United States Patent
Avila

(10) Patent No.: US 11,034,391 B2
(45) Date of Patent: Jun. 15, 2021

(54) TOOL RACK SYSTEM AND METHOD

(71) Applicant: Stephen Anthony Avila, Sanger, TX (US)

(72) Inventor: Stephen Anthony Avila, Sanger, TX (US)

(*) Notice: Subject to any disclaimer, the term of this patent is extended or adjusted under 35 U.S.C. 154(b) by 220 days.

(21) Appl. No.: 15/158,081

(22) Filed: May 18, 2016

(65) Prior Publication Data
US 2016/0339967 A1 Nov. 24, 2016

Related U.S. Application Data

(60) Provisional application No. 62/164,990, filed on May 21, 2015.

(51) Int. Cl.
*B62D 33/02* (2006.01)
*B60R 11/06* (2006.01)

(52) U.S. Cl.
CPC .......... *B62D 33/0207* (2013.01); *B60R 11/06* (2013.01)

(58) Field of Classification Search
CPC ..... B62D 33/0207; B60R 11/06; F16B 7/025; B60P 3/40; B65H 75/366; Y10S 224/922; Y10T 137/6918; A47B 81/005; A01K 97/10
USPC ....... 224/405, 403, 404, 402, 497, 314, 549, 224/922; 248/89; 211/1.3, 70.6, 80, 182; 296/37.6
See application file for complete search history.

(56) References Cited

U.S. PATENT DOCUMENTS

| | | | | |
|---|---|---|---|---|
| 2,720,414 A * | 10/1955 | Hart | ........................ | B62D 33/08 211/182 |
| 5,292,045 A * | 3/1994 | Mandel | .................... | B60R 9/00 224/309 |
| 5,964,358 A * | 10/1999 | Hafendorfer | ........... | B60R 11/00 211/70.6 |
| D494,532 S * | 8/2004 | Reese | ......................... | D12/406 |
| 8,157,312 B2 * | 4/2012 | Bliss, Jr. | .................. | B60P 3/14 224/403 |
| 8,523,128 B2 * | 9/2013 | Palermo | ................ | B60P 7/0815 224/403 |
| 2006/0226097 A1 * | 10/2006 | Smith | ...................... | B25H 3/04 211/70.6 |
| 2013/0001179 A1 * | 1/2013 | Harpole | ................. | B65D 19/12 211/59.4 |
| 2013/0257075 A1 * | 10/2013 | Riley | ....................... | B60R 9/00 296/3 |

(Continued)

*Primary Examiner* — Nathan J Newhouse
*Assistant Examiner* — Matthew T Theis
(74) *Attorney, Agent, or Firm* — Kevin Mark Klughart

(57) ABSTRACT

A tool rack system/method configured for operation on a pickup truck is disclosed. The system integrates a diagonal tube stack (DTS), an elongated tube stack (ETS), and a reconfigurable hose rack (RHR). The DTS, ETS, and RHR are configured for placement over the wheel well and tailgate in a pickup truck such that tools inserted within the tool rack are organized and readily available without cluttering the pickup truck bed. The ETS is configured to permit retention of oversized hand tools such as pool cleaning implements without the need for an overhead truck rack. The RHR may be reconfigured to adapt to the overhead retention of long pipe joints as well as hoses such as those used in pool maintenance operations. In both of these reconfigured modes the RHR obviates the need for a conventional truck rack or the use of space within the truck bed for storage.

20 Claims, 160 Drawing Sheets

(56) References Cited

U.S. PATENT DOCUMENTS

2014/0197653 A1* 7/2014 Stepanians ................ B60R 9/00
296/3

* cited by examiner

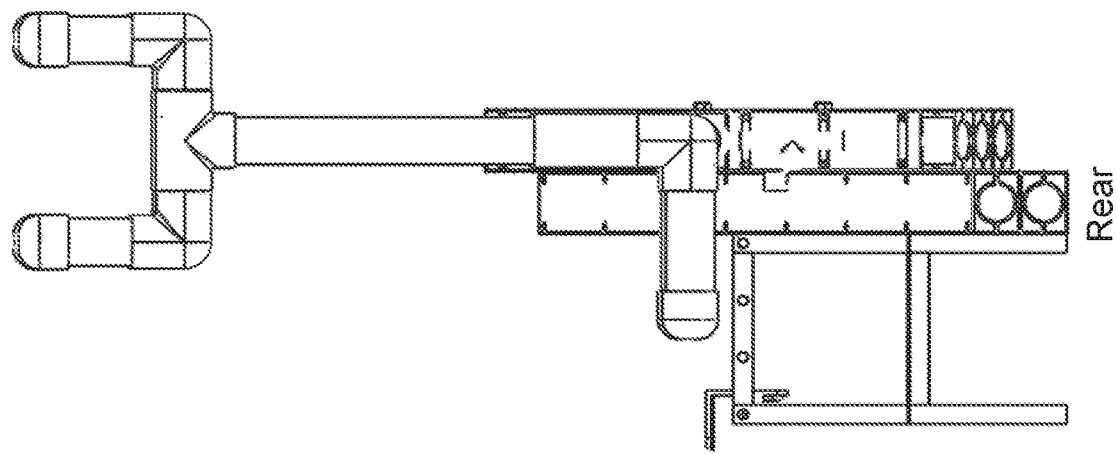
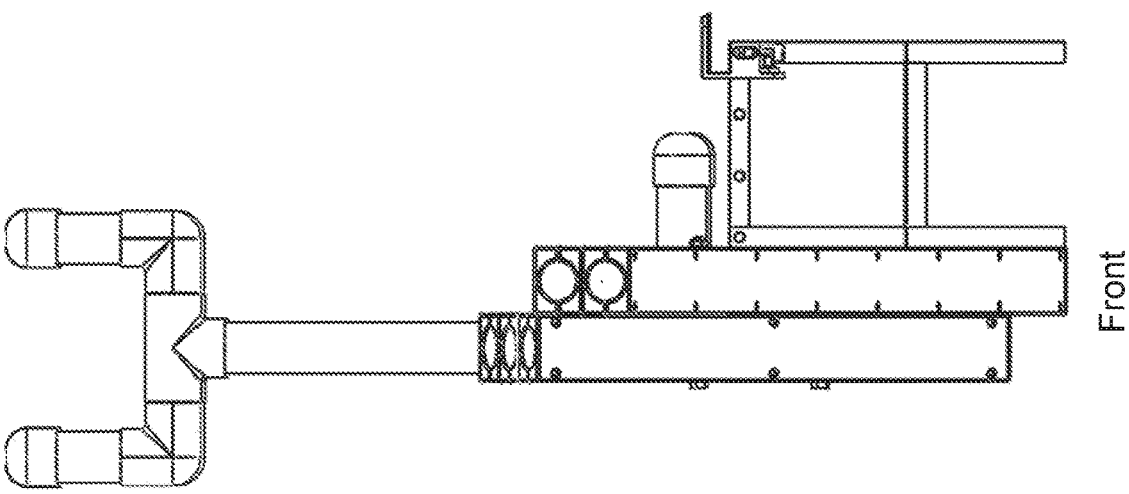
FIG. 35

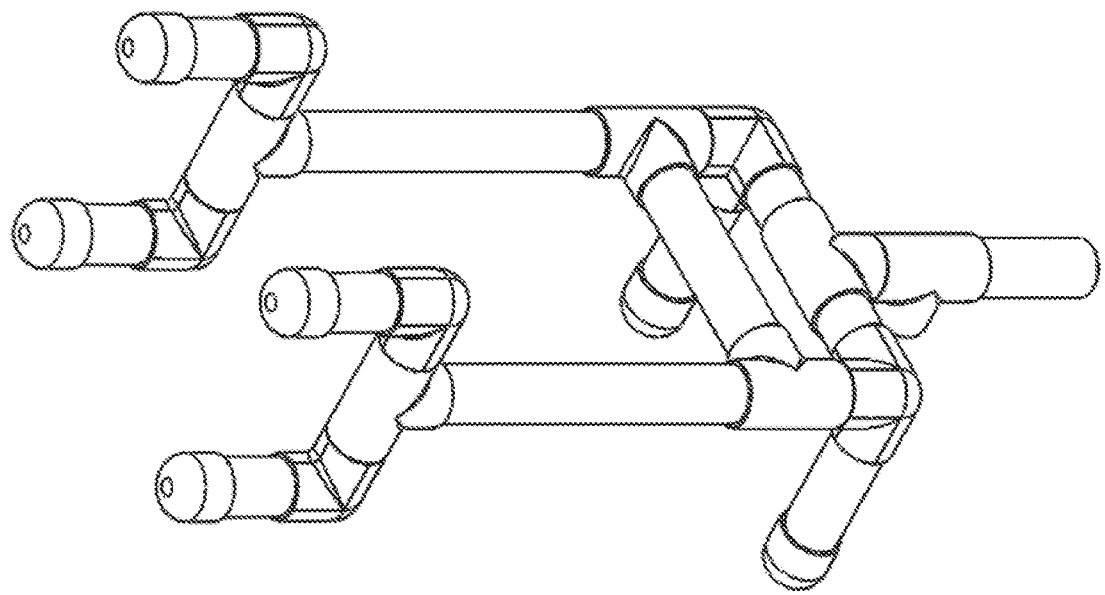
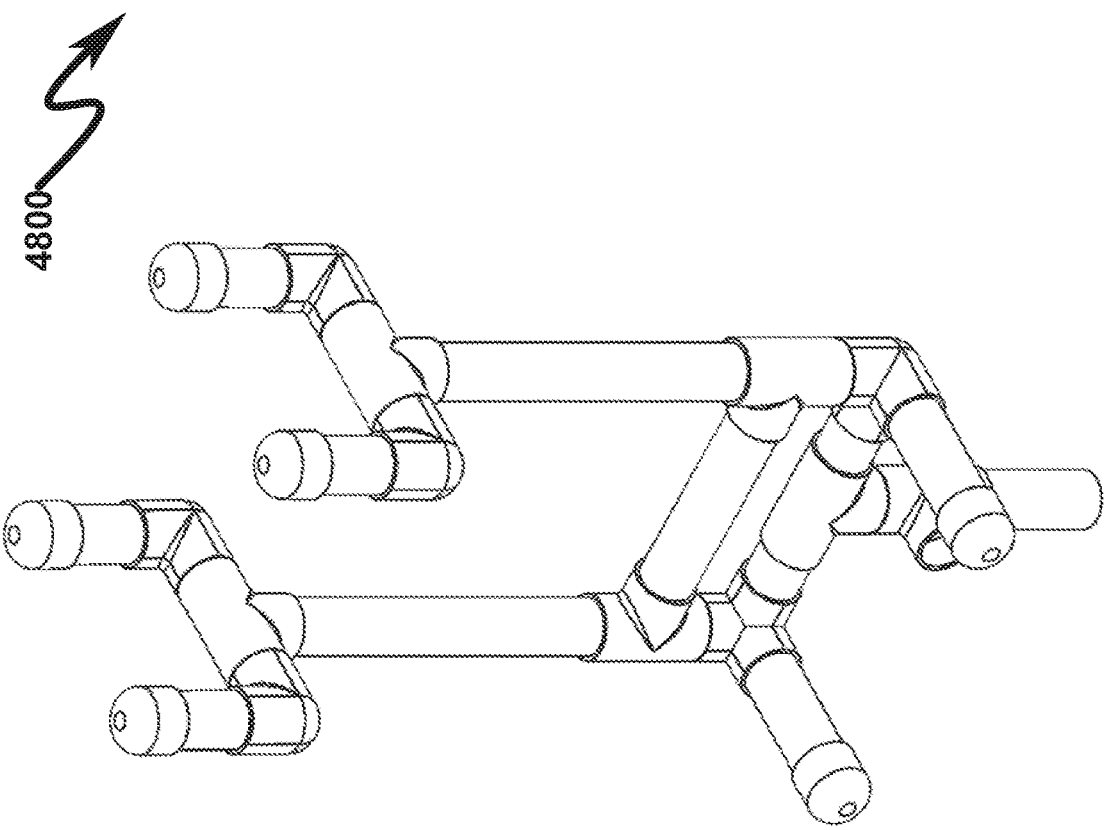
FIG. 48

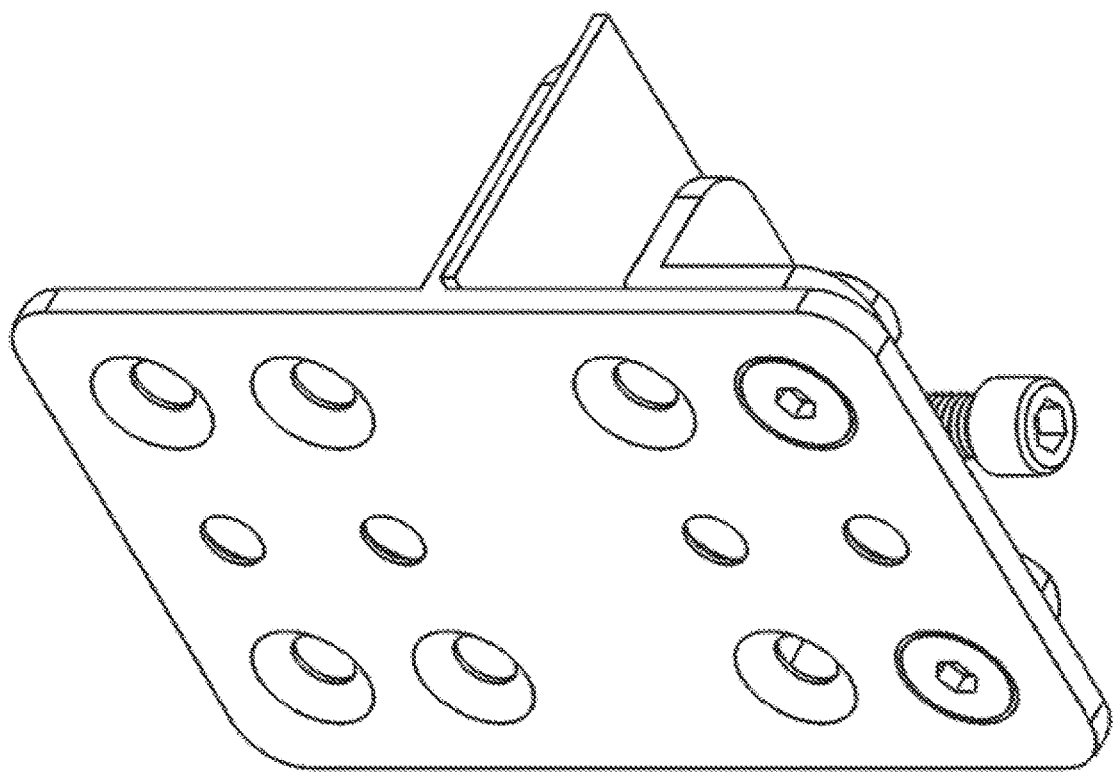
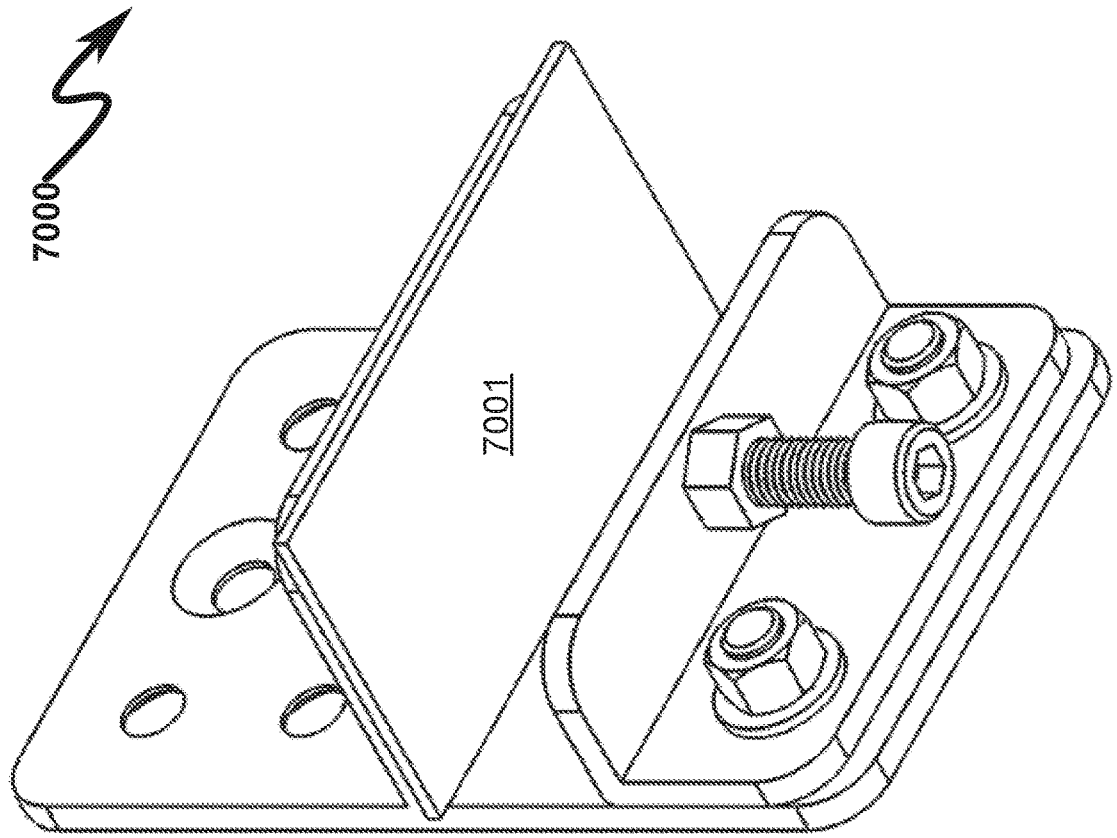
FIG. 70

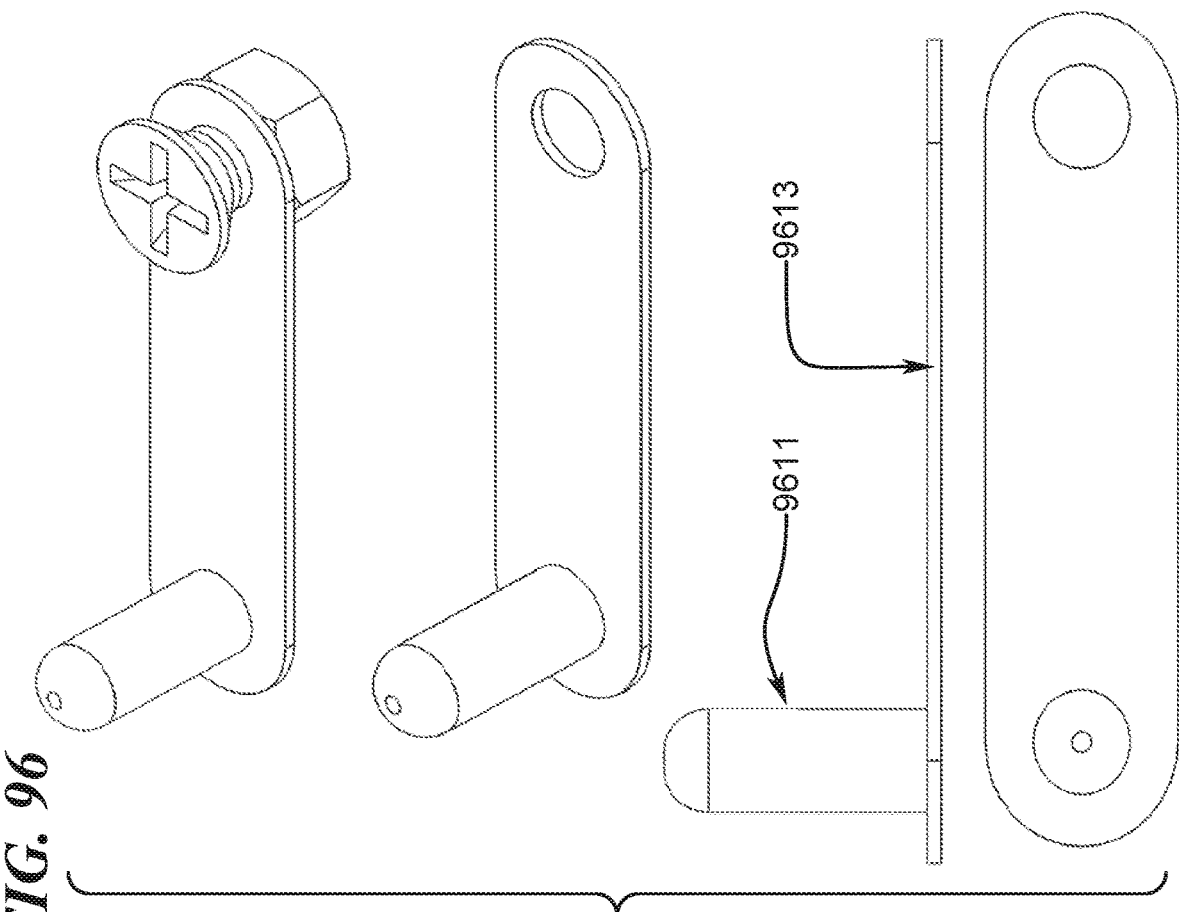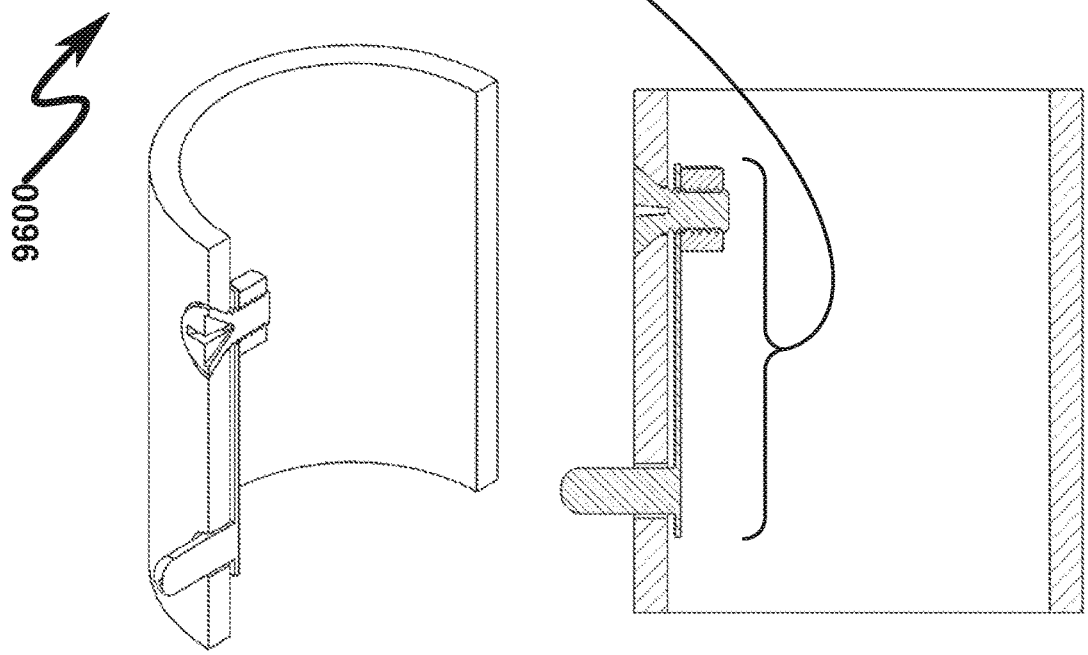
FIG. 96

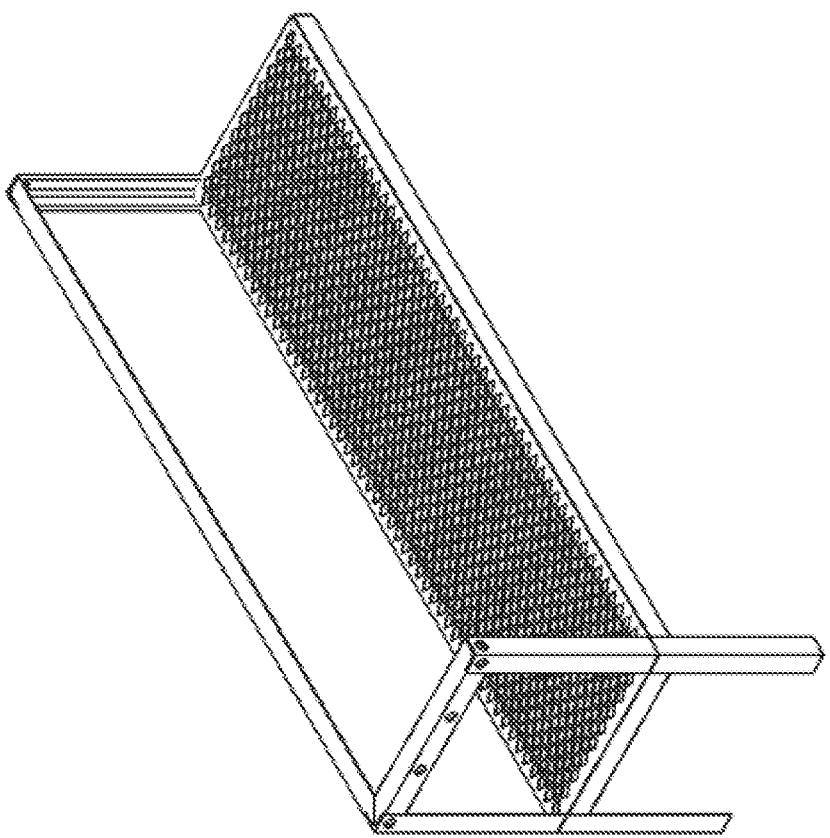
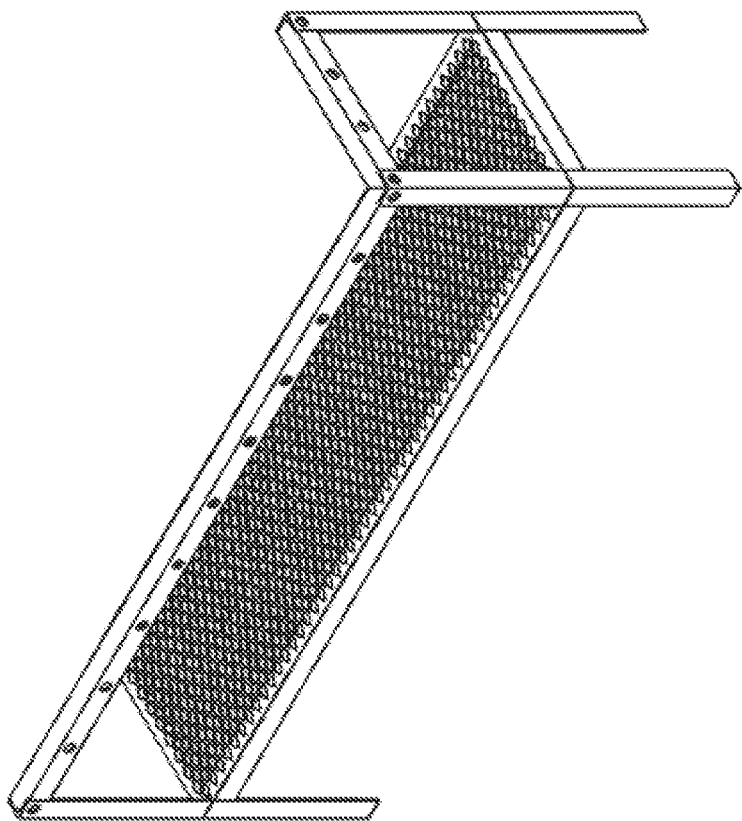
FIG. 104

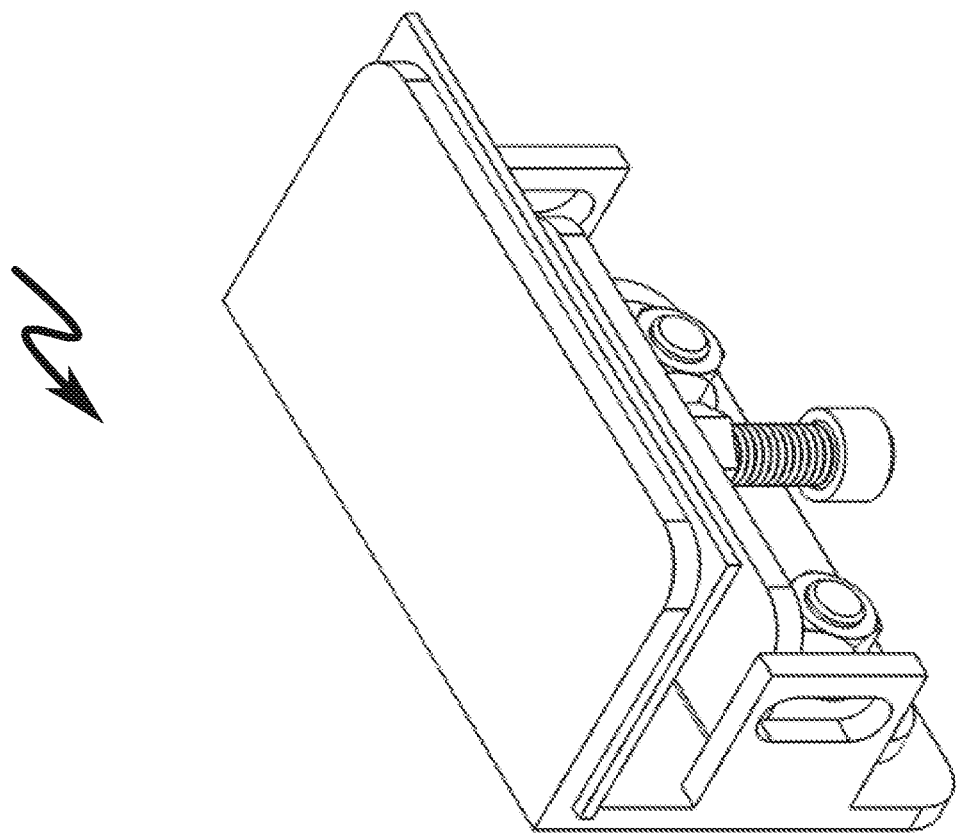
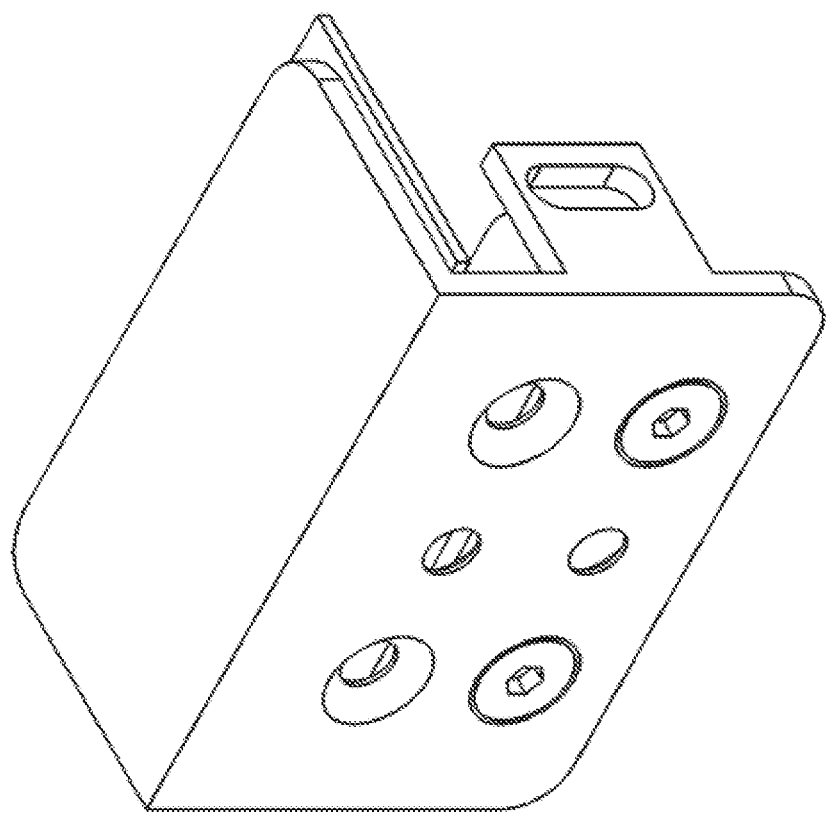
FIG. 109

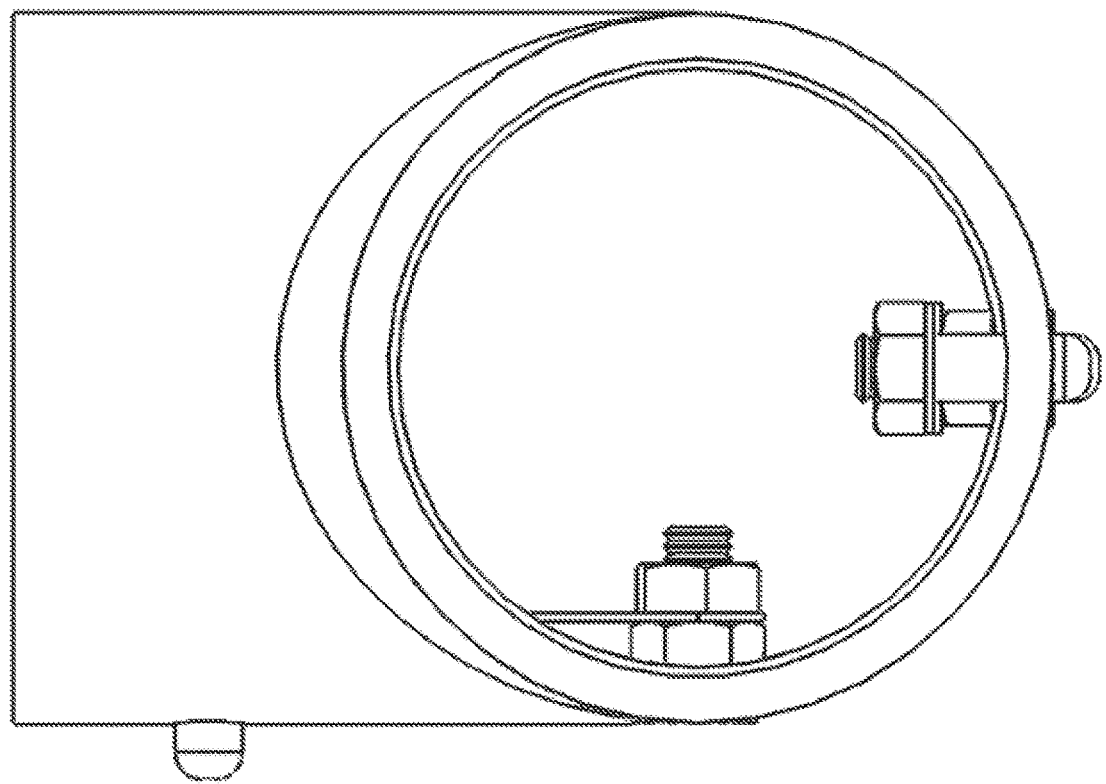
FIG. 127

14700

FIG. 160
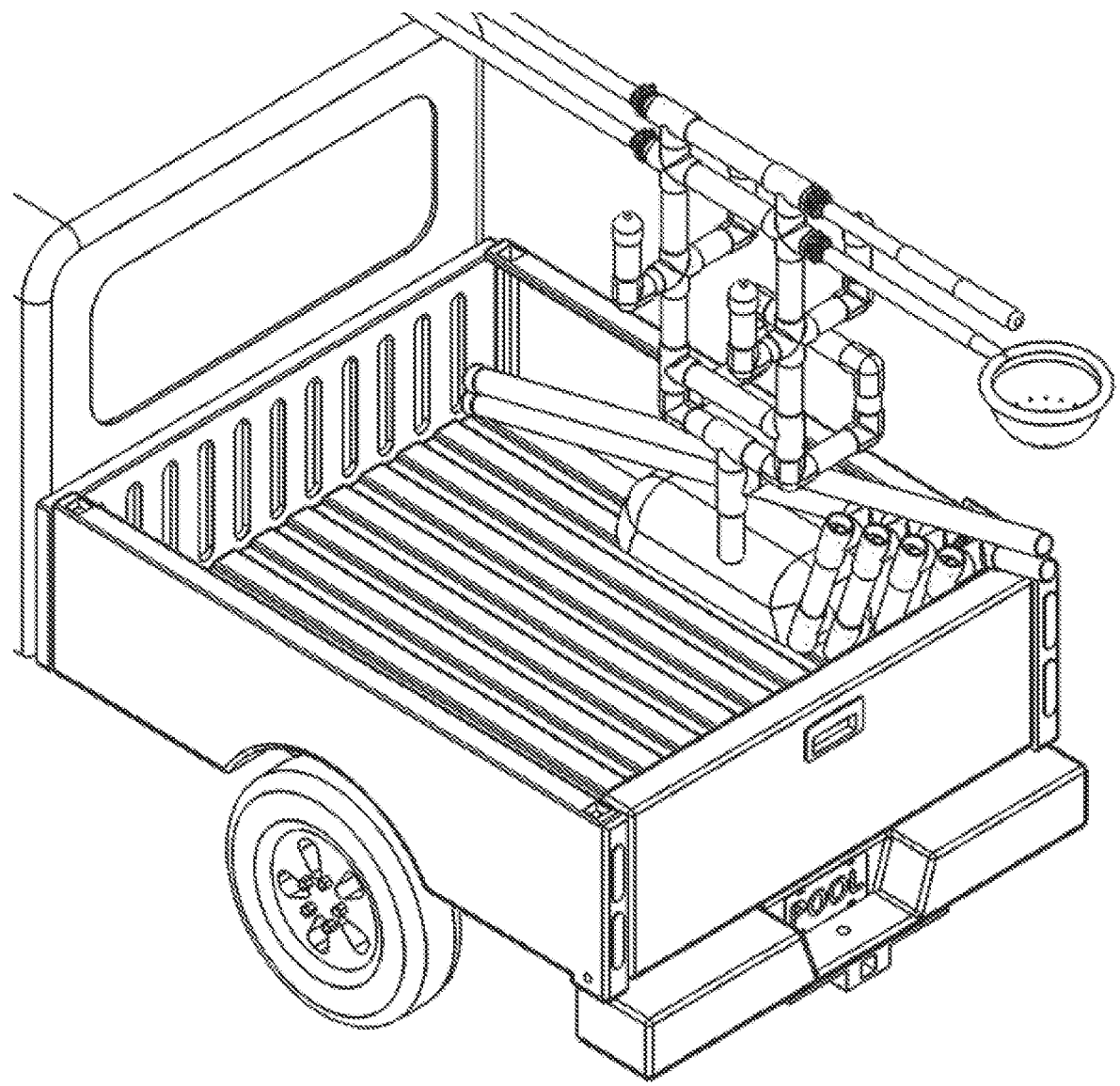

TOOL RACK SYSTEM AND METHOD

CROSS REFERENCE TO RELATED APPLICATIONS

Applicant claims benefit pursuant to 35 U.S.C. § 119 and hereby incorporates by reference Provisional Patent Application for "TOOL RACK SYSTEM AND METHOD," Ser. No. 62/164,990, filed electronically with the USPTO on May 21, 2015 with EFS ID 22417134 and Confirmation Number 4701.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for implementing a tool rack on a pickup truck. Specifically, the present invention in many preferred embodiments has application to situations in which a tool rack must be implemented on a pickup truck without significantly impacting the storage capacity of the pickup truck cargo bed and without significantly impacting the overall height of the pickup truck. Many of these application contexts involve a tool rack specifically configured to support pool maintenance operations using a pickup truck.

PRIOR ART AND BACKGROUND OF THE INVENTION

Conventional Overhead Tool Rack Systems (0100)-(0800)

Traditional tool racks associated with pickup trucks are generally fixed in construction and are either configured as overhead storage racks or in some circumstances configured as vertical posts placed in the vertical stake retainers that are typically located on the corners of the pickup truck bed. A typical overhead rack system is depicted in FIG. 1 (0100)-FIG. 3 (0300) and is depicted as installed on a typical pickup truck in FIG. 4 (0400)-FIG. 6 (0600). In many circumstances these configurations are neither convenient nor practical as overhead storage racks tend to permanently set the overall height of the pickup truck (see FIG. 6 (0600)) and are not necessarily optimally configured for a given complement of tools. Furthermore, not all pickup trucks are configured with post/stake receptacles on their four corners of the pickup truck bed walls (see FIG. 4 (0400)) and as such any tool rack configuration dependent on this truck feature will not necessarily work with other pickup trucks not having this feature.

As generally depicted in the drawings, overhead tool racks of this form are generally fixed in nature and as a result are not adjustable to accommodate a variety of tools having a variety of physical form factors. As a result, as depicted in FIG. 7 (0700) and FIG. 8 (0800), the pickup truck when configured with these overhead tool rack systems is often cluttered with tools of varying length, bulk items such as buckets, and in some cases very long items such as PVC pipe joints and the like. As depicted in a conventional pool maintenance configuration of FIG. 8 (0800), it can be seen that space efficiency within the pickup truck bed is so constrained that pool cleaning equipment may even be attached to the rear tow hitch receiver of the pickup truck to affect additional storage space within the pickup truck bed. This clutter in this conventional configuration results in both efficiency and safety issues that are not addressed by the tool rack systems of the prior art. Furthermore, it should be noted that space above the wheel wells of the pickup truck bed is typically unusable for storage of bulk items such as buckets and other similarly configured items.

DEFICIENCIES IN THE PRIOR ART

The prior art as detailed above suffers from the following deficiencies:
  Prior art tool rack systems are difficult to install and remove from the pickup truck.
  Prior art tool rack systems lack the ability to be reconfigured to accommodate a variety of tool storage.
  Prior art tool rack systems lack the ability to be adaptable depending on the number of tools to be stored.
  Prior art tool rack systems lack the ability to be adaptable to both long and short tools.
  Prior art tool rack systems lack the ability to be adaptable to temporary storage of very long items such as pipe joints and the like.
  Prior art tool rack systems generally reduce the storage capacity of the pickup truck bed.
  Prior art tool rack systems generally fix the minimum height of the pickup truck and may pose height issues in some circumstances.
  Prior art tool rack systems generally require stake post receptacles in the truck.
  Prior art tool rack systems generally cannot be expanded to support a variable number of tools.
  Prior art tool rack systems generally have difficulty in managing tools that extend beyond or lay on the tailgate, as this limits the operation of the tailgate to load/remove bulk materials such as buckets, chemicals, etc.

While some of the prior art may teach some solutions to several of these problems, the core issue of integrating a low profile adjustable and adaptable tool rack system into the context of a pickup truck has not been solved by the prior art.

OBJECTIVES OF THE INVENTION

Accordingly, the objectives of the present invention are (among others) to circumvent the deficiencies in the prior art and affect the following objectives in the context of a tool rack system and method:

(1) Provide for a tool rack system and method that permits easy installation and removal from a pickup truck.
(2) Provide for a tool rack system and method that permits easy installation and removal from the pickup truck.
(3) Provide for a tool rack system and method that permits reconfiguration to accommodate a variety of tool storage.
(4) Provide for a tool rack system and method that may be adapted depending on the number of tools to be stored.
(5) Provide for a tool rack system and method that may be adaptable to both long and short tools.
(6) Provide for a tool rack system and method that may be adapted to temporary storage of very long items such as pipe joints and the like.
(7) Provide for a tool rack system and method that limits reduction of the storage capacity of the pickup truck bed and makes use of "unused" area within the pickup truck bed.
(8) Provide for a tool rack system and method that minimizes the overall height of the pickup truck.
(9) Provide for a tool rack system and method that does not require stake post receptacles on the truck.
(10) Provide for a tool rack system and method that may be expanded to support a variable number of tools.
(11) Provide for a tool rack system and method that may operate independent of the state of the pickup truck tailgate.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention as embodied in a system and method that provides for a low profile adaptable and adjustable tool rack system suitable for installation and use in a pickup truck. The system is configured such that it may be place over the wheel well in the pickup truck bed and thus make use of typically "unusable" space within the pickup truck bed. The system incorporates a diagonal tube stack (DTS) used to retain hand tools having moderate to short length, an elongated tube stack (ETS) configured to retain hand tools having a long overall length, and a reconfigurable hose rack (RHR) that serves a dual purpose of storing hose and similar looped materials and also providing for the temporary storage of very long items such as pipe joints and the like.

The system and method as described herein may be adapted to a variety of application contexts, but is especially useful in the pool maintenance trades. In this exemplary application context, pool maintenance involves a number of tools having long pole components that are often difficult to safely and efficiently store in a pickup truck. Furthermore, other hand tools in this particular trade are often strewn throughout the pickup truck bed making use of the pickup truck bed for storage of pool chemicals and the like difficult or impossible. Additionally, the storage of hand tools within a pickup truck bed presents several safety concerns as these tools are generally not restrained and may be subject to ejection from the pickup truck bed in certain circumstances. Furthermore, unrestrained tools in this arrangement may impact chemical storage containers in the pickup truck bed and thus present an additional safety hazard. Finally, the pool trades require a number of bulky chemicals for pool maintenance, and there is no cohesive method to store these chemicals using traditional tool storage systems and methodologies.

The present invention as described herein addresses these issues by providing a low profile tool storage rack that allows safe storage of pool maintenance tools in the context of a pickup truck bed while making efficient and safe use of the pickup truck bed. Additionally, the system as presented permits very long objects such as pipe joints and the like to be stored for temporary transport in situations where pool maintenance functions require this functionality. The system as described may also be augmented by a wheel-well storage rack (WSR) that permits safe storage of chemicals and other storage containers associated will pool maintenance operations while simultaneously utilizing previously unusable space above the pickup truck bed wheel wells.

BRIEF DESCRIPTION OF THE DRAWINGS

For a fuller understanding of the advantages provided by the invention, reference should be made to the following detailed description together with the accompanying drawings wherein:

FIG. 35 illustrates front and rear views of a preferred exemplary invention embodiment incorporating a wheel-well storage rack (WSR);

FIG. 48 illustrates top front left and right perspective views of a preferred exemplary invention reconfigurable hose rack (RHR) embodiment;

FIG. 70 illustrates bottom right and left front perspective views of a universal non-penetrating mounting bracket useful in some preferred invention embodiments;

FIG. 96 illustrates sectional and top/front detail views of a preferred exemplary reconfigurable hose rack (RHR) detent mechanism incorporated within a U-shaped rotatable fork;

FIG. 104 illustrates top left front and top right front perspective detail views of an exemplary wheel-well storage rack (WSR) designed for right wheel-well placement with a conventional truck storage box;

FIG. 109 illustrates top left and right front perspective views of a WSR non-penetrating mounting bracket useful in some preferred invention embodiments;

FIG. 119 illustrates an ETS member configured for a 1-slot tubular stack utilizing unified identical extrusions for the entire tubular stack;

FIG. 120 illustrates an ETS member configured for a 1-slot tubular stack illustrating exemplary mounting of the 1-slot tubular stack to the UMB or WSR;

FIG. 121 illustrates a perspective view of an exemplary universal joint assembly structure useful in some preferred invention embodiments;

FIG. 122 illustrates a perspective view of an exemplary universal joint assembly structure useful in some preferred invention embodiments with T-joint hidden;

FIG. 123 illustrates a perspective view of an exemplary universal joint assembly structure useful in some preferred invention embodiments with T-joint and connecting pipe tubes hidden;

FIG. 124 illustrates a front view of an exemplary universal joint assembly structure useful in some preferred invention embodiments with T-joint and connecting pipe tubes hidden;

FIG. 125 illustrates a front view of an exemplary universal joint useful in some preferred invention embodiments;

FIG. 126 illustrates a top view of an exemplary universal joint useful in some preferred invention embodiments;

FIG. 127 illustrates a side view of an exemplary universal joint useful in some preferred invention embodiments;

FIG. 128 illustrates a back side section view of an exemplary universal joint useful in some preferred invention embodiments;

FIG. 129 illustrates a top right front perspective view of an exemplary preferred invention embodiment incorporating dual hose racks;

FIG. 130 illustrates a top right rear perspective view of an exemplary preferred invention embodiment incorporating dual hose racks;

Figure 131:
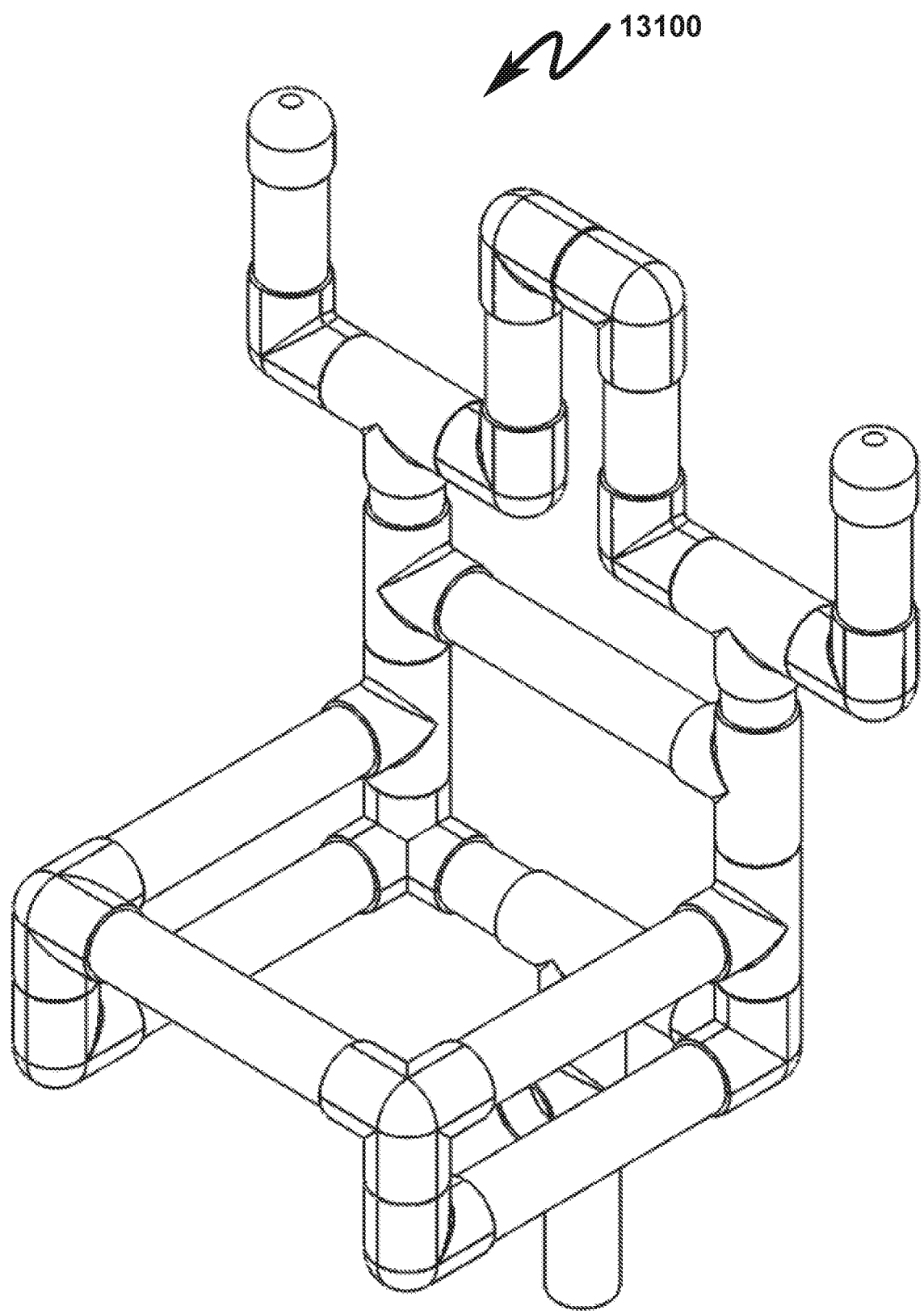
Figure 132:
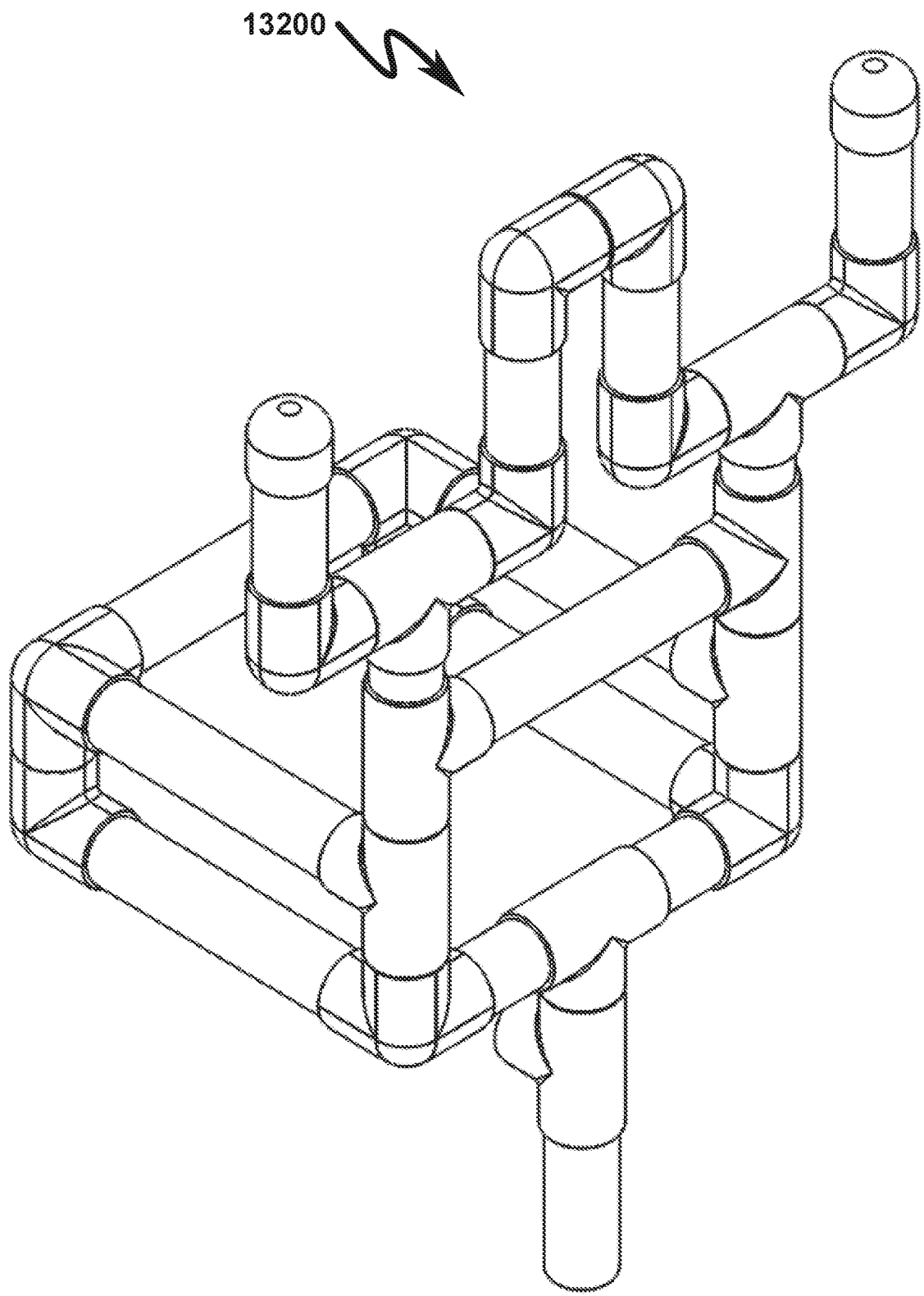
Figure 133:
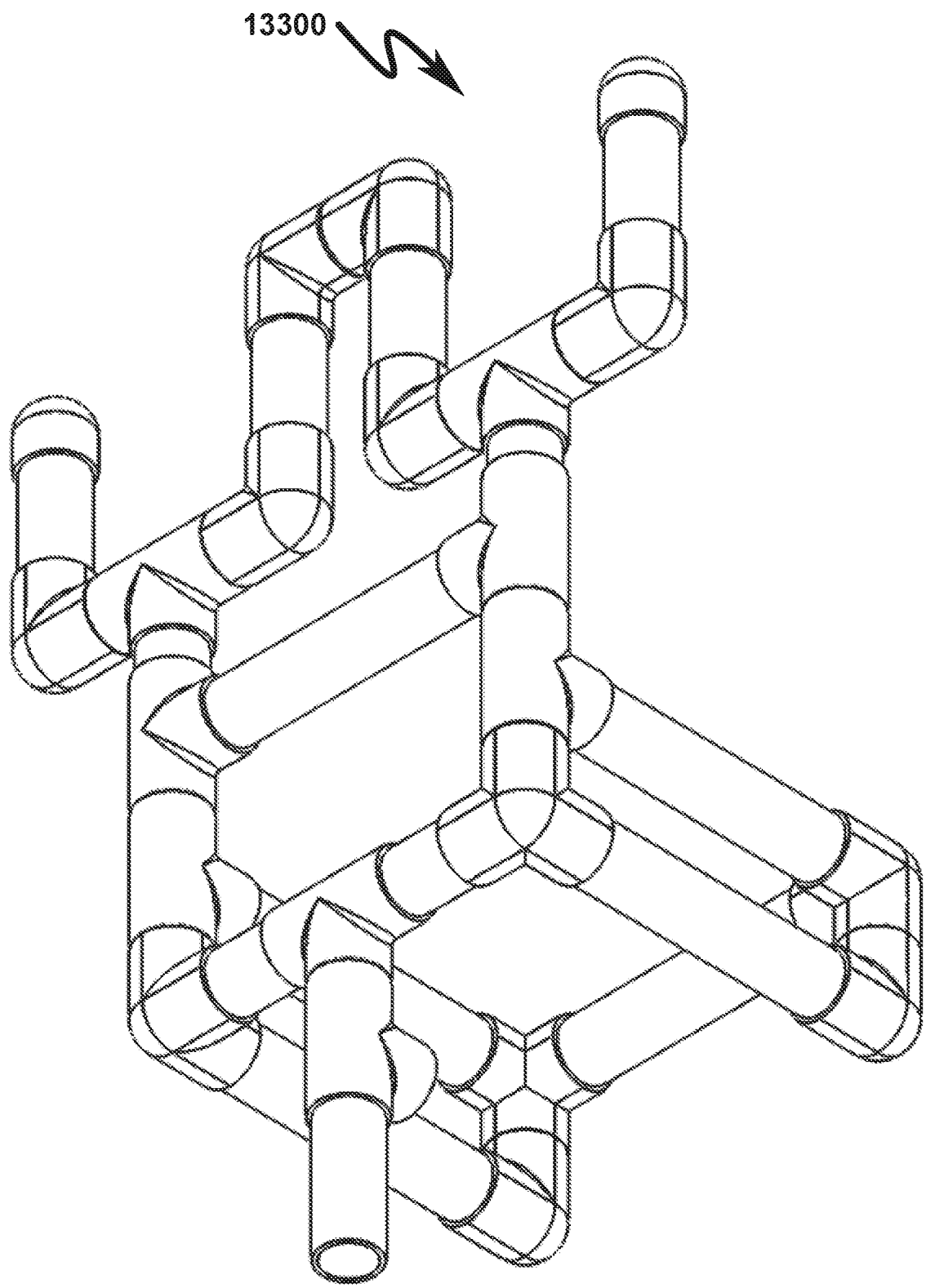
Figure 134:
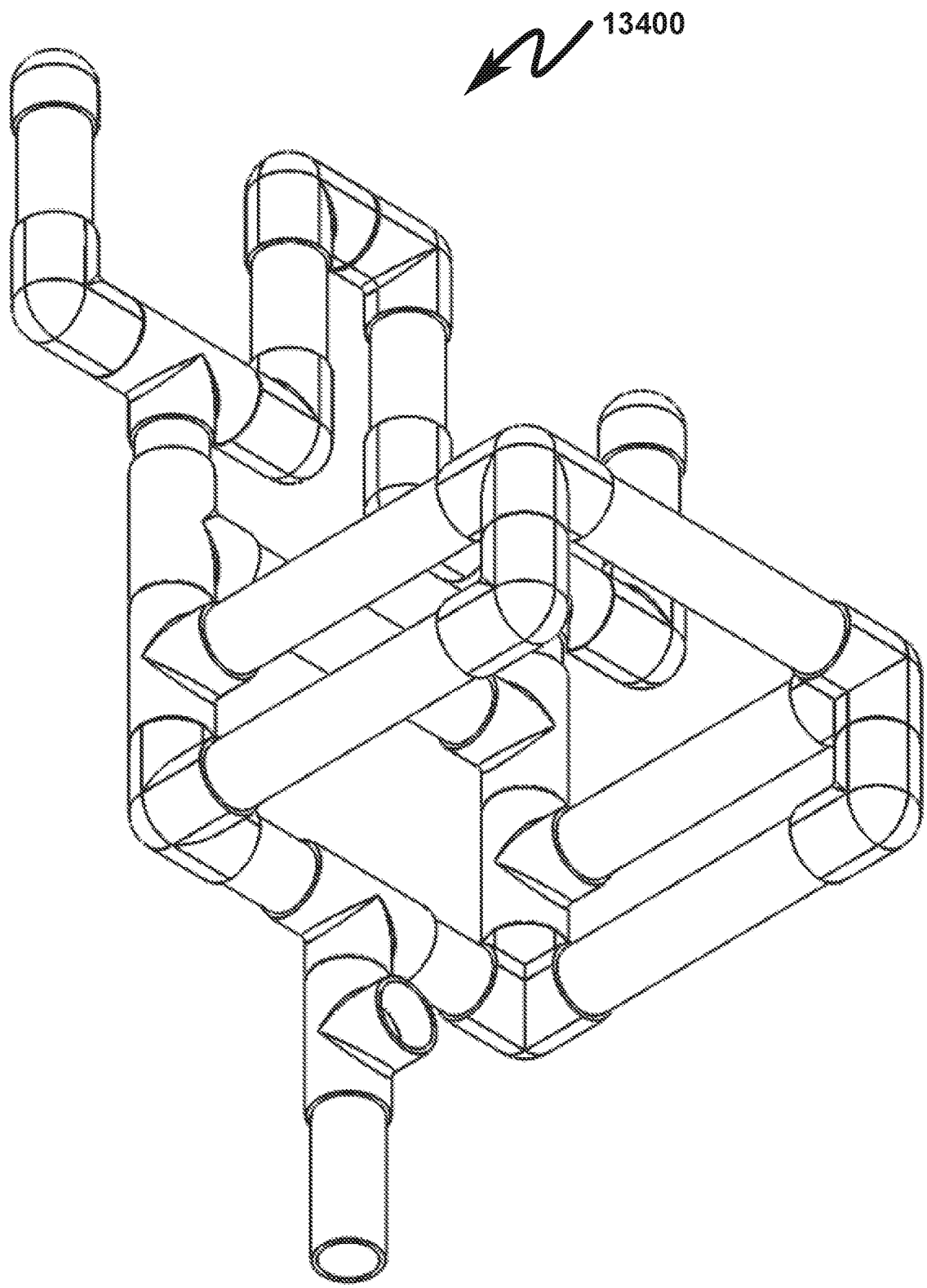
Figure 135:
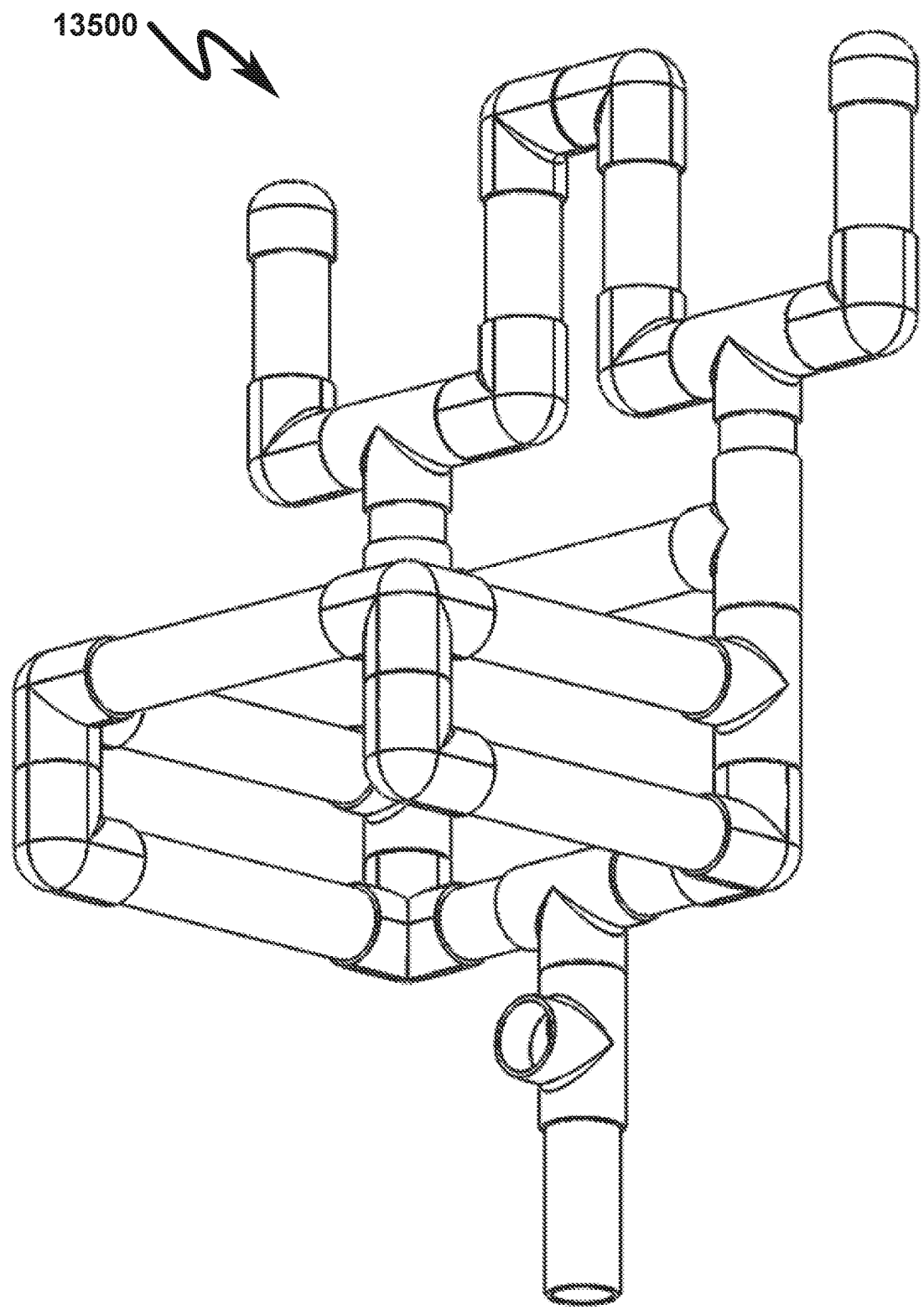
Figure 136:
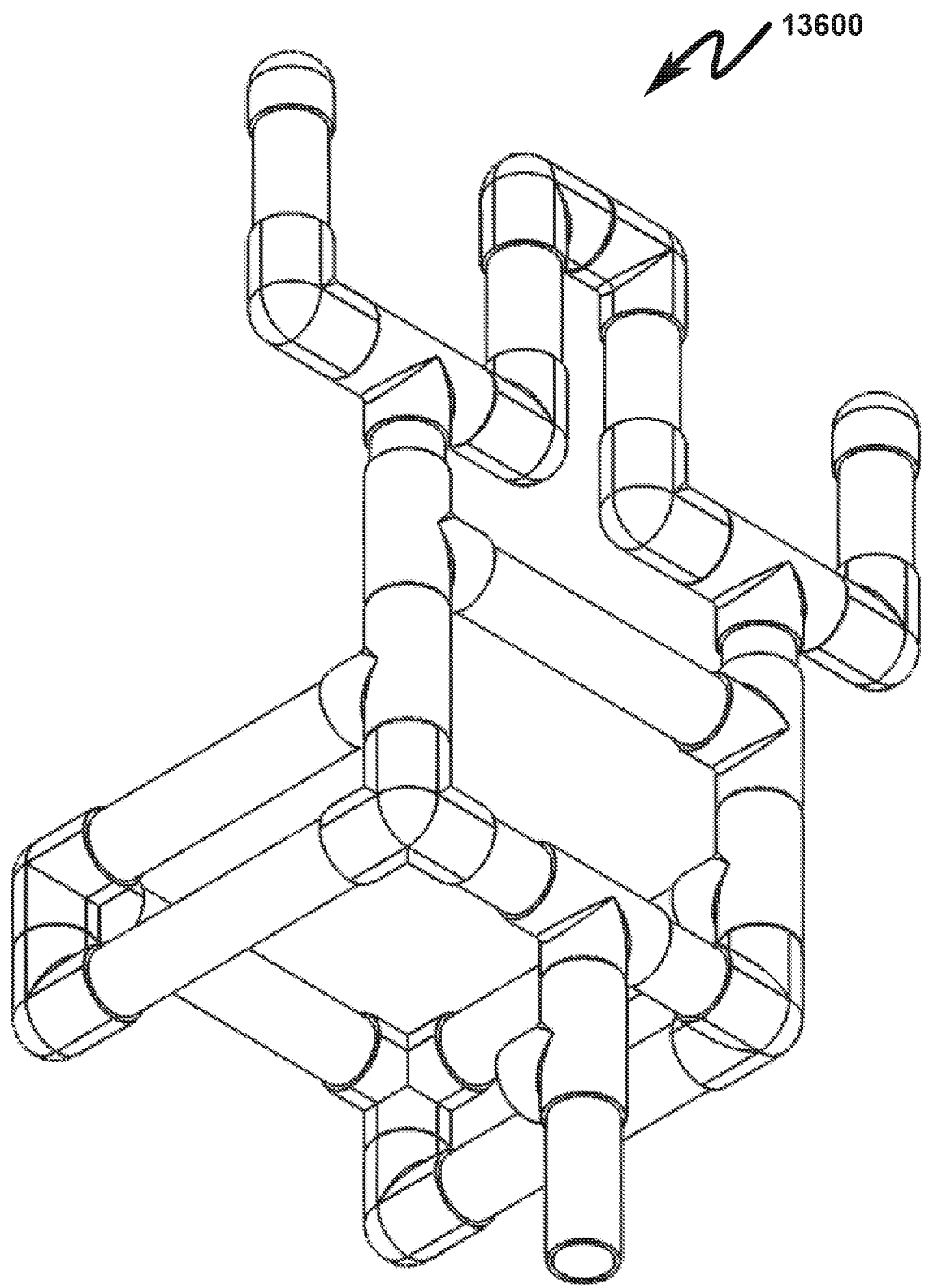
Figure 137:
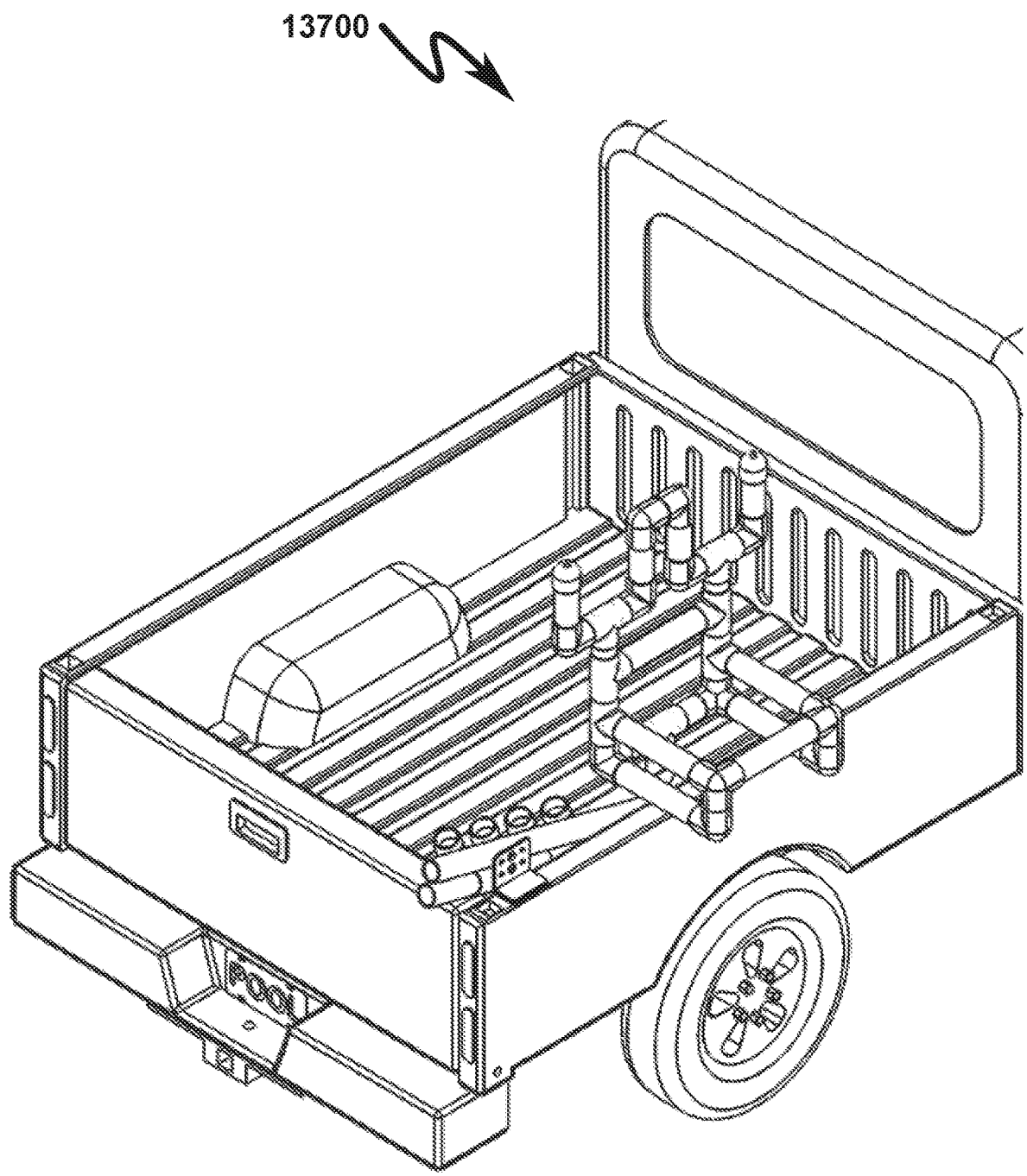
Figure 138:
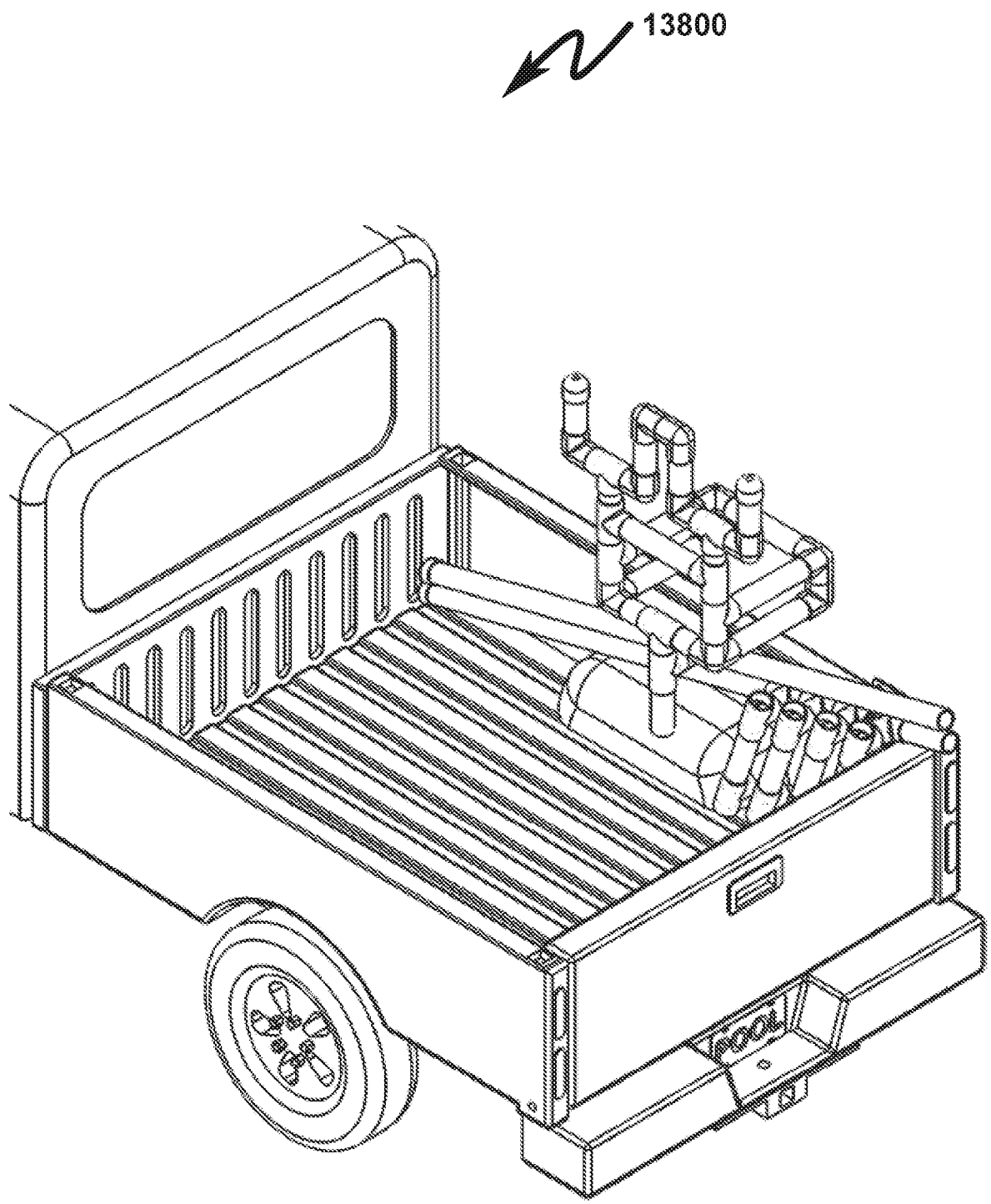
Figure 139:
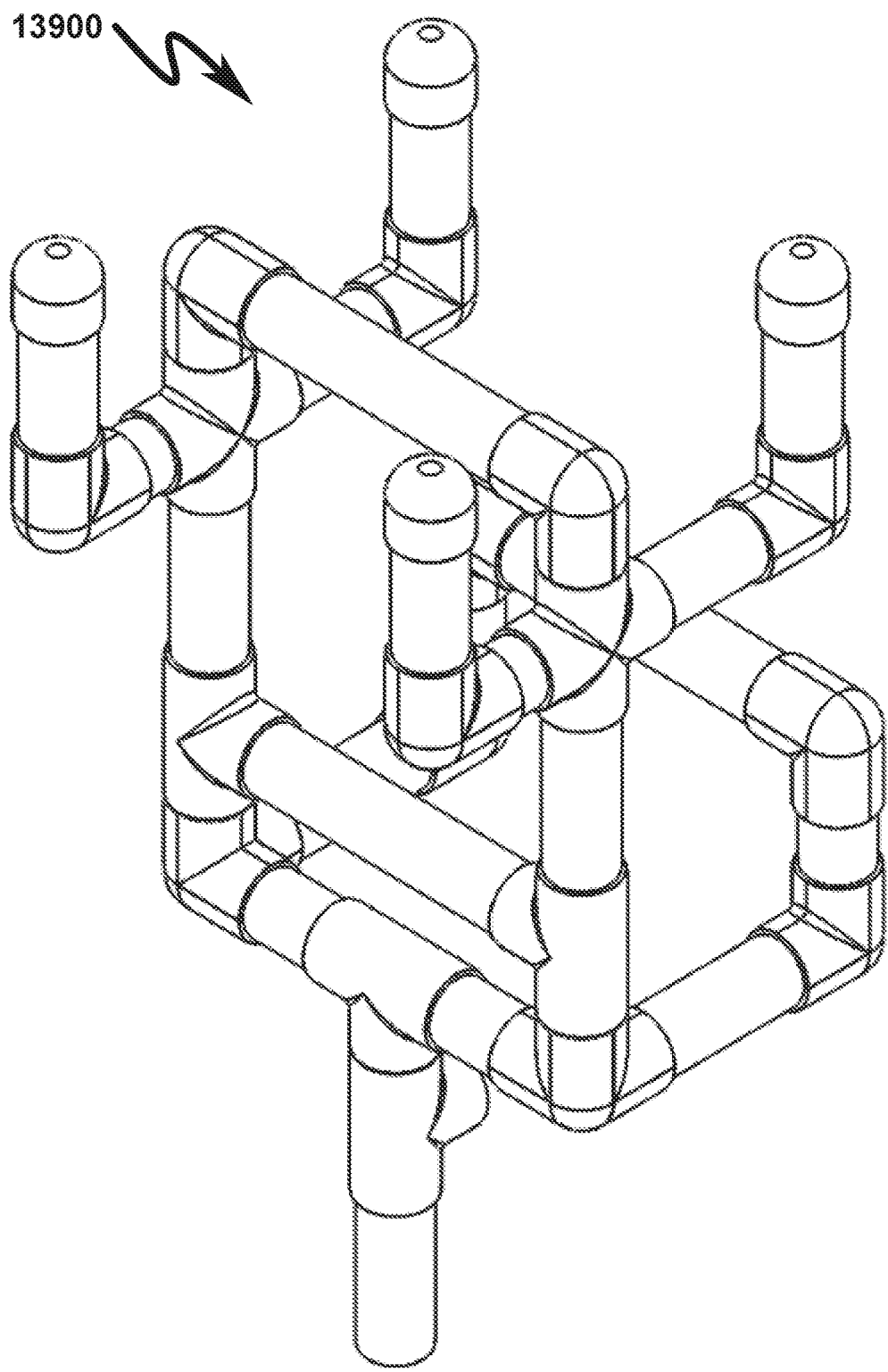
Figure 140:
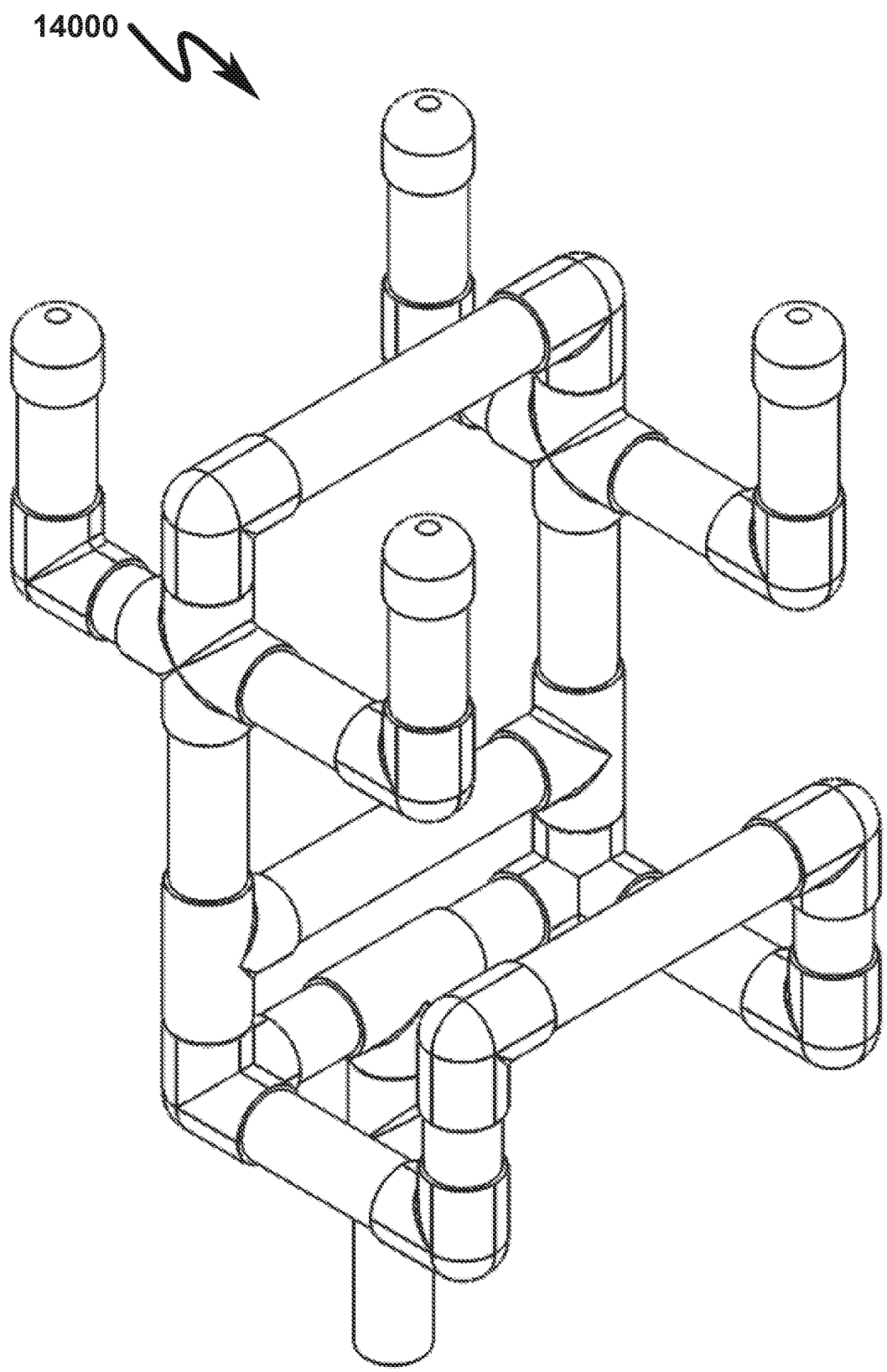
Figure 141:
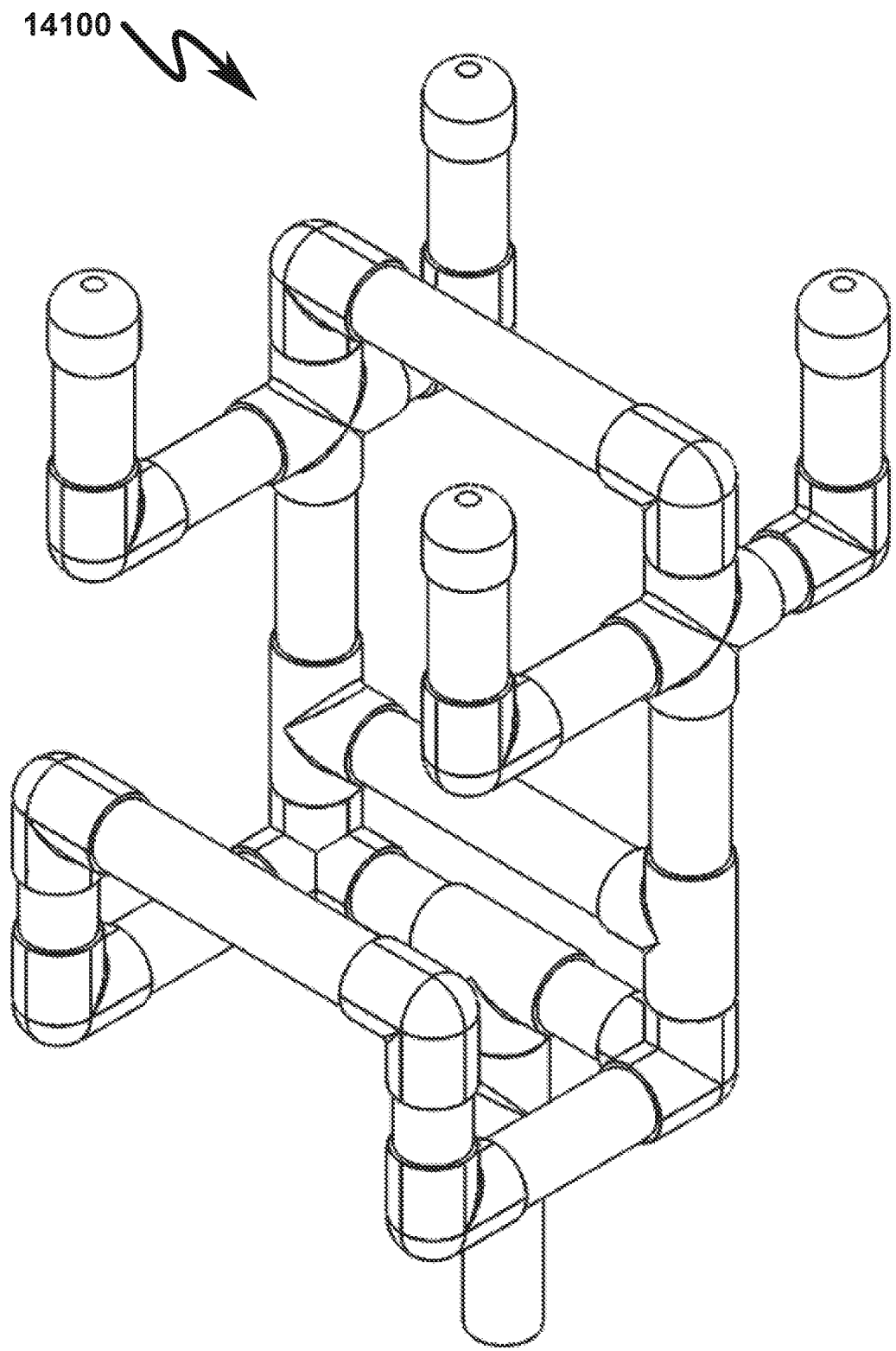
Figure 142:
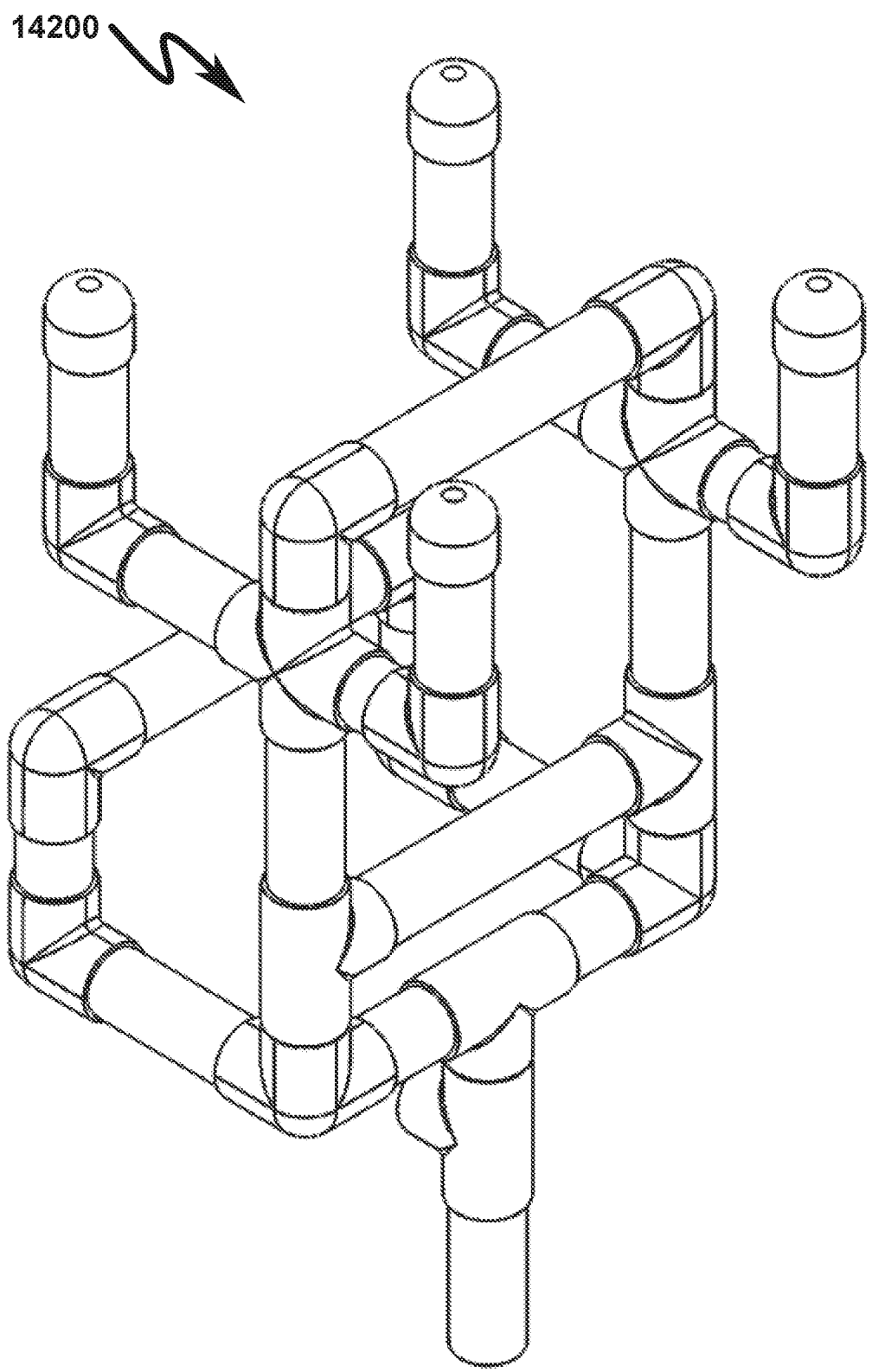
Figure 143:
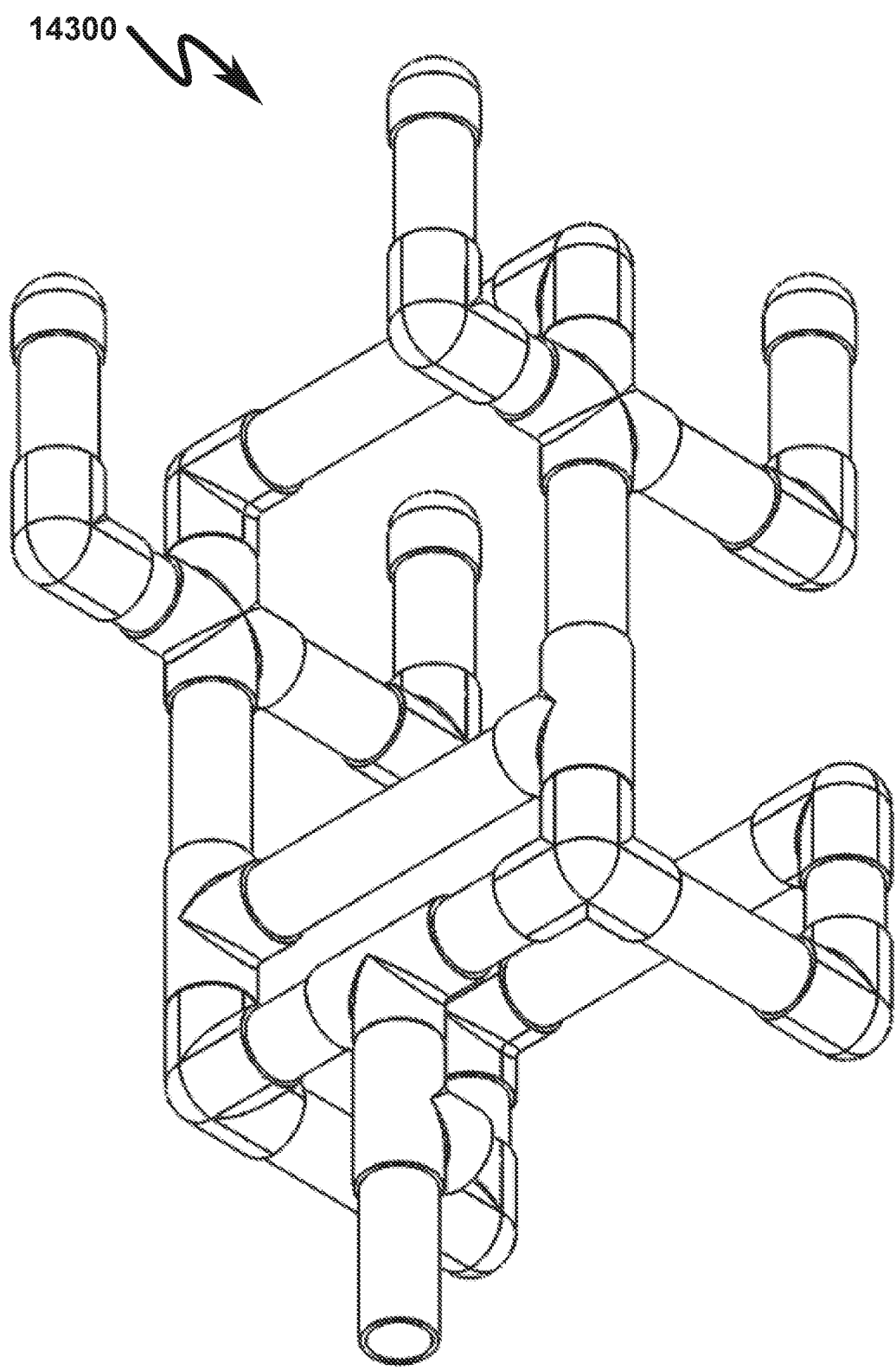
Figure 144:
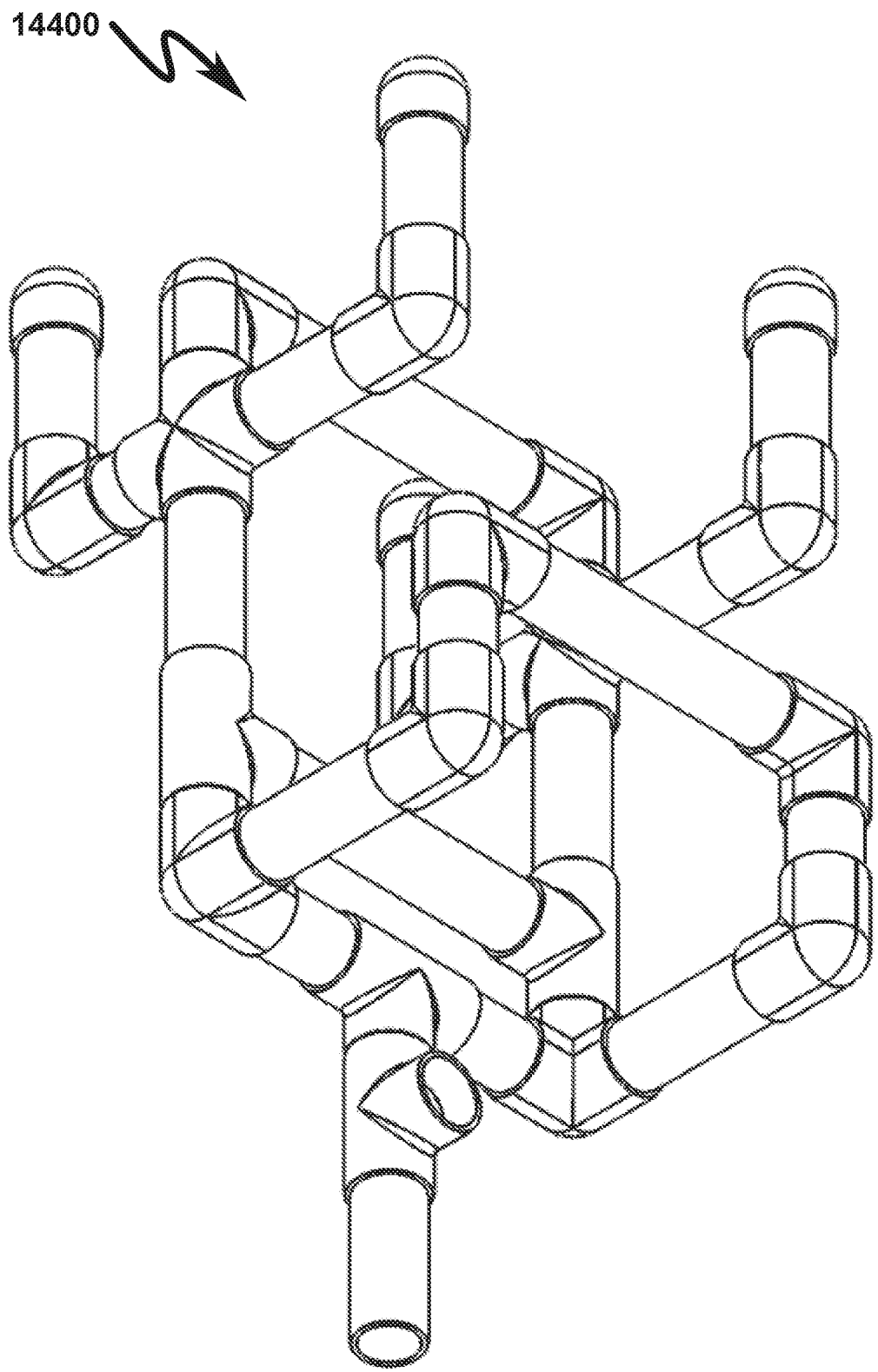
Figure 145:
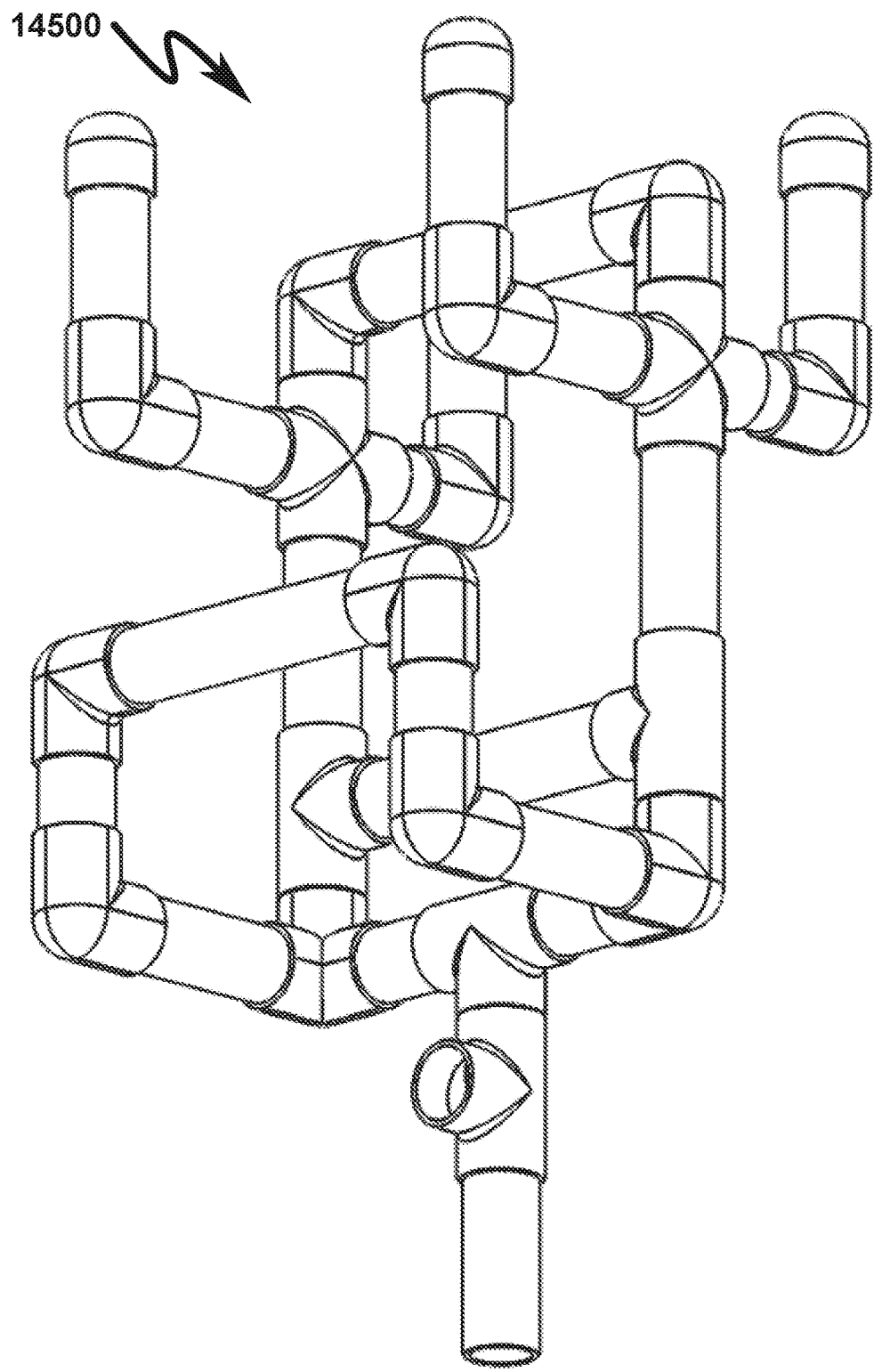
Figure 146:
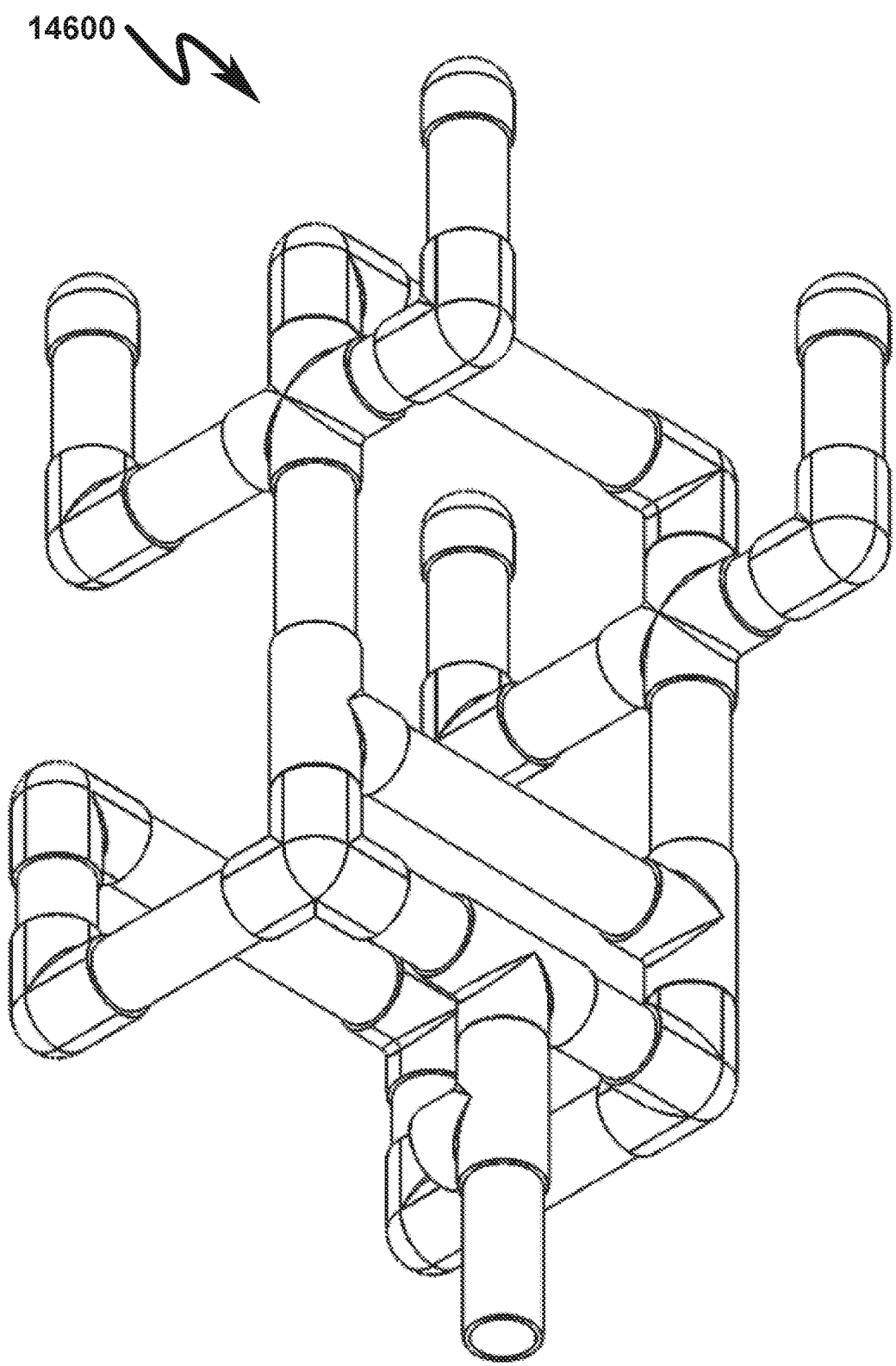
Figure 147:
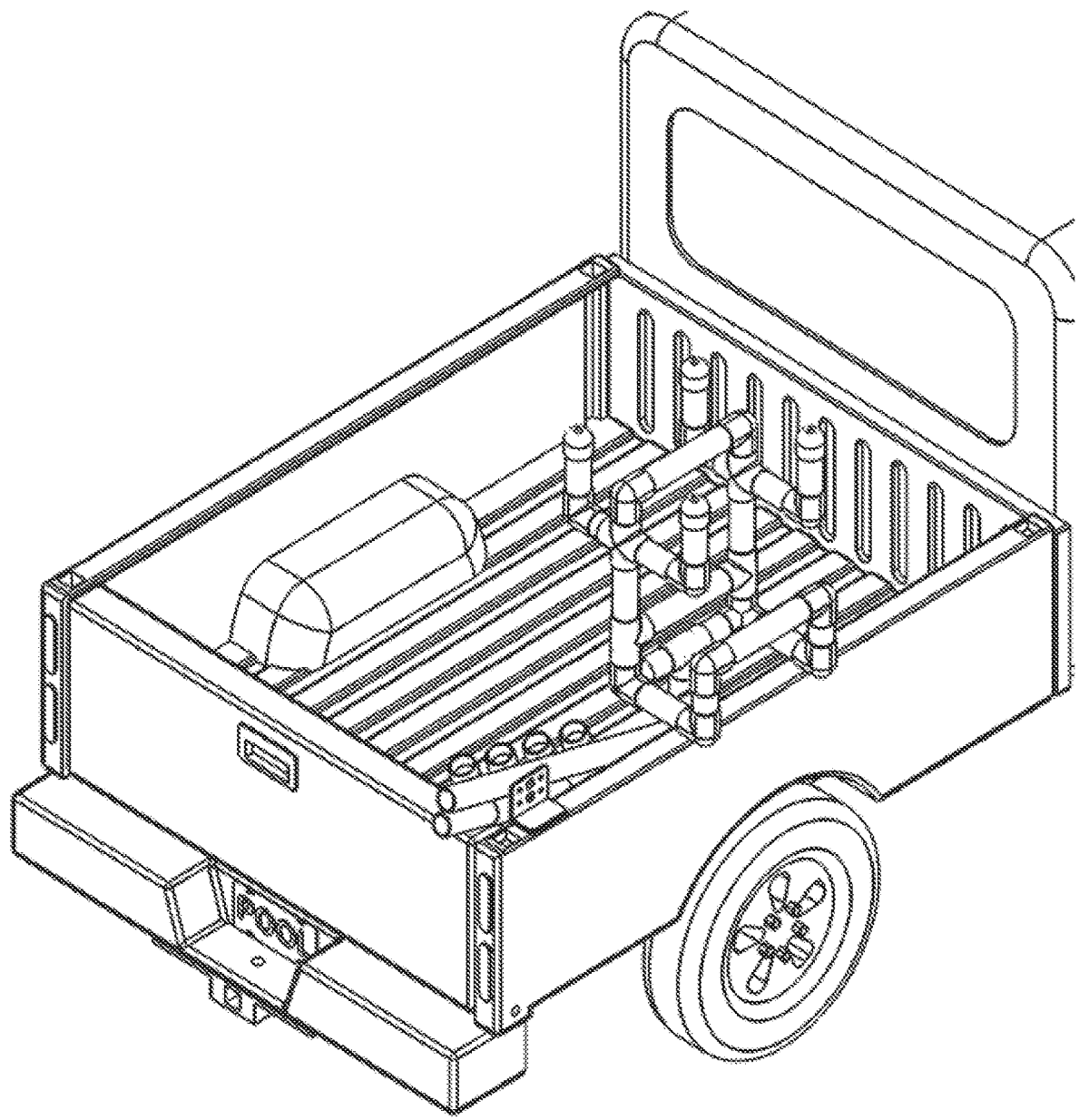
Figure 148:
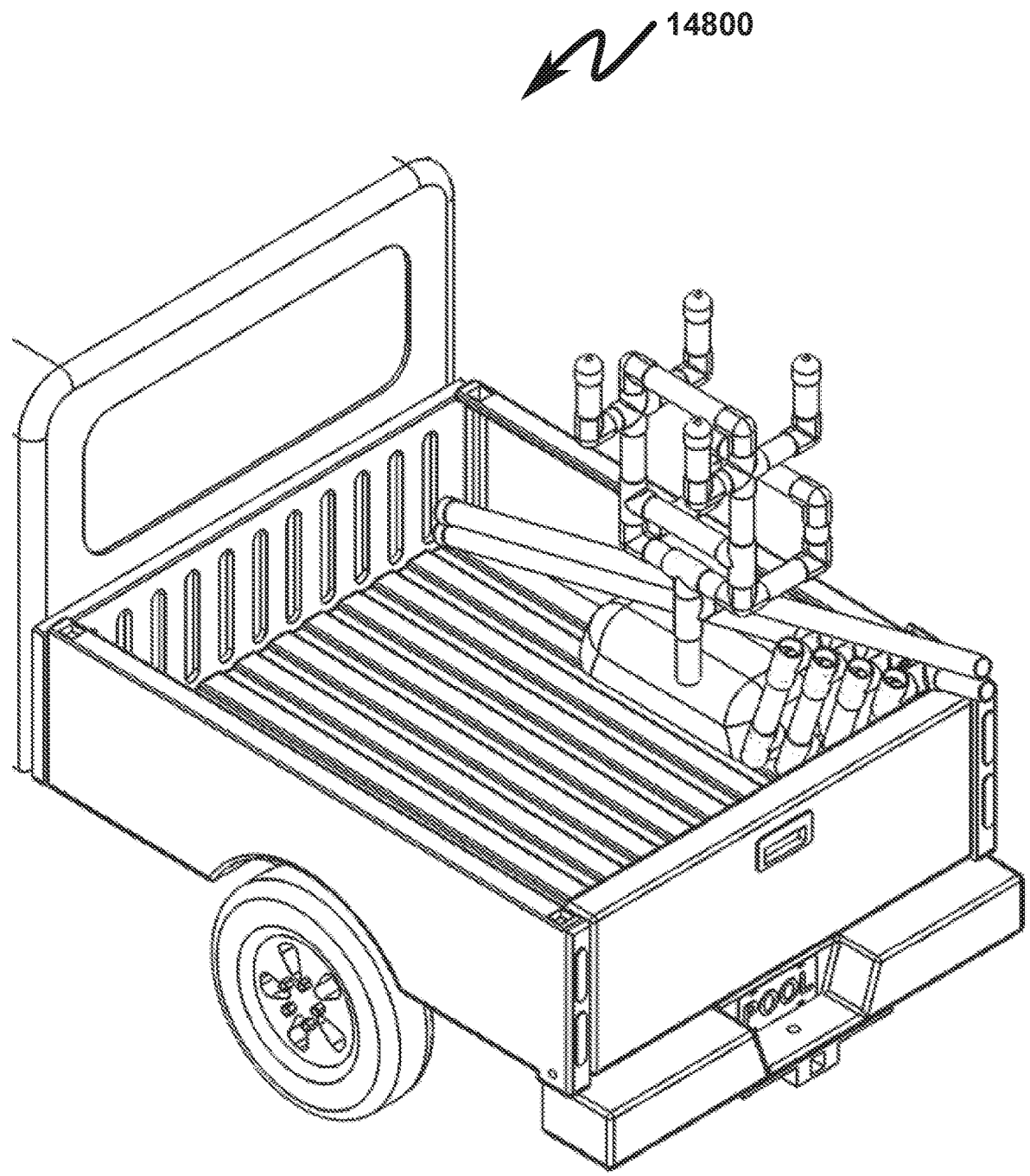
Figure 149:
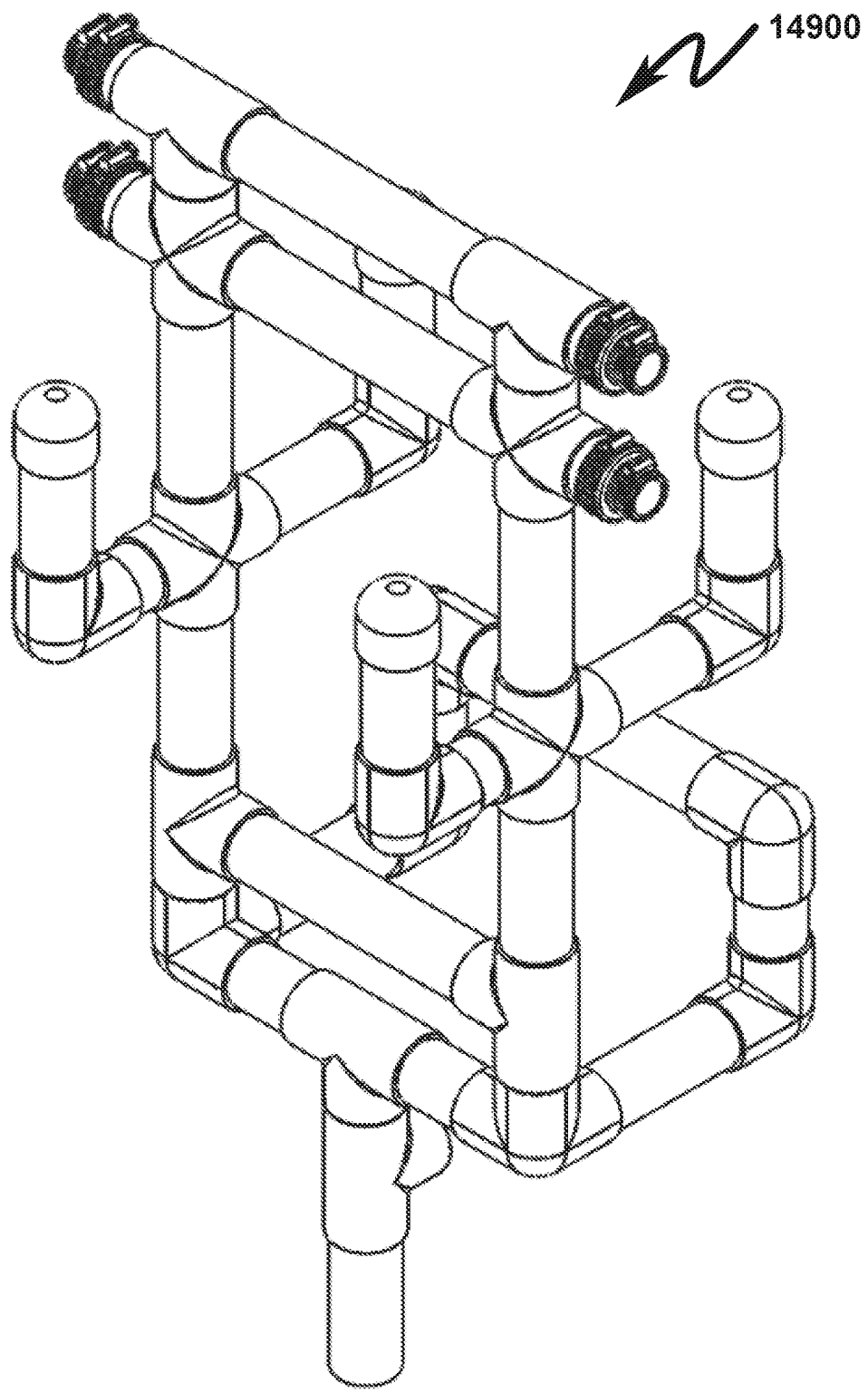
Figure 150:
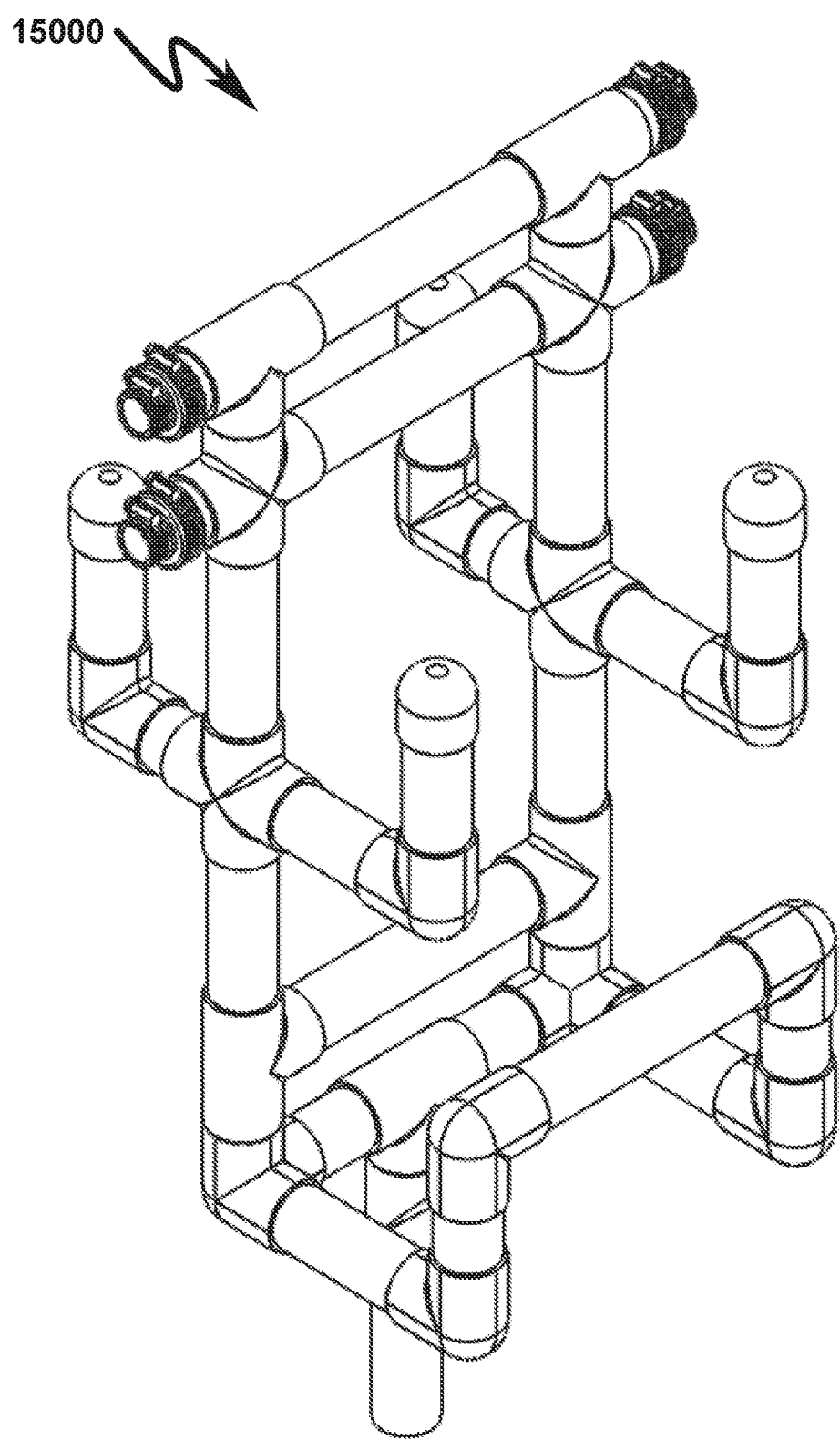
Figure 151:
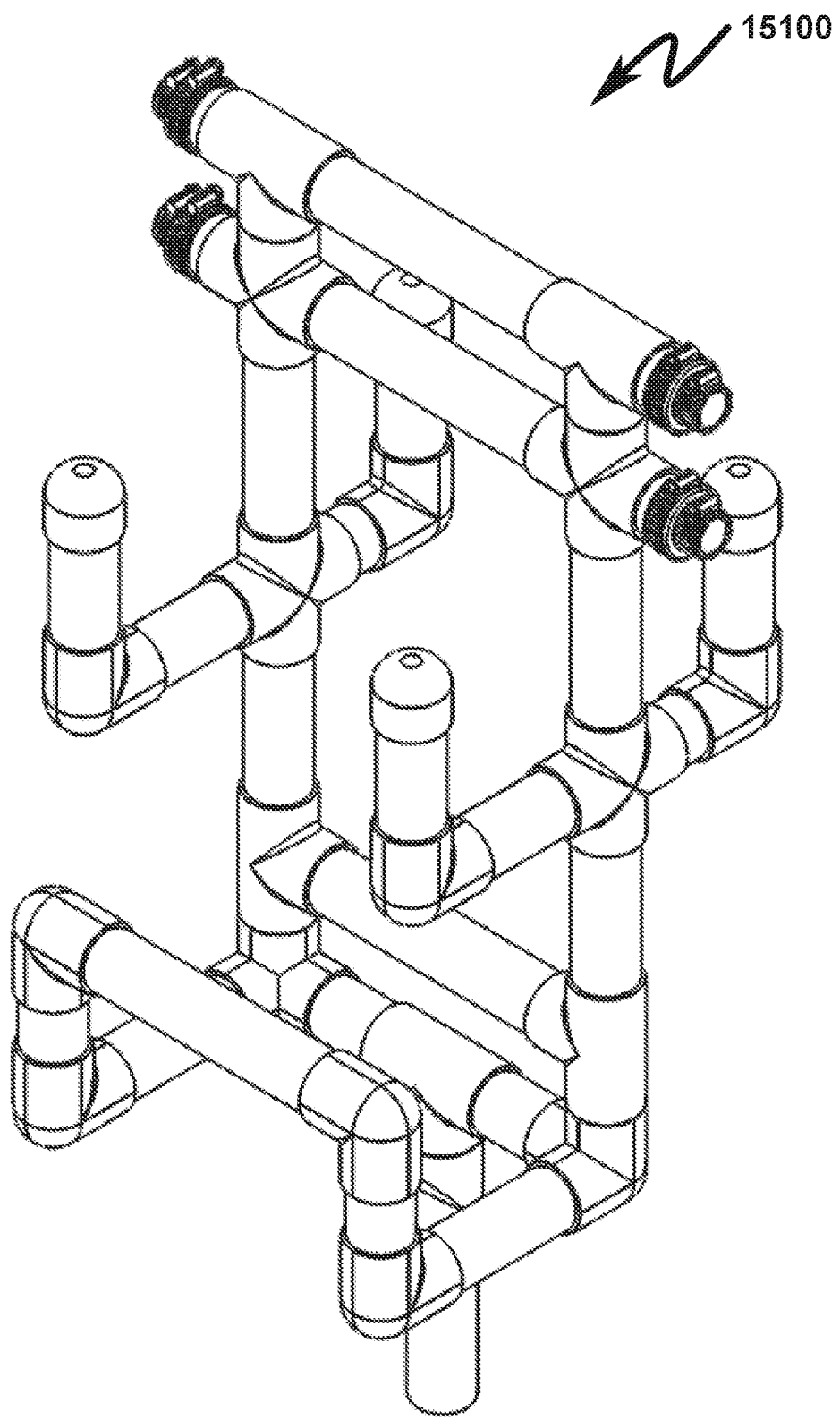
Figure 152:
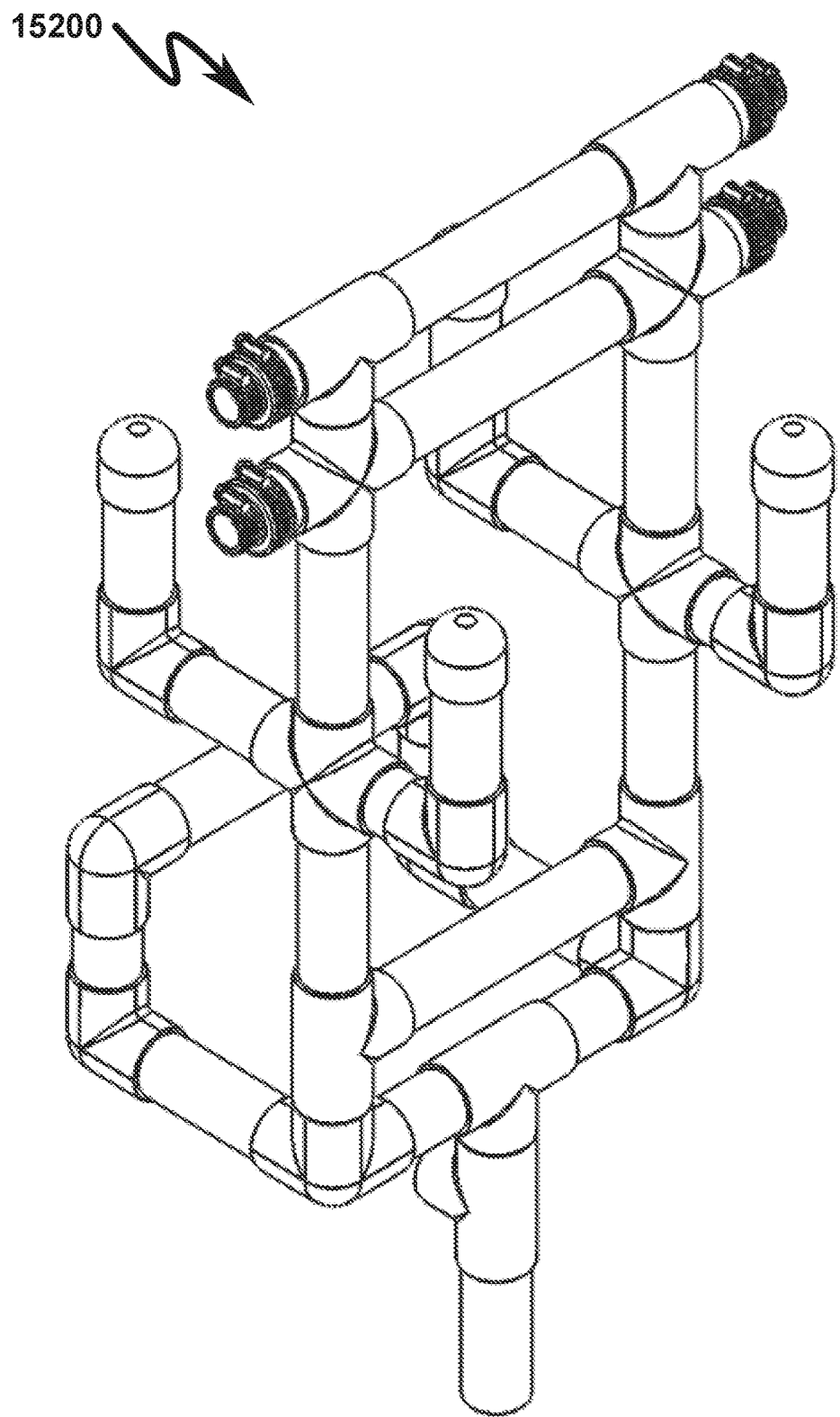
Figure 153:
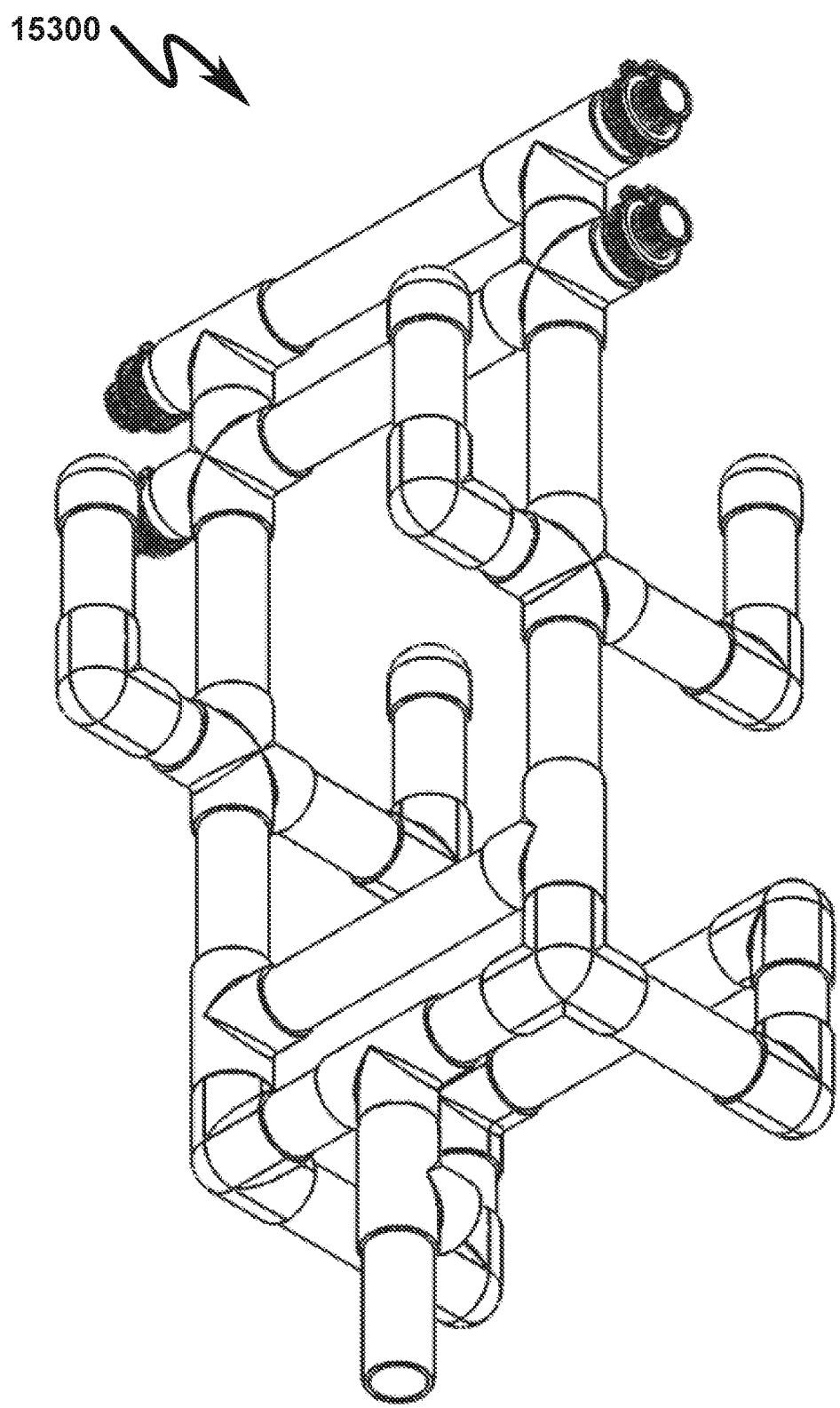
Figure 154:
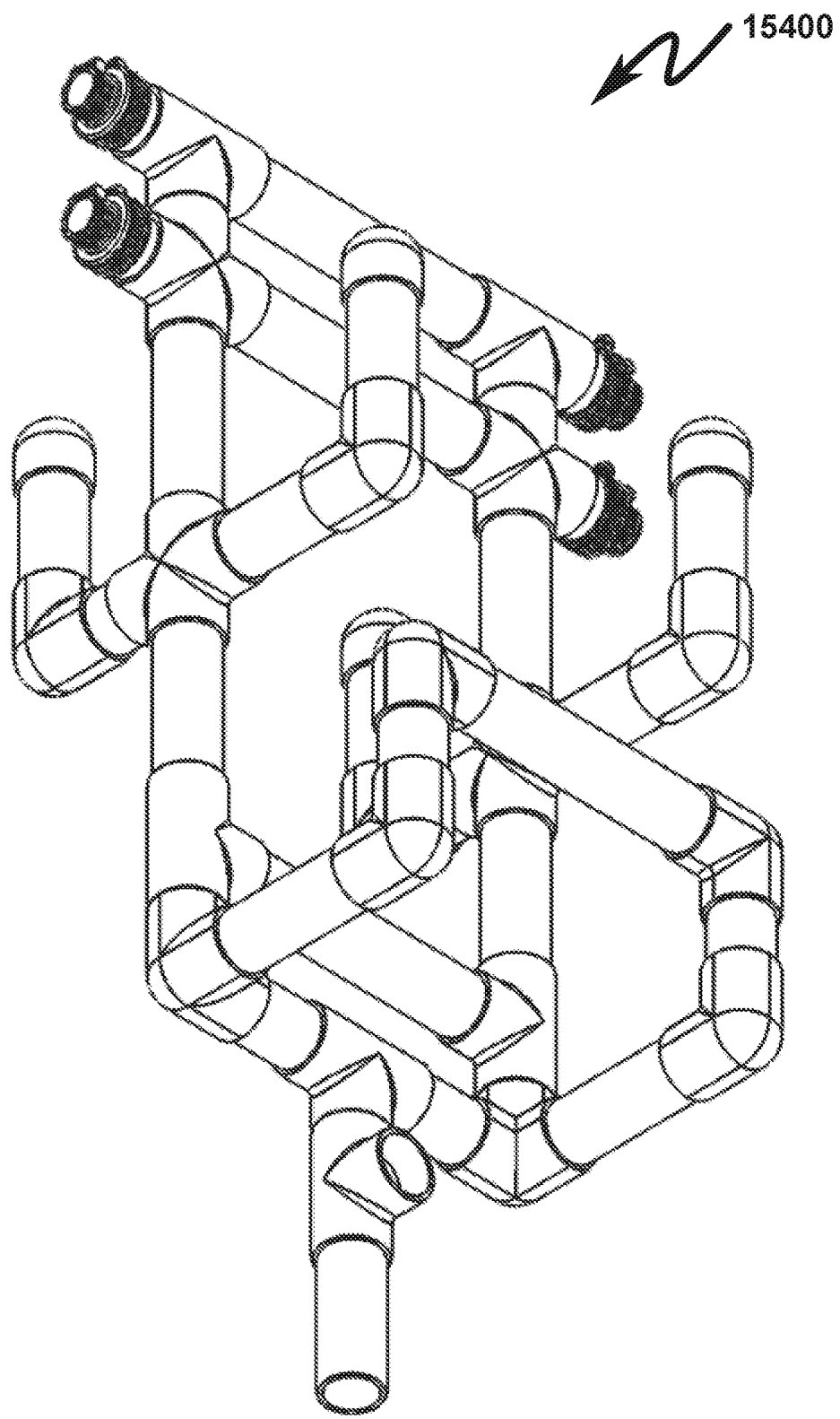
Figure 155:
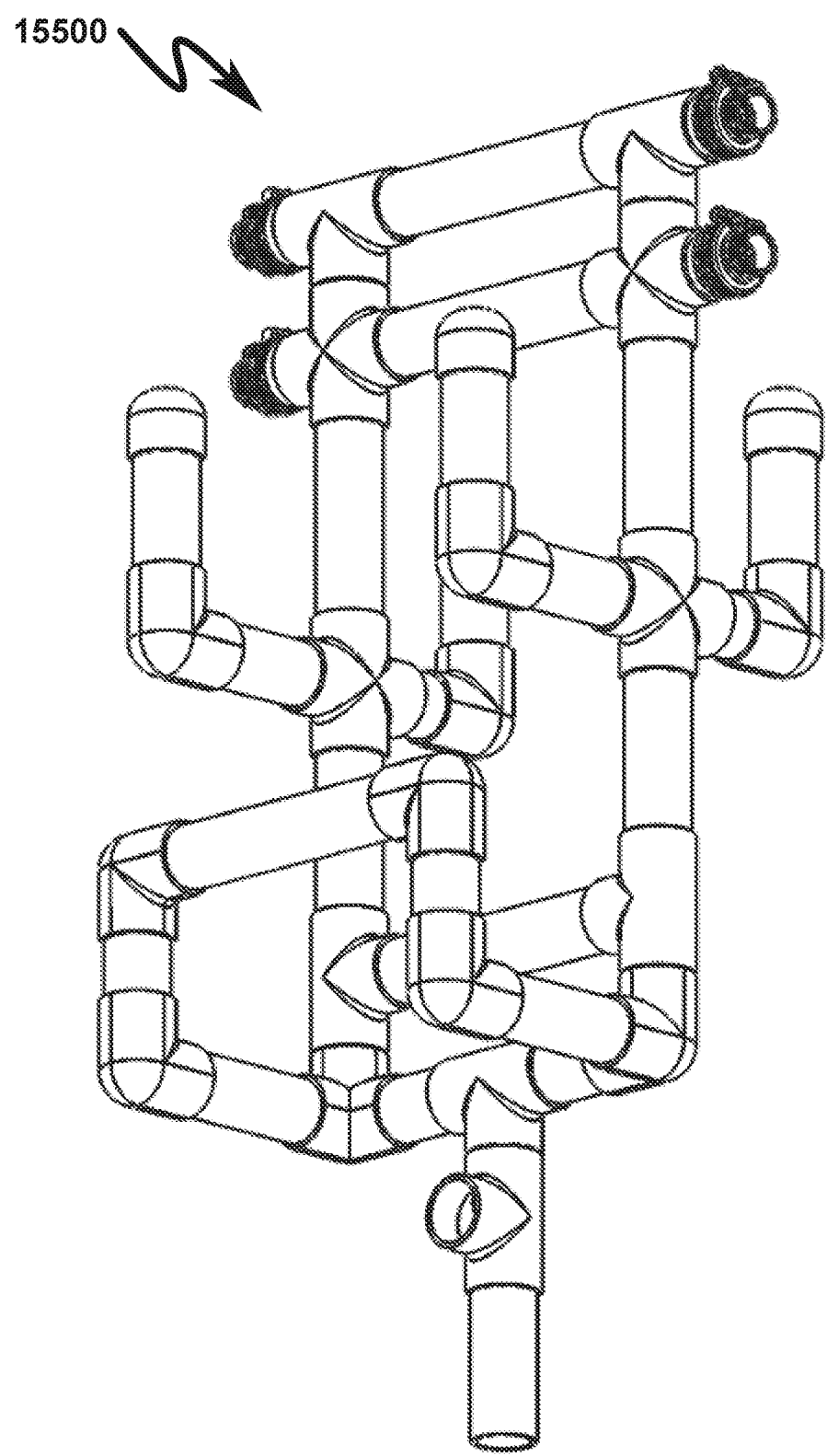
Figure 156:
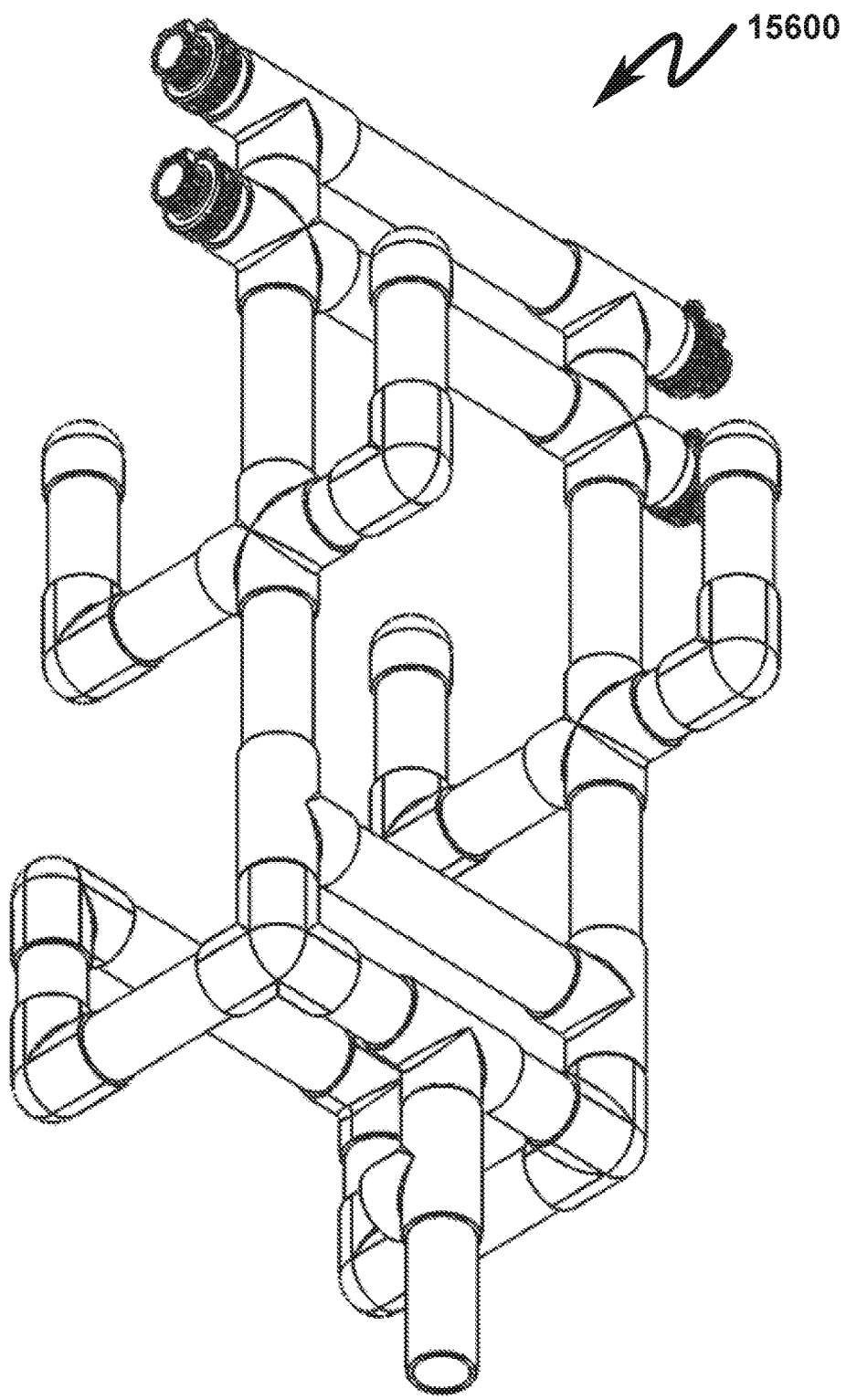
Figure 157:
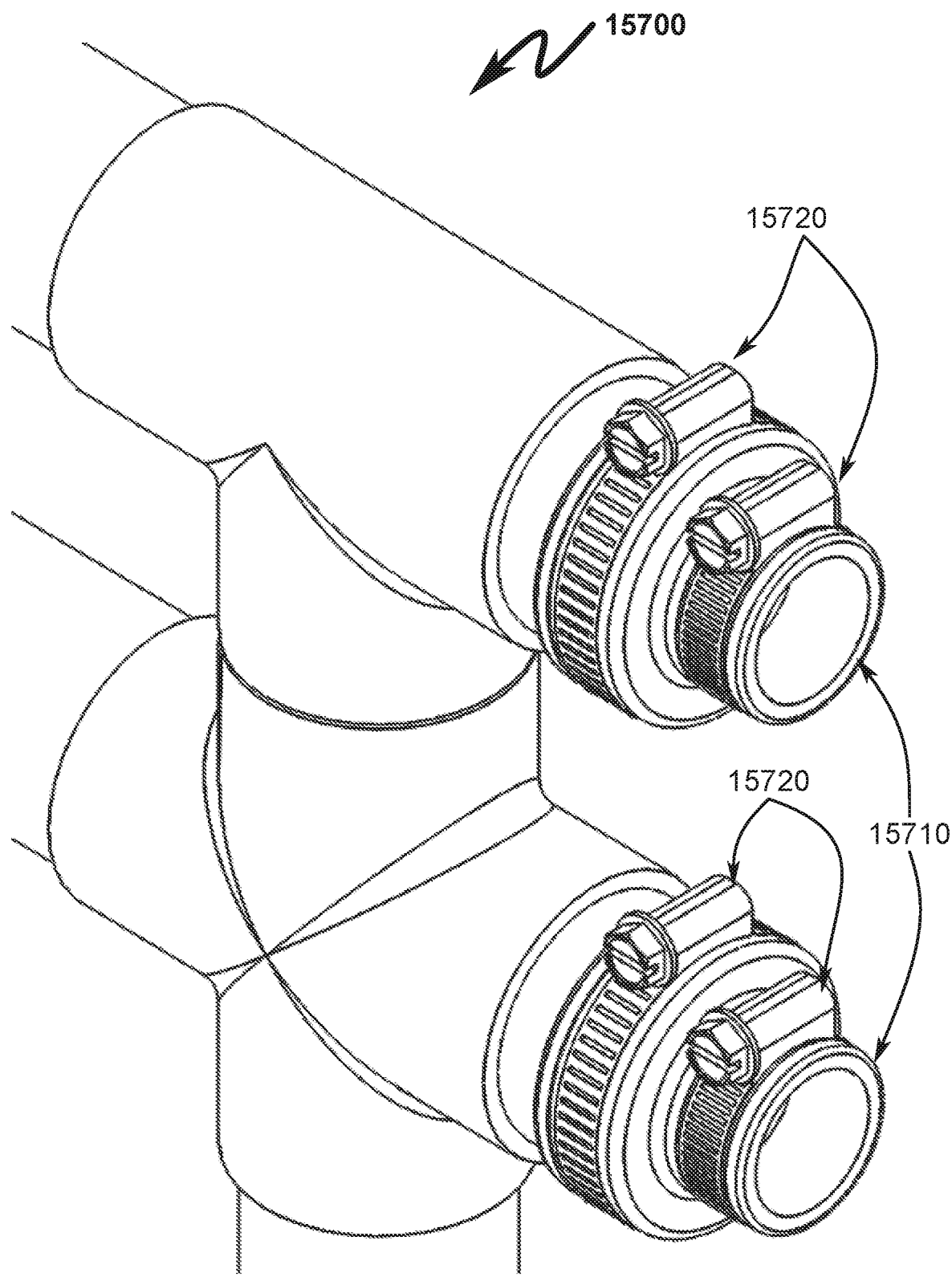
Figure 158:
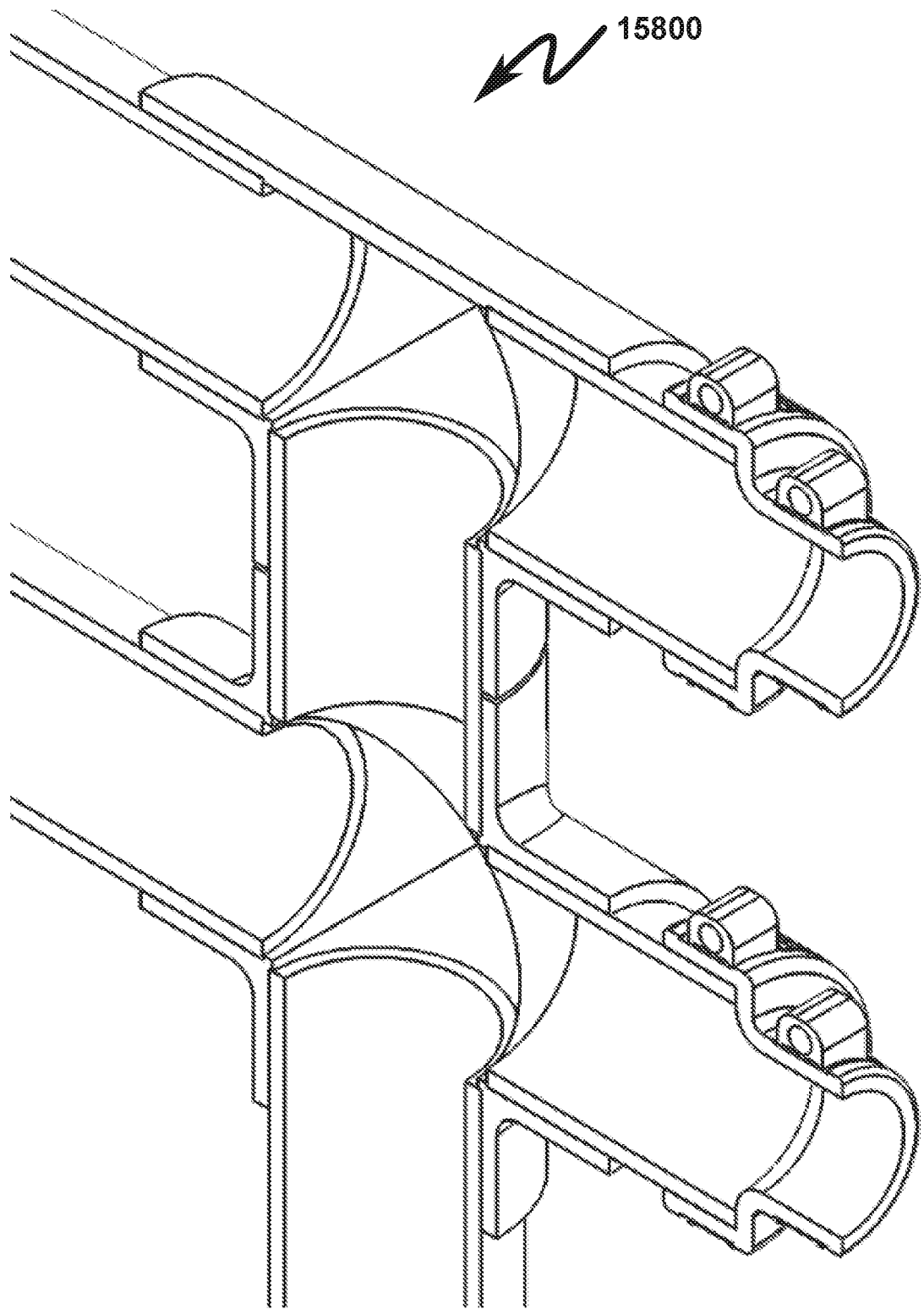
Figure 159:
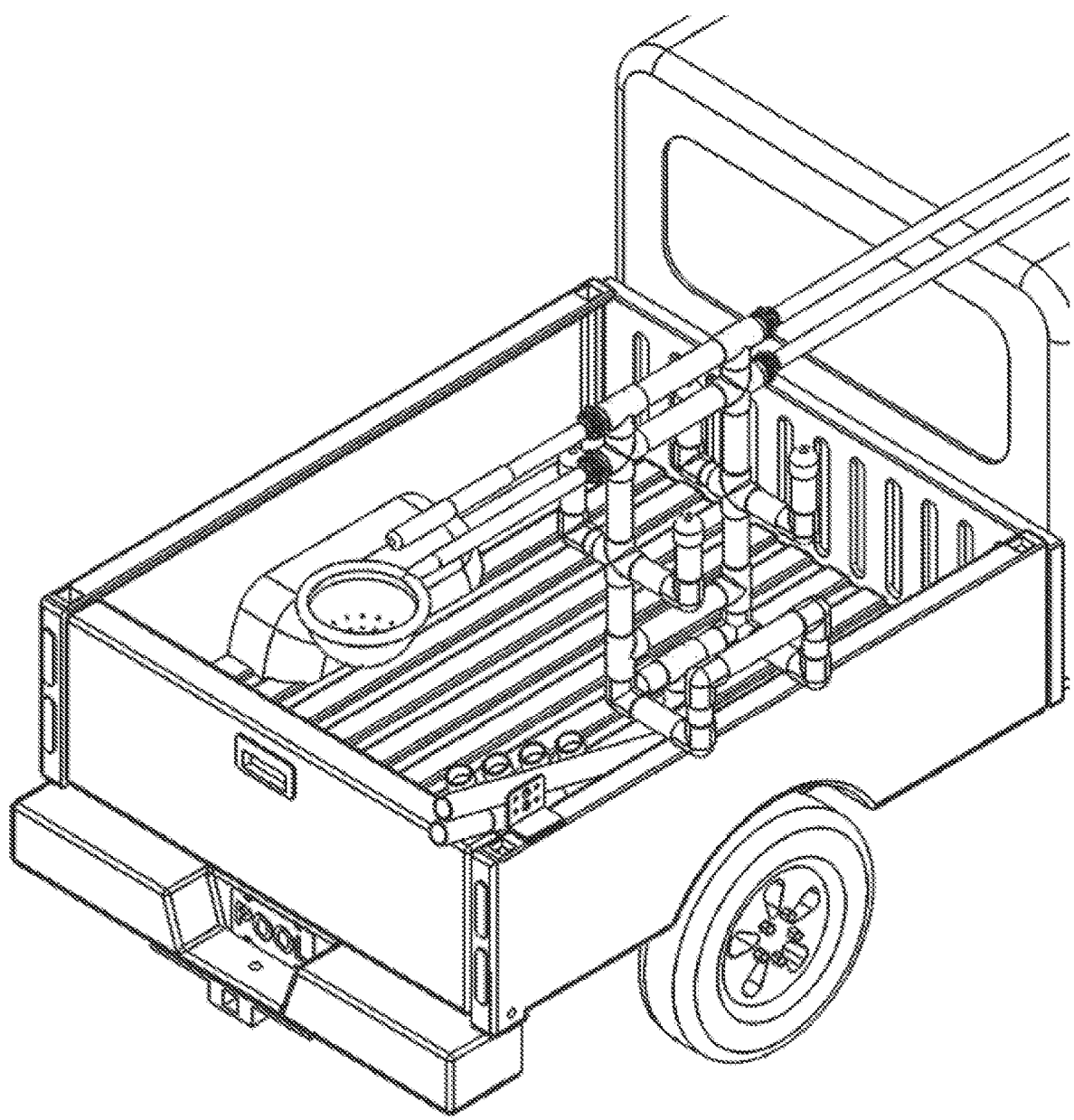

FIG. 131 illustrates a top left rear perspective view of an exemplary preferred invention embodiment incorporating dual hose racks;

FIG. 132 illustrates a top left front perspective view of an exemplary preferred invention embodiment incorporating dual hose racks;

FIG. 133 illustrates a bottom right front perspective view of an exemplary preferred invention embodiment incorporating dual hose racks;

FIG. 134 illustrates a bottom right rear perspective view of an exemplary preferred invention embodiment incorporating dual hose racks;

FIG. 135 illustrates a bottom left rear perspective view of an exemplary preferred invention embodiment incorporating dual hose racks;

FIG. 136 illustrates a bottom left front perspective view of an exemplary preferred invention embodiment incorporating dual hose racks;

FIG. 137 illustrates a top right front perspective view of an exemplary preferred invention embodiment incorporating dual hose racks installed on a pickup truck;

FIG. 138 illustrates a top left front perspective view of an exemplary preferred invention embodiment incorporating dual hose racks installed on a pickup truck;

FIG. 139 illustrates a top right front perspective view of an exemplary preferred invention embodiment incorporating a four-hose rack;

FIG. 140 illustrates a top right rear perspective view of an exemplary preferred invention embodiment incorporating a four-hose rack;

FIG. 141 illustrates a top left rear perspective view of an exemplary preferred invention embodiment incorporating a four-hose rack;

FIG. 142 illustrates a top left front perspective view of an exemplary preferred invention embodiment incorporating a four-hose rack;

FIG. 143 illustrates a bottom right front perspective view of an exemplary preferred invention embodiment incorporating a four-hose rack;

FIG. 144 illustrates a bottom right rear perspective view of an exemplary preferred invention embodiment incorporating a four-hose rack;

FIG. 145 illustrates a bottom left rear perspective view of an exemplary preferred invention embodiment incorporating a four-hose rack;

FIG. 146 illustrates a bottom left front perspective view of an exemplary preferred invention embodiment incorporating a four-hose rack;

FIG. 147 illustrates a bottom left front perspective view of an exemplary preferred invention embodiment incorporating a four-hose rack;

FIG. 148 illustrates a top right front perspective view of an exemplary preferred invention embodiment incorporating a four-hose rack installed on a pickup truck;

FIG. 149 illustrates a top right front perspective view of an exemplary preferred invention embodiment incorporating a four-hose rack and overhead pole rack;

FIG. 150 illustrates a top right rear perspective view of an exemplary preferred invention embodiment incorporating a four-hose rack and overhead pole rack;

FIG. 151 illustrates a top left rear perspective view of an exemplary preferred invention embodiment incorporating a four-hose rack and overhead pole rack;

FIG. 152 illustrates a top left front perspective view of an exemplary preferred invention embodiment incorporating a four-hose rack and overhead pole rack;

FIG. 153 illustrates a bottom right front perspective view of an exemplary preferred invention embodiment incorporating a four-hose rack and overhead pole rack;

FIG. 154 illustrates a bottom right rear perspective view of an exemplary preferred invention embodiment incorporating a four-hose rack and overhead pole rack;

FIG. 155 illustrates a bottom left rear perspective view of an exemplary preferred invention embodiment incorporating a four-hose rack and overhead pole rack;

FIG. 156 illustrates a bottom left front perspective view of an exemplary preferred invention embodiment incorporating a four-hose rack and overhead pole rack;

FIG. 157 illustrates a top right front perspective detail view of an exemplary preferred invention embodiment incorporating a four-hose rack and overhead pole rack with detail showing the rubberized reducing cups and hose clamp retainers;

FIG. 158 illustrates a top right front perspective section detail view of an exemplary preferred invention embodiment incorporating a four-hose rack and overhead pole rack with detail showing the rubberized reducing cups and hose clamp retainers;

FIG. 159 illustrates a top left front perspective view of an exemplary preferred invention embodiment incorporating a four-hose rack and overhead pole rack installed on a pickup truck depicting storage of long pool maintenance tools; and FIG. 160 illustrates a top right front perspective view of an exemplary preferred invention embodiment incorporating a four-hose rack and overhead pole rack installed on a pickup truck depicting storage of long pool maintenance tools.

DESCRIPTION OF THE PRESENTLY PREFERRED EXEMPLARY EMBODIMENTS

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a TOOL RACK SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

System Overview

Within the application context of mobile maintenance operations that are based out of pickup trucks, it is often the case that the number and volume of tools and other implements necessary to perform the desired maintenance functions reaches the transport capacity of a pickup truck. As the number and volume of tools and materials transported reaches the capacity of the pickup truck, it often becomes impossible to quickly access the tools/materials to perform necessary maintenance due to clutter that invariably occurs within the bed of the pickup truck.

Within some specific application contexts such as pool maintenance, this problem is exacerbated by the fact that this type of maintenance operation requires a large number of bulky chemicals and the required maintenance tools are often long and cumbersome if simply stacked in the bed of the pickup truck. Furthermore, simply placing tools within the pickup truck bed can become a hazard if the tool is not restrained and inadvertently is ejected from the pickup truck during transit. This maintenance field is also plagued by situations in which very long materials (such as PVC pipe joints) must be temporarily transported to support the functions of pool maintenance.

The present invention in various embodiments addresses one or more of the above objectives in the following manner:
The pickup truck bed is provided with a diagonal tube stack (DTS) that is designed to provide storage for tools having a moderate length.
The DTS is attached to an elongated tube stack (ETS) that is designed to provide storage for tools having a long length (such as that might exceed that of the pickup truck bed).
The DTS/ETS combination is connected to a reconfigurable hose rack (RHR) that allows storage of multiple hoses in one configuration and also may be reconfigured for temporary transport of very long materials such as pipe joints and the like.

One skilled in the art will recognize that the various embodiments depicted herein may be combined to produce a variety of system configurations consistent with the teachings of the invention.

Preferred Exemplary Extruded Embodiment (0900)-(2400)

Figure 9:
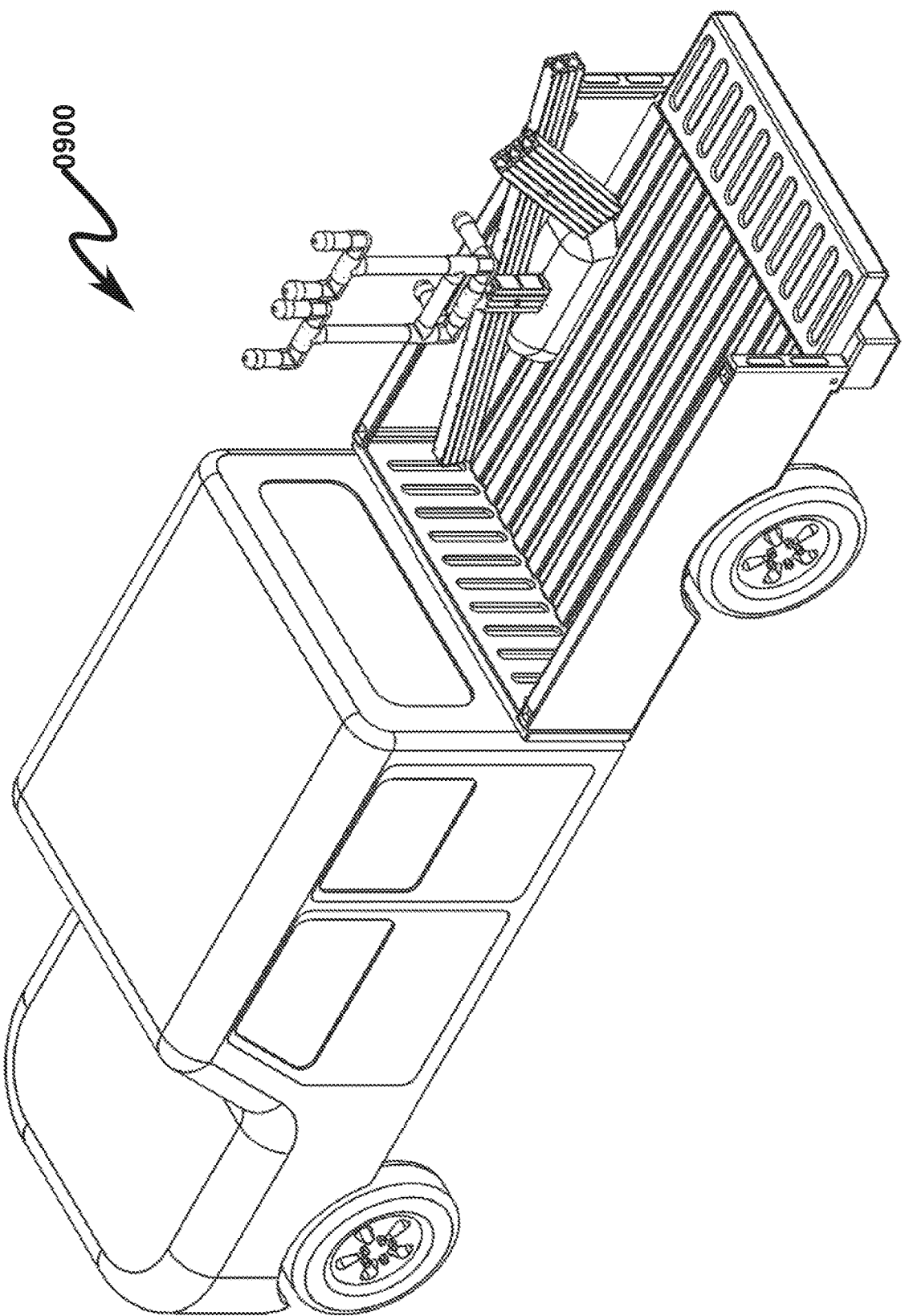
FIG. 9 illustrates a left front operational top perspective view of a preferred exemplary invention embodiment installed on a pickup truck.
Figure 10:
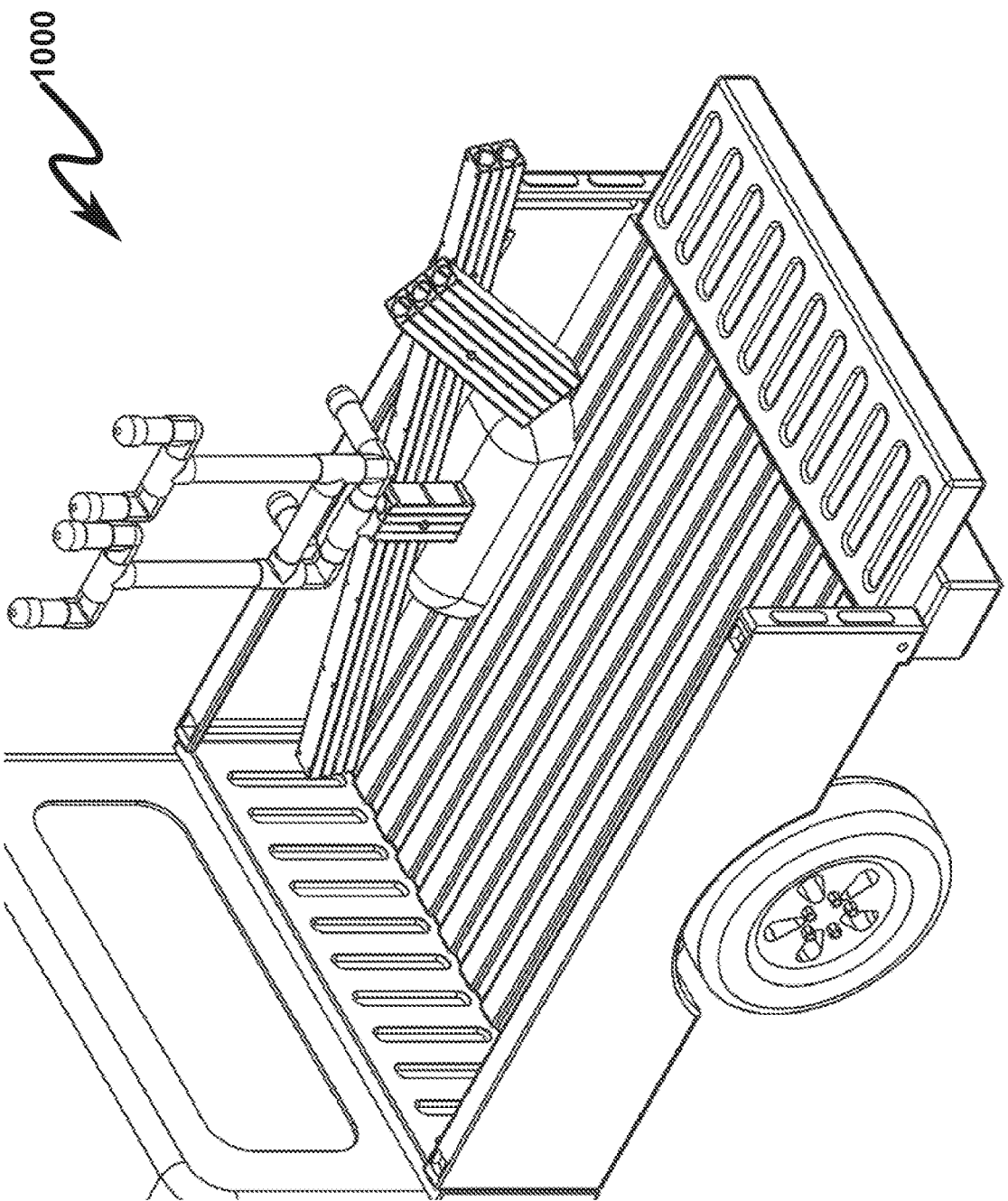
FIG. 10 illustrates a left front operational top perspective detail view of a preferred exemplary invention embodiment installed on a pickup truck.
Figure 11:
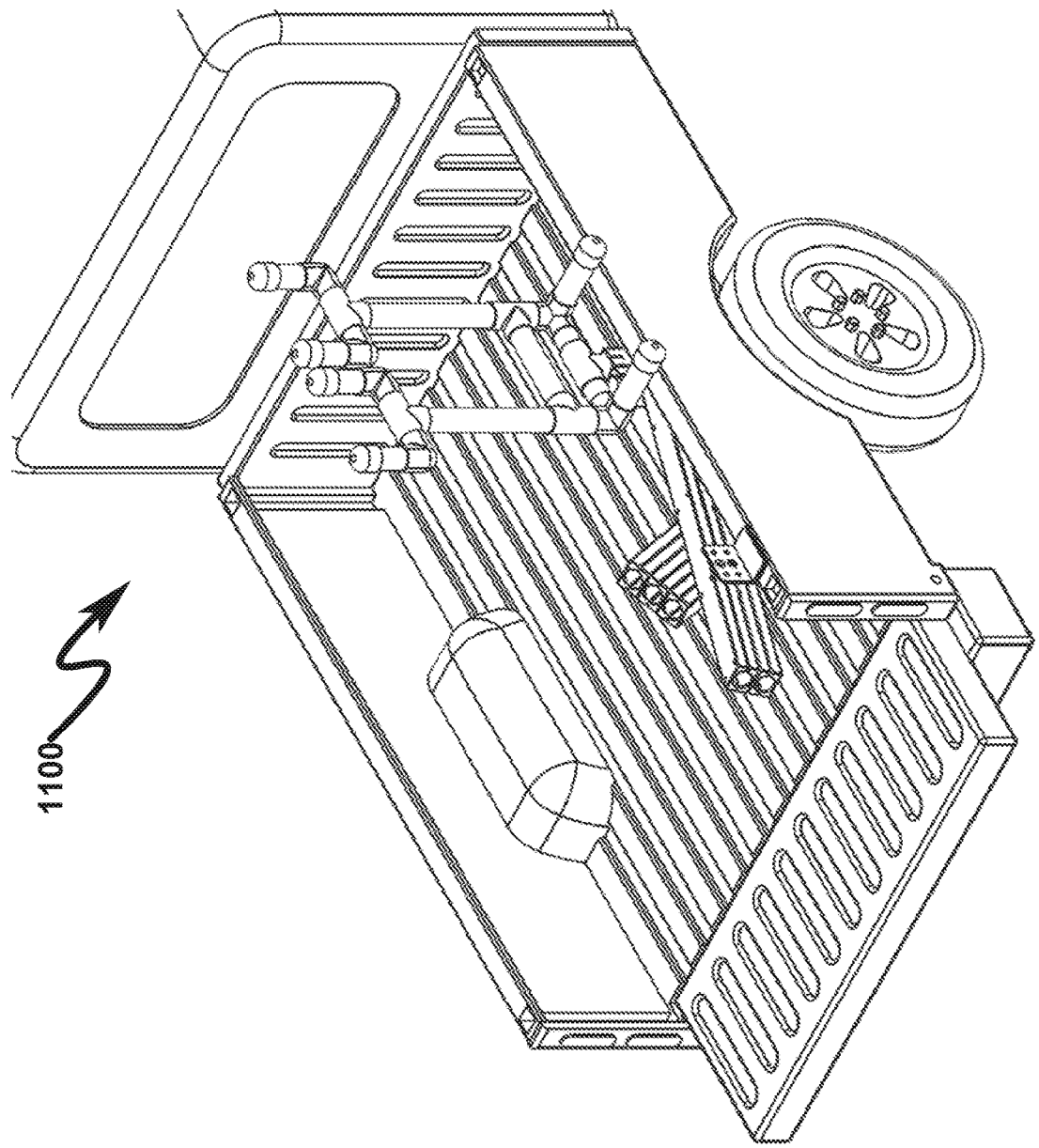
FIG. 11 illustrates a right front operational top perspective view of a preferred exemplary invention embodiment installed on a pickup truck.
Figure 12:
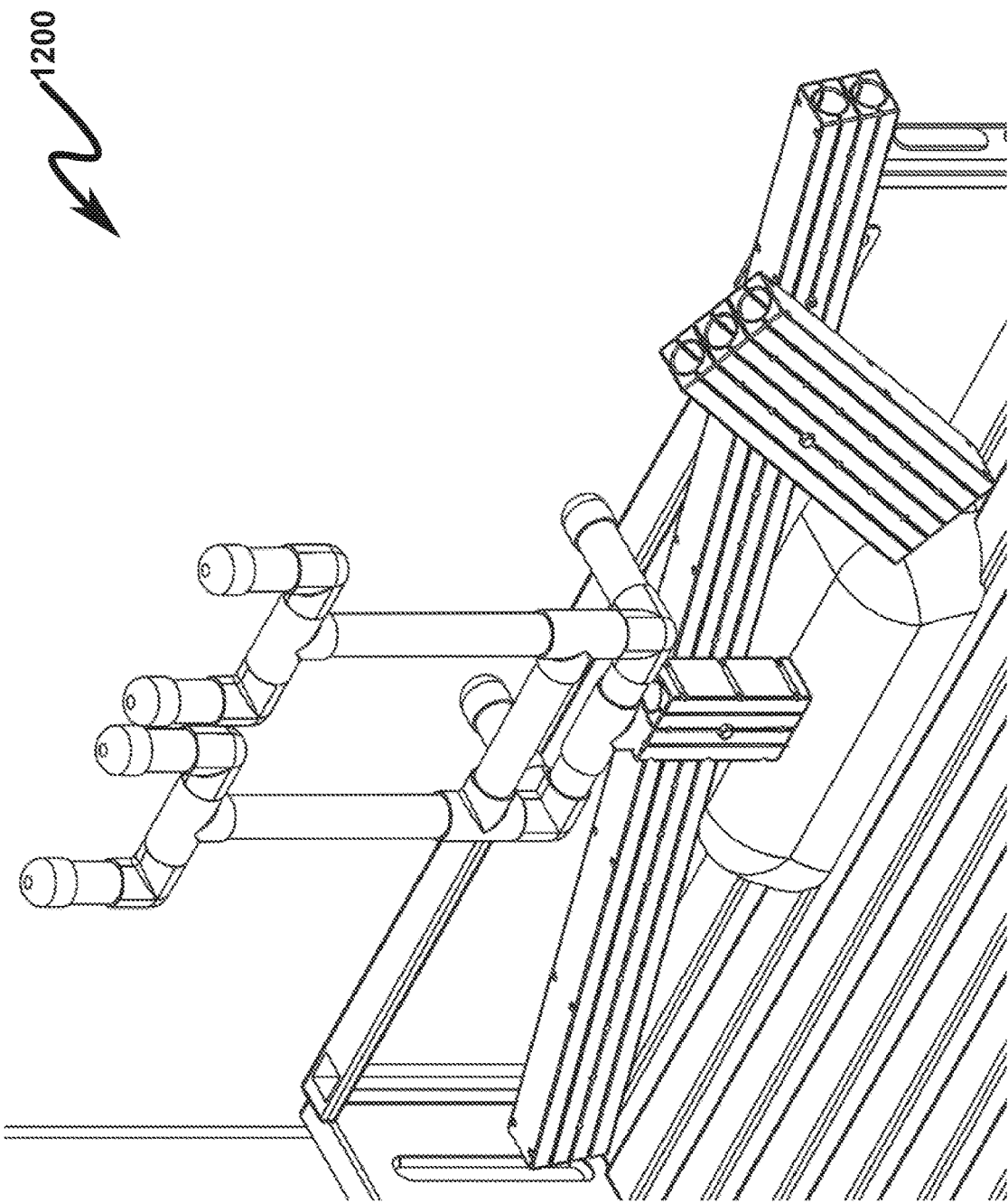
FIG. 12 illustrates a left front operational top perspective detail view of a preferred exemplary invention embodiment installed on a pickup truck.
Figure 13:
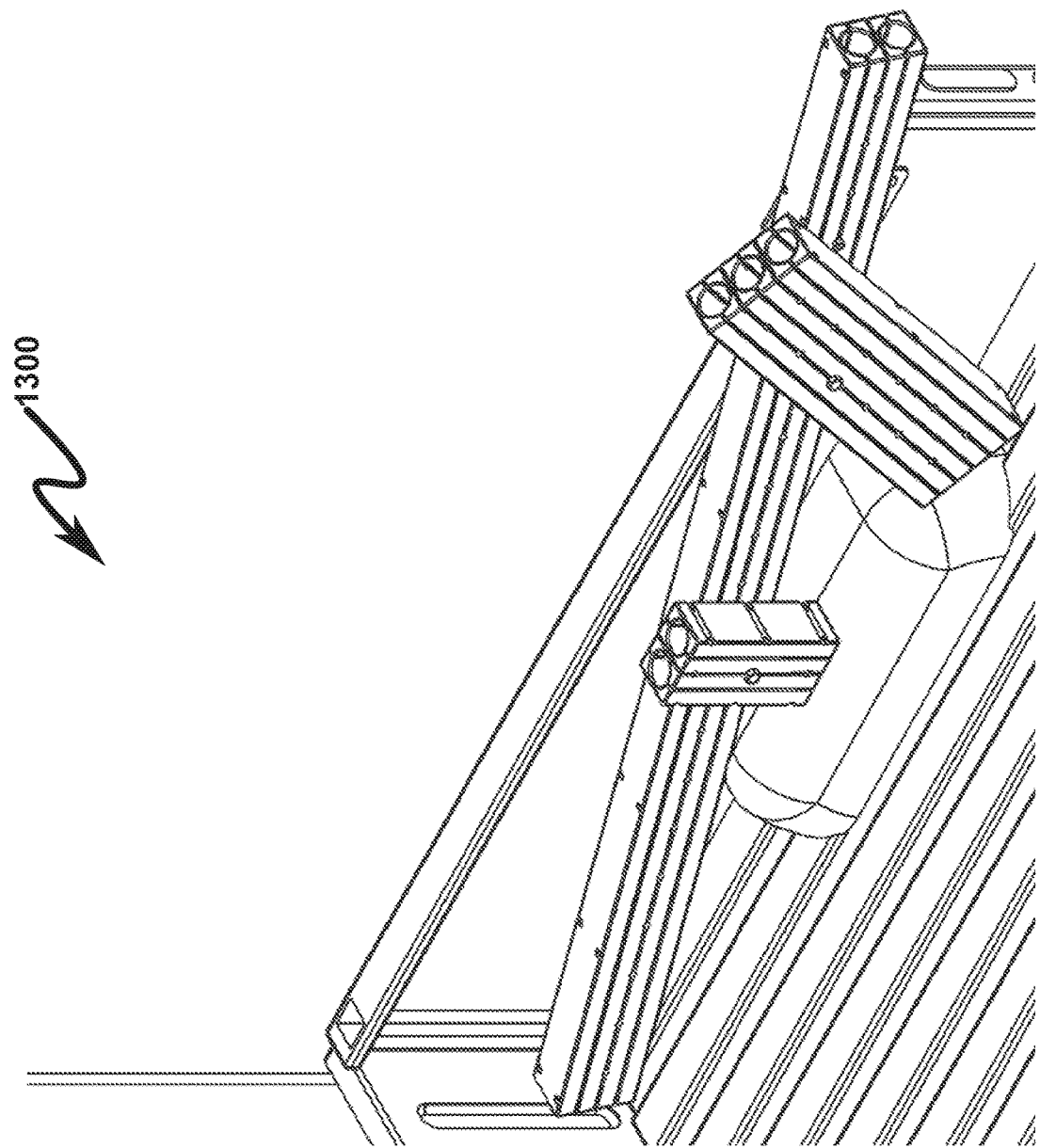
FIG. 13 illustrates a left front operational top perspective detail view of a preferred exemplary invention embodiment installed on a pickup truck with RHR removed.
Figure 14:
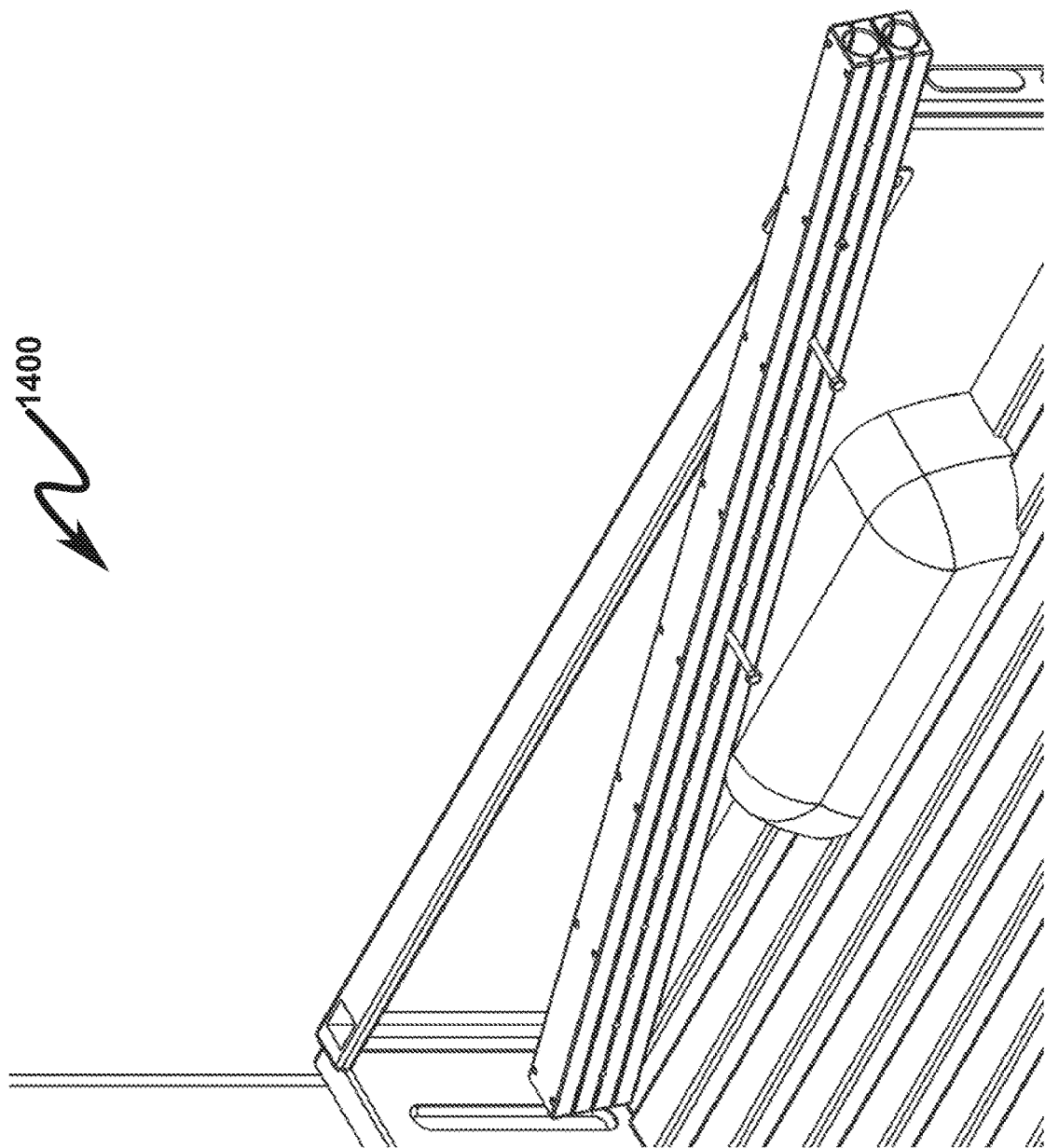
FIG. 14 illustrates a left front operational top perspective detail view of a preferred exemplary invention embodiment installed on a pickup truck with RHR, VSM, and DTS removed.
Figure 15:
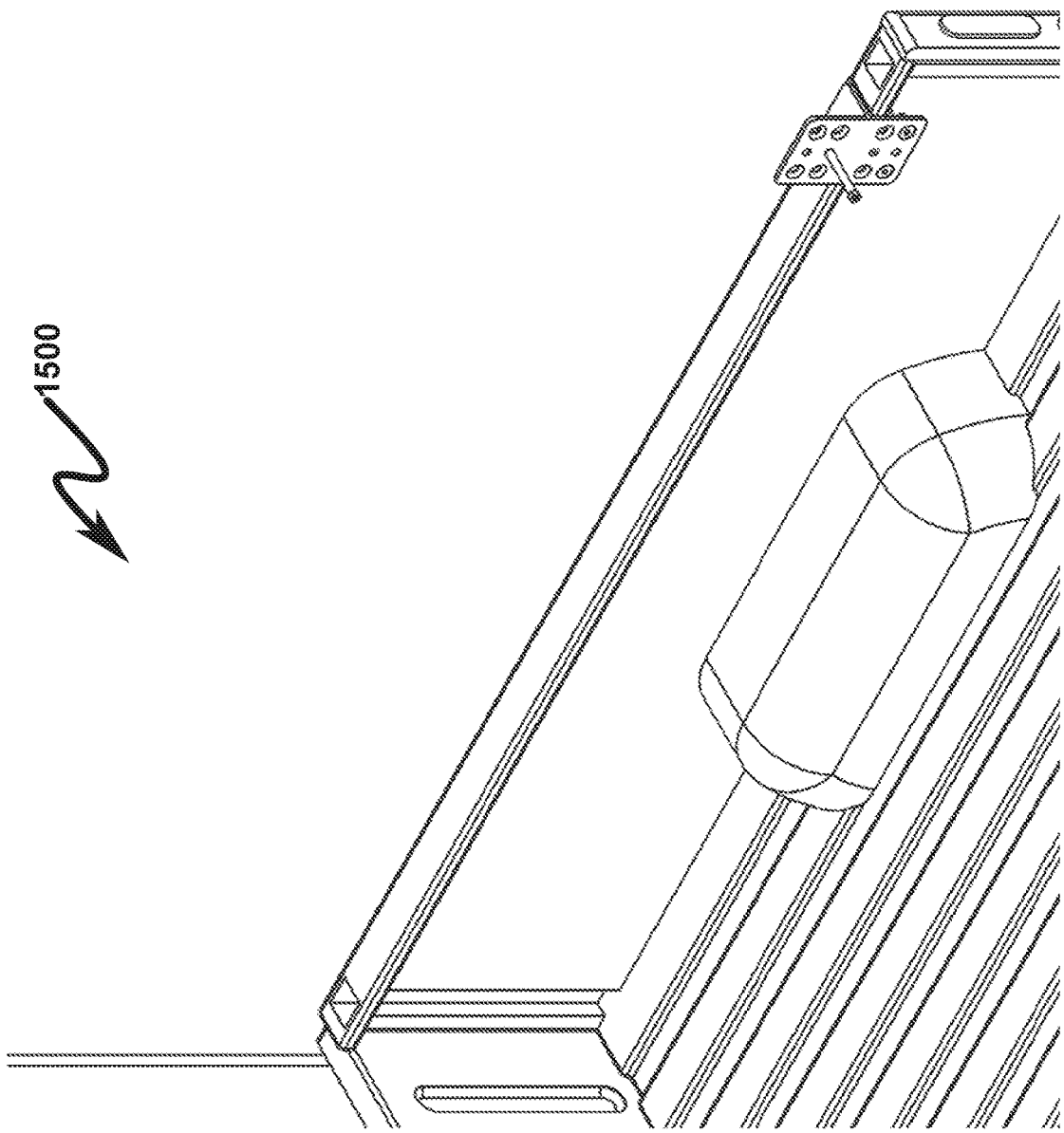
FIG. 15 illustrates a left front operational top perspective detail view of a preferred exemplary invention embodiment installed on a pickup truck with RHR, VSM, DTS, and ETS removed.
Figure 16:
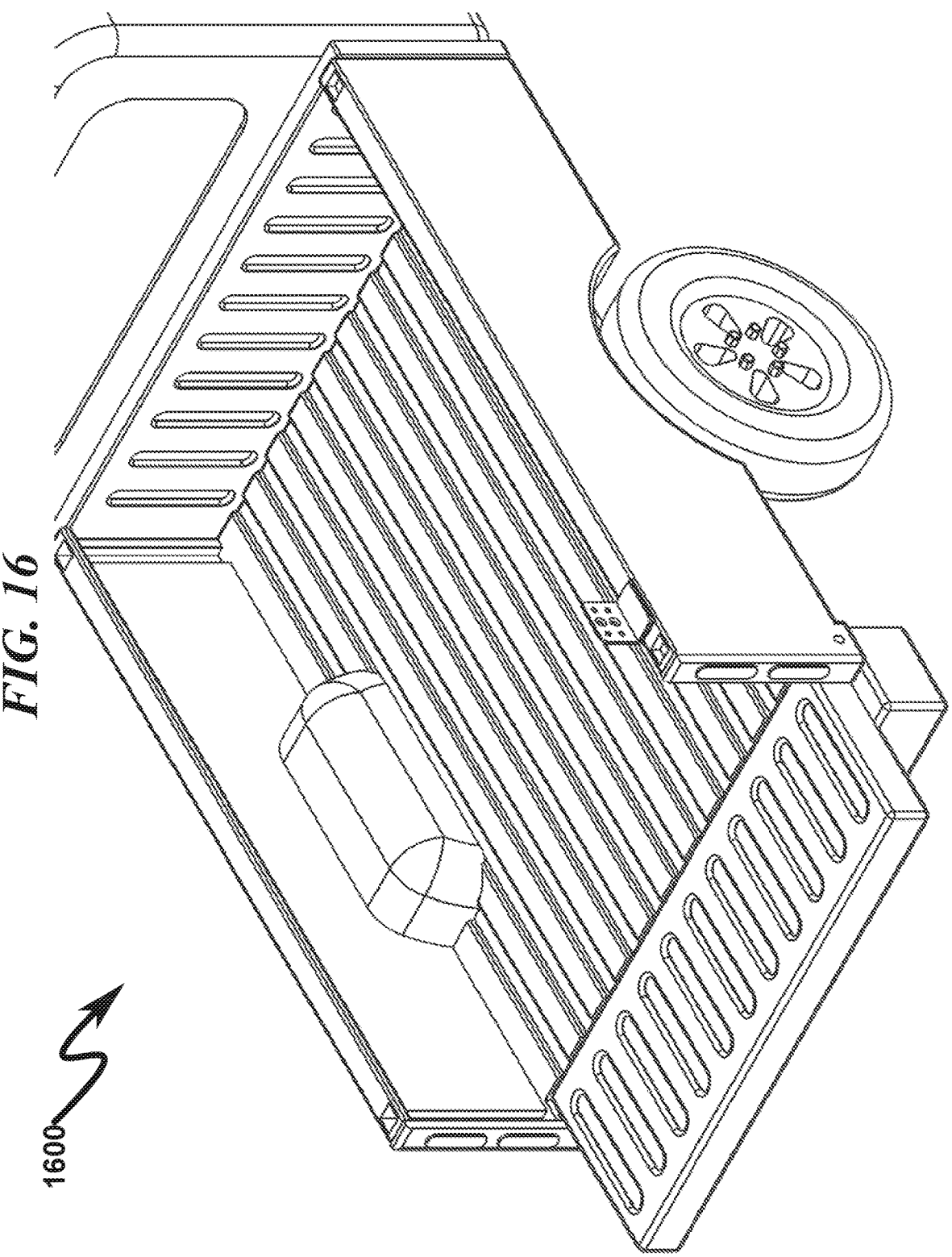
FIG. 16 illustrates a right front operational top perspective detail view of a preferred exemplary invention embodiment installed on a pickup truck with RHR, VSM, DTS, and ETS removed.
Figure 17:
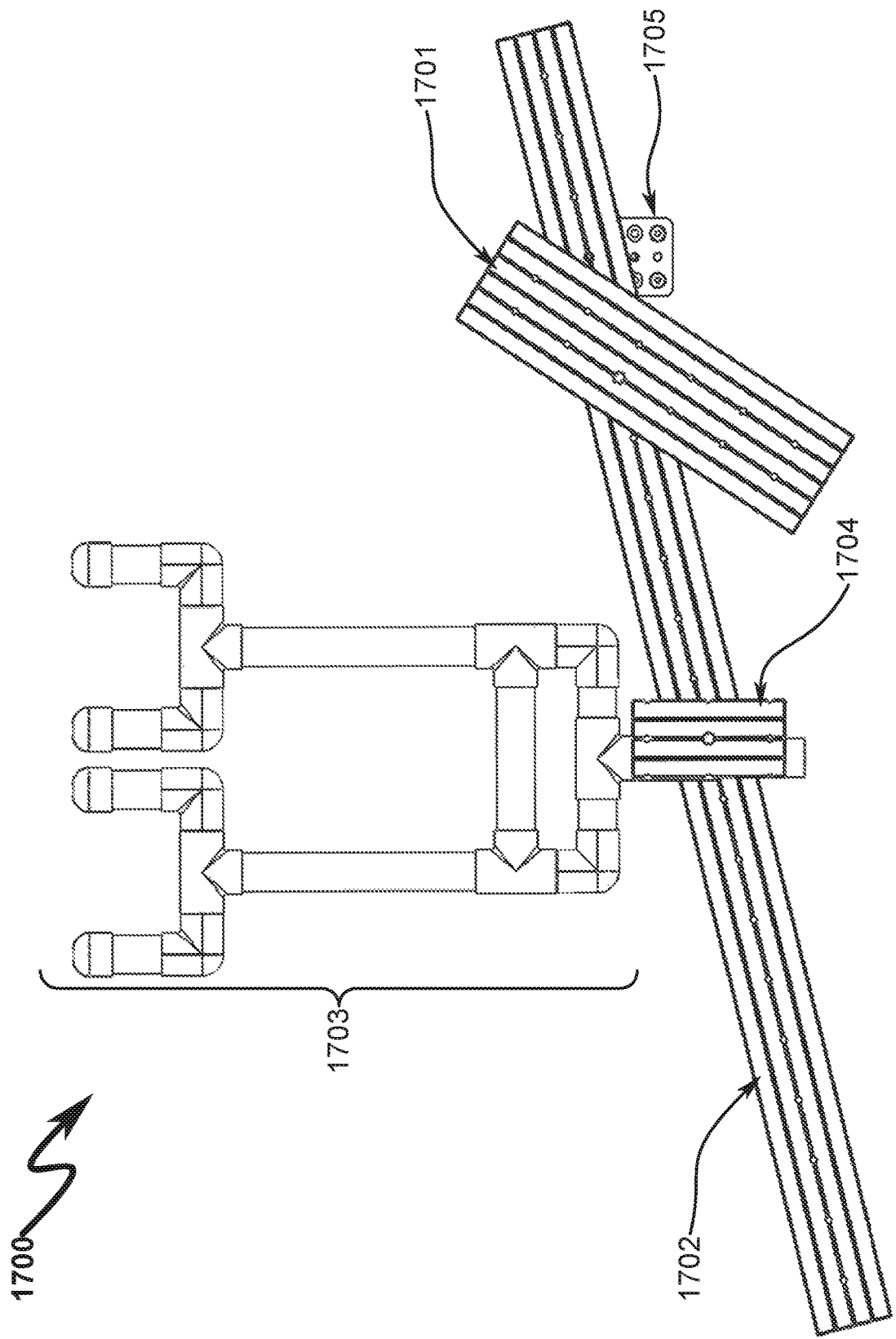
FIG. 17 illustrates a left view of a preferred exemplary invention embodiment.
Figure 18:
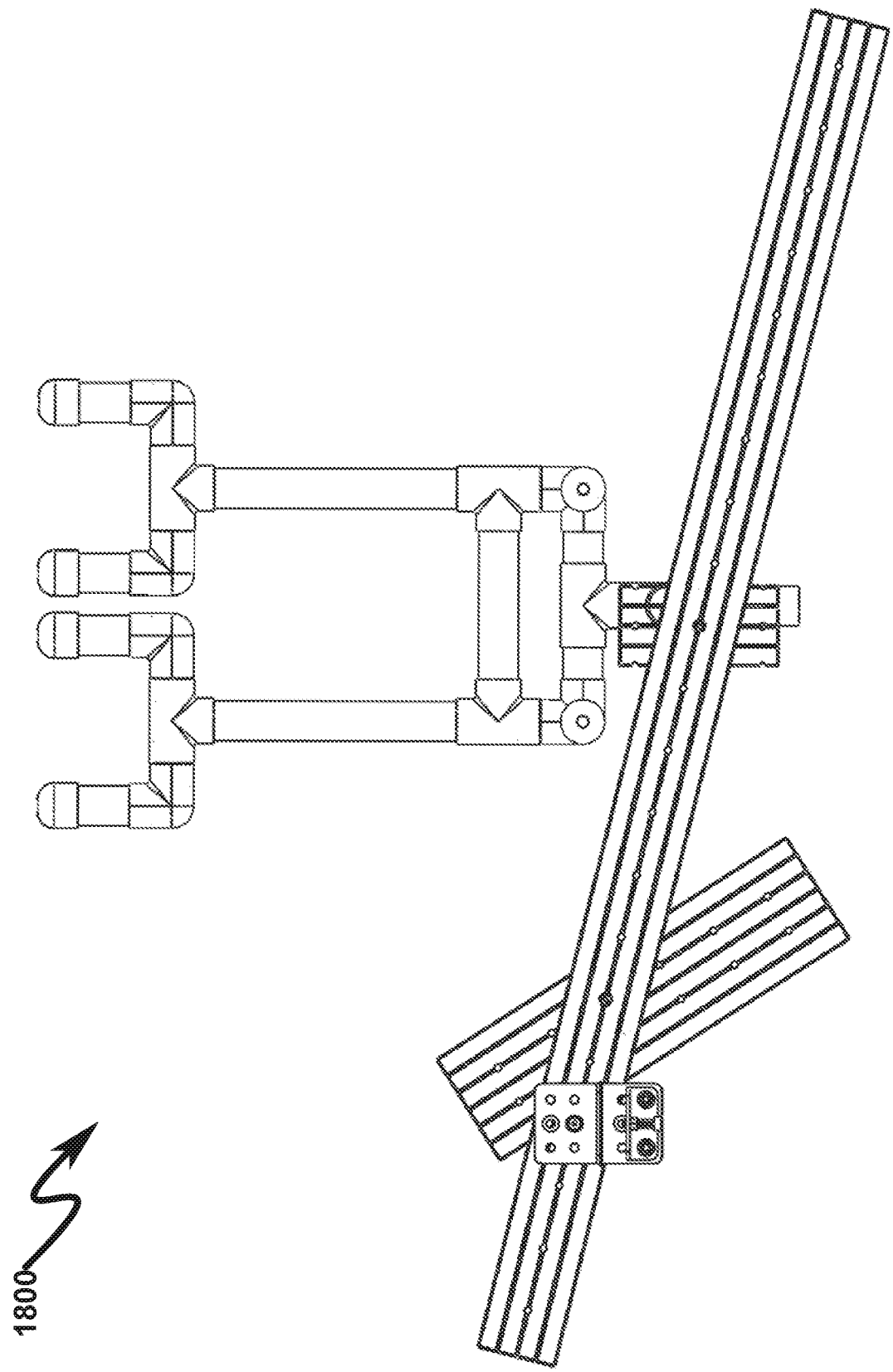
FIG. 18 illustrates a right view of a preferred exemplary invention embodiment.
Figure 19:
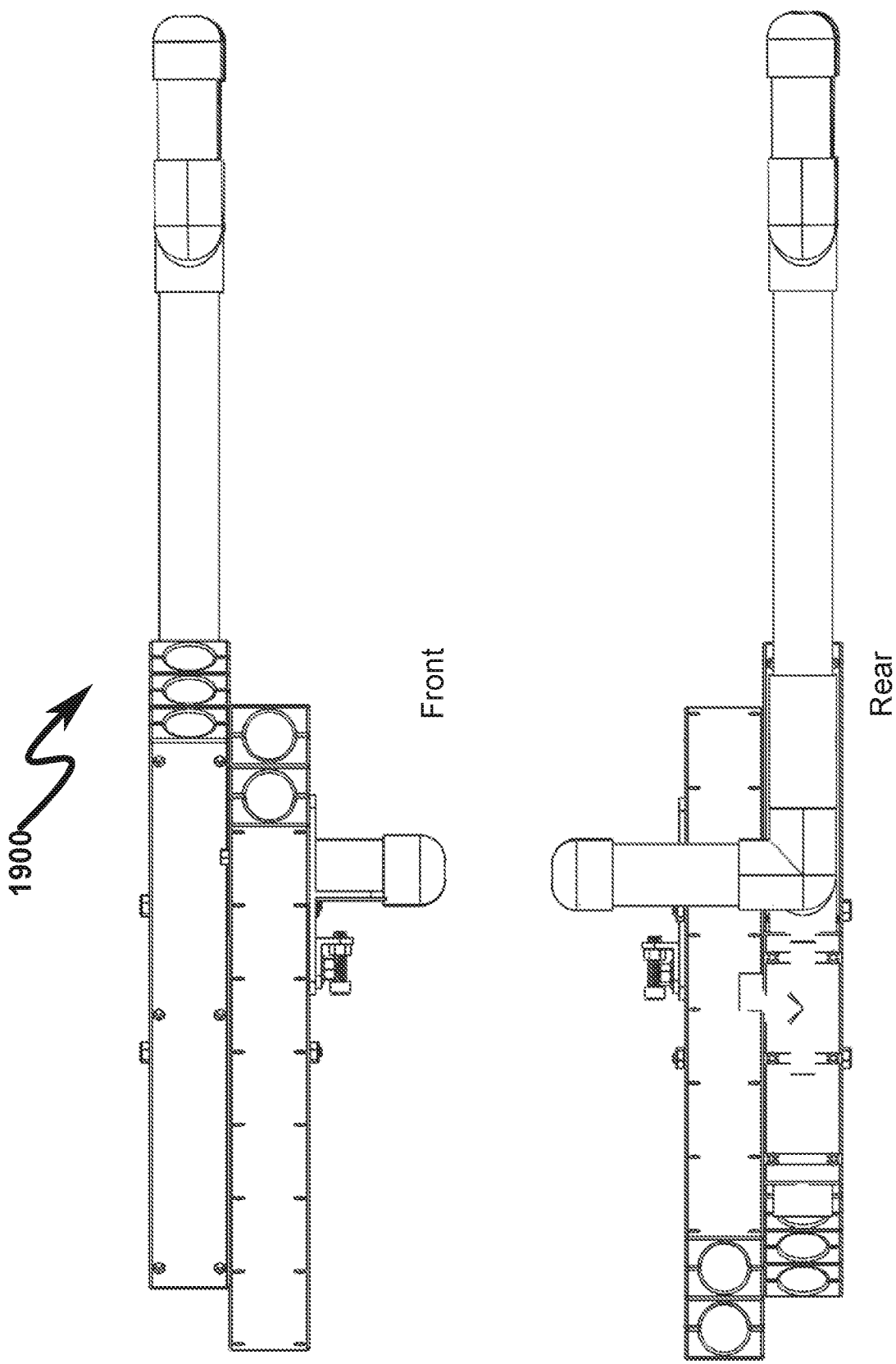
FIG. 19 illustrates front and rear views of a preferred exemplary invention embodiment.
Figure 20:
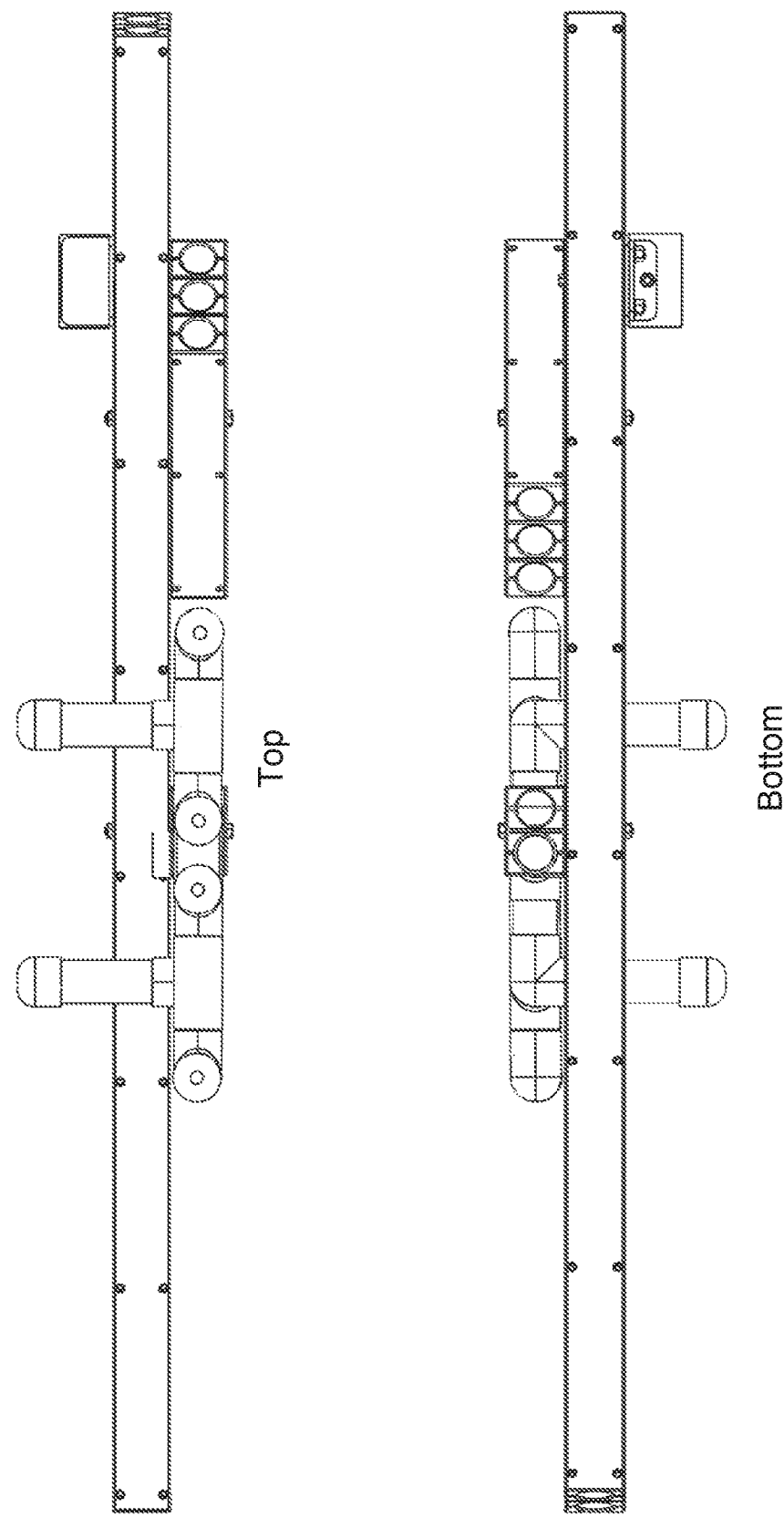
FIG. 20 illustrates top and bottom views of a preferred exemplary invention embodiment.

The concepts taught by the present invention may take a variety of preferred construction forms. As depicted in FIG. 9 (0900)-FIG. 24 (2400), the present invention has been implemented using a limited number of extrusions (typically fabricated using plastic, PVC, or aluminum) that may be bolted together in an extensible tool rack structure. FIG. 9 (0900)-FIG. 16 (1600) illustrates this preferred exemplary embodiment installed on a pickup truck. FIG. 17 (1700)-FIG. 24 (2400) illustrates this preferred exemplary embodiment in isolated views.

Referencing FIG. 17 (1700), this preferred exemplary embodiment comprises a diagonal tube stack (DTS) (1701), an elongated tube stack (ETS) (1702), reconfigurable hose rack (RHR) (1703) with vertical support member (VSM) (1704), and universal mounting bracket (UMB) (1705).

Figure 21:
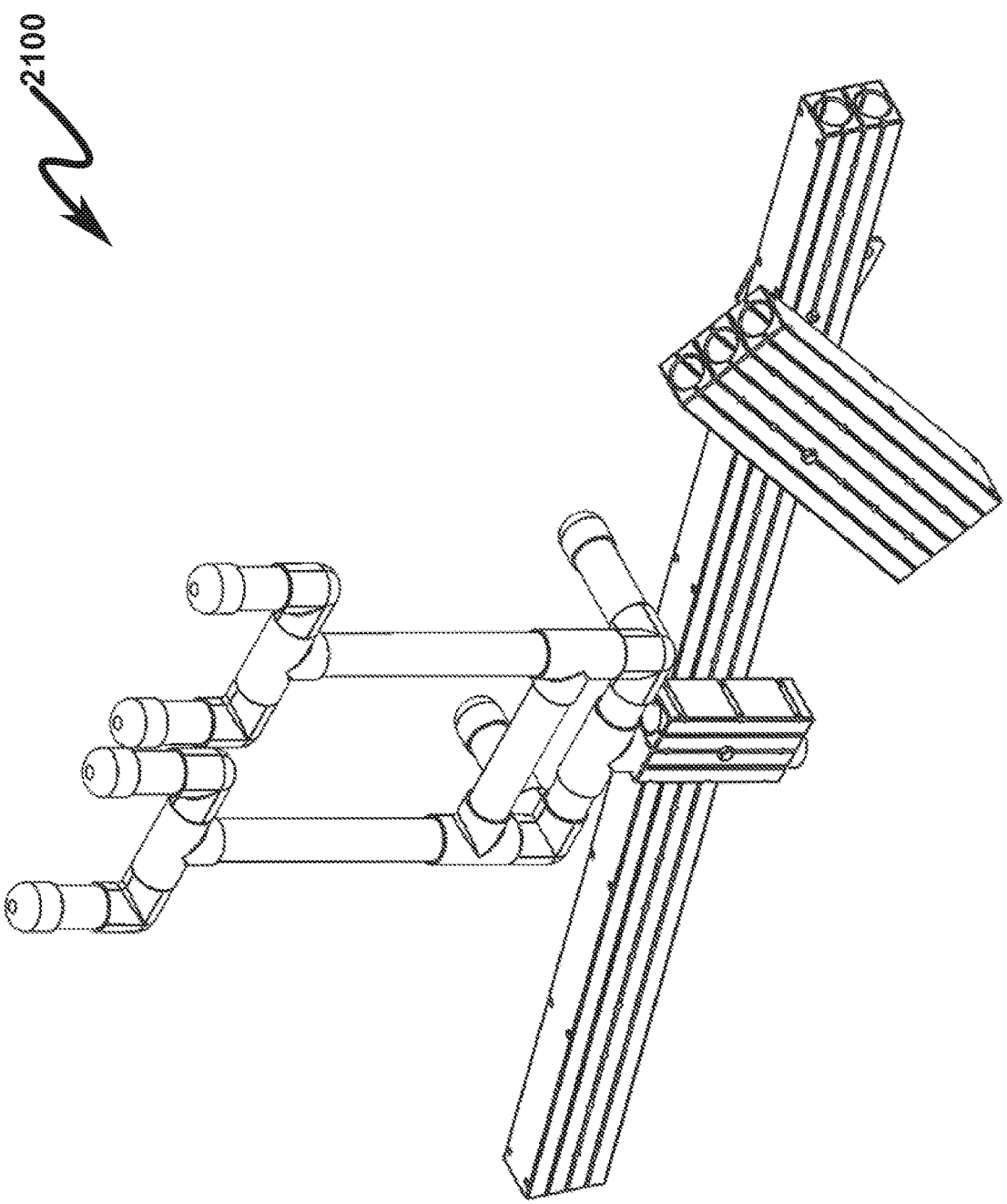
FIG. 21 illustrates a top front left perspective view of a preferred exemplary invention embodiment with RHR configured in a first exemplary position.
Figure 22:
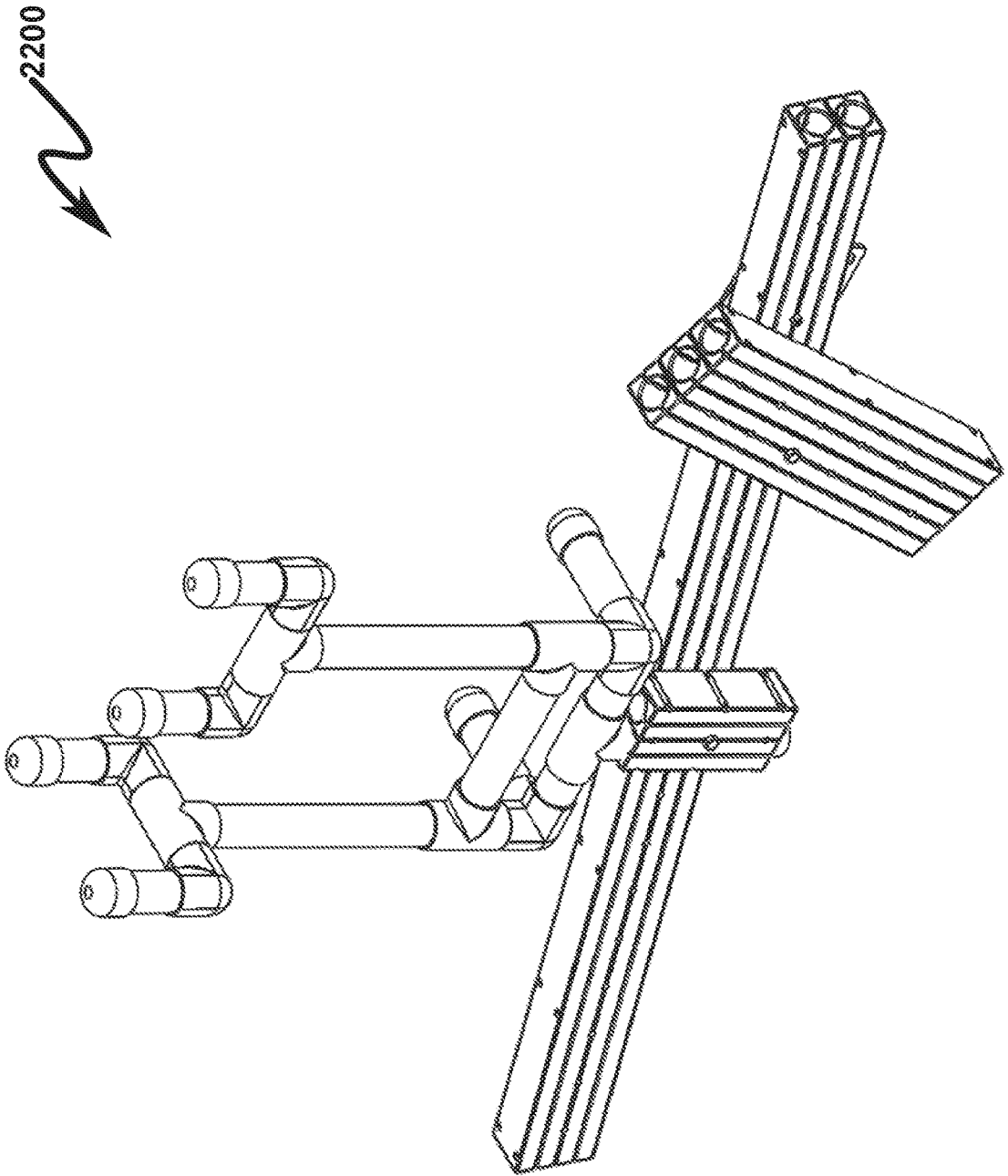
FIG. 22 illustrates a top front left perspective view of a preferred exemplary invention embodiment with RHR configured in a second exemplary position.
Figure 23:
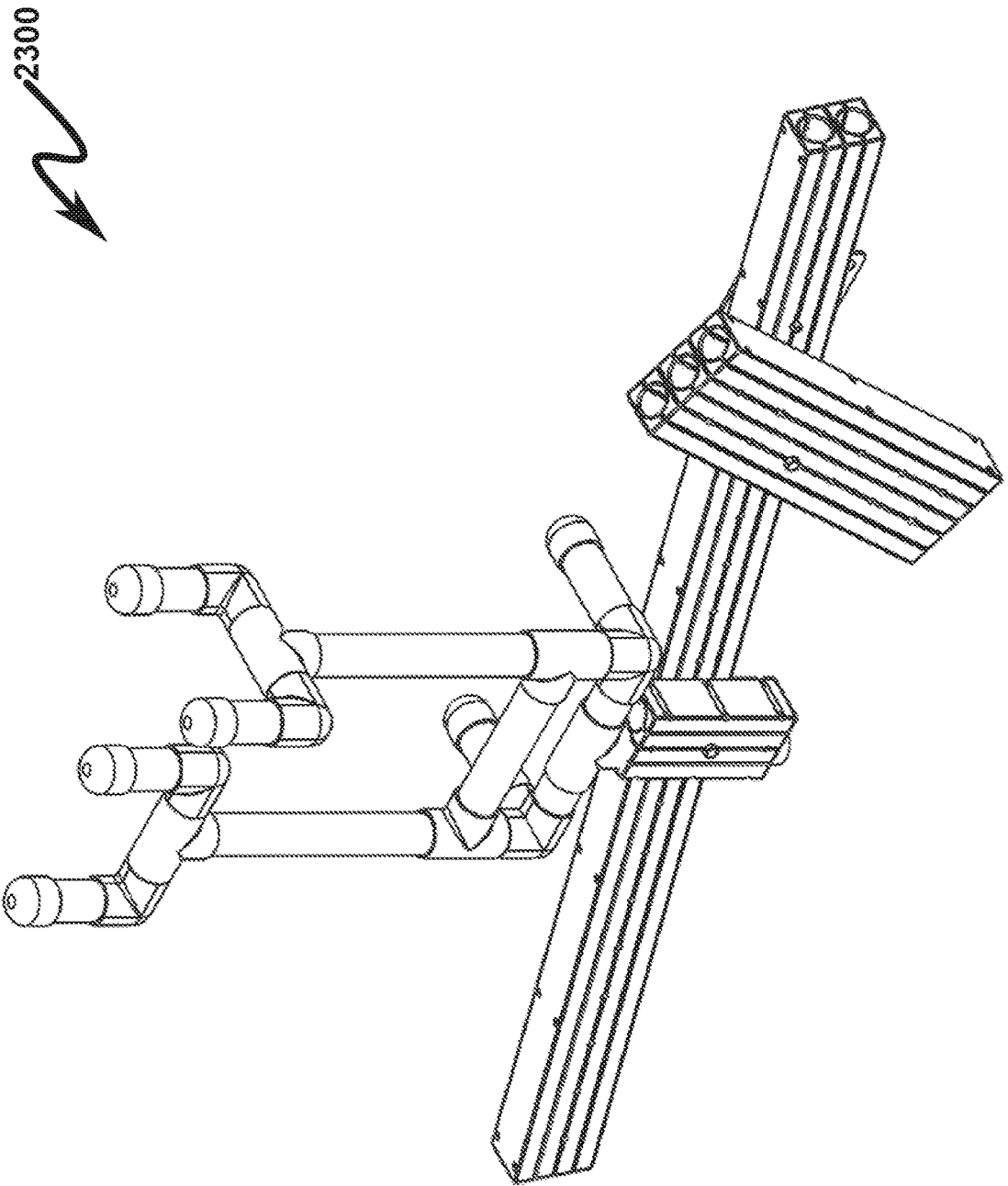
FIG. 23 illustrates a top front left perspective view of a preferred exemplary invention embodiment with RHR configured in a third exemplary position.
Figure 24:
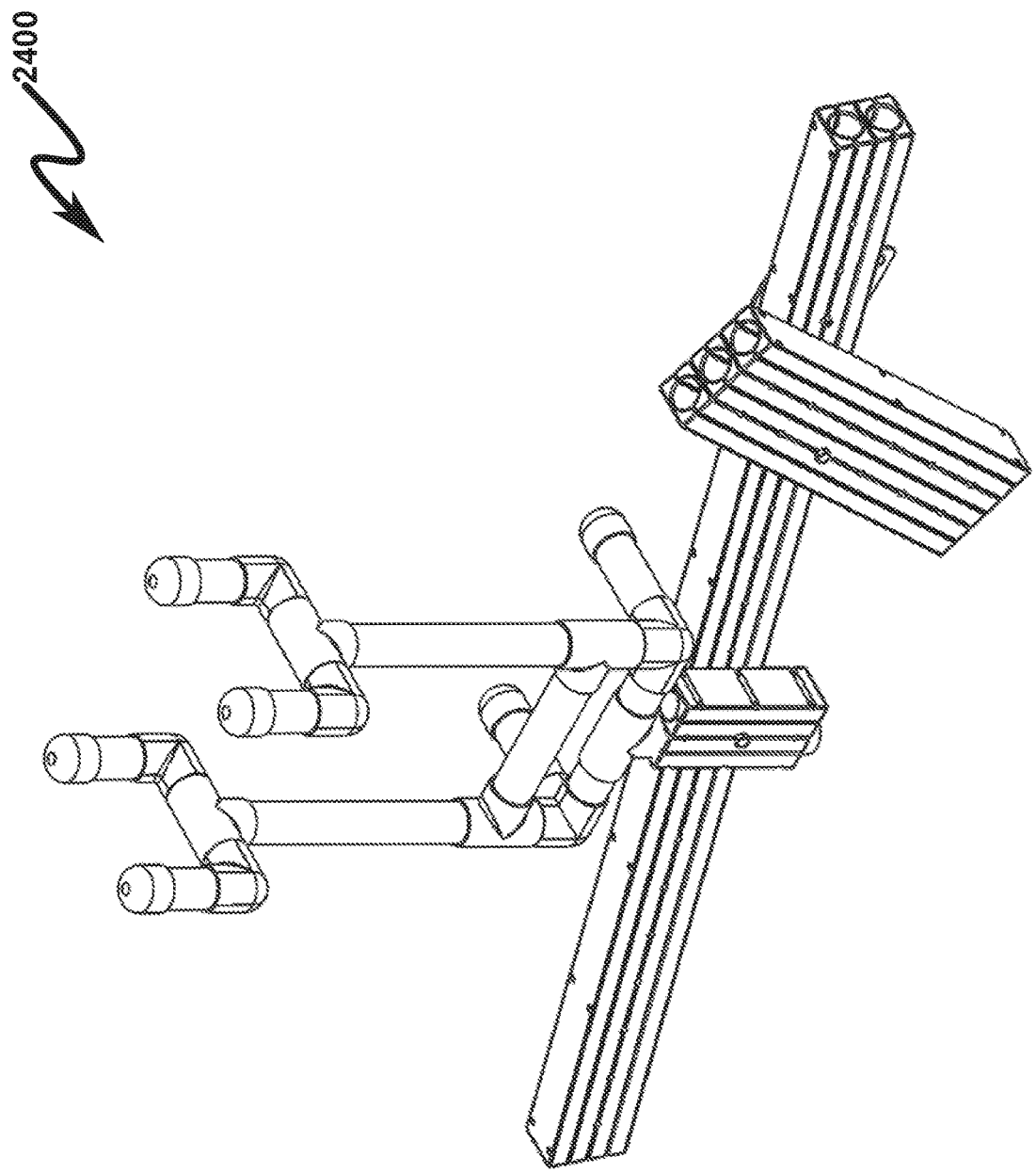
FIG. 24 illustrates a top front left perspective view of a preferred exemplary invention embodiment with RHR configured in a fourth exemplary position.

As generally illustrated in FIG. 21 (2100)-FIG. 24 (2400), the RHR may be reconfigured in various configurations to support the storage of hose (FIG. 21 (2100)) as well as the transportation of long pipe stock (FIG. 24 (2400)) by the system.

Wheel-Well Storage Rack (WSR) Embodiment (2500)-(4000)

Figure 25:
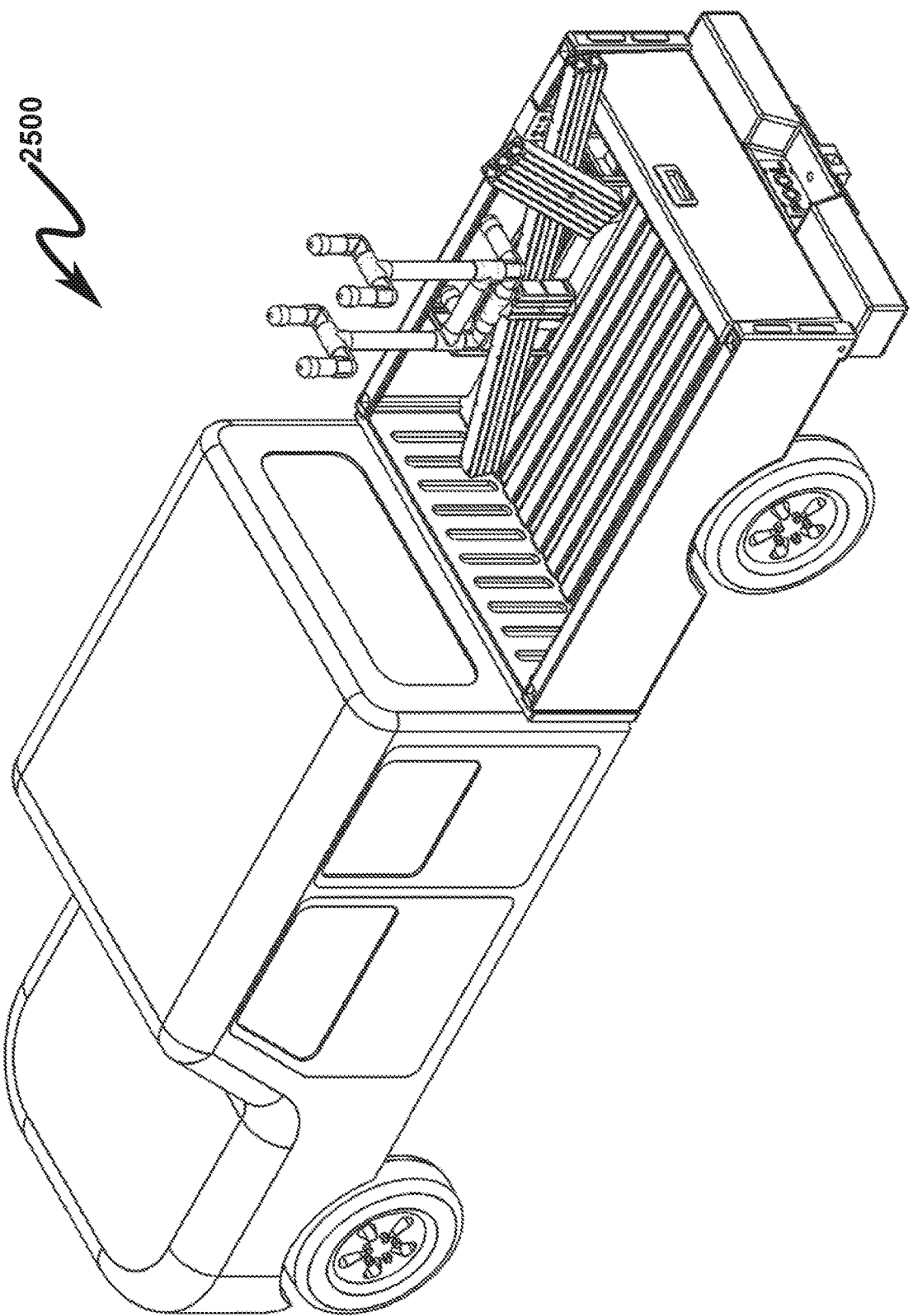
FIG. 25 illustrates a left front operational top perspective view of a preferred exemplary invention embodiment incorporating a wheel-well storage rack (WSR) installed on a pickup truck.
Figure 26:
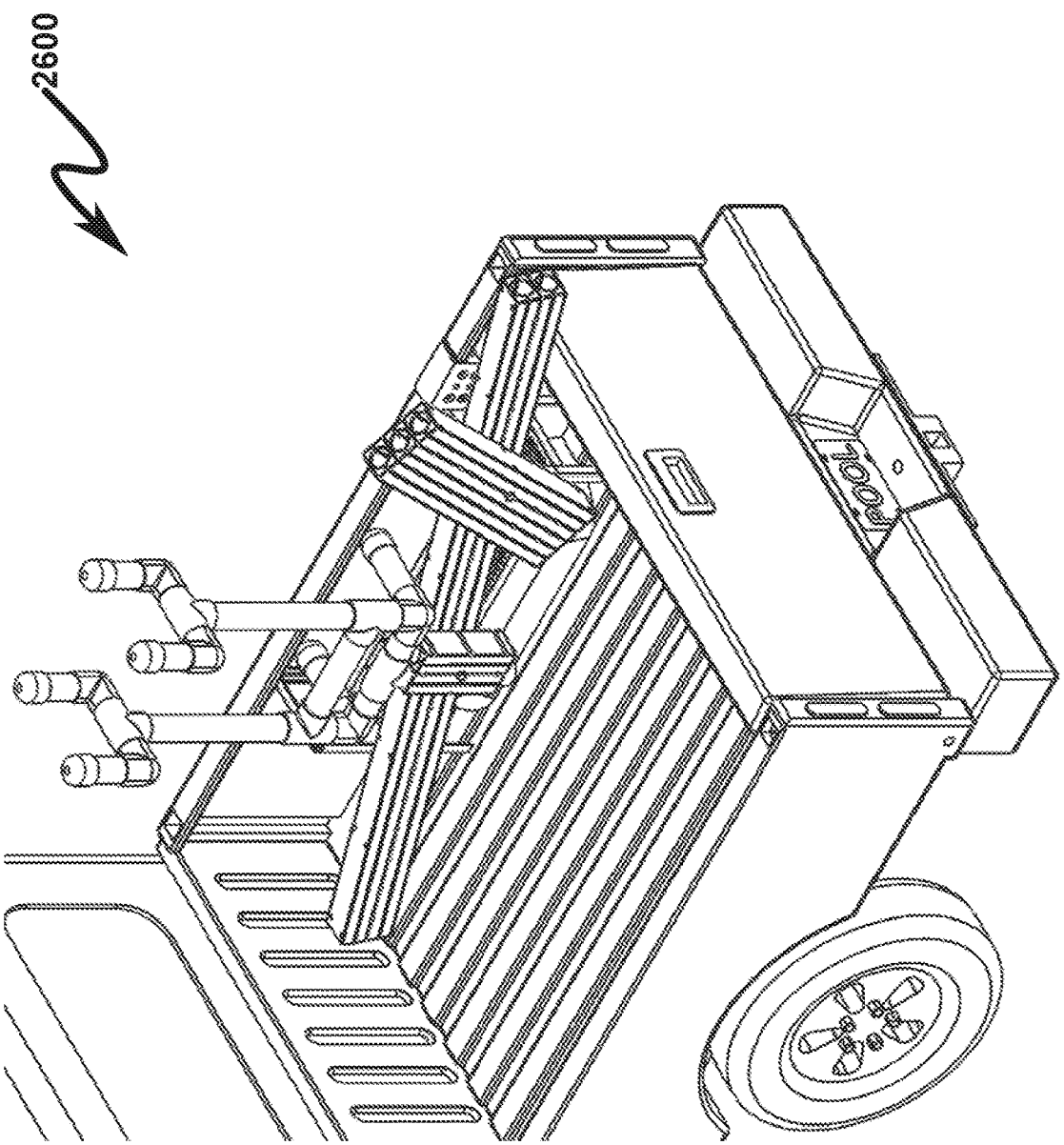
FIG. 26 illustrates a left front operational top perspective detail view of a preferred exemplary invention embodiment incorporating a wheel-well storage rack (WSR) installed on a pickup truck.
Figure 27:
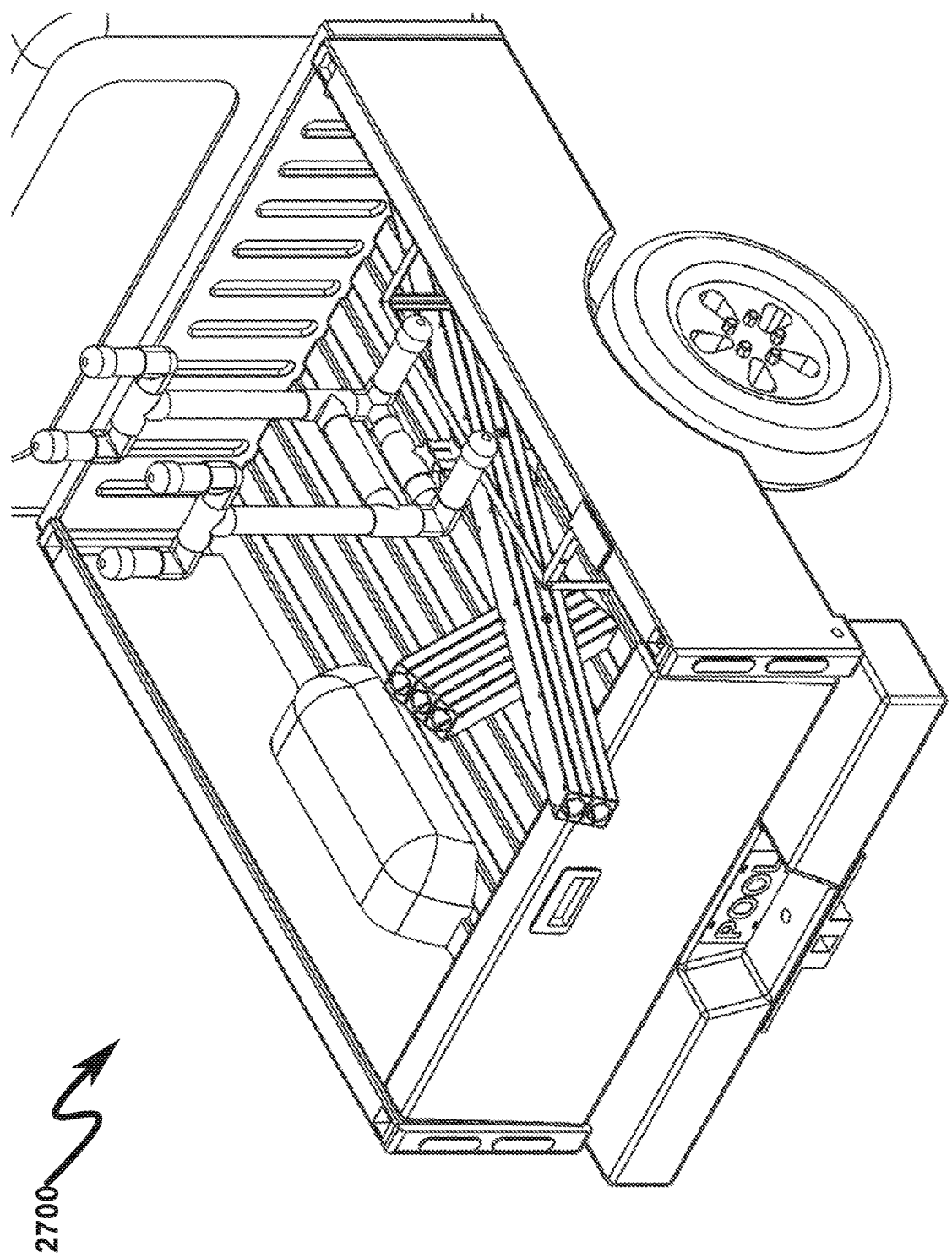
FIG. 27 illustrates a right front operational top perspective view of a preferred exemplary invention embodiment incorporating a wheel-well storage rack (WSR) installed on a pickup truck.
Figure 28:
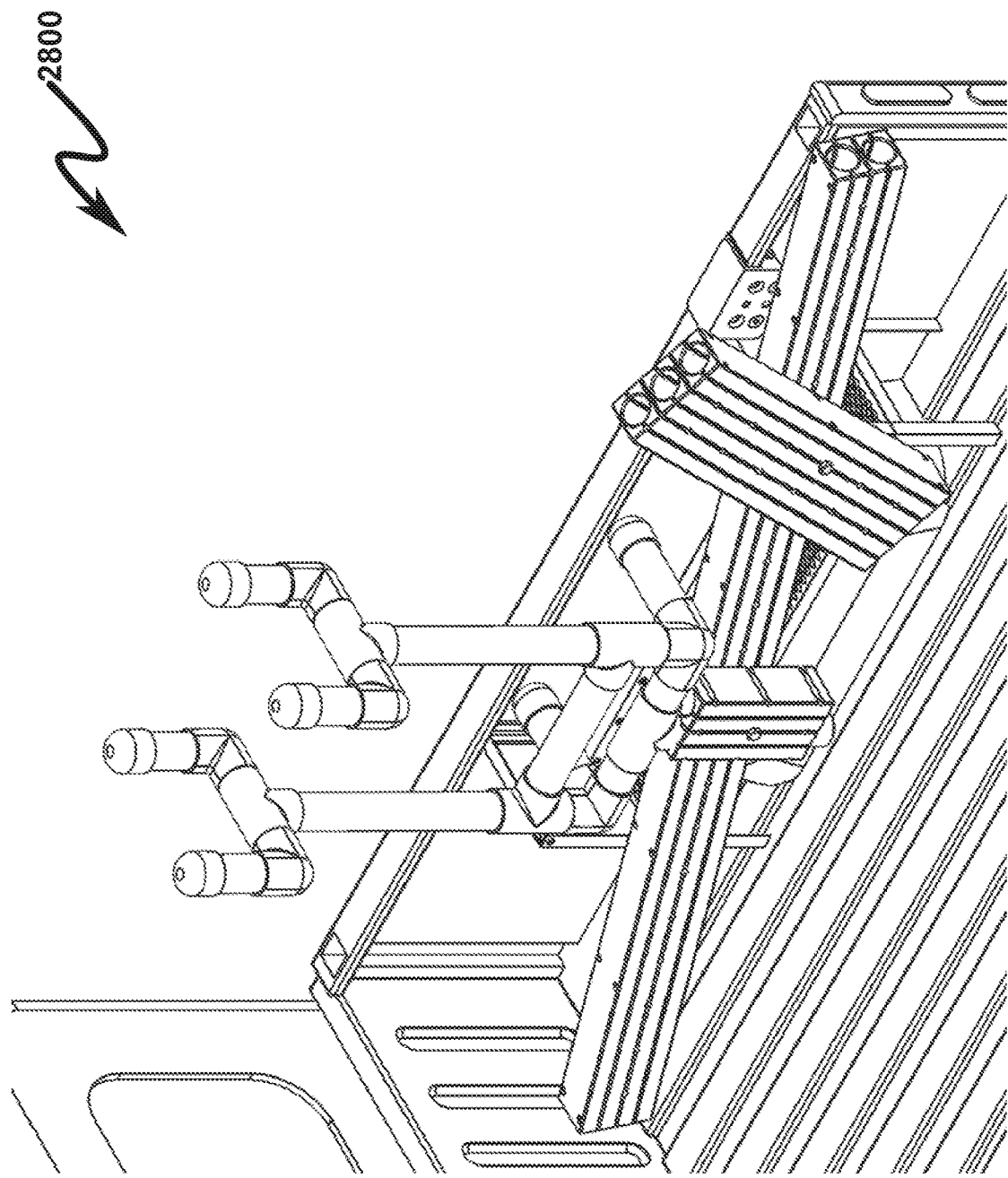
FIG. 28 illustrates a left front operational top perspective detail view of a preferred exemplary invention embodiment incorporating a wheel-well storage rack (WSR) installed on a pickup truck.
Figure 29:
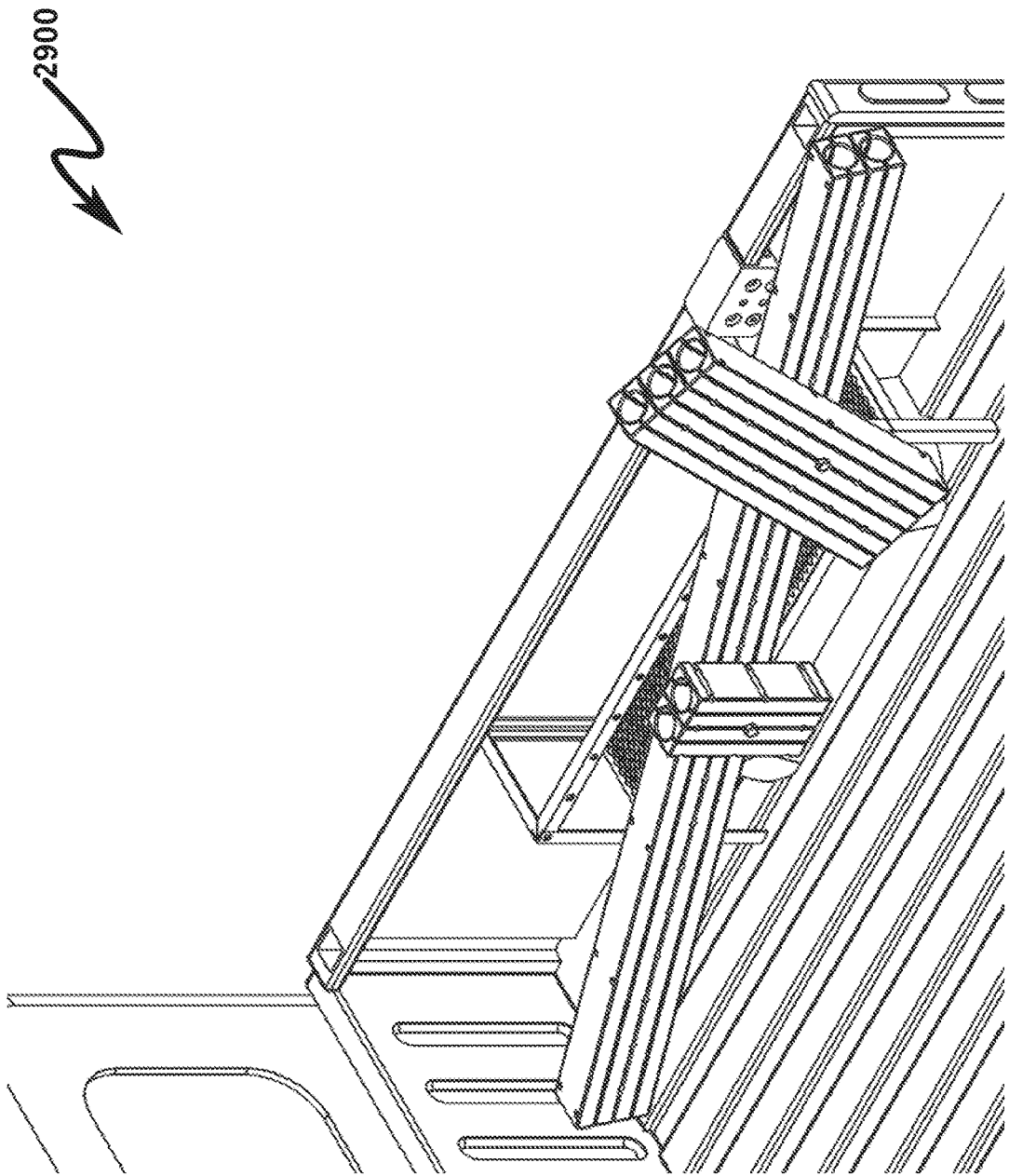
FIG. 29 illustrates a left front operational top perspective detail view of a preferred exemplary invention embodiment incorporating a wheel-well storage rack (WSR) installed on a pickup truck with RHR removed.
Figure 30:
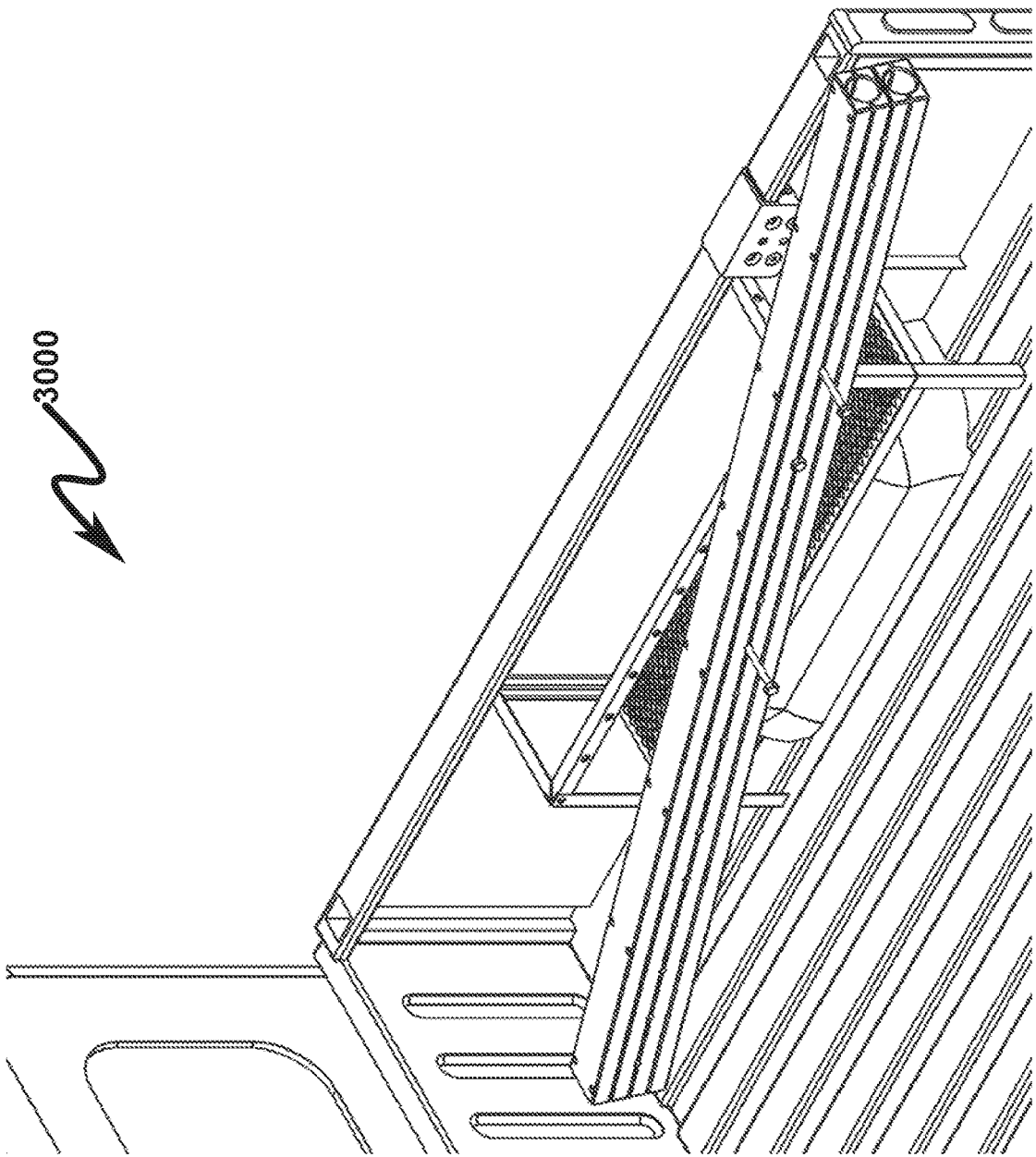
FIG. 30 illustrates a left front operational top perspective detail view of a preferred exemplary invention embodiment incorporating a wheel-well storage rack (WSR) installed on a pickup truck with RHR, VSM, and DTS removed.
Figure 31:
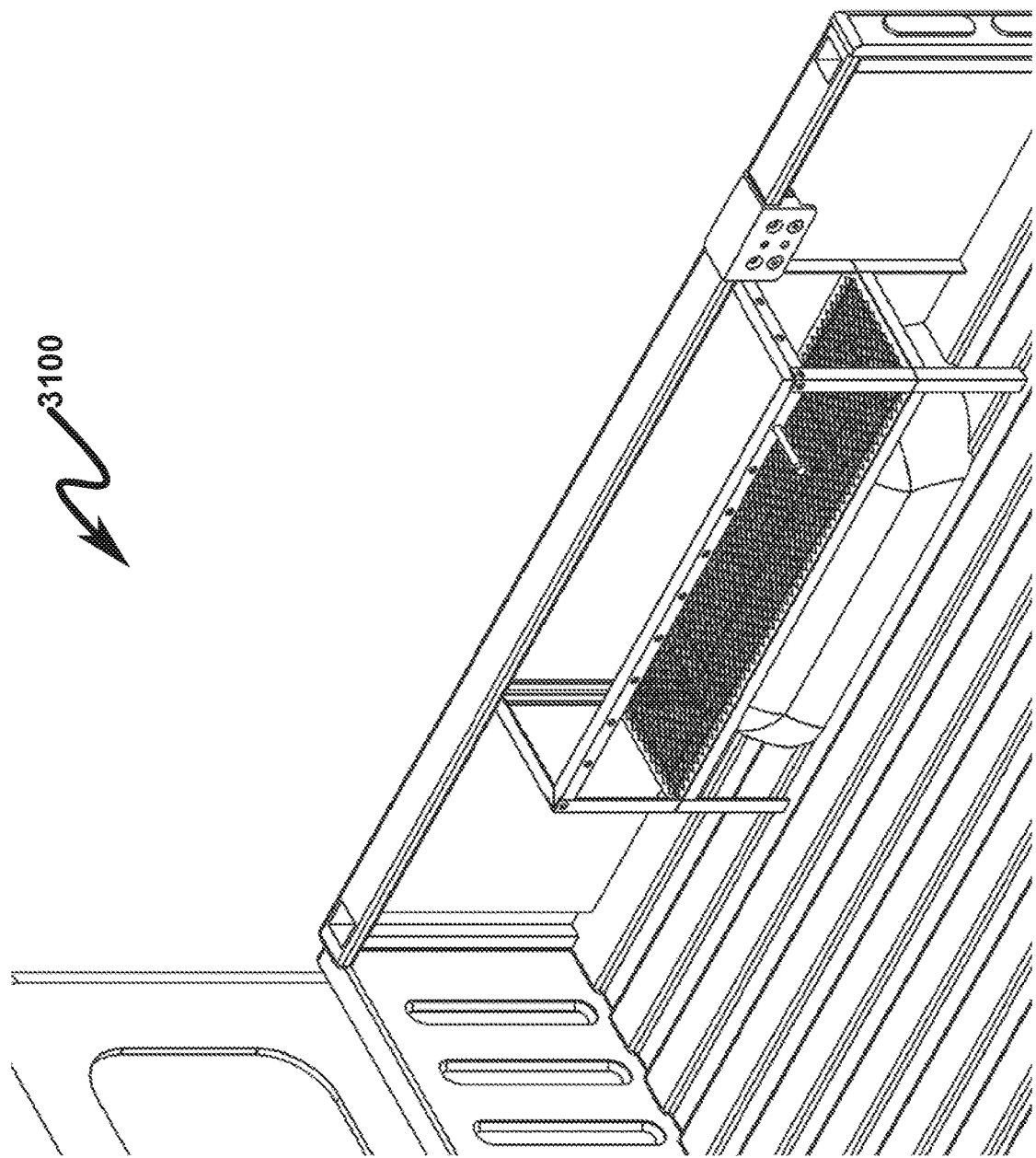
FIG. 31 illustrates a left front operational top perspective detail view of a preferred exemplary invention embodiment incorporating a wheel-well storage rack (WSR) installed on a pickup truck with RHR, VSM, DTS, and ETS removed.
Figure 32:
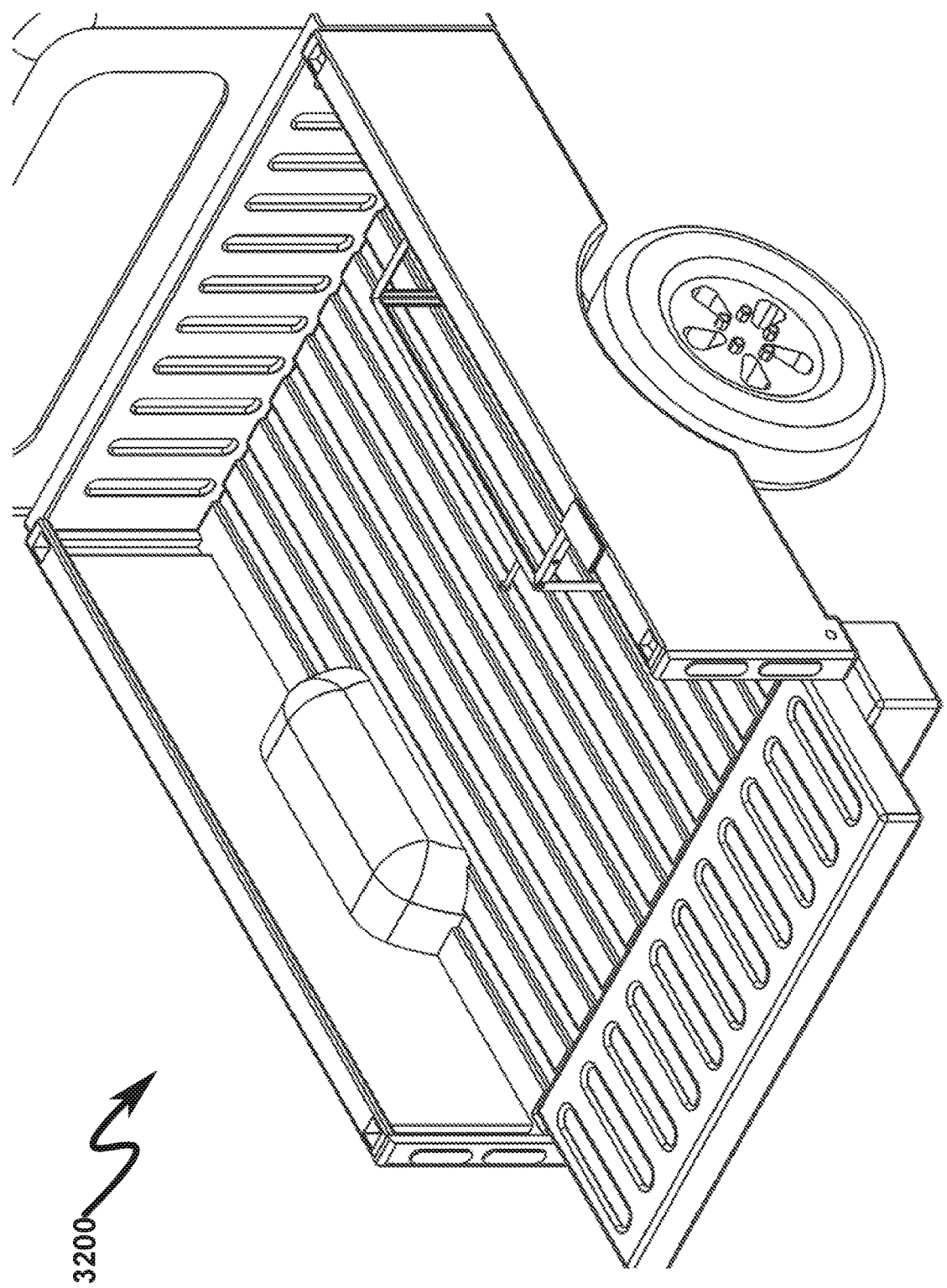
FIG. 32 illustrates a right front operational top perspective detail view of a preferred exemplary invention embodiment incorporating a wheel-well storage rack (WSR) installed on a pickup truck with RHR, VSM, DTS, and ETS removed.
Figure 33:
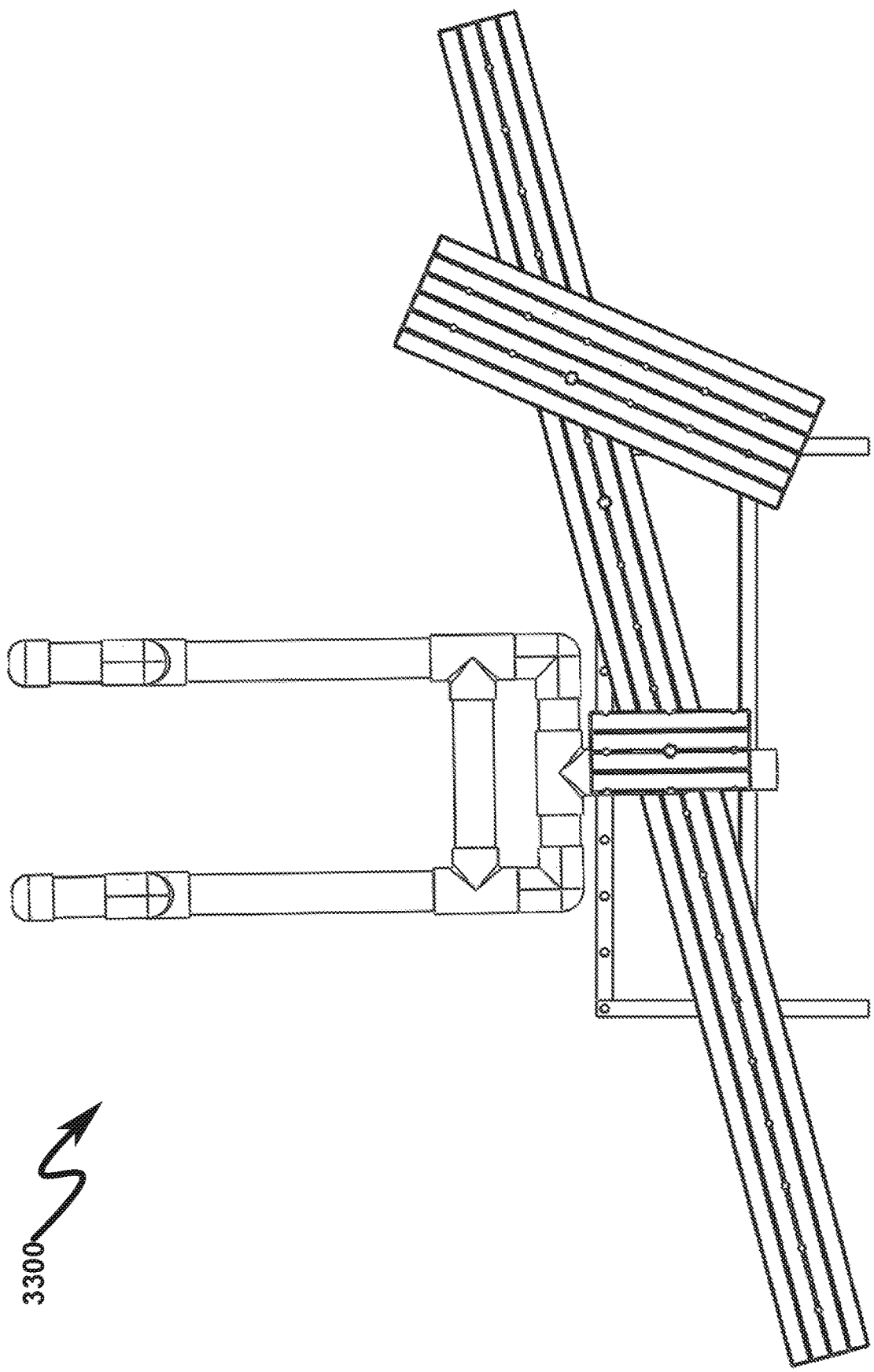
FIG. 33 illustrates a left view of a preferred exemplary invention embodiment incorporating a wheel-well storage rack (WSR)
Figure 34:
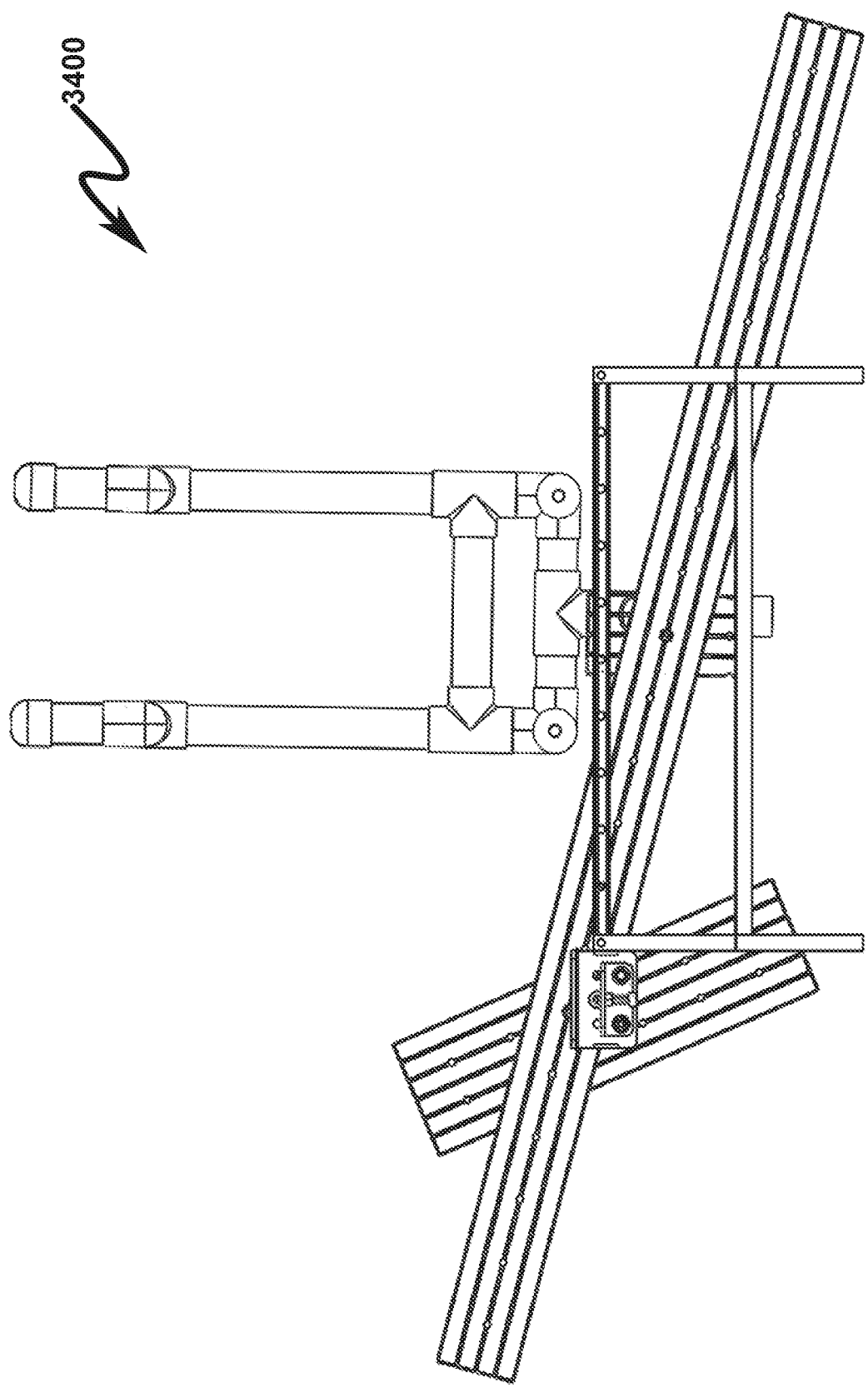
FIG. 34 illustrates a right view of a preferred exemplary invention embodiment incorporating a wheel-well storage rack (WSR)
Figure 36:
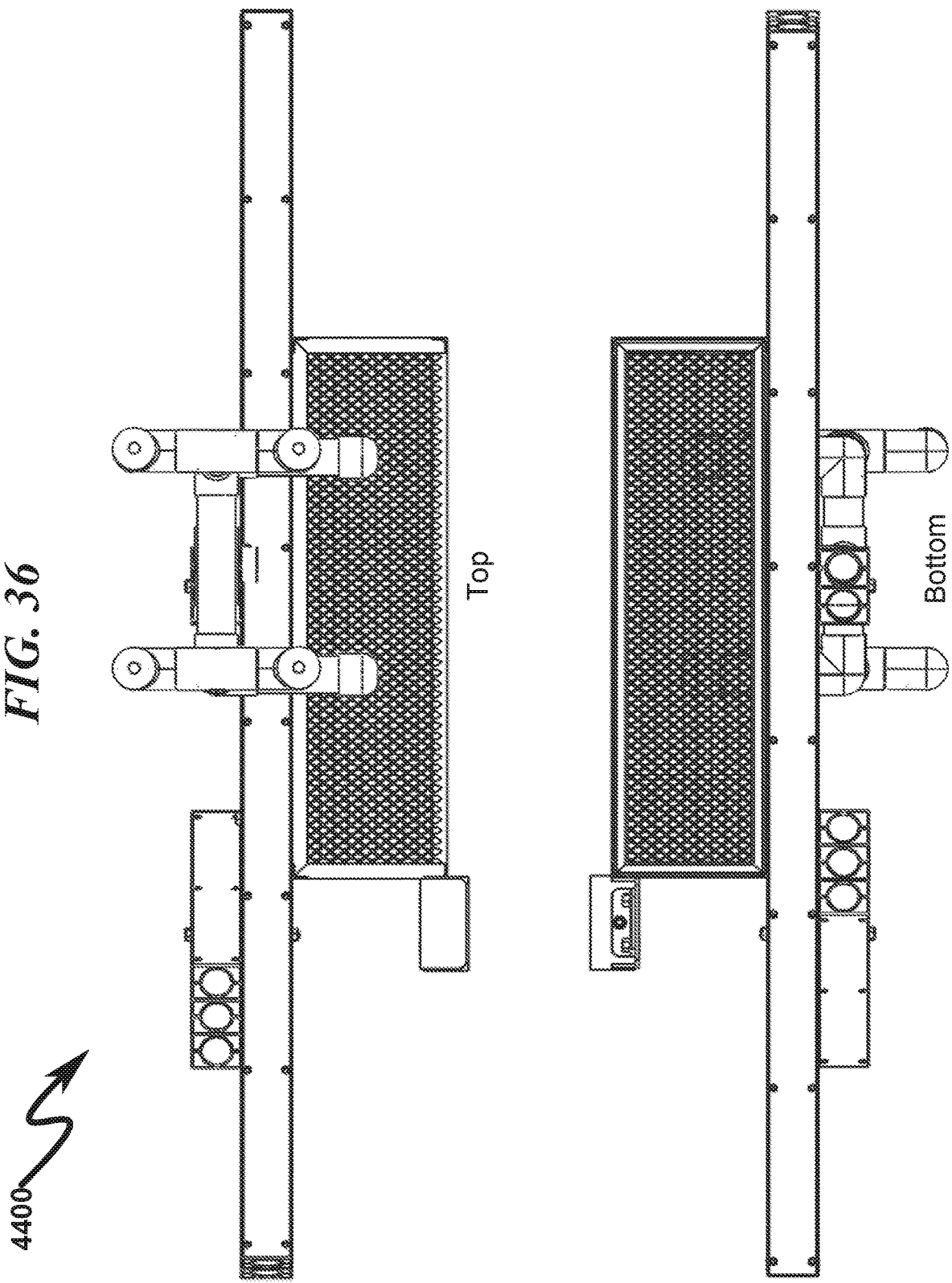
FIG. 36 illustrates top and bottom views of a preferred exemplary invention embodiment incorporating a wheel-well storage rack (WSR)
Figure 37:
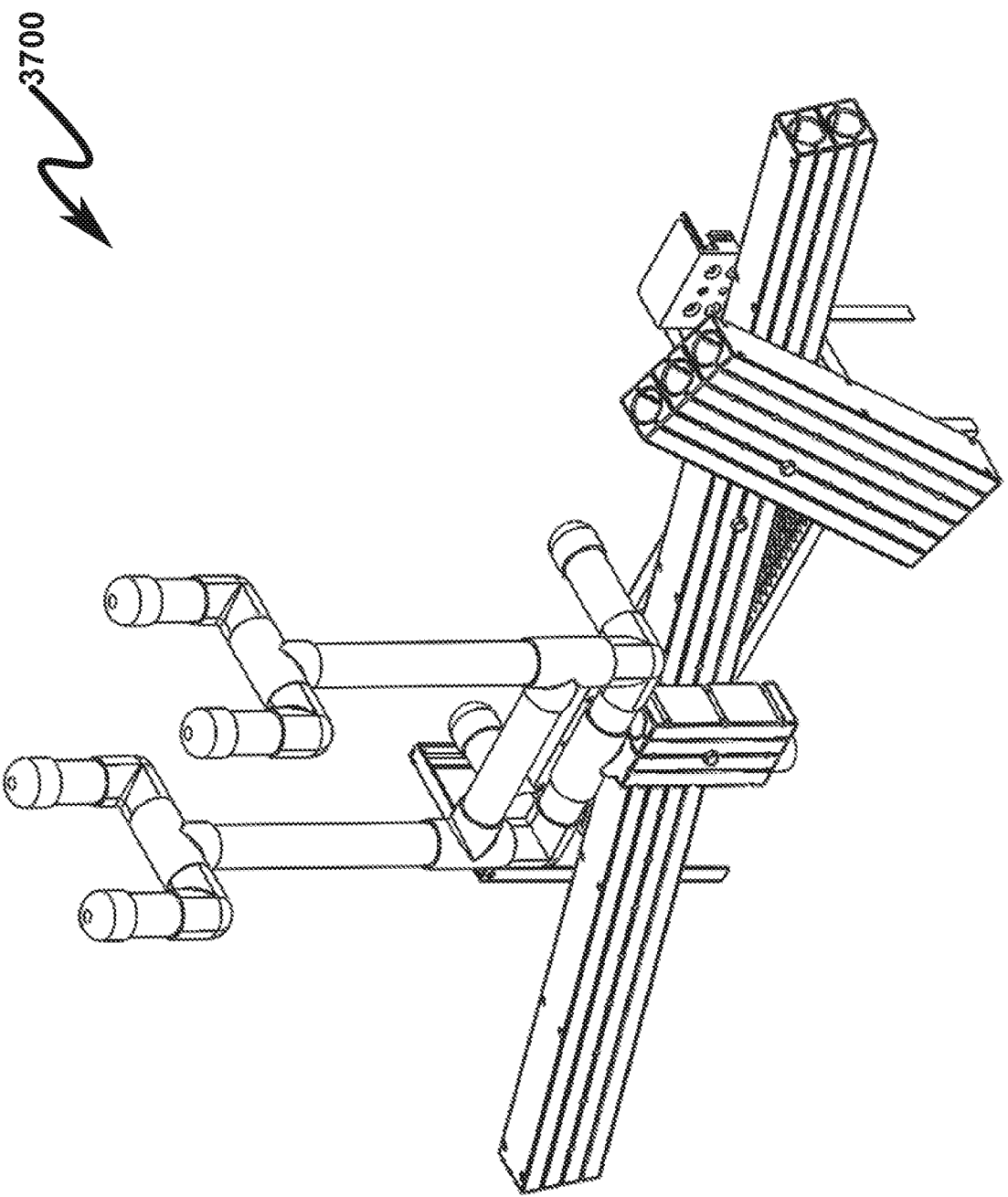
FIG. 37 illustrates a top front left perspective view of a preferred exemplary invention embodiment incorporating a wheel-well storage rack (WSR)
Figure 38:
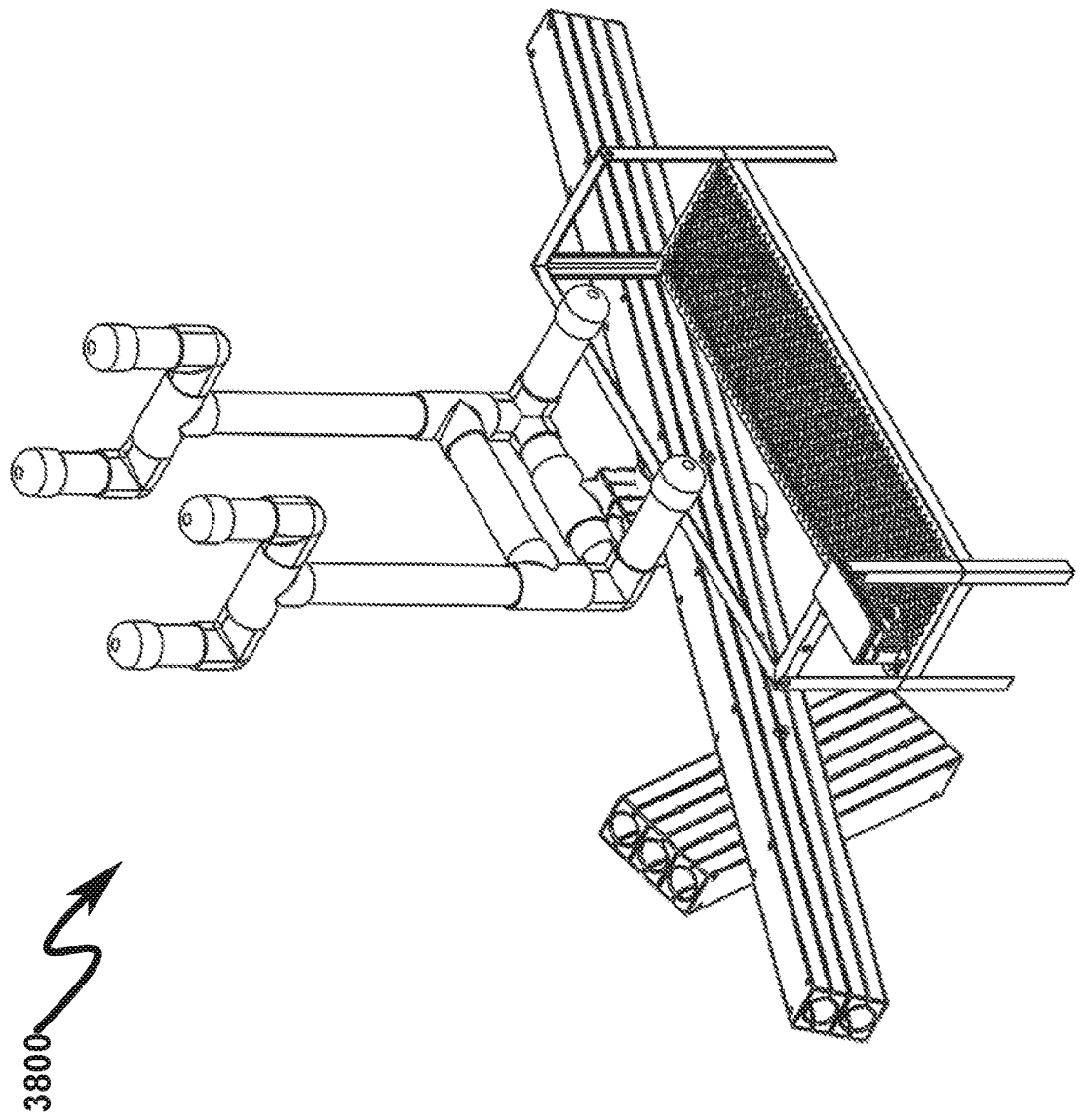
FIG. 38 illustrates a top front right perspective view of a preferred exemplary invention embodiment incorporating a wheel-well storage rack (WSR)
Figure 39:
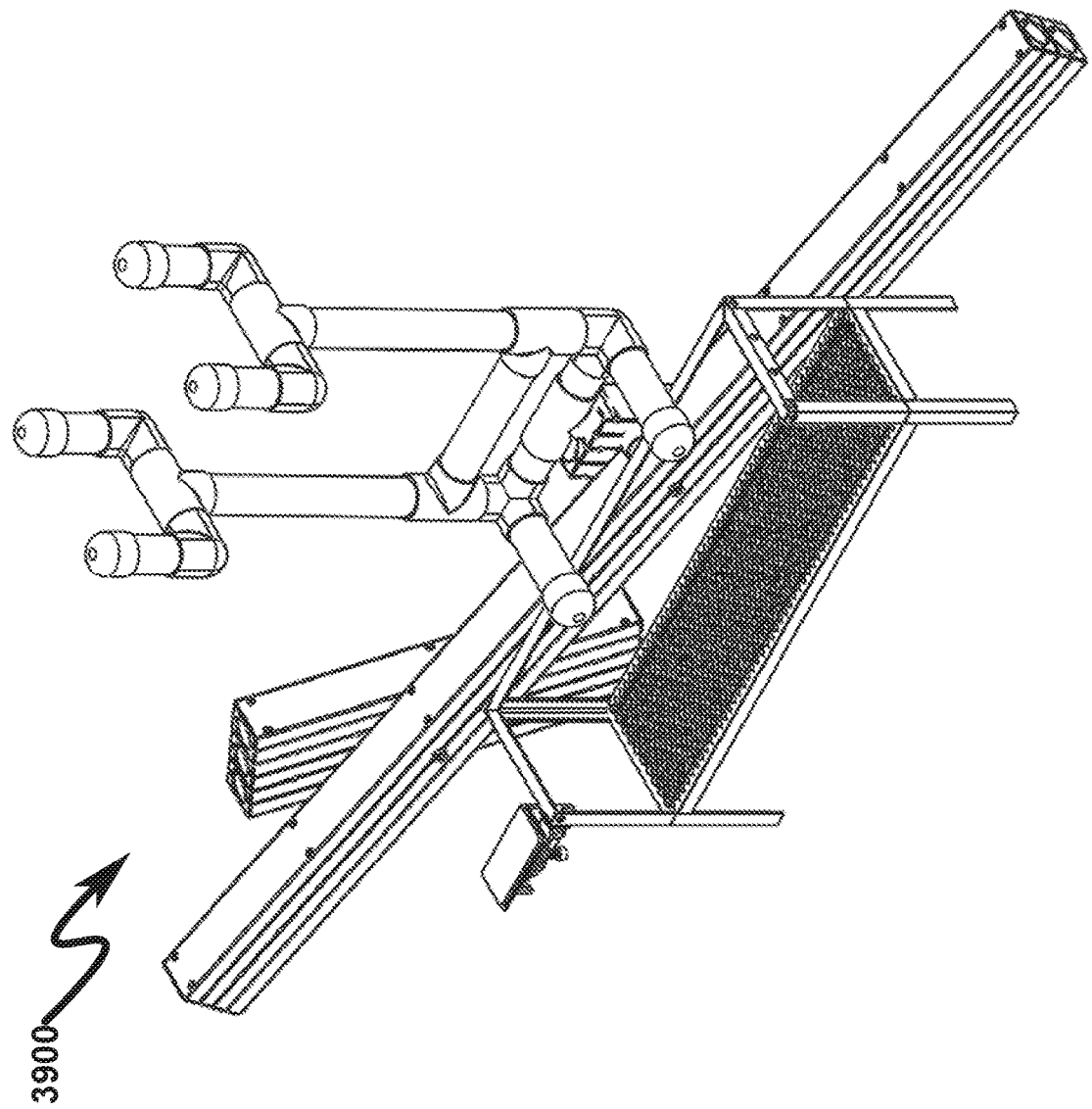
FIG. 39 illustrates a top right rear perspective view of a preferred exemplary invention embodiment incorporating a wheel-well storage rack (WSR)
Figure 40:
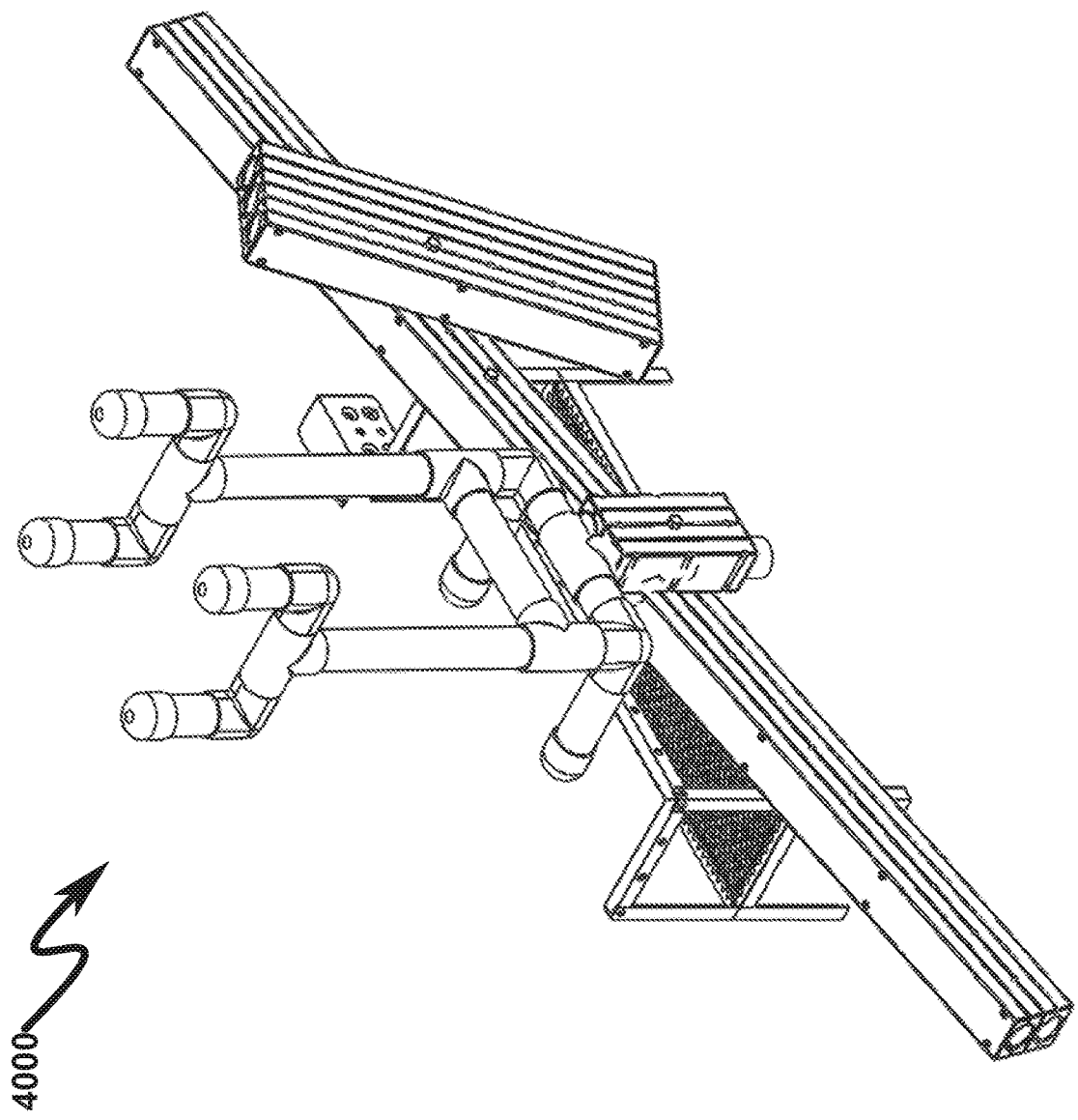
FIG. 40 illustrates a top left rear perspective view of a preferred exemplary invention embodiment incorporating a wheel-well storage rack (WSR)

The preferred exemplary embodiment depicted in FIG. 9 (0900)-FIG. 24 (2400) may be augmented with a wheel-well storage rack (WSR) as depicted in FIG. 25 (2500)-FIG. 40 (4000). FIG. 25 (2500)-FIG. 32 (3200) illustrates this preferred exemplary embodiment installed on a pickup truck. FIG. 33 (3300)-FIG. 40 (4000) illustrates this preferred exemplary embodiment in isolated views.

Here the typically unused "dead" space above the pickup truck bed wheel-well is utilized for additional storage. As mentioned and detailed previously, especially in pool maintenance functions, space in the pickup truck bed is often quickly consumed by various tools and maintenance chemicals, buckets, and the like. Often the area above the wheel wells is unusable because no maintenance item can be safely positioned on or above the wheel-wells of the pickup truck bed. This depicted embodiment incorporates a wheel-well storage rack (WSR) that may optionally be fastened to the overall tool rack structure. This permits both tool storage as well as storage of chemicals and cleaning agents required for pool maintenance functions.

Preferred Embodiment Detail (4100)-(4800)

Figure 41:
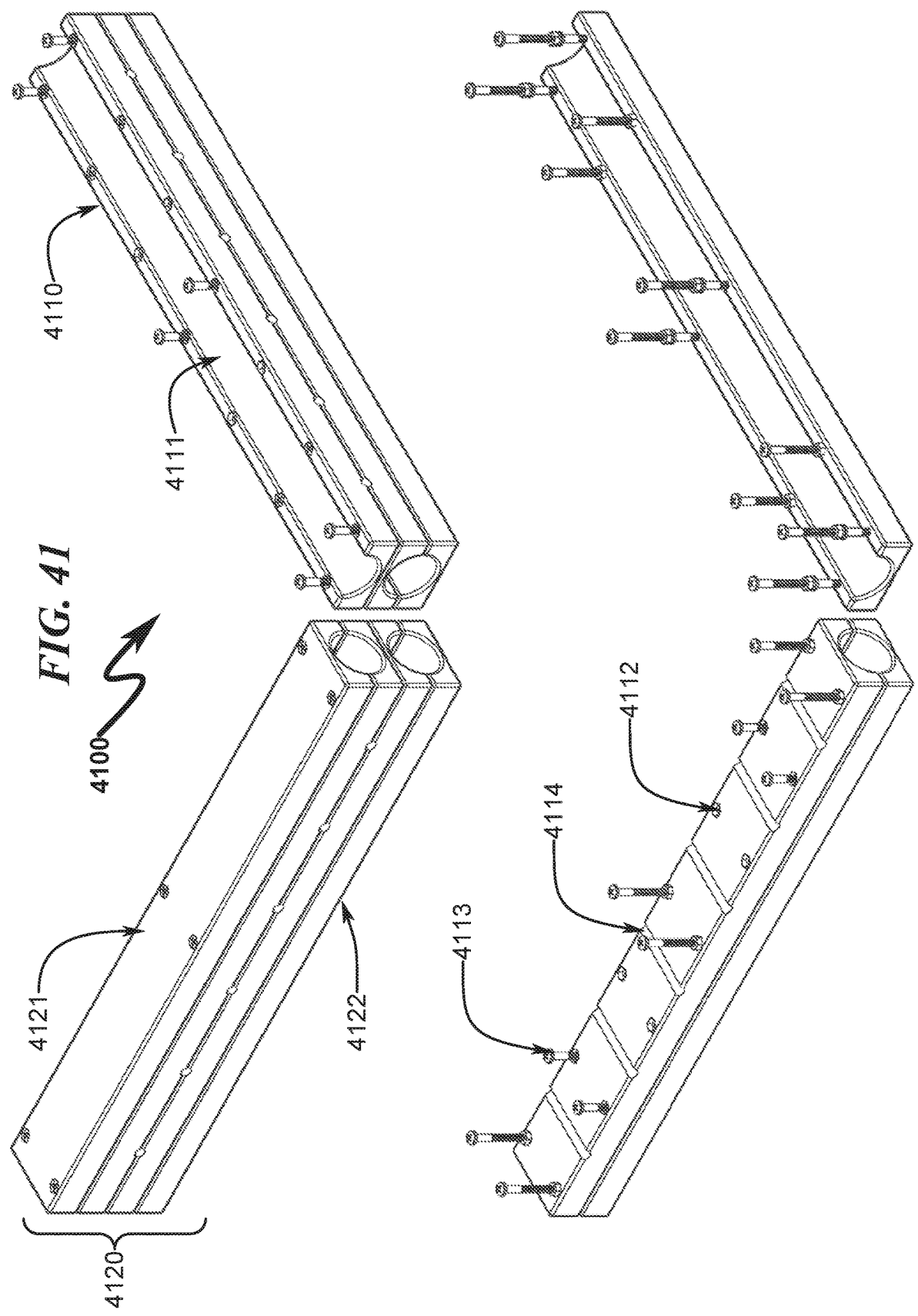
FIG. 41 illustrates an assembly perspective view of a preferred exemplary invention diagonal tube stack (DTS) embodiment.
Figure 42:
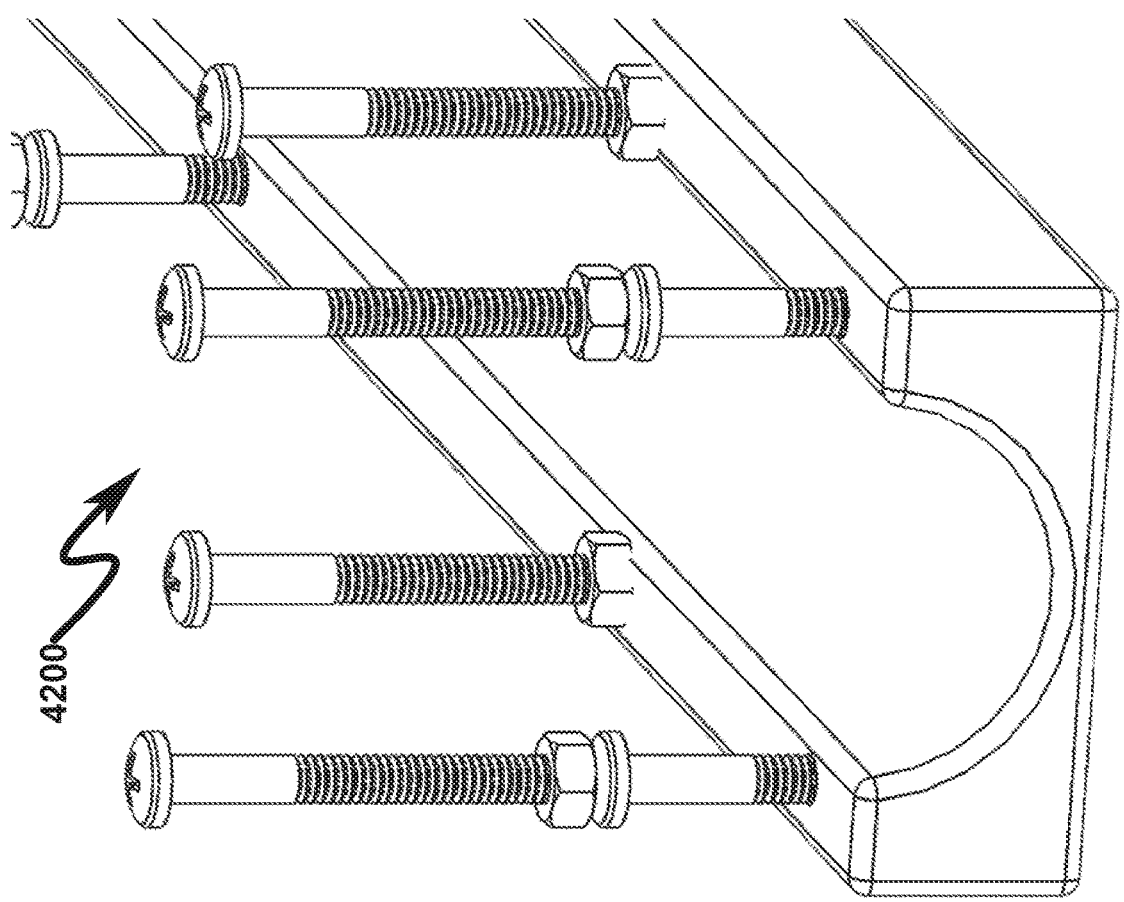
FIG. 42 illustrates an assembly perspective view of a preferred exemplary invention diagonal tube stack (DTS) embodiment.
Figure 43:
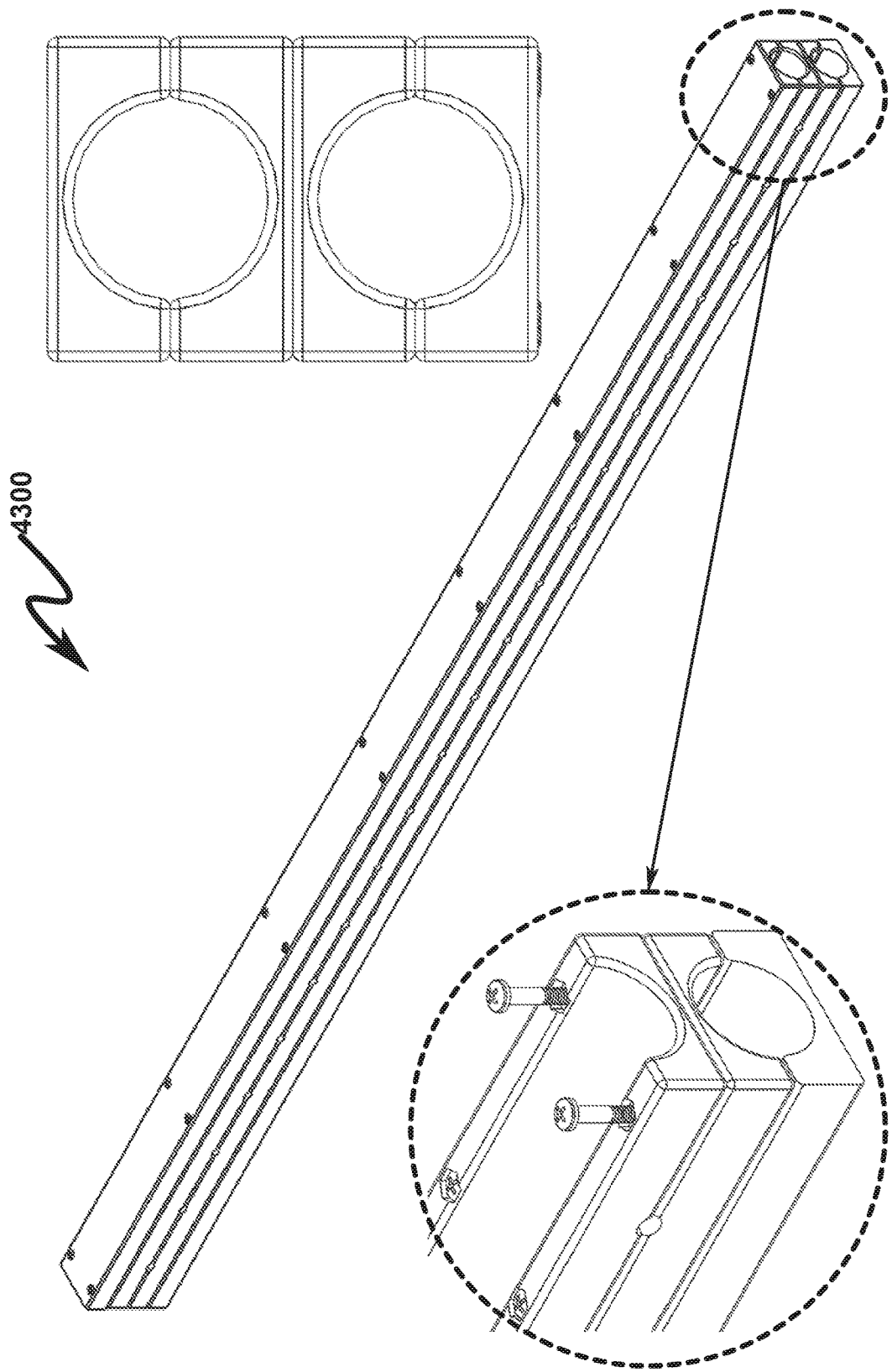
FIG. 43 illustrates an assembly perspective view of a preferred exemplary invention elongated tube stack (ETS) embodiment.

Elements of the preferred exemplary embodiment depicted in FIG. 17 (1700)-FIG. 40 (4000) are depicted in more detail in FIG. 41 (4100)-FIG. 48 (4800). FIG. 41 (4100)-FIG. 42 (4200) illustrates detail of the DTS. FIG. 43 (4300)-FIG. 44 (4400) illustrates detail of the ETS. FIG. 45 (4500)-FIG. 48 (4800) illustrates detail of the RHR.

The DTS, ETS, and VSM structures may be configured using similar techniques as detailed in the DTS detail depicted in FIG. 41 (4100). Here an extrusion (4110) of defined length is configured with an internal void (4111) that may be typically semi-circular (but could also be elliptical or an elongated slot). This extrusion (4110) includes drills (4112) for assembly fasteners (4113) to form a stacked tubular structure as well as transverse mounting voids (TMV) (4114) to allow the assembled tubular stack (4120) to be mated to another tubular stack or to a fixed object such as a pickup truck bed using bolt fasteners or the like. While not required, the extrusion may include top and bottom vanity sections (4121, 4122) that do not incorporate the transverse mounting voids (4114).

Figure 44:
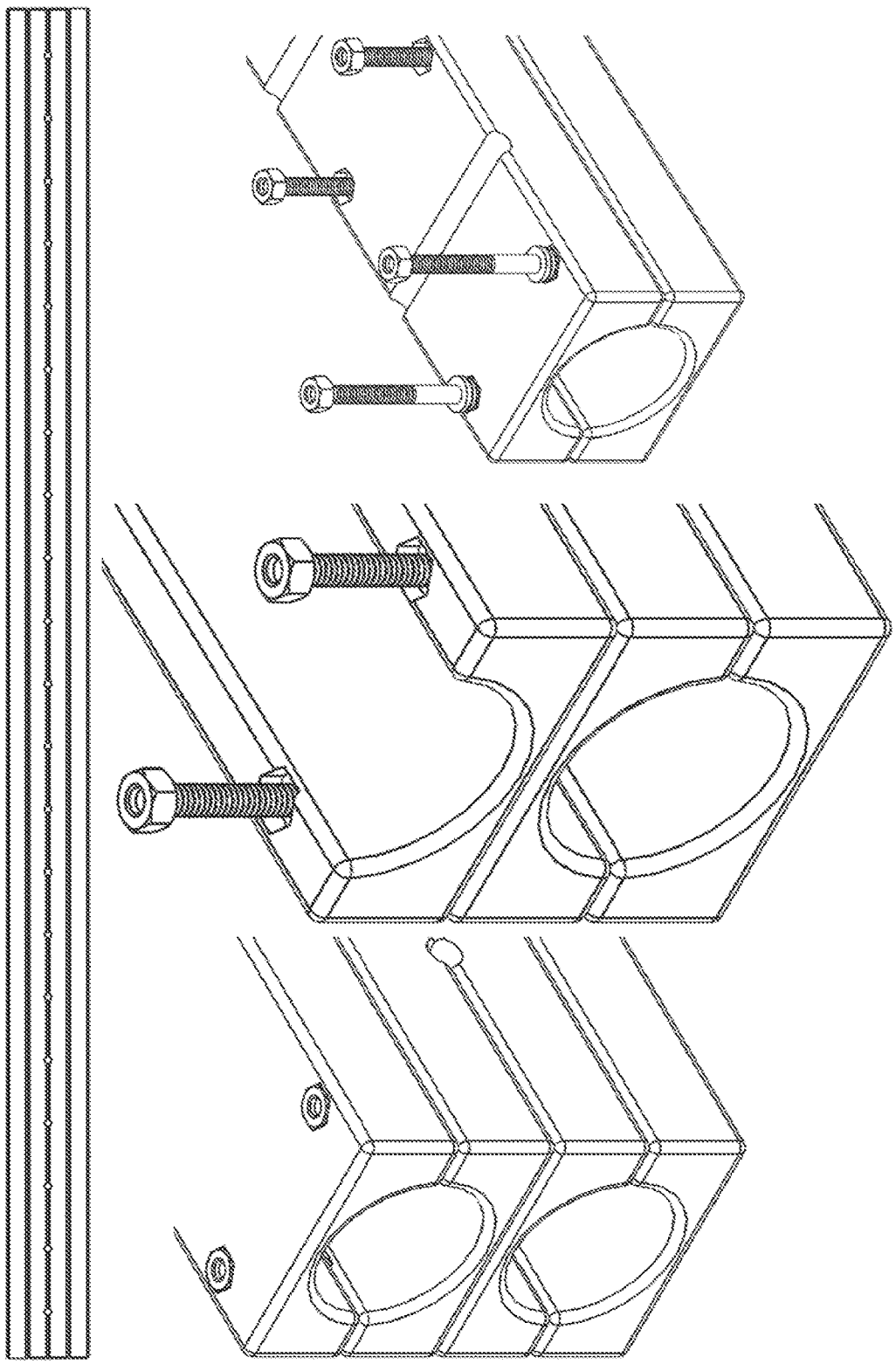
FIG. 44 illustrates an assembly perspective view of a preferred exemplary invention elongated tube stack (ETS) embodiment.
Figure 45:
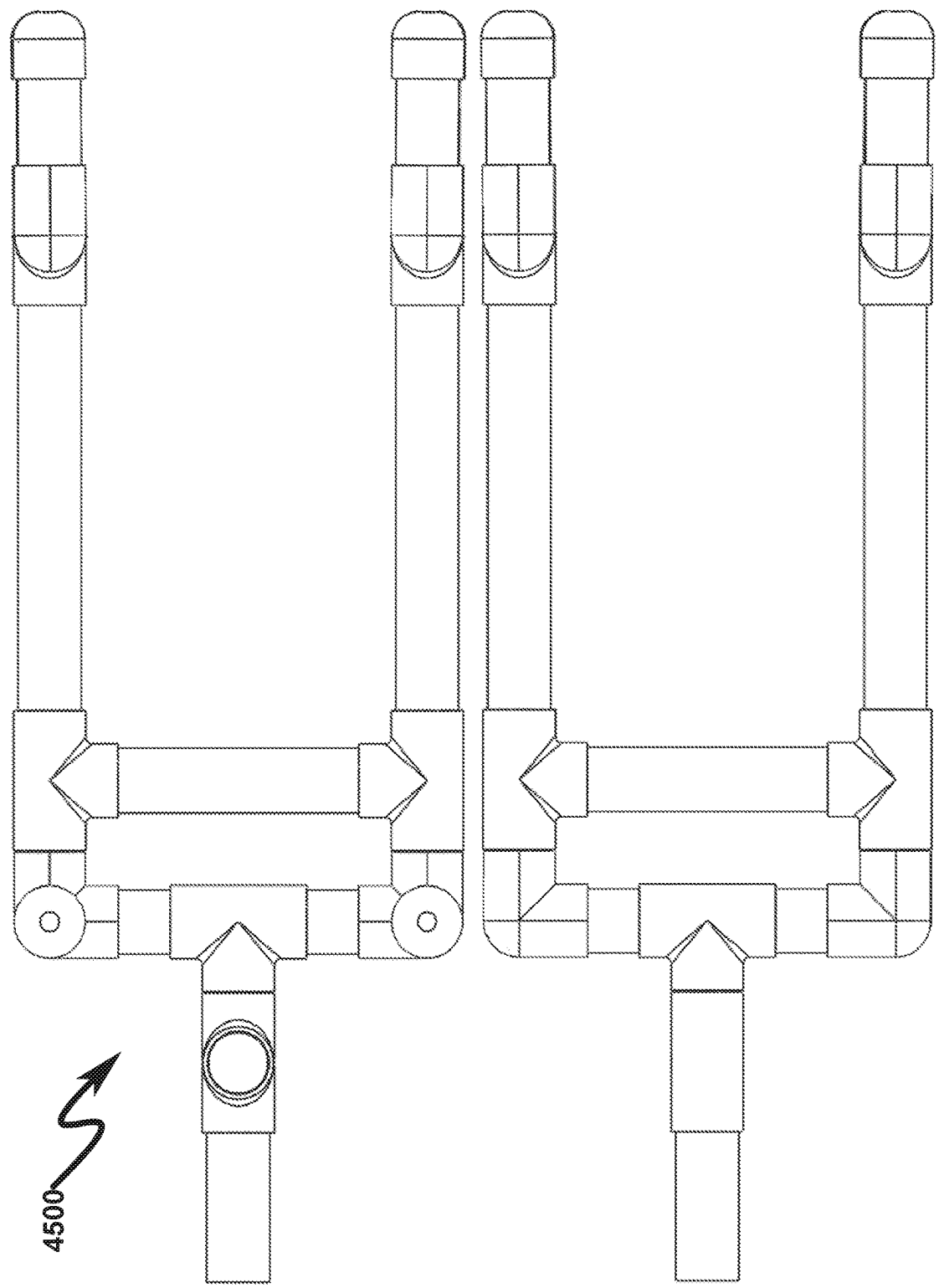
FIG. 45 illustrates left and right views of a preferred exemplary invention reconfigurable hose rack (RHR) embodiment.
Figure 46:
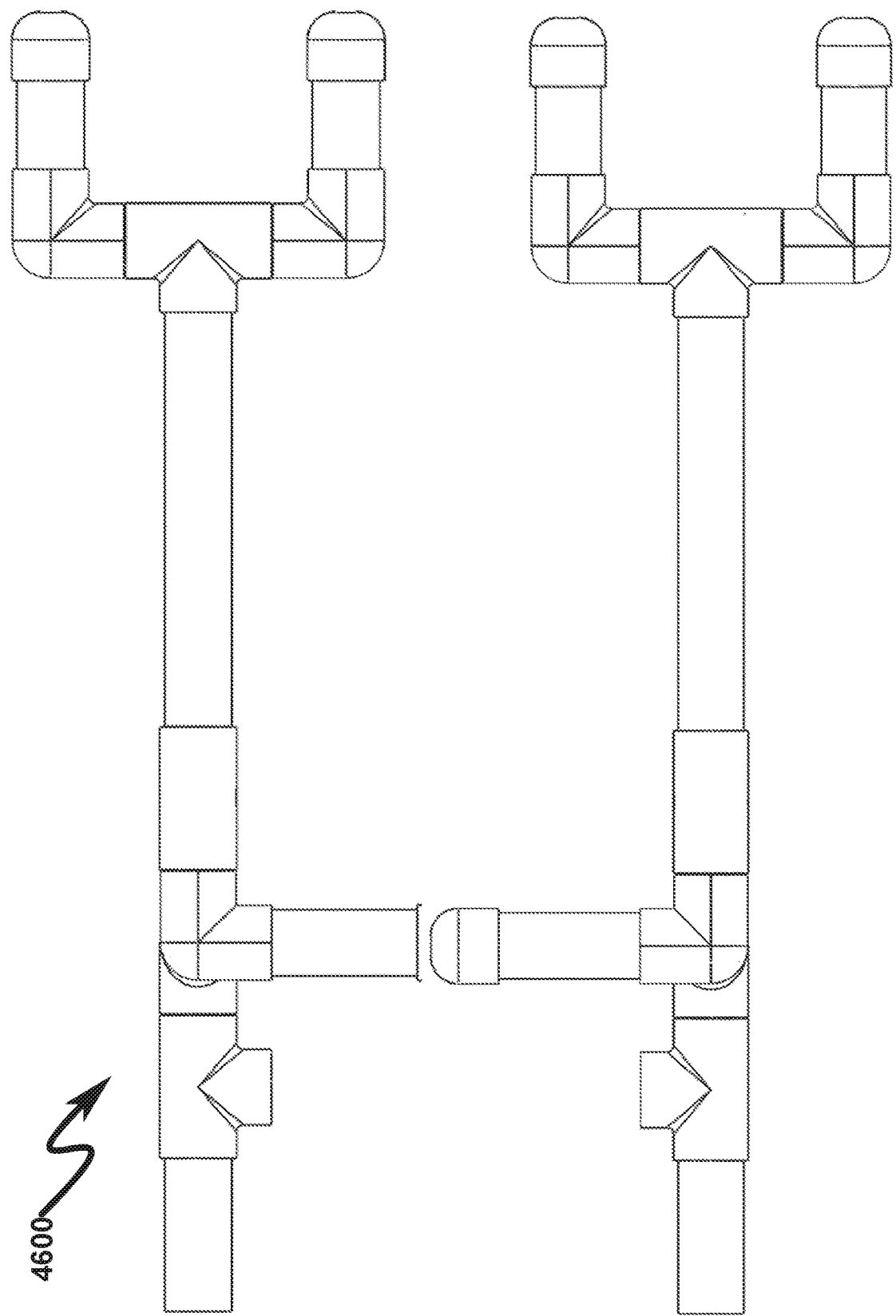
FIG. 46 illustrates front and rear views of a preferred exemplary invention reconfigurable hose rack (RHR) embodiment.
Figure 47:
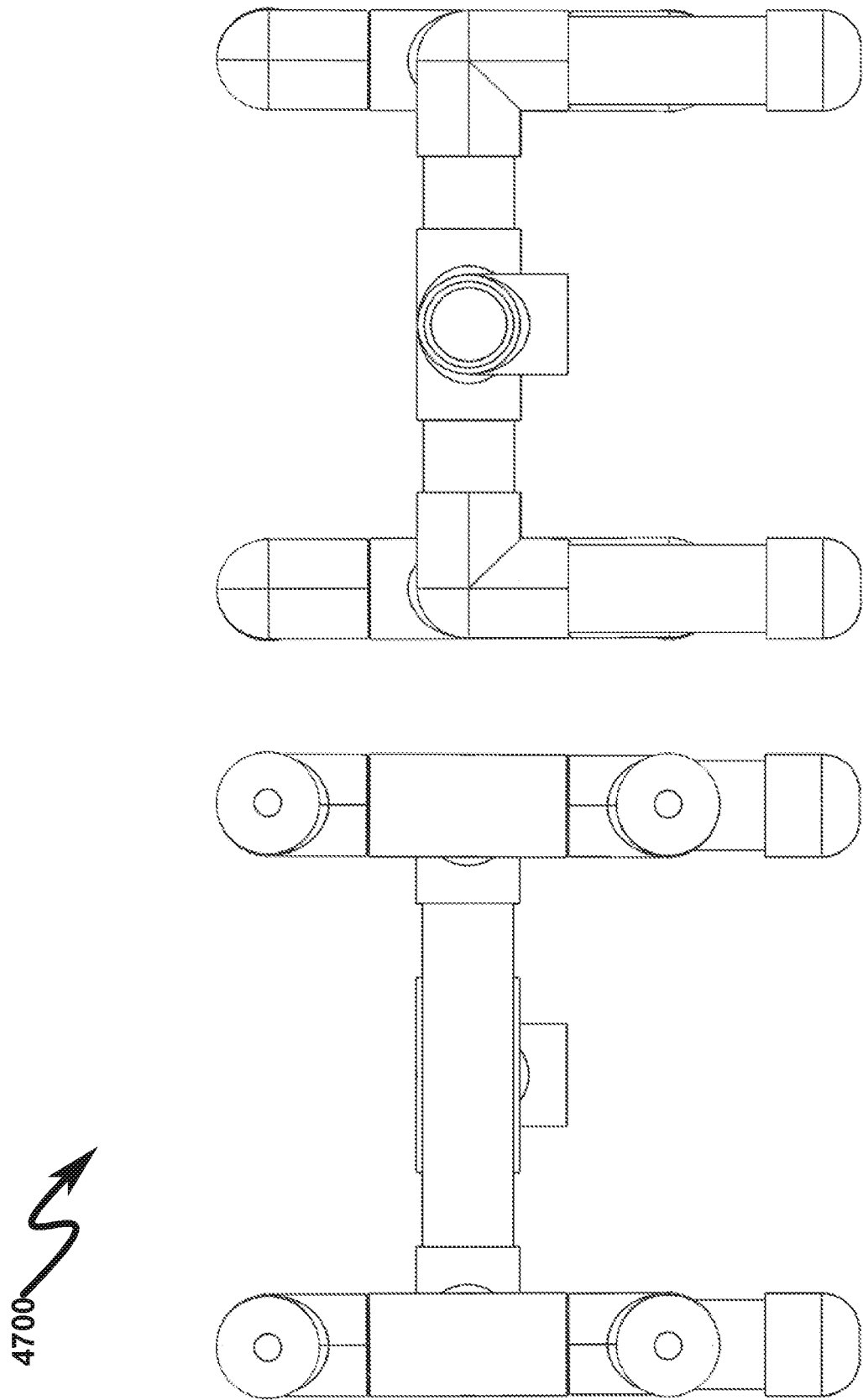
FIG. 47 illustrates top and bottom views of a preferred exemplary invention reconfigurable hose rack (RHR) embodiment.

As depicted in the various views in FIG. 41 (4100)-FIG. 44 (4400), the DTS/ETS/VSM members may be formed using a single type of extrusion that is cut to desired length. Since each extrusion section can be formed with the internal void, the assembly stack drills (ASD), and the transverse mounting voids (TMV), the extrusions are symmetric and can be mated together using standard machine fasteners. Note that as the extrusions are stacked on top of each other the internal members may utilize assembly drill locations that are not used by adjacent extrusion members. This permits a single fastener to be used for all members of the tubular stack construction. It should also be noted that in these examples nuts and bolts have been utilized to perform the fastening operations but in other preferred embodiments the extrusion material may be configured to accept self-tapping bolts/screws or the like.

The present invention anticipates that in some circumstances a custom fit will be required for installation of the system on a pickup truck. Since pickup truck beds vary widely in size and construction, the present invention has been specifically designed to allow a single extrusion element to be supplied to the end-user and then cut-to-fit in the field and assembled for the particular pickup truck installation. The use of PVC or other plastic extrusions for this application in conjunction with the ability to create arbitrary stacked tubular structures provides a degree of installation flexibility not present in the prior art but of considerable value to the end-user.

It should also be noted in the depicted drawings that the DTS tubular stack has been configured with three tubes and the ETS tubular stack has been configured with two tubes. As one of skill in the art will recognize, the present invention is capable of supporting an arbitrary plural number of DTS/ETS stack profiles with no loss of generality in the teachings of the invention. Additionally, it should be noted that the use of TMV permits other items to be mounted to the DTS/ETS structures to allow additional customization of the tool rack as desired by the end-user. These features are not present in any of current related art.

Figure 56:
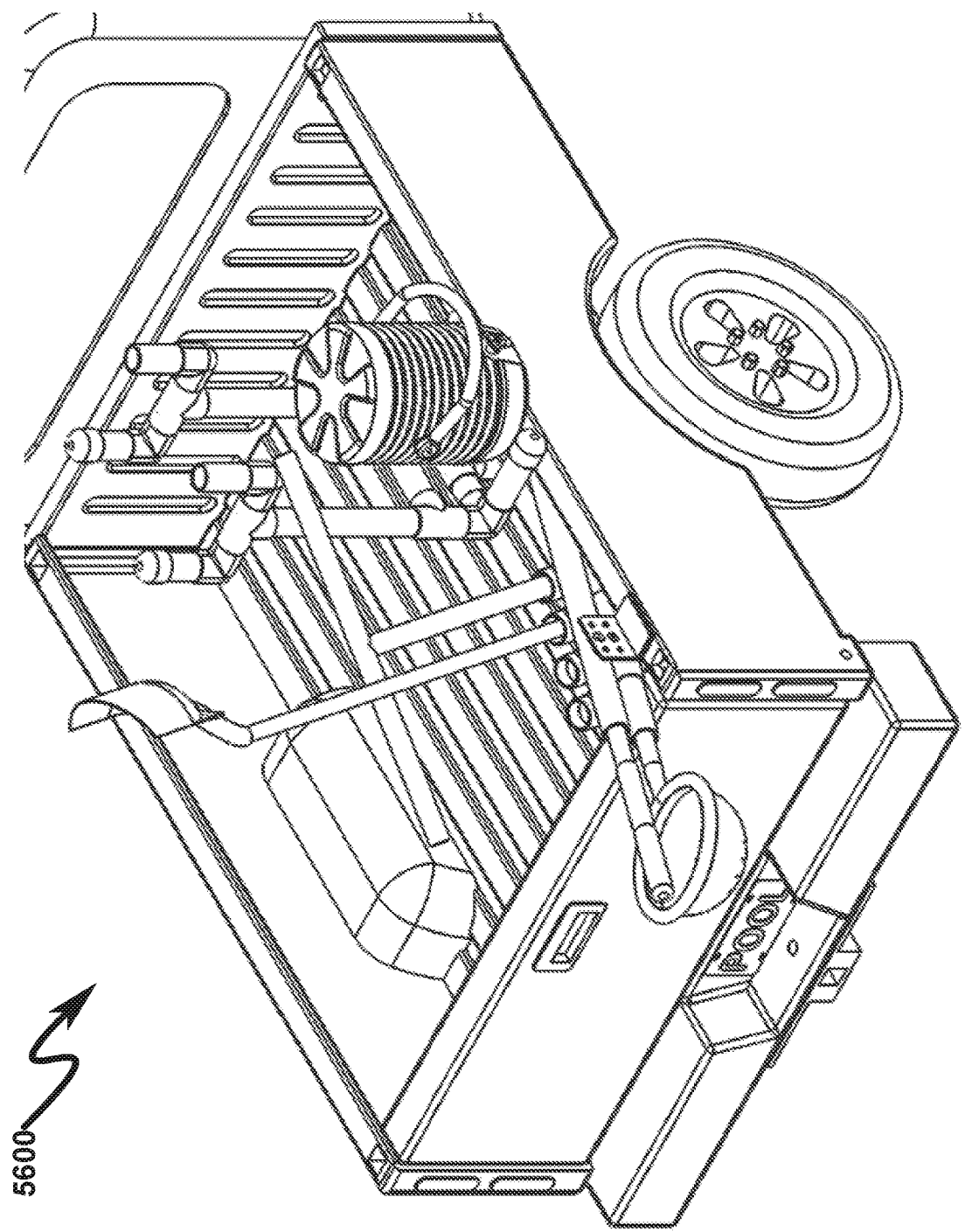
FIG. 56 illustrates a top right perspective view of an exemplary invention tubular prototype embodiment installed on a pickup truck.

Referencing FIG. 45 (4500)-FIG. 48 (4800), it can be seen that the RHR may be arranged in a variety of configurations that are consistent with storage of hose material and/or the temporary transportation of pipe stock. Additionally, the RHR may be configured to retain a water cooler as generally depicted in FIG. 56 (5600).

Tubular Prototype Embodiment (4900)-(6400)

Figure 49:
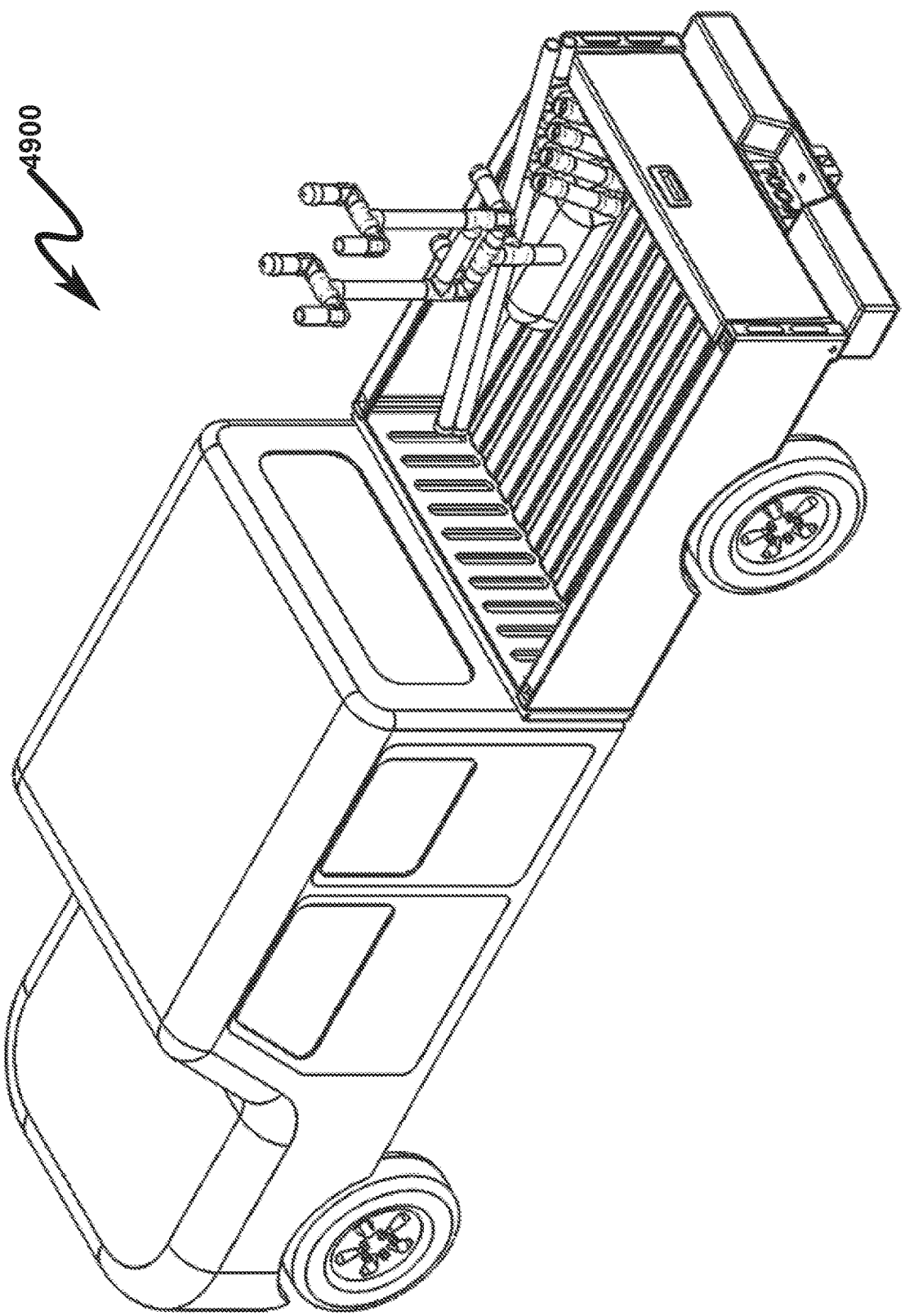
FIG. 49 illustrates a left front operational top perspective view of an exemplary invention tubular prototype embodiment installed on a pickup truck.
Figure 57:
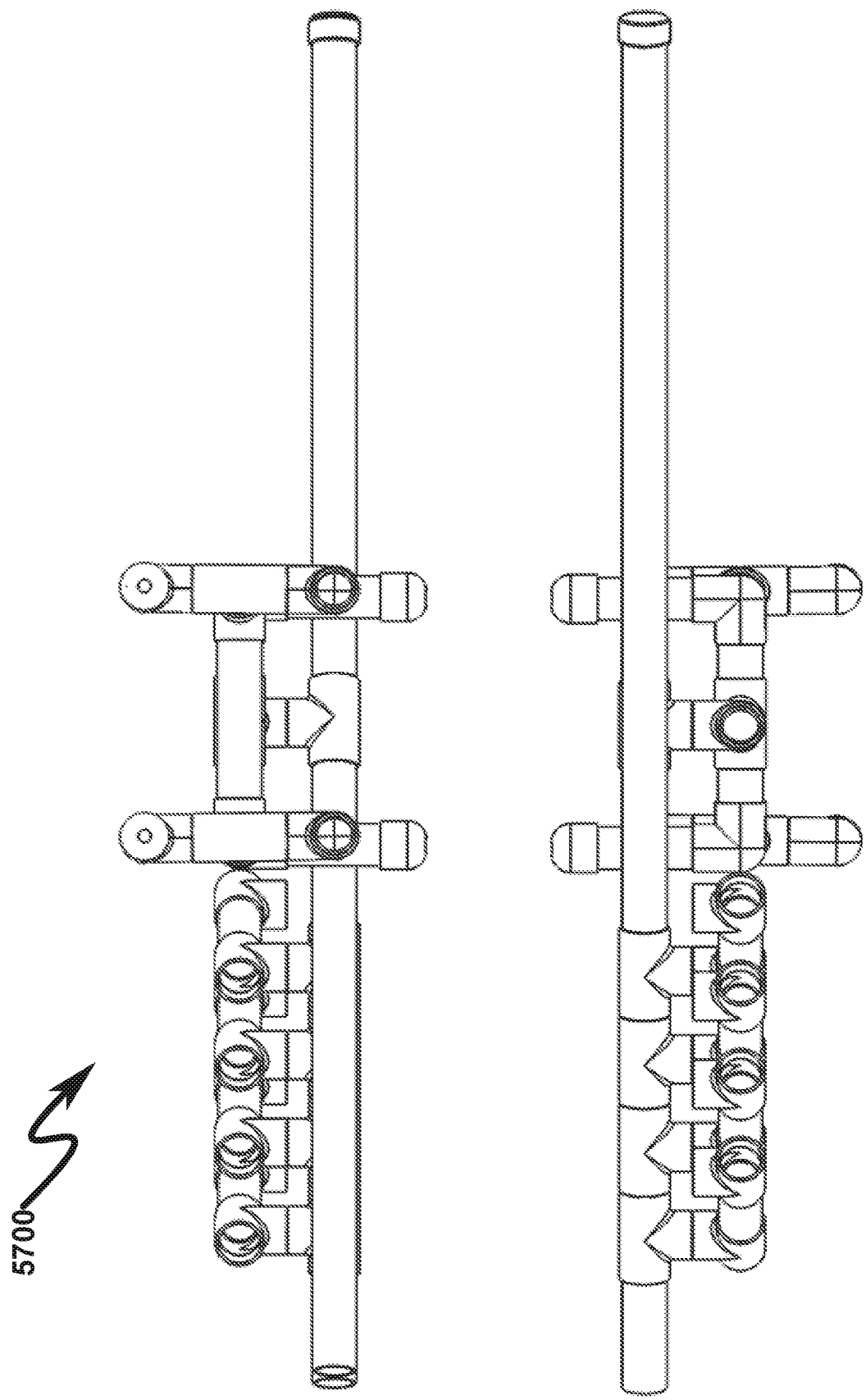
FIG. 57 illustrates top and bottom views of an exemplary invention tubular prototype embodiment.
Figure 58:
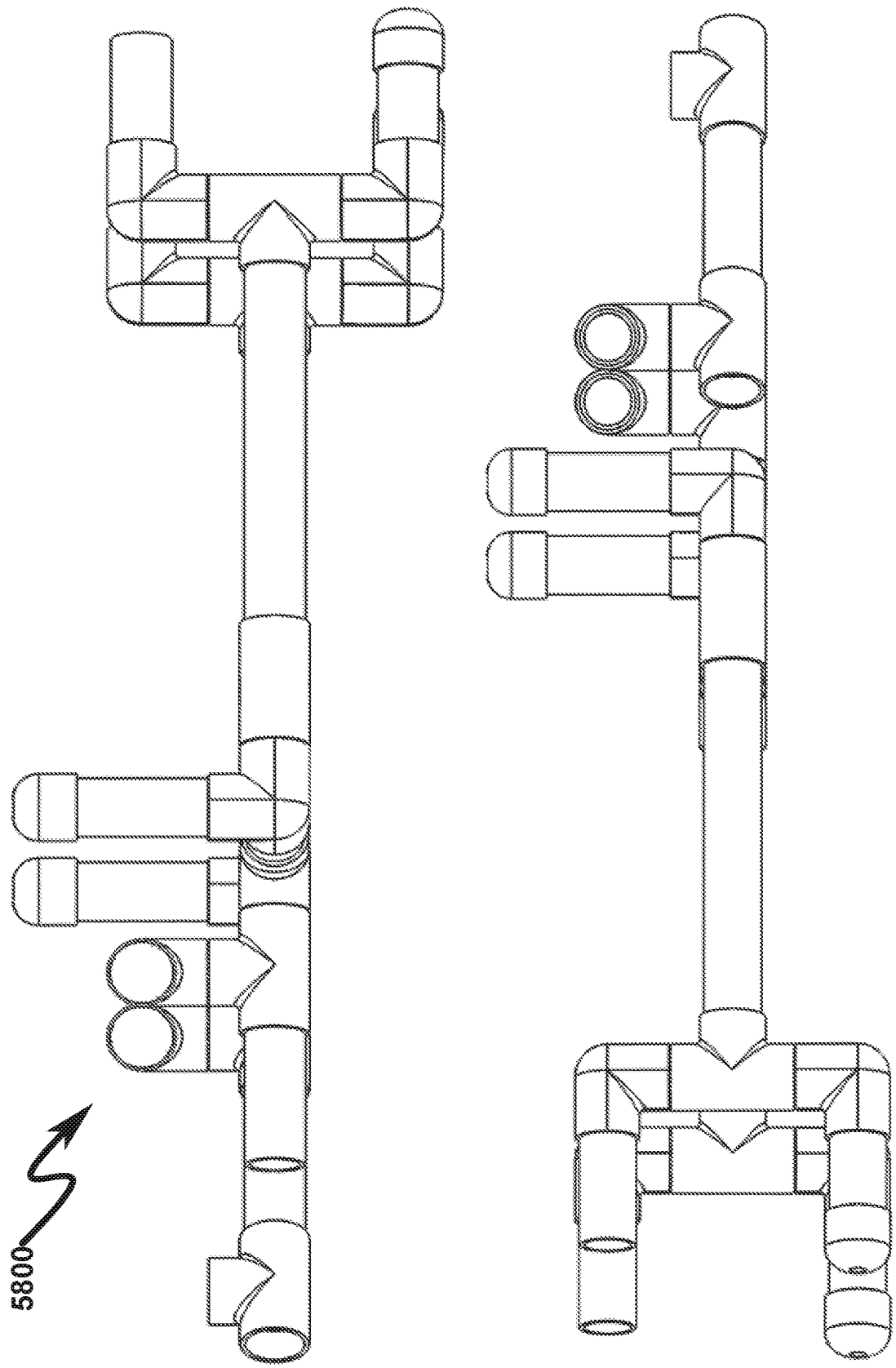
FIG. 58 illustrates front and rear views of an exemplary invention tubular prototype embodiment.
Figure 59:
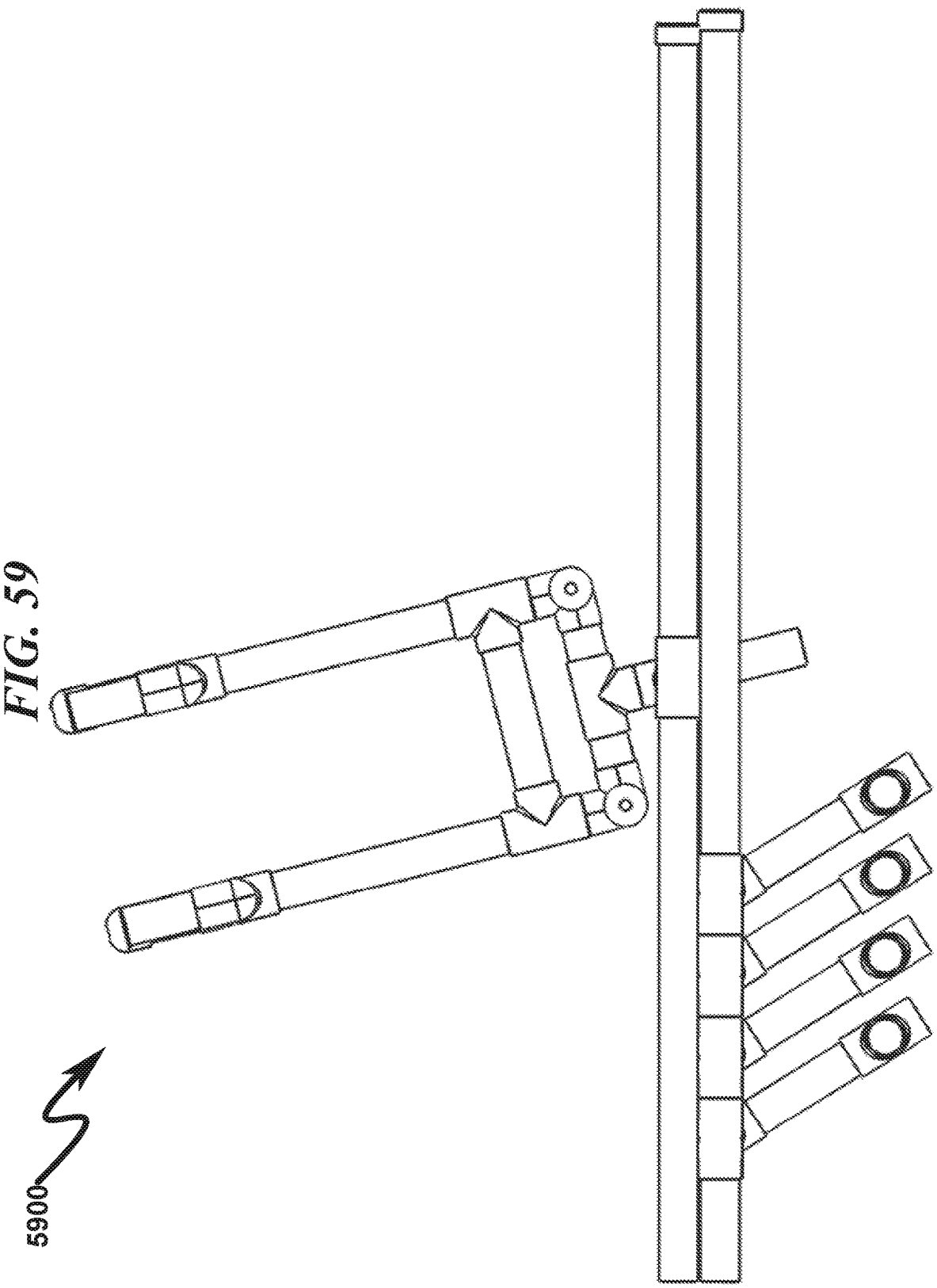
FIG. 59 illustrates a right side view of an exemplary invention tubular prototype embodiment.
Figure 60:
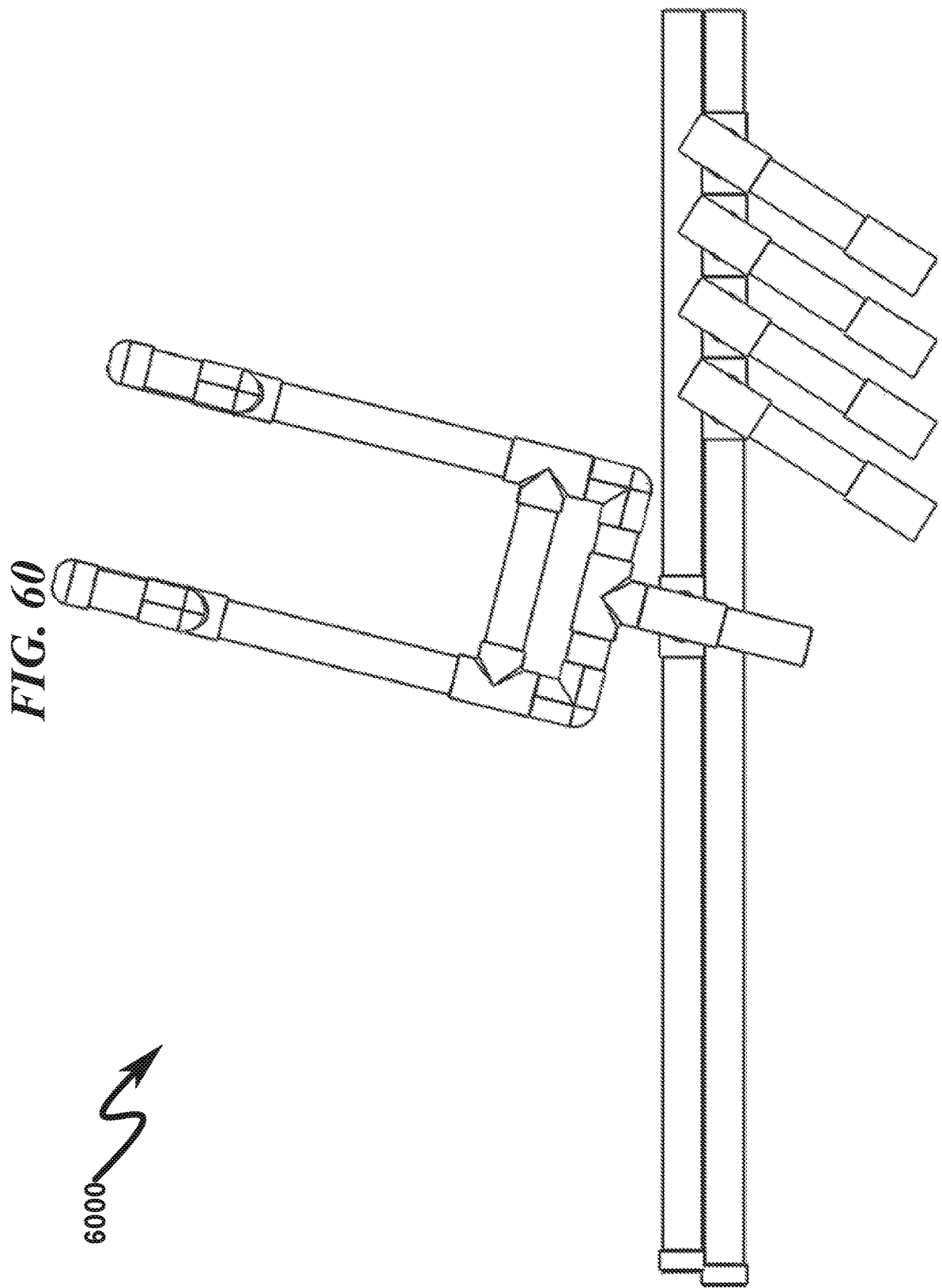
FIG. 60 illustrates a left side view of an exemplary invention tubular prototype embodiment.
Figure 61:
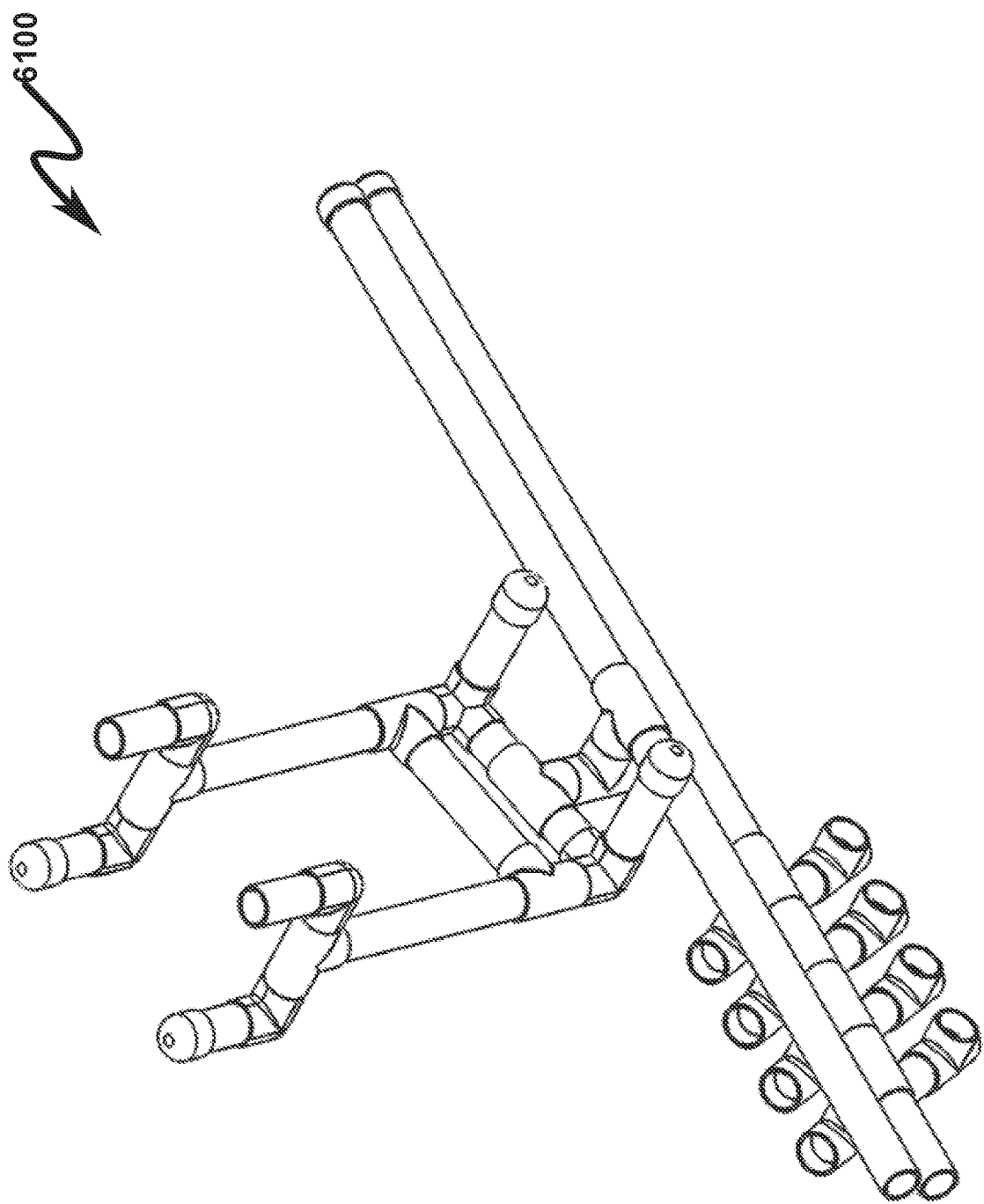
FIG. 61 illustrates a top right front perspective view of an exemplary invention tubular prototype embodiment.
Figure 62:
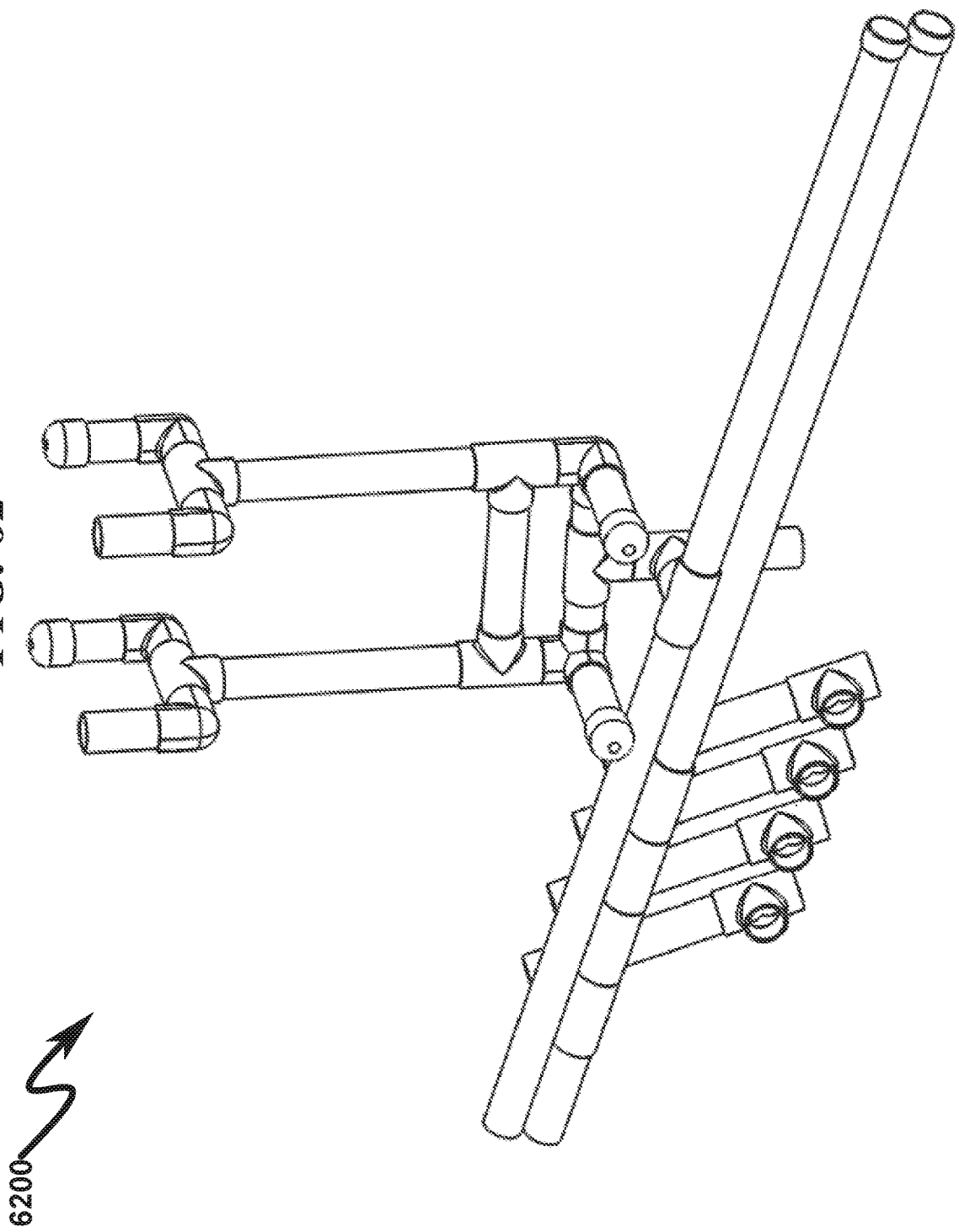
FIG. 62 illustrates a top right rear perspective view of an exemplary invention tubular prototype embodiment.
Figure 64:
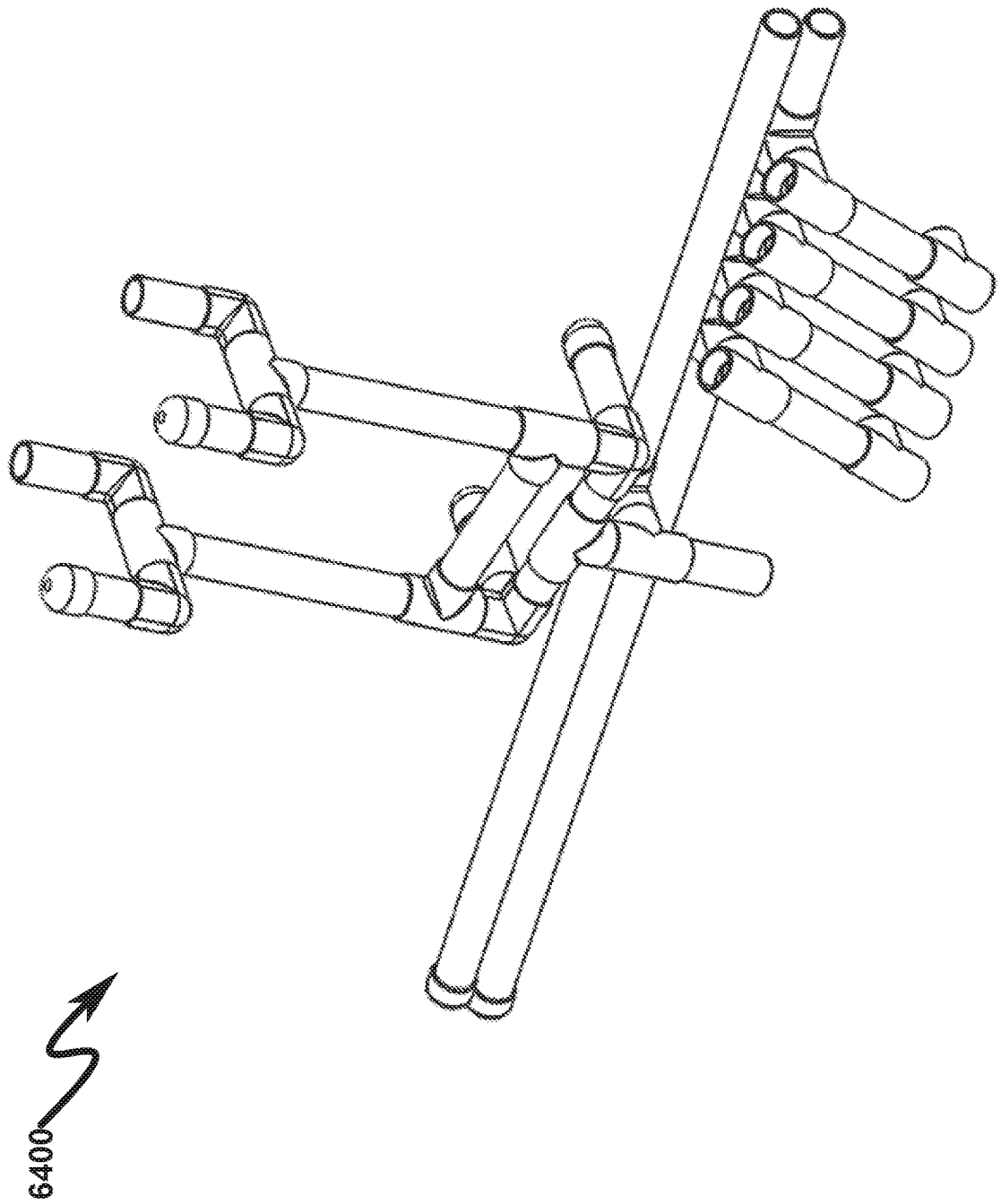
FIG. 64 illustrates a top left front perspective view of an exemplary invention tubular prototype embodiment.

The concepts taught by the present invention may take a variety of forms based on application context. As depicted in FIG. 49 (4900)-FIG. 64 (6400), the present invention has also been implemented in prototype form using tubular PVC pipe as illustrated in these drawings. In this exemplary prototype, 2-inch schedule-40 PVC pipe and pipe fittings have been used to construct a mockup of one preferred exemplary invention embodiment. FIG. 49 (4900)-FIG. 56 (5600) illustrates this experimental embodiment installed on a pickup truck. FIG. 57 (5700)-FIG. 64 (6400) illustrates this experimental embodiment in isolated views.

Figure 50:
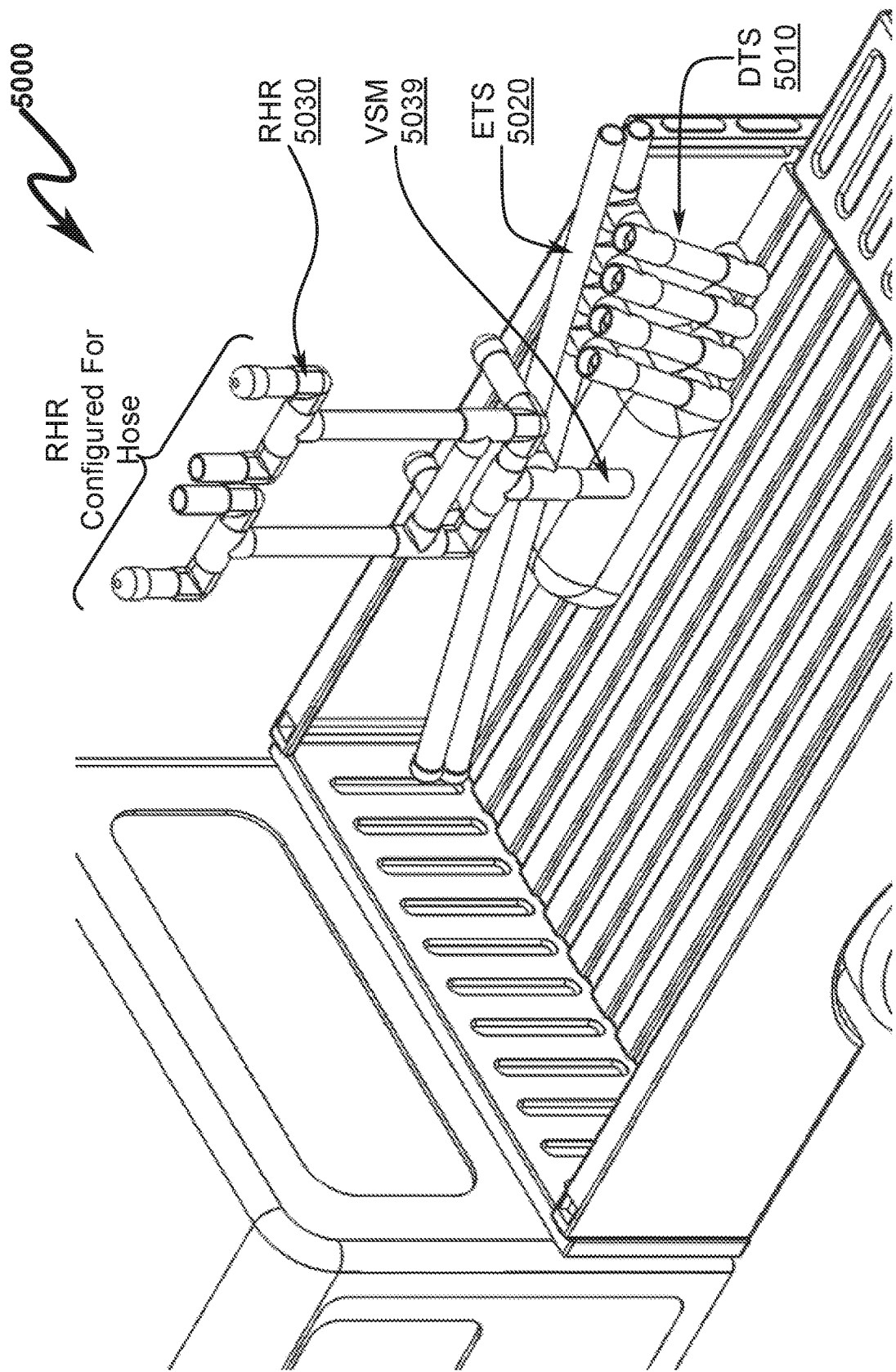
FIG. 50 illustrates a left front operational top perspective view of an exemplary invention tubular prototype embodiment installed on a pickup truck.
Figure 51:
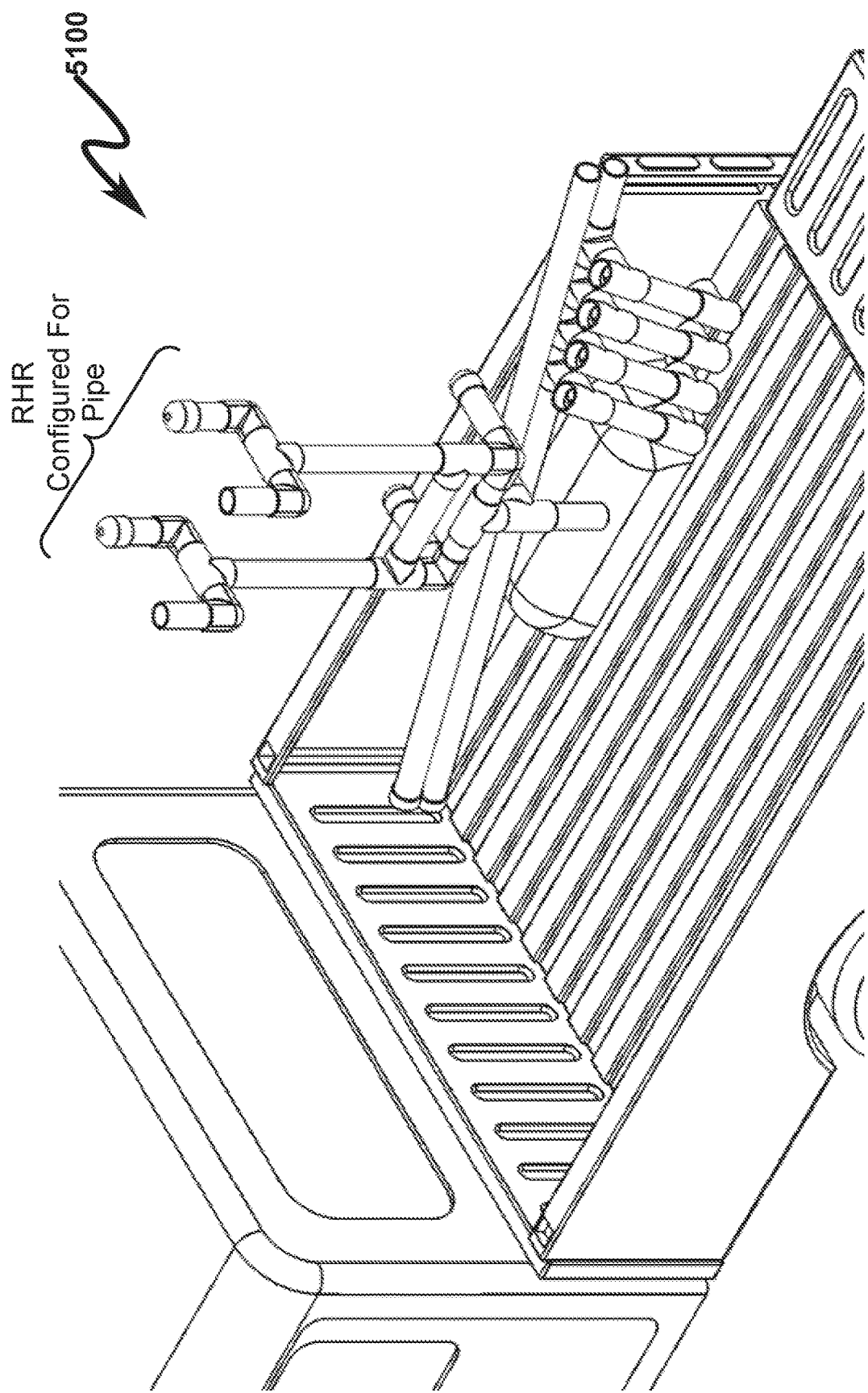
FIG. 51 illustrates a left front operational top perspective view of an exemplary invention tubular prototype embodiment installed on a pickup truck.
Figure 52:
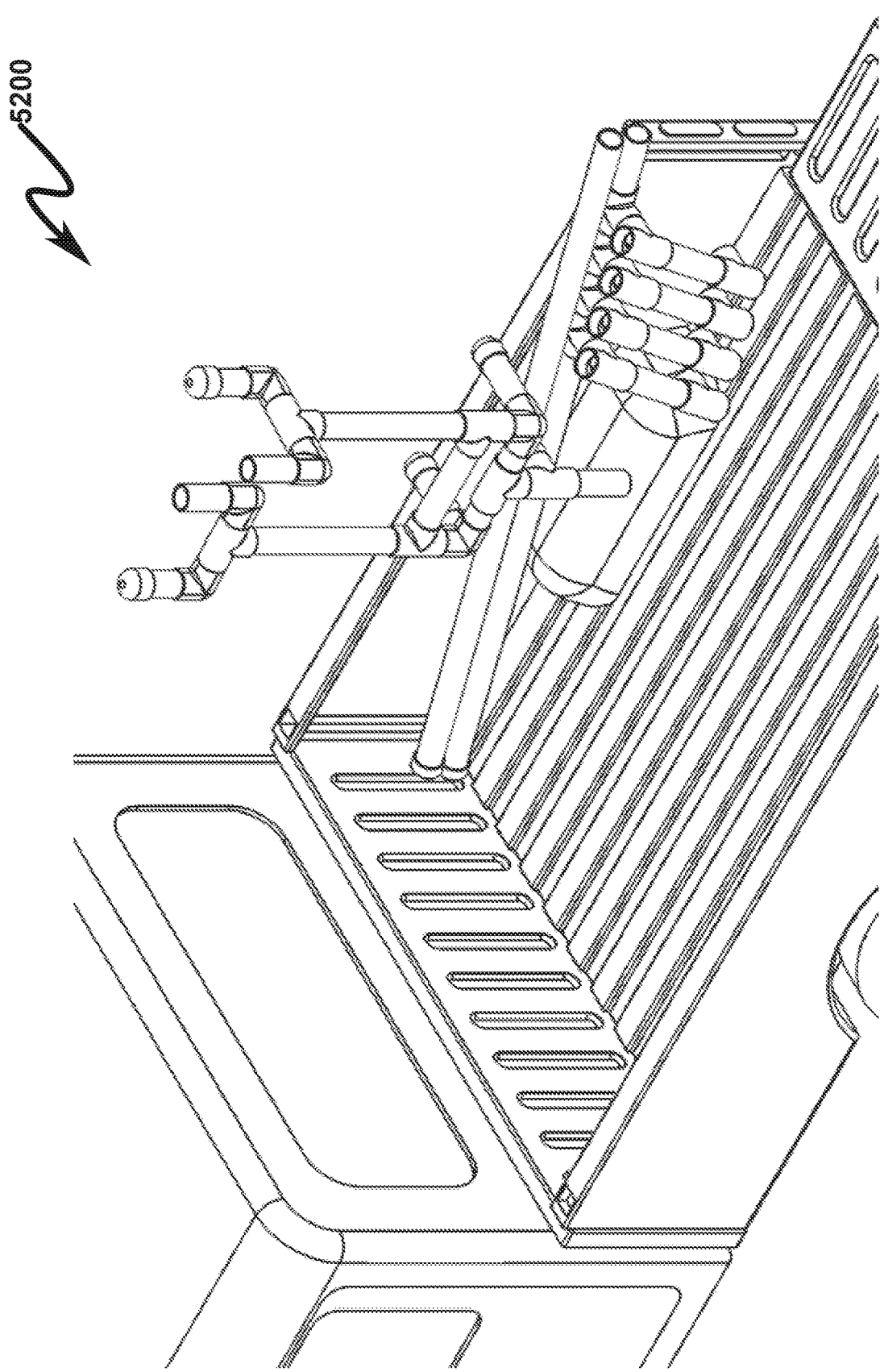
FIG. 52 illustrates a left front operational top perspective view of an exemplary invention tubular prototype embodiment installed on a pickup truck.
Figure 53:
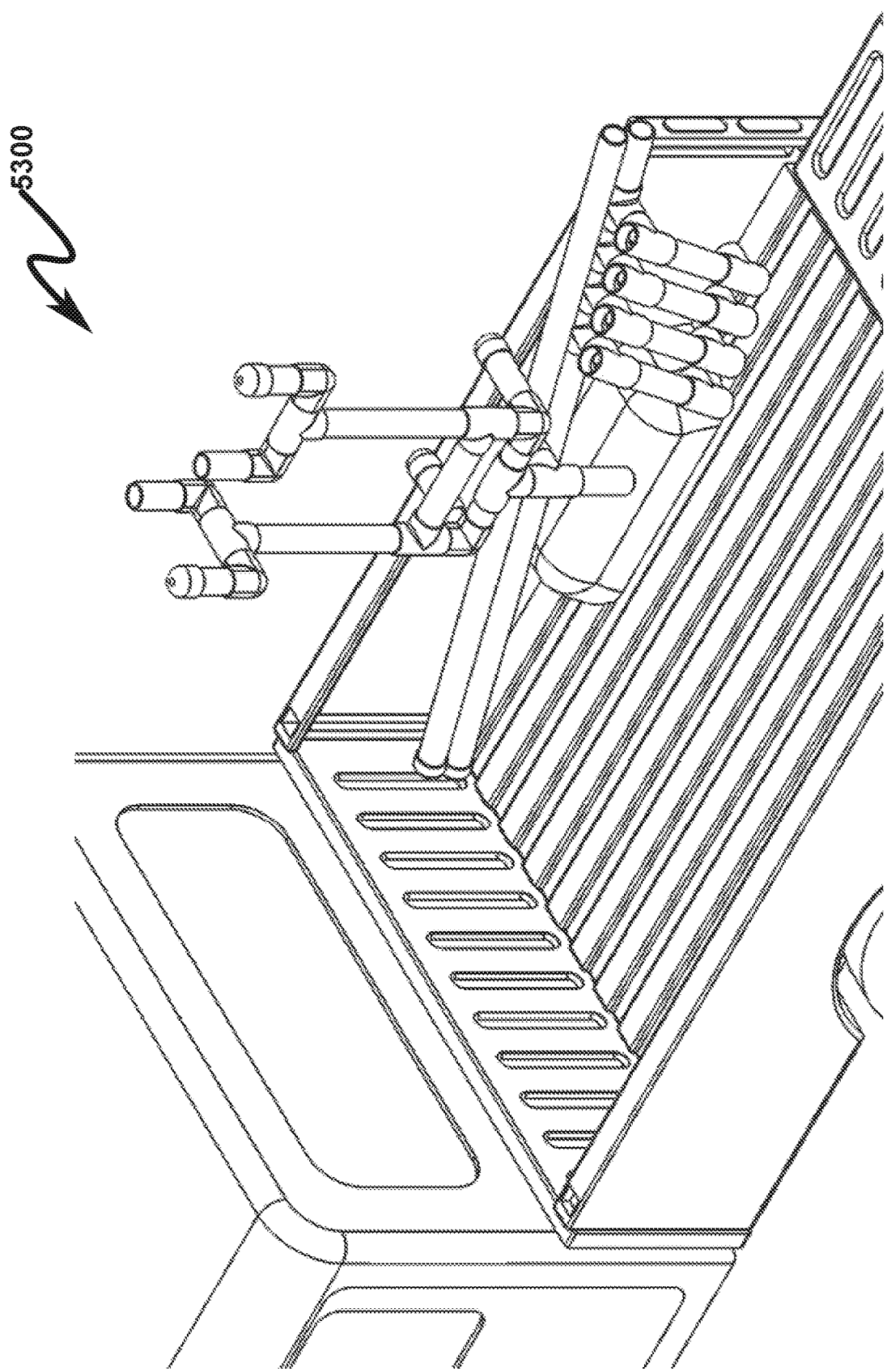
FIG. 53 illustrates a left front view of an exemplary invention tubular prototype embodiment installed on a pickup truck.
Figure 54:
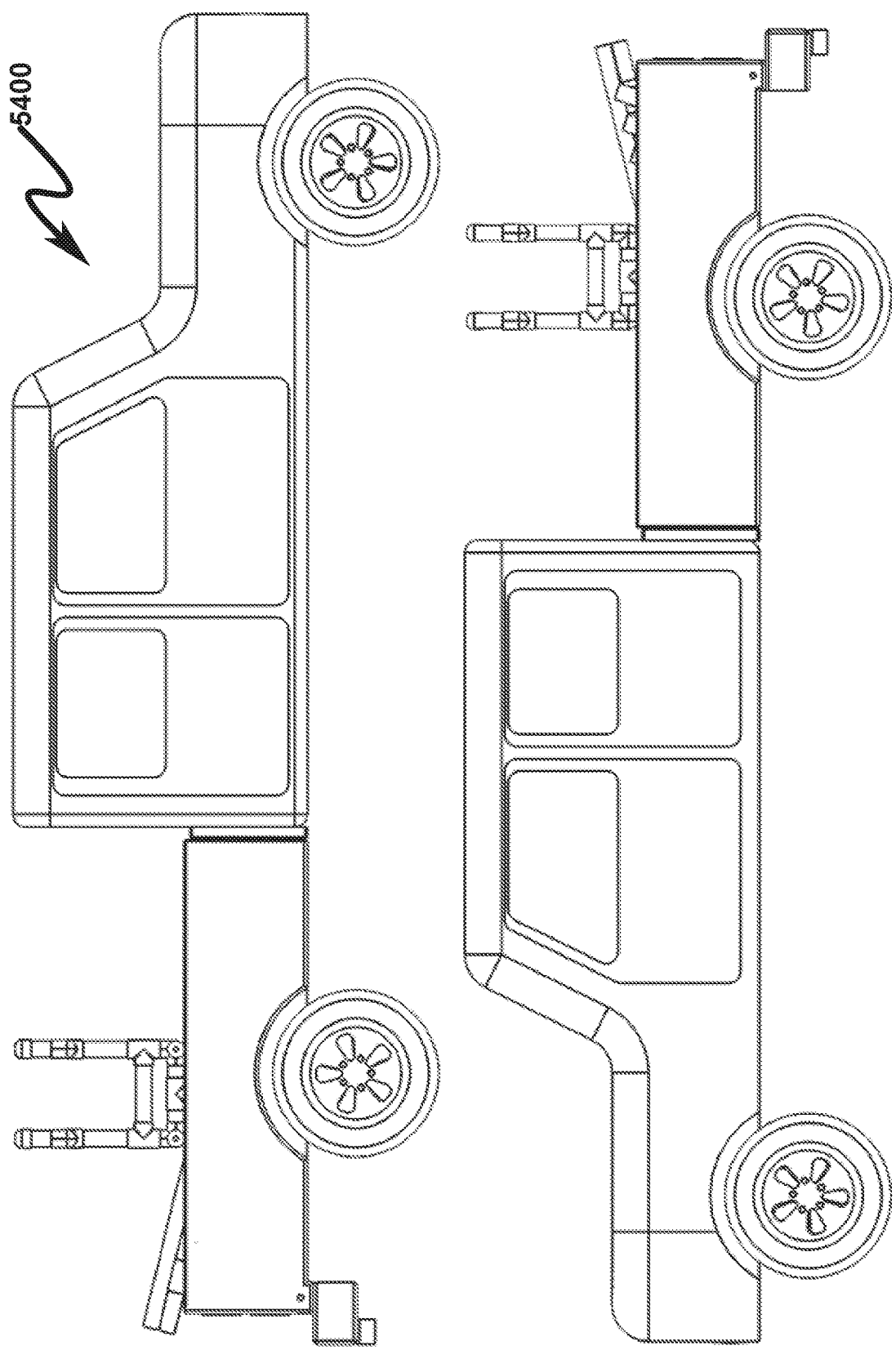
FIG. 54 illustrates right and left side views of an exemplary invention tubular prototype embodiment installed on a pickup truck.
Figure 55:
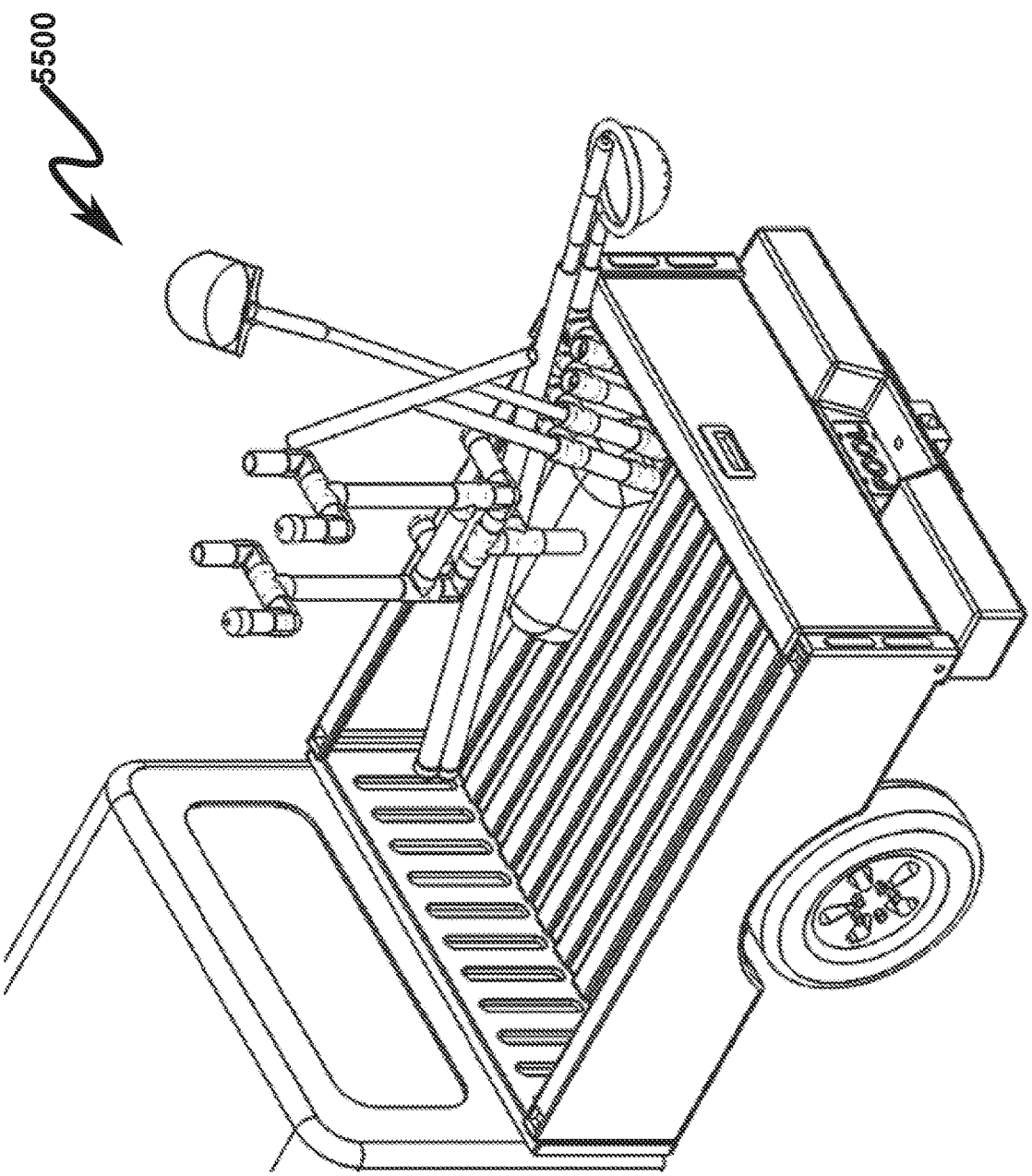
FIG. 55 illustrates a top left perspective view of an exemplary invention tubular prototype embodiment installed on a pickup truck.

FIG. 50 (5000)-FIG. 51 (5100) depict various positions that the reconfigurable hose rack (RHR) may take to accommodate hose or like materials as well as long pipe stock such as PVC pipe. As depicted in FIG. 49 (4900)-FIG. 51 (5100), the system comprising the diagonal tube stack (DTS) (5010), elongated tube stack (ETS) (5020), reconfigurable hose rack (RHR) (5030) is self-supporting within the pickup truck bed (via use in part of the vertical support member (VSM) (5039) positioned on the pickup truck wheel-well) and as such when the pickup truck tailgate is deployed in the horizontal position, tools stored in the tool rack remain properly positioned within the pickup truck bed.

Figure 63:
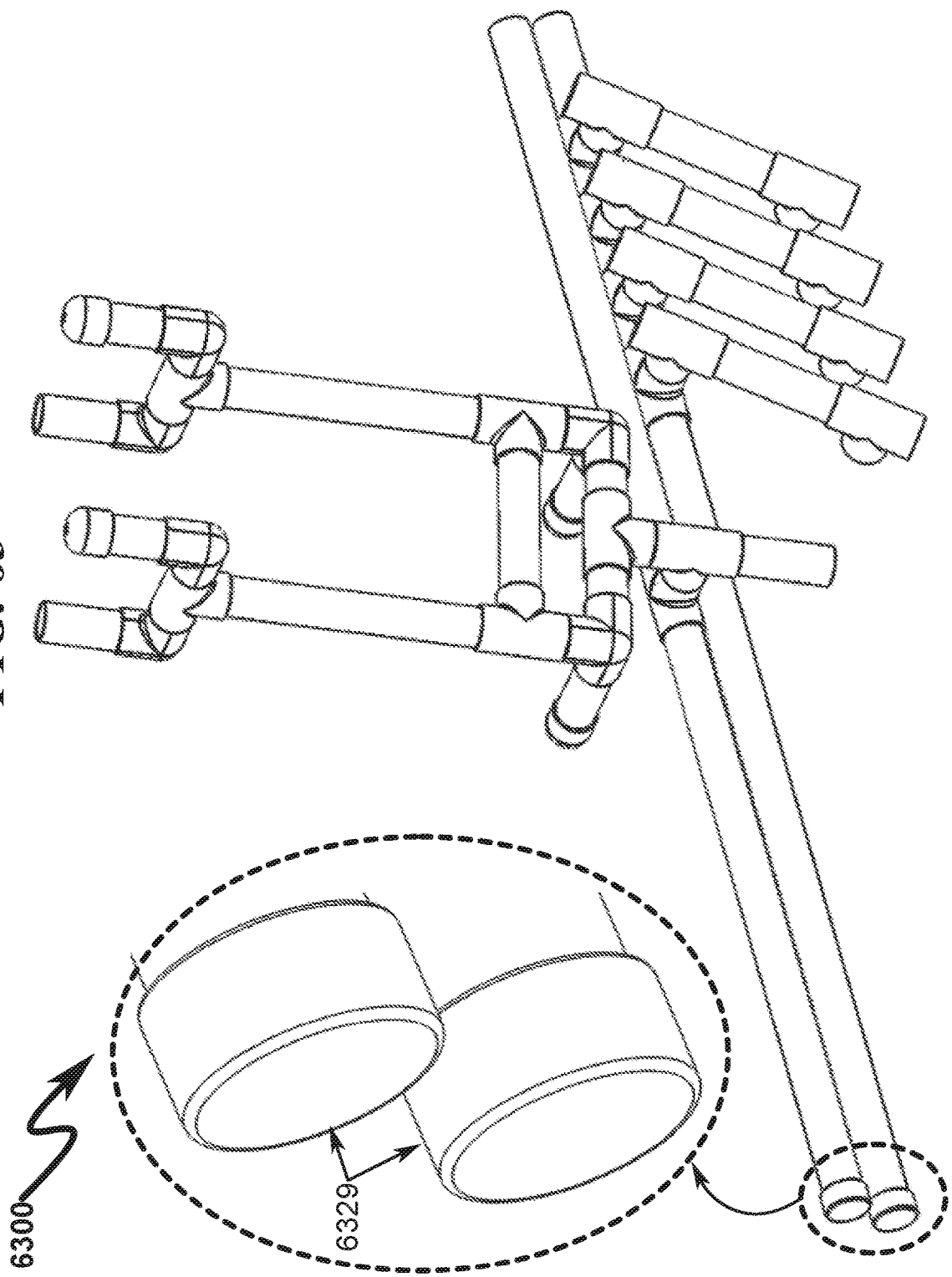
FIG. 63 illustrates a top left rear perspective view of an exemplary invention tubular prototype embodiment.

As depicted in the inset detail of FIG. 63 (6300), the ETS may incorporate rubberized end-caps (6329) that protect tool ends that fully extend within the ETS cavity. These end-caps (6329) also protect the pickup truck bed from marring and scratches caused by tool insertion.

Universal Bracket Assembly (UBA) (6500)-(7200)

Figure 65:
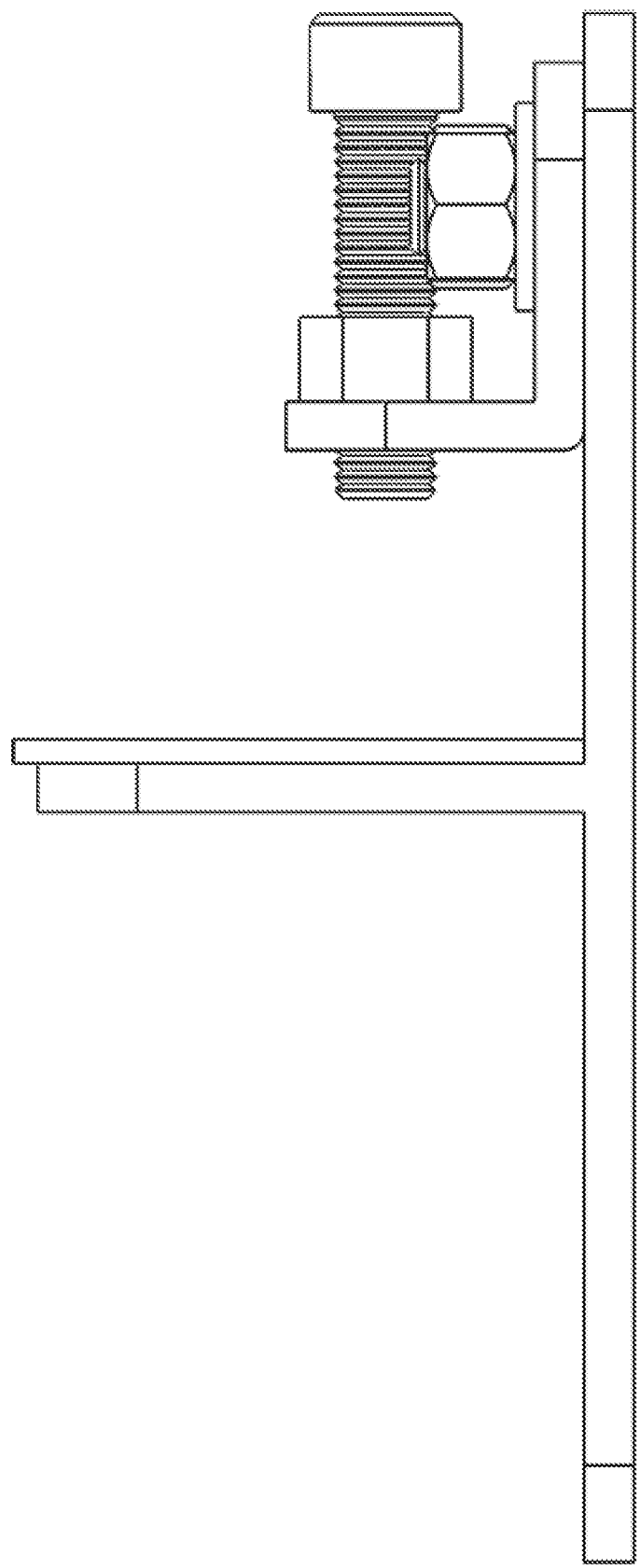
FIG. 65 illustrates a front view of a universal non-penetrating mounting bracket useful in some preferred invention embodiments.
Figure 66:
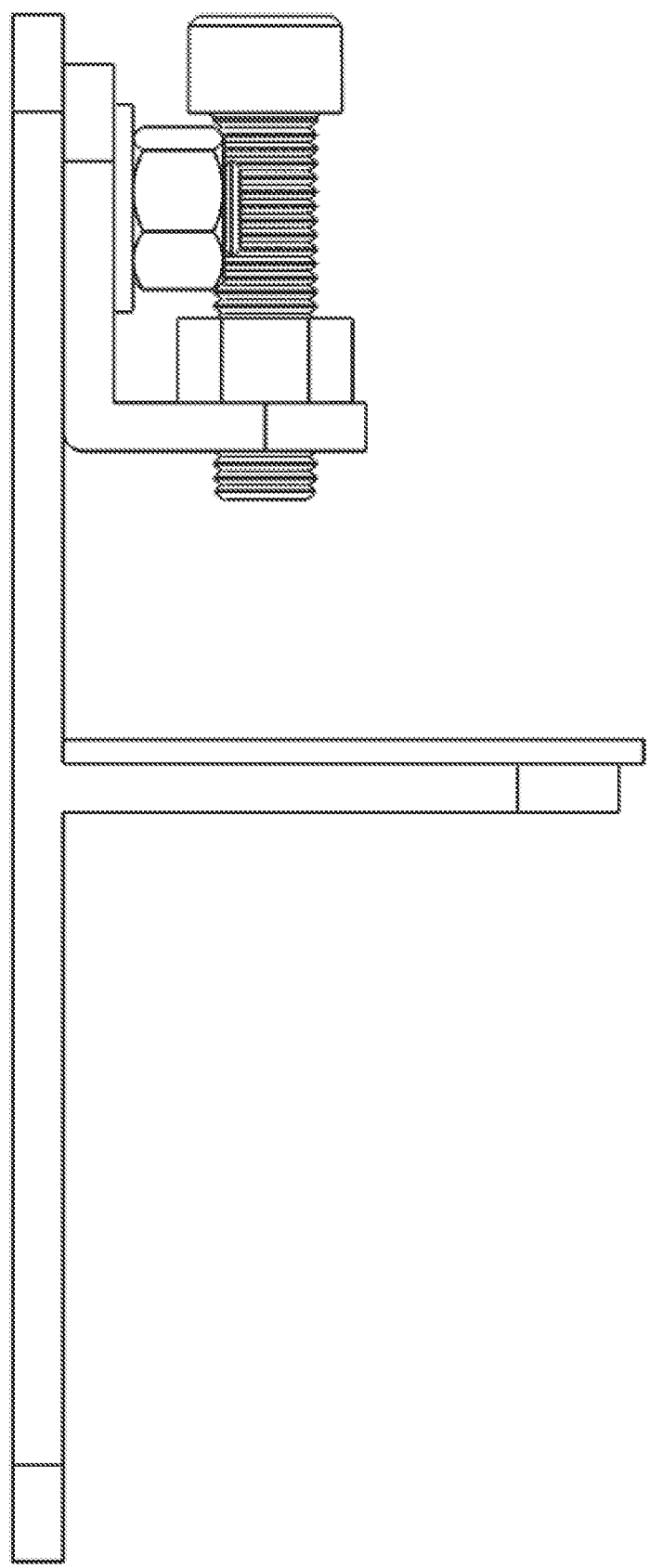
FIG. 66 illustrates a back view of a universal non-penetrating mounting bracket useful in some preferred invention embodiments.
Figure 67:
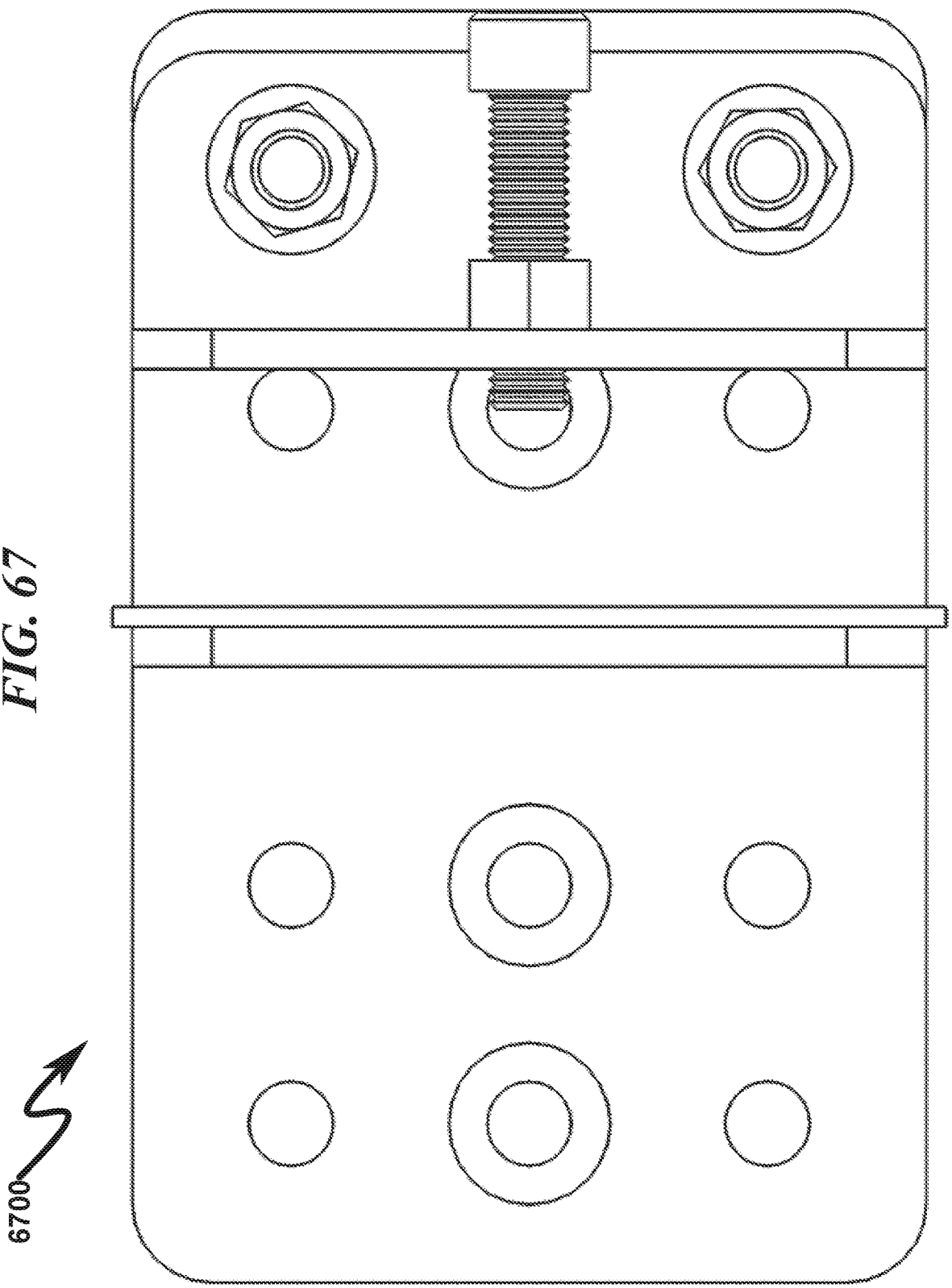
FIG. 67 illustrates a right side view of a universal non-penetrating mounting bracket useful in some preferred invention embodiments.
Figure 68:
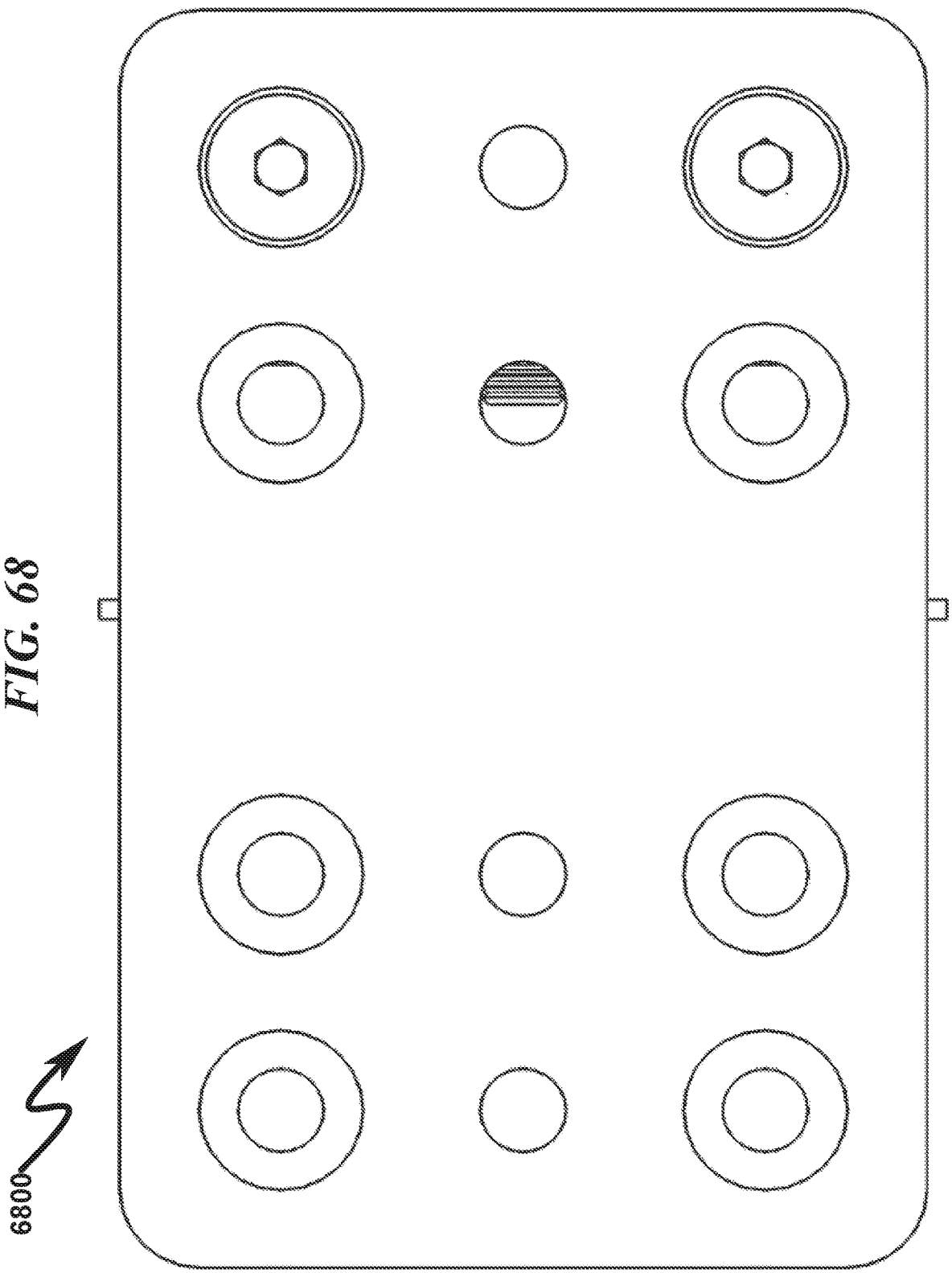
FIG. 68 illustrates a left side view of a universal non-penetrating mounting bracket useful in some preferred invention embodiments.
Figure 69:
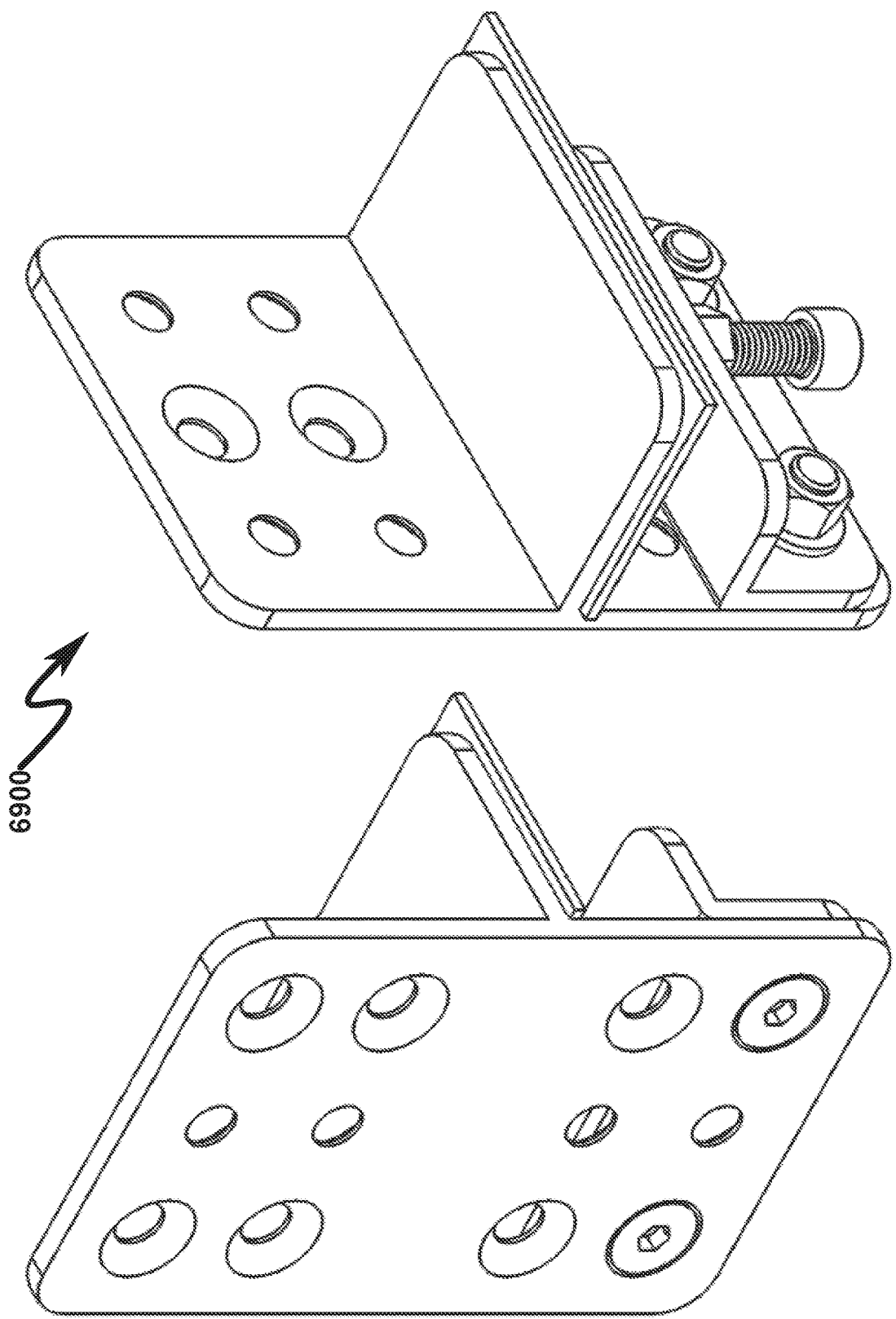
FIG. 69 illustrates top left and right front perspective views of a universal non-penetrating mounting bracket useful in some preferred invention embodiments.
Figure 71:
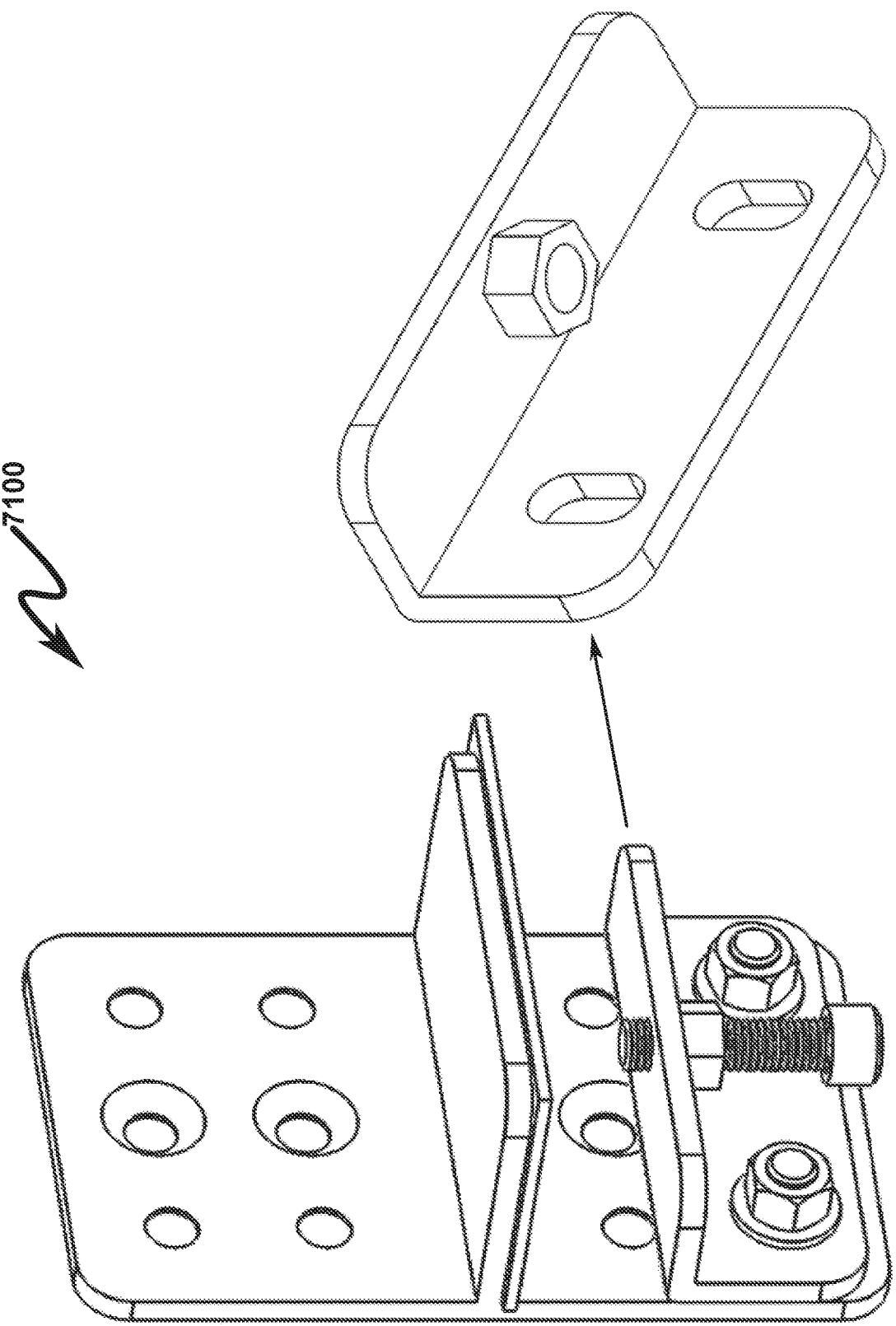
FIG. 71 illustrates top right front perspective detail views of a universal non-penetrating mounting bracket useful in some preferred invention embodiments.

The present invention anticipates that a universal bracket assembly (UBA) as generally depicted in FIG. 65 (6500)-

Figure 72:
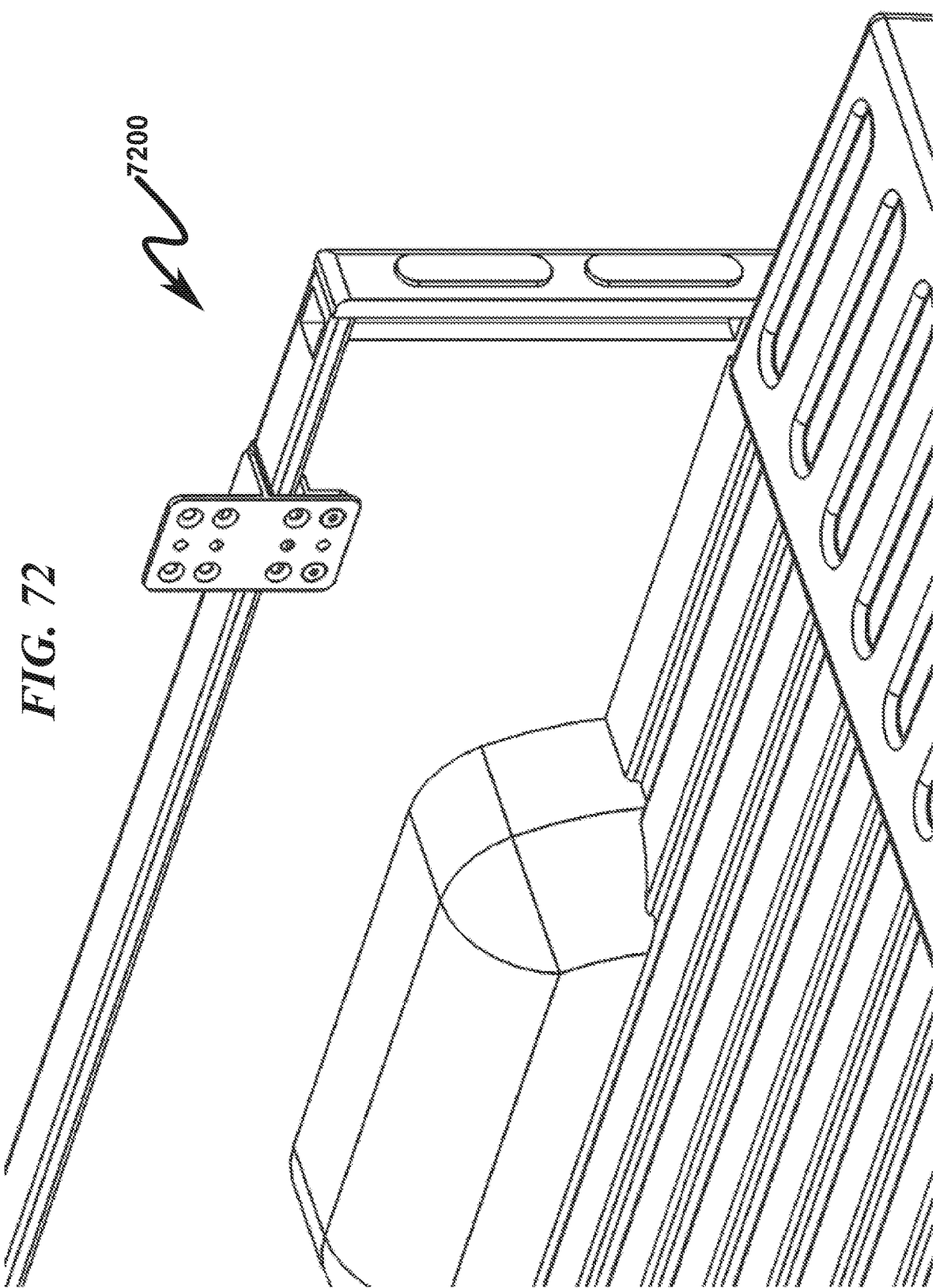
FIG. 72 illustrates a top left perspective view of a universal non-penetrating mounting bracket useful in some preferred invention embodiments attached to a pickup truck bed sidewall.

FIG. 72 (7200) may be used to affix the system to the upper lip of the pickup truck bed. In this manner, the tool rack system is supported when the tailgate is deployed as depicted in FIG. 72 (7200). Exemplary positioning of the UBA on the pickup truck bed is also depicted in FIG. 56 (5600).

Figure 1:
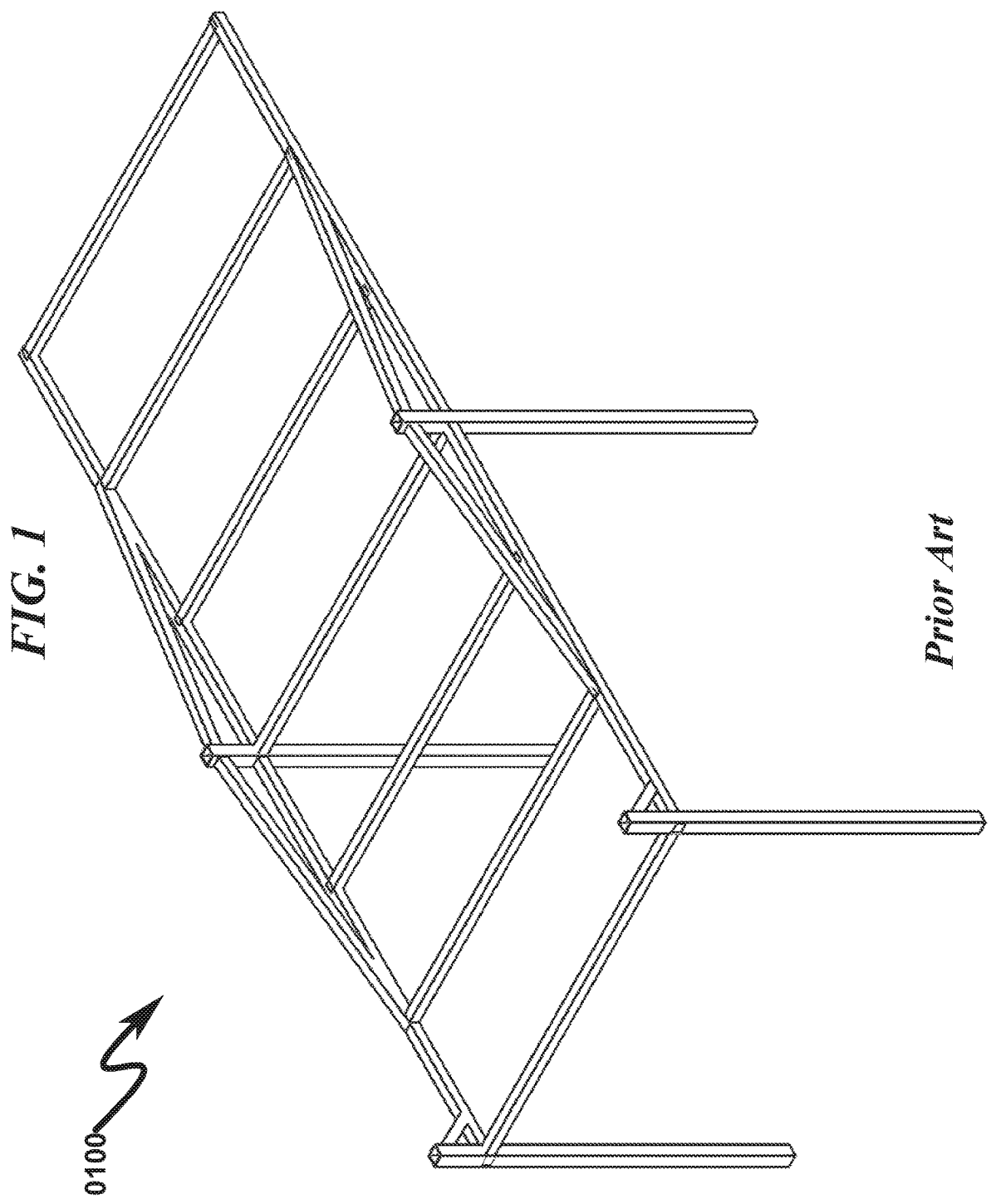
FIG. 1 illustrates a right front operational top perspective view of a prior art overhead pickup truck storage rack.
Figure 2:
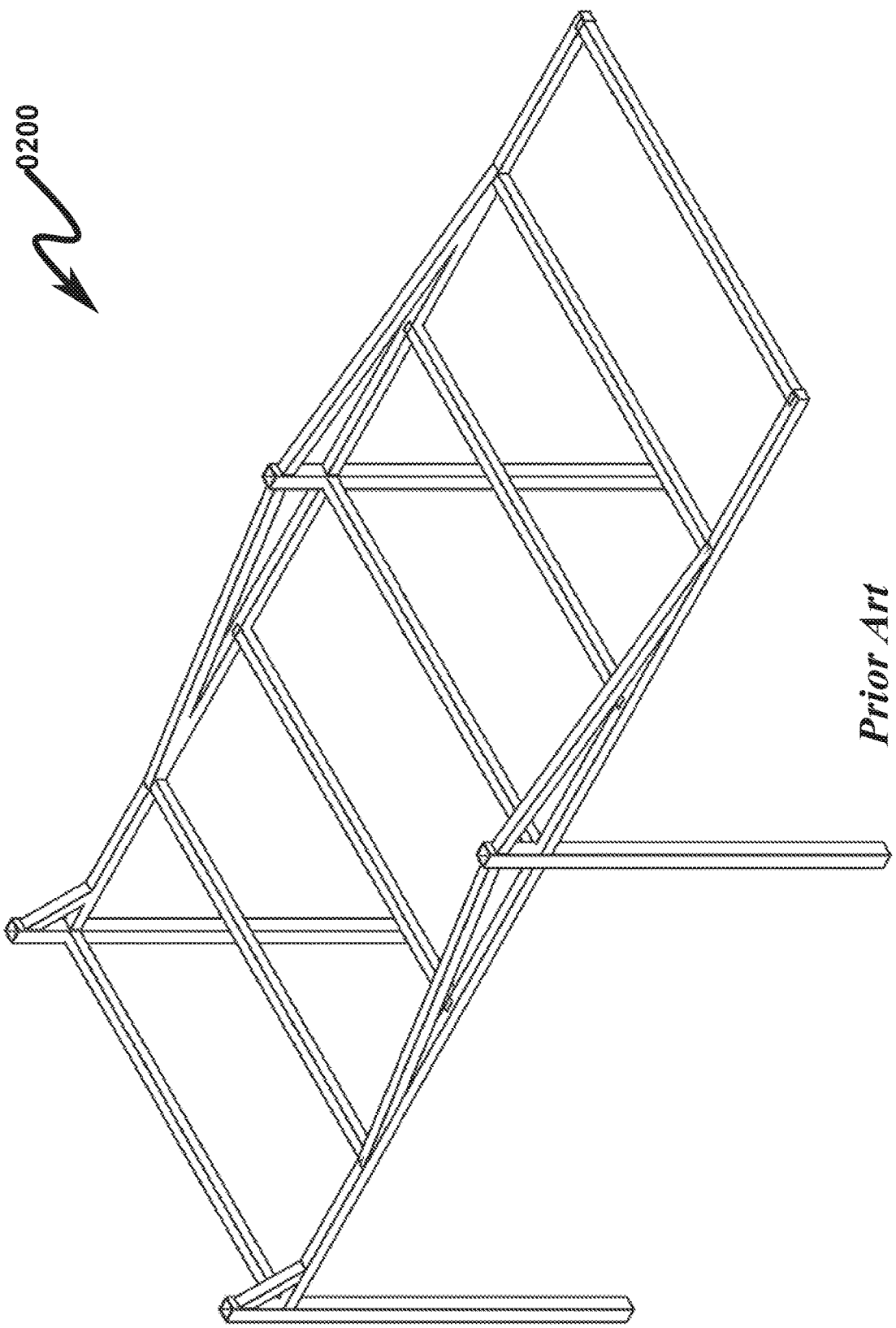
FIG. 2 illustrates a right rear operational top perspective view of a prior art overhead pickup truck storage rack.
Figure 3:
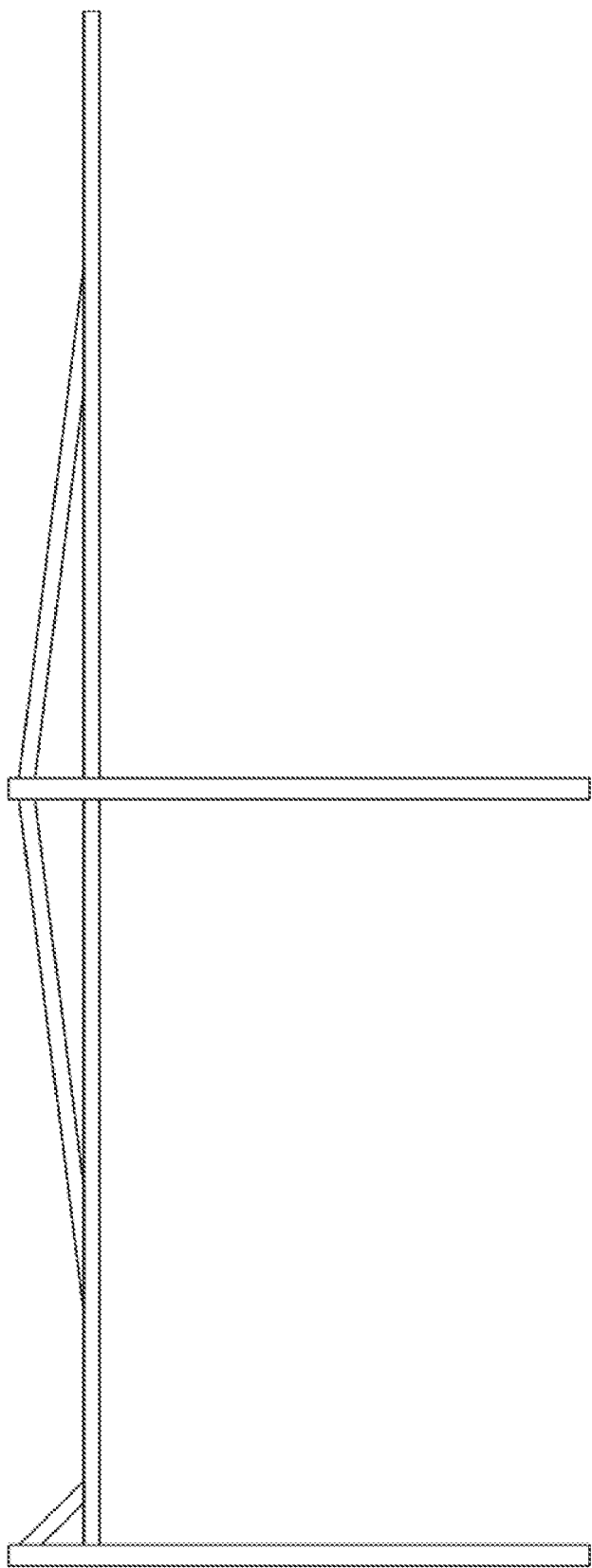
FIG. 3 illustrates a side view of a prior art overhead pickup truck storage rack.
Figure 4:
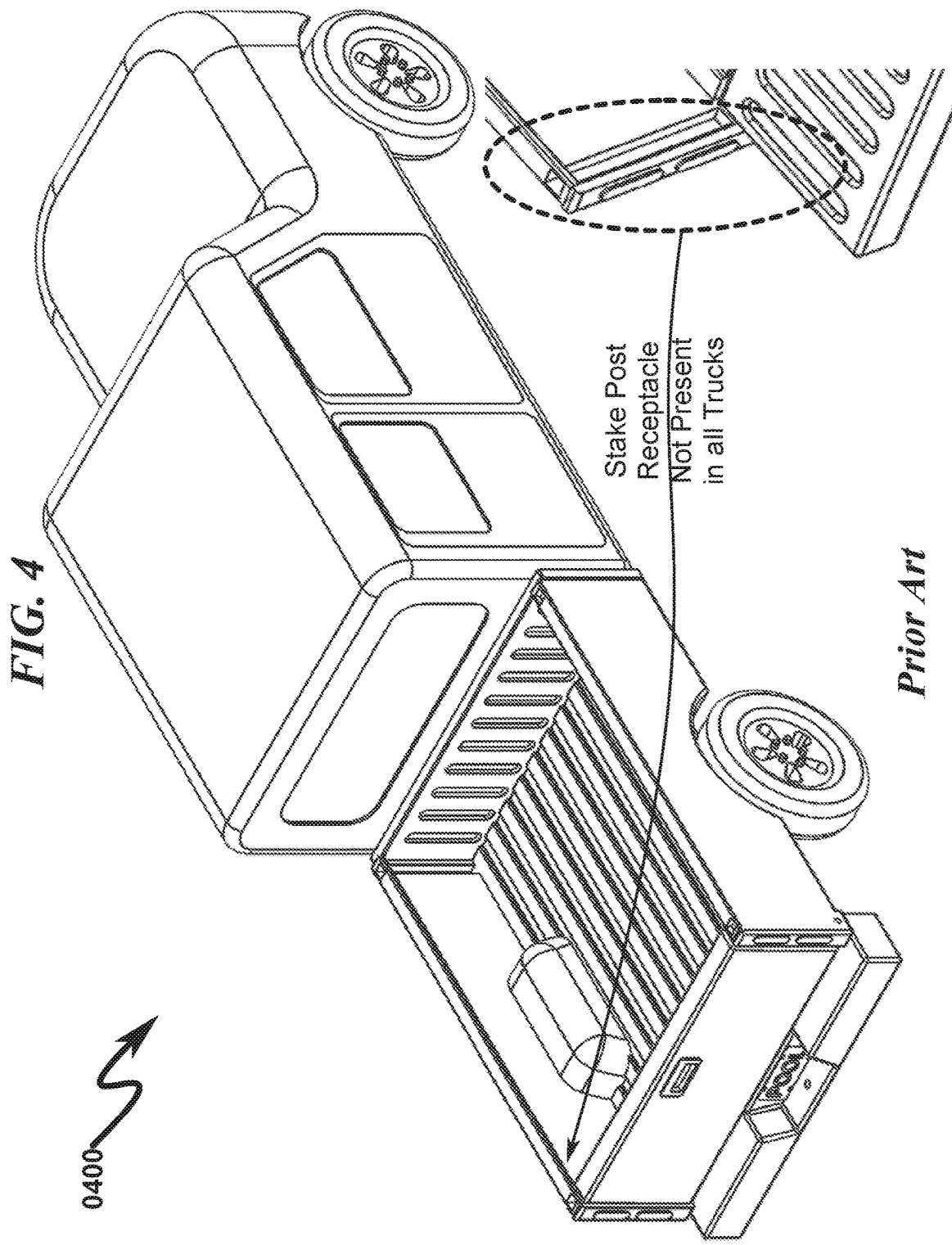
FIG. 4 illustrates a right front operational top perspective view of a prior art pickup truck.
Figure 5:
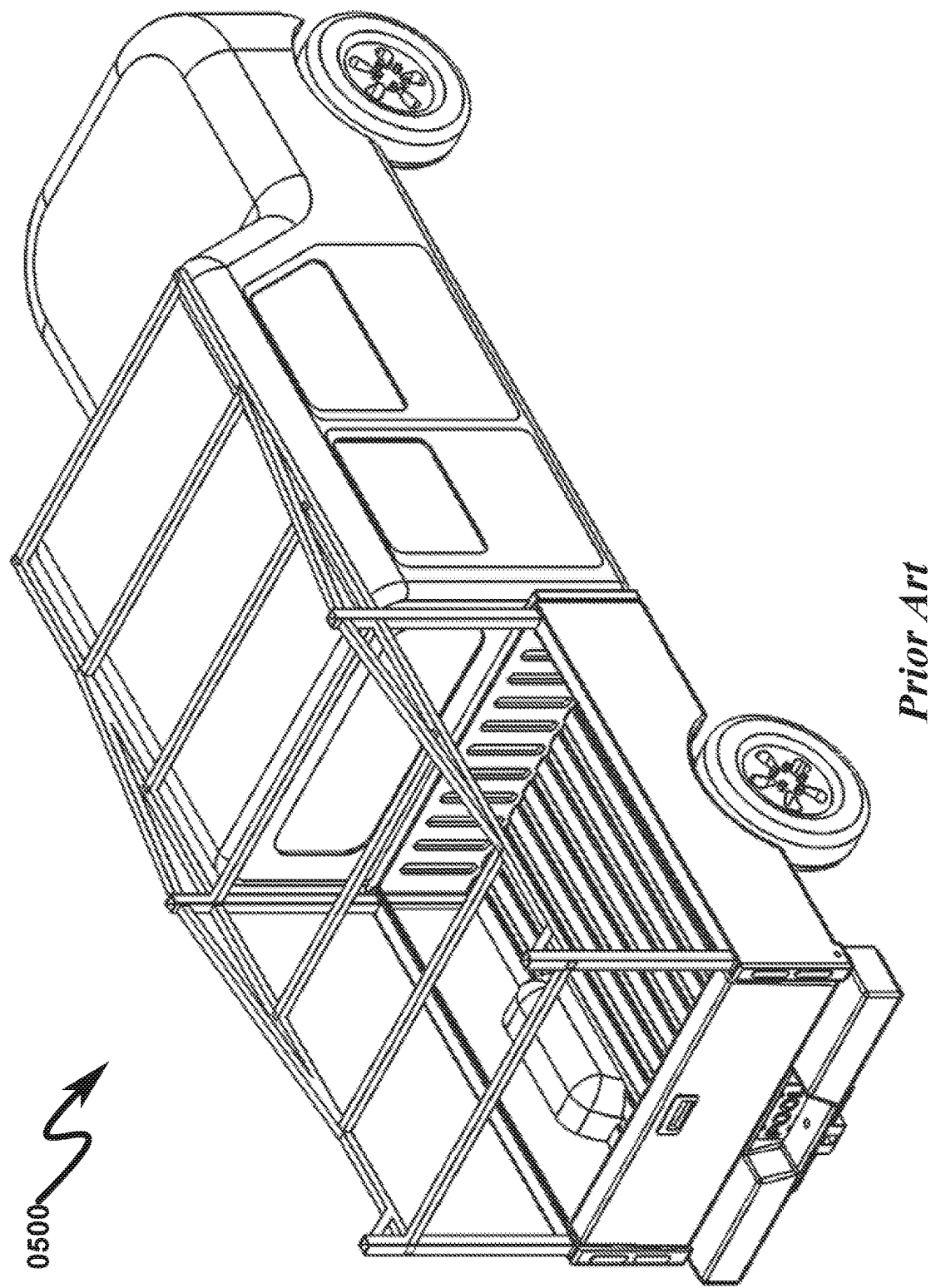
FIG. 5 illustrates a right front operational top perspective view of a prior art pickup truck fitted with a conventional overhead storage rack.
Figure 6:
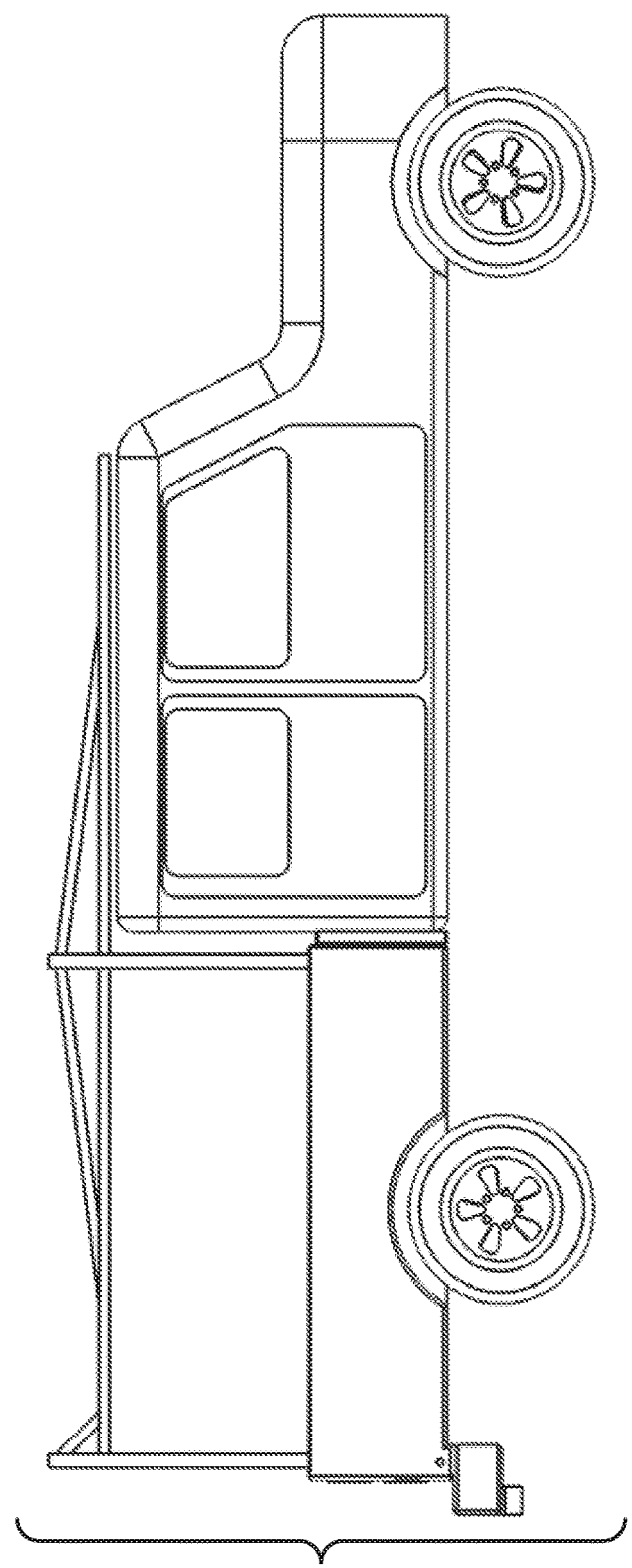
FIG. 6 illustrates a side view of a prior art pickup truck fitted with a conventional overhead storage rack and depicts the minimum height requirement of this configuration.
Figure 7:
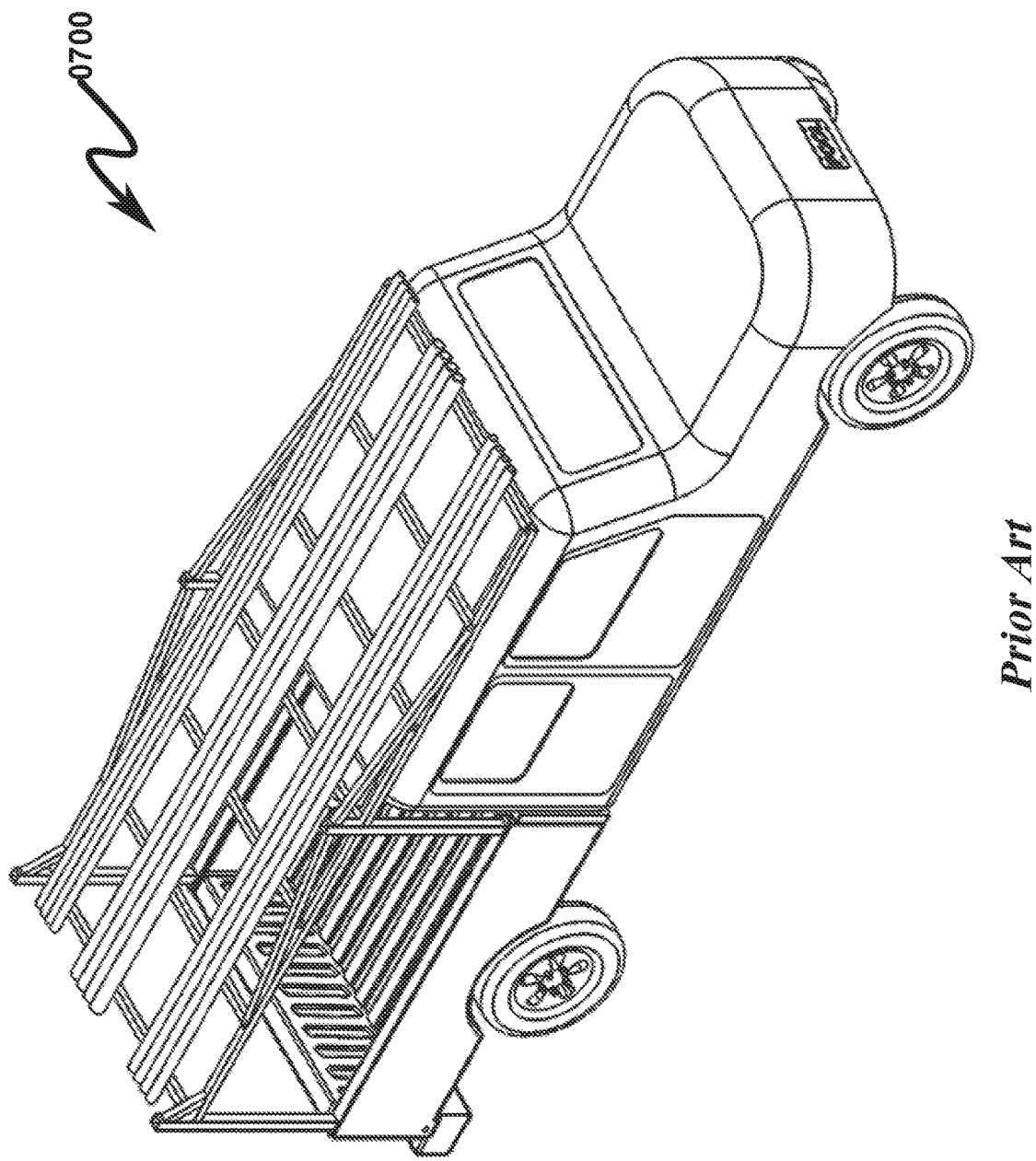
FIG. 7 illustrates a right front operational top perspective view of a prior art pickup truck fitted with a conventional overhead storage rack loaded with PVC pipe joints.
Figure 8:
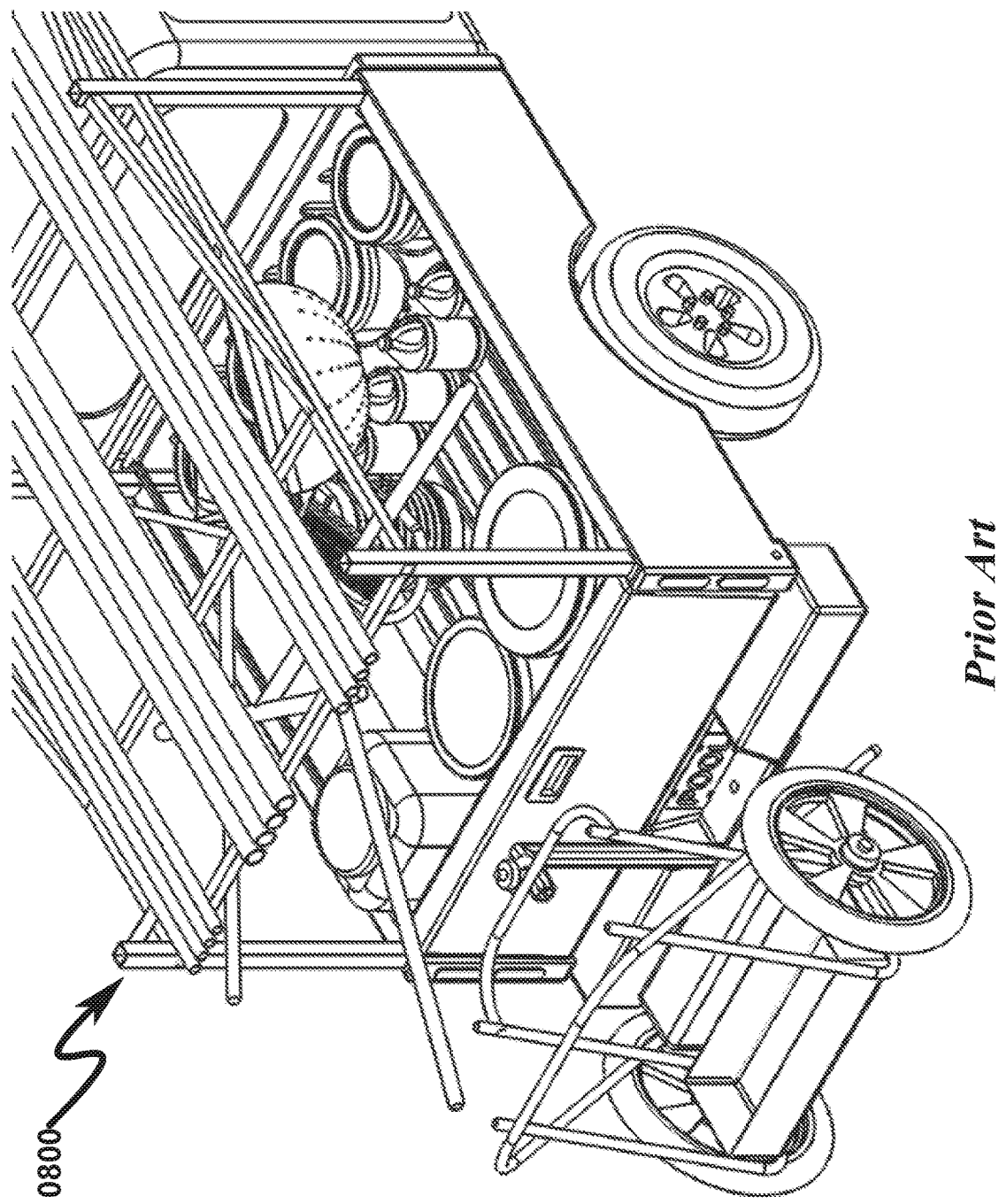
FIG. 8 illustrates a right front operational top perspective view of a prior art pickup truck fitted with a conventional overhead storage rack depicting typical disorganization within the pickup truck bed as a result of chemical storage and tool storage.

As depicted in FIG. 65 (6500)-FIG. 72 (7200), the present invention in many preferred embodiments makes use of a non-penetrating mounting bracket to attach to tool rack to the bed of the pickup truck. This mounting apparatus has great advantage in scenarios where the pickup truck bed lacks stake post insets that are required for traditional overhead tool rack systems as depicted generally in FIG. 1 (0100)-FIG. 8 (0800). Furthermore, the universal mounting bracket as depicted in FIG. 65 (6500)-FIG. 72 (7200) may incorporate a rubber isolation member (7001) that prevents marring of paint on the pickup truck bed sidewalls as the bracket is affixed to the upper lip of the pickup truck bed.

Reconfigurable Hose Rack (7300)-(9600)

Figure 73:
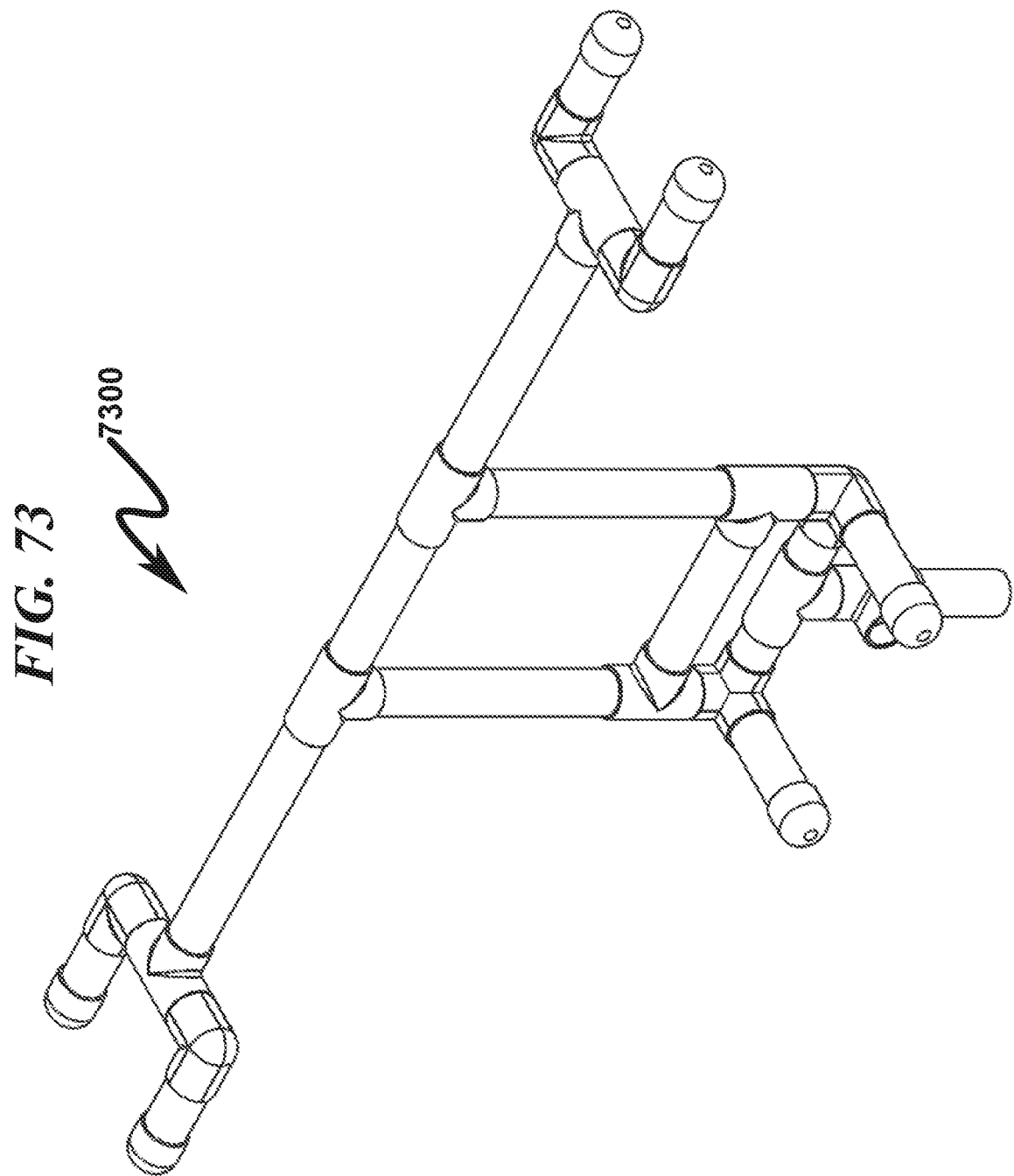
FIG. 73 illustrates a top right front perspective view of a preferred exemplary reconfigurable hose rack (RHR) with U-shaped rotatable forks configured horizontally outward.
Figure 74:
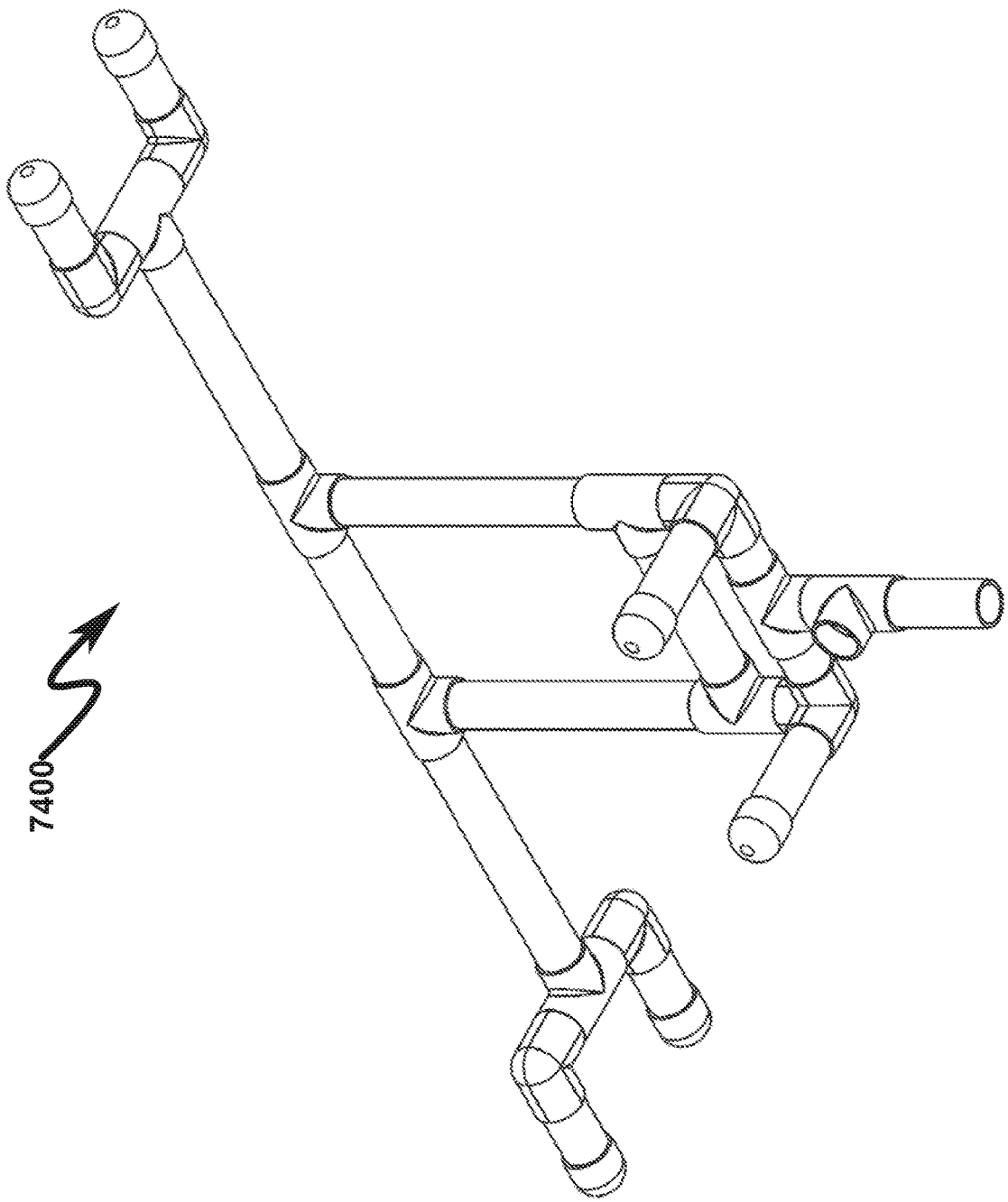
FIG. 74 illustrates a bottom right front perspective view of a preferred exemplary reconfigurable hose rack (RHR) with U-shaped rotatable forks configured horizontally outward.
Figure 75:
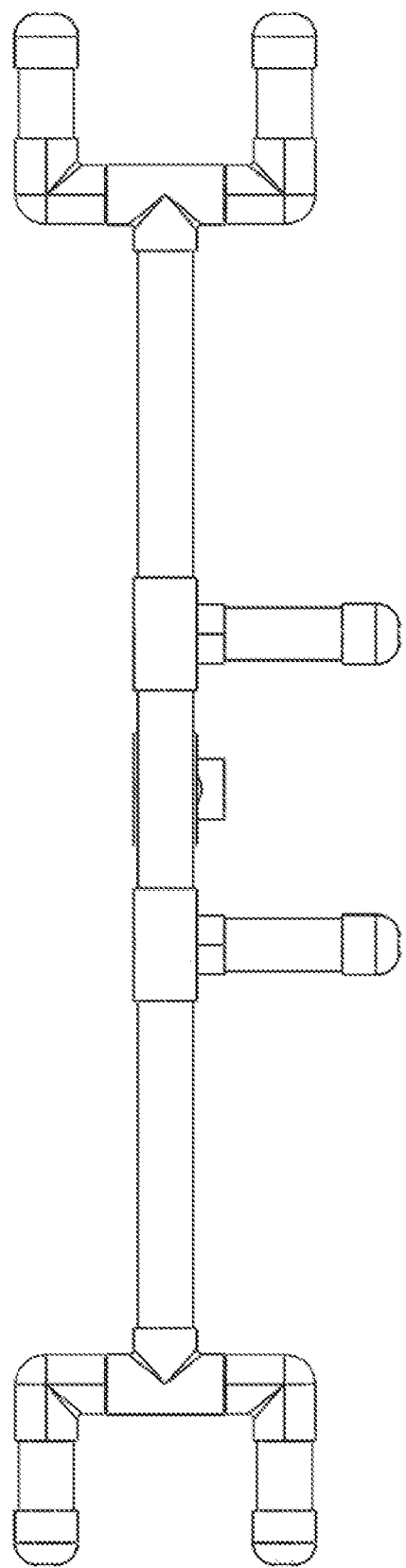
FIG. 75 illustrates a top view of a preferred exemplary reconfigurable hose rack (RHR) with U-shaped rotatable forks configured horizontally outward.
Figure 76:
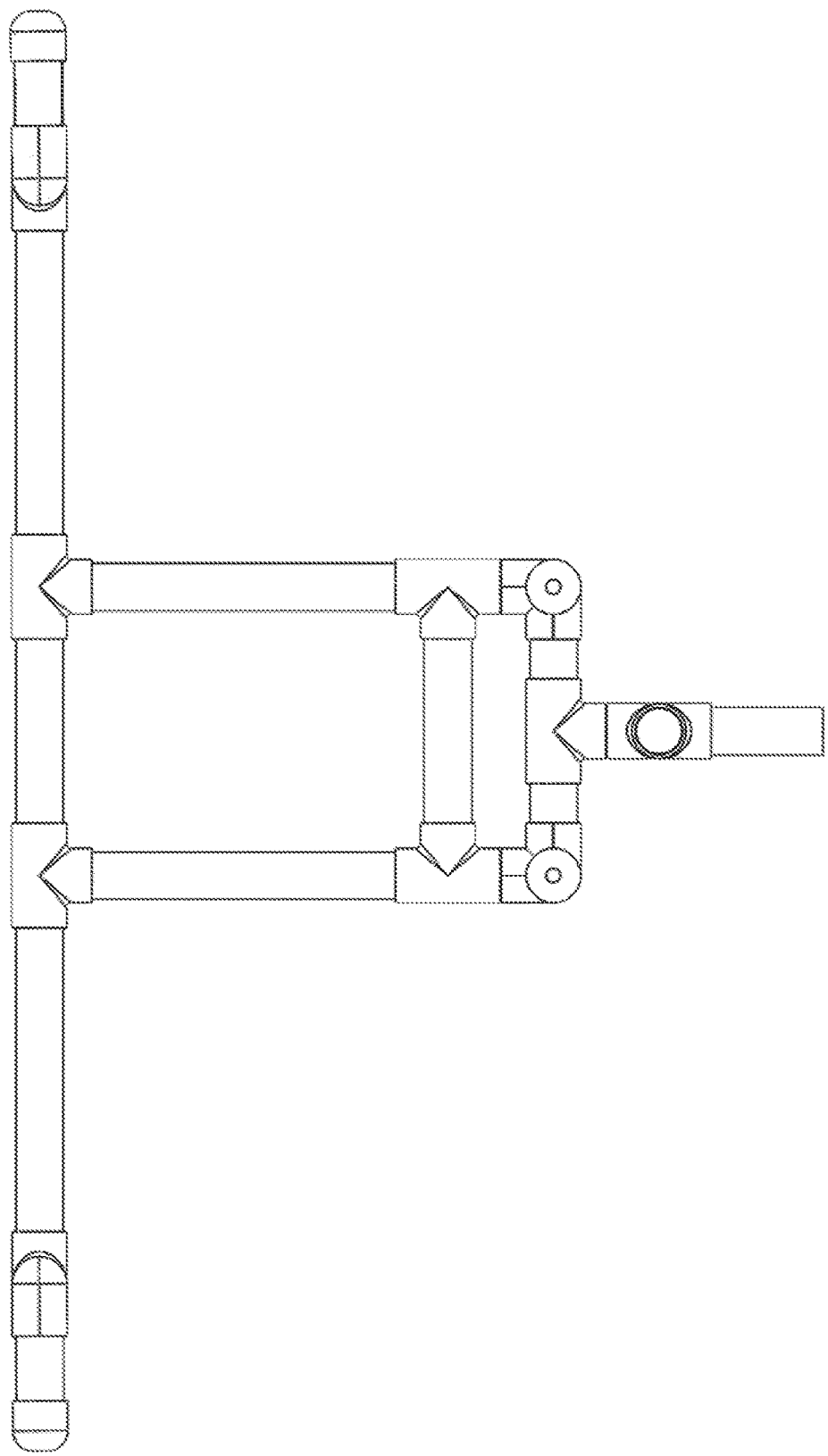
FIG. 76 illustrates a front view of a preferred exemplary reconfigurable hose rack (RHR) with U-shaped rotatable forks configured horizontally outward.
Figure 77:
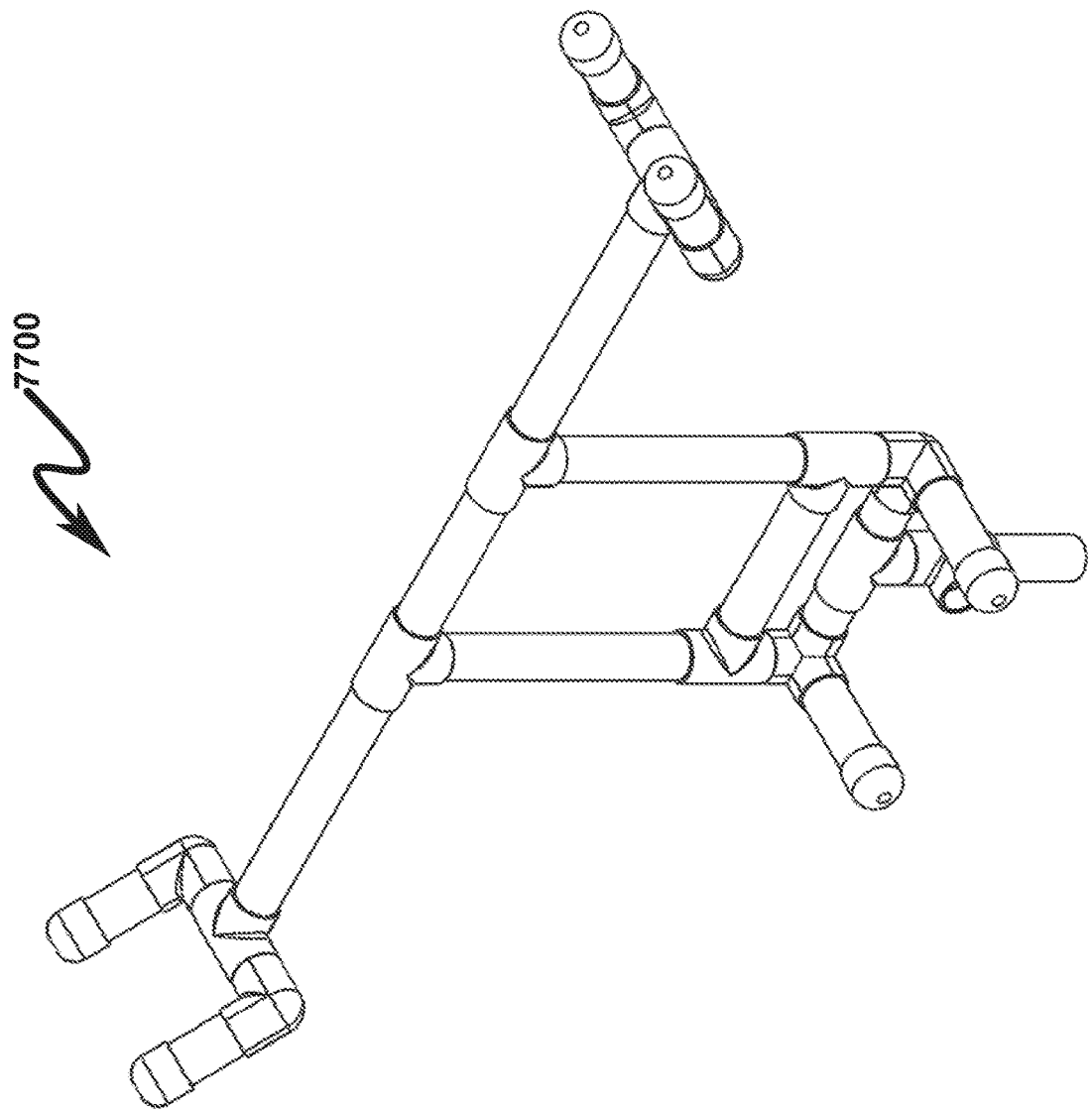
FIG. 77 illustrates a top right front perspective view of a preferred exemplary reconfigurable hose rack (RHR) with U-shaped rotatable forks configured diagonally outward.
Figure 78:
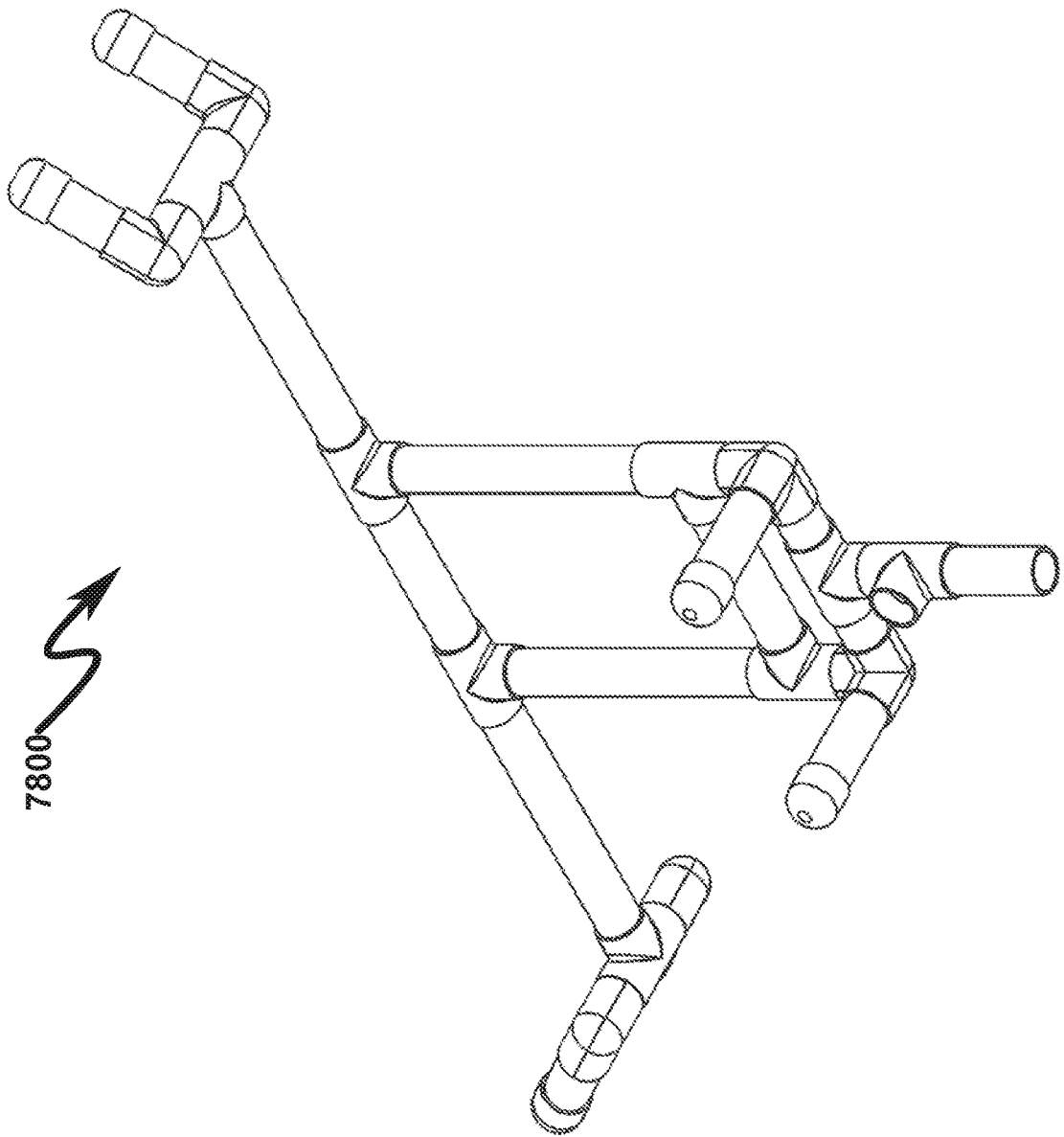
FIG. 78 illustrates a bottom right front perspective view of a preferred exemplary reconfigurable hose rack (RHR) with U-shaped rotatable forks configured diagonally outward.
Figure 79:
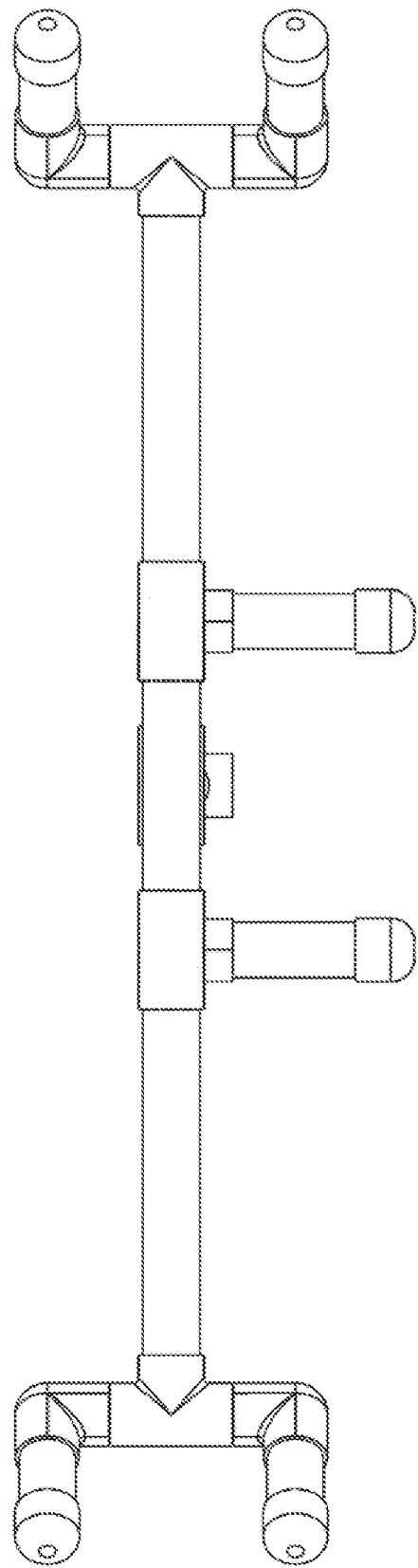
FIG. 79 illustrates a top view of a preferred exemplary reconfigurable hose rack (RHR) with U-shaped rotatable forks configured diagonally outward.
Figure 80:
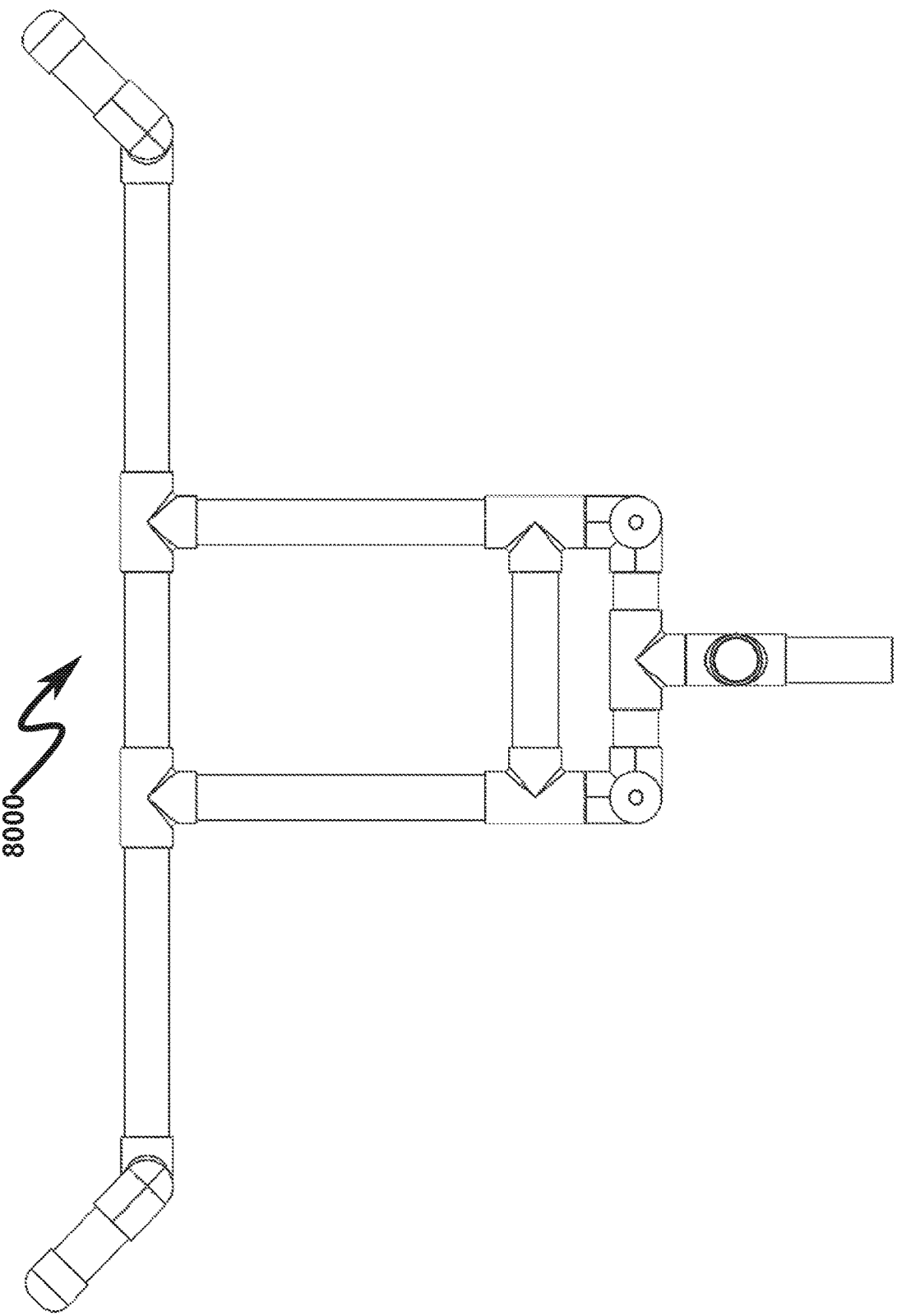
FIG. 80 illustrates a front view of a preferred exemplary reconfigurable hose rack (RHR) with U-shaped rotatable forks configured diagonally outward.
Figure 81:
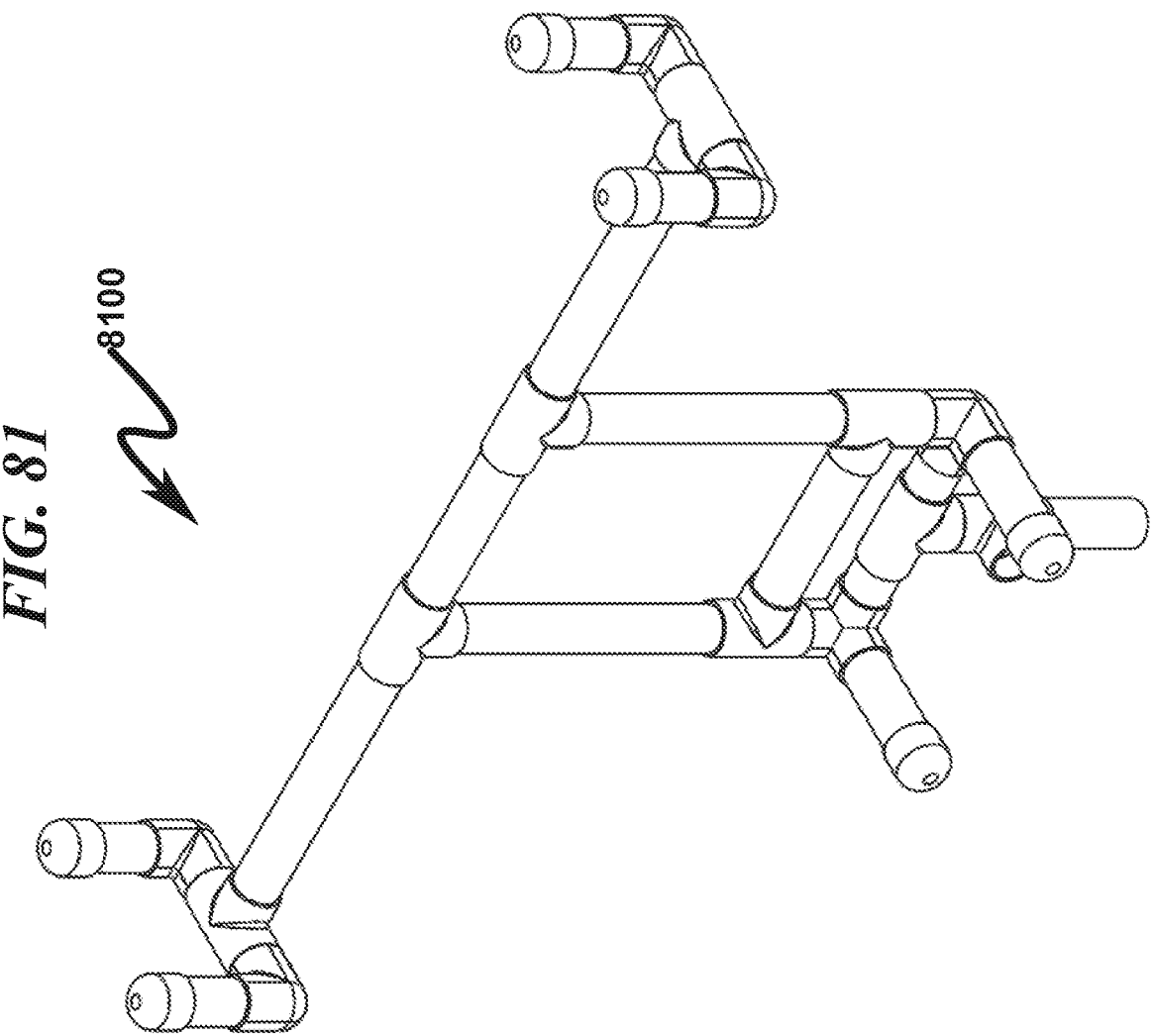
FIG. 81 illustrates a top right front perspective view of a preferred exemplary reconfigurable hose rack (RHR) with U-shaped rotatable forks configured vertically.
Figure 82:
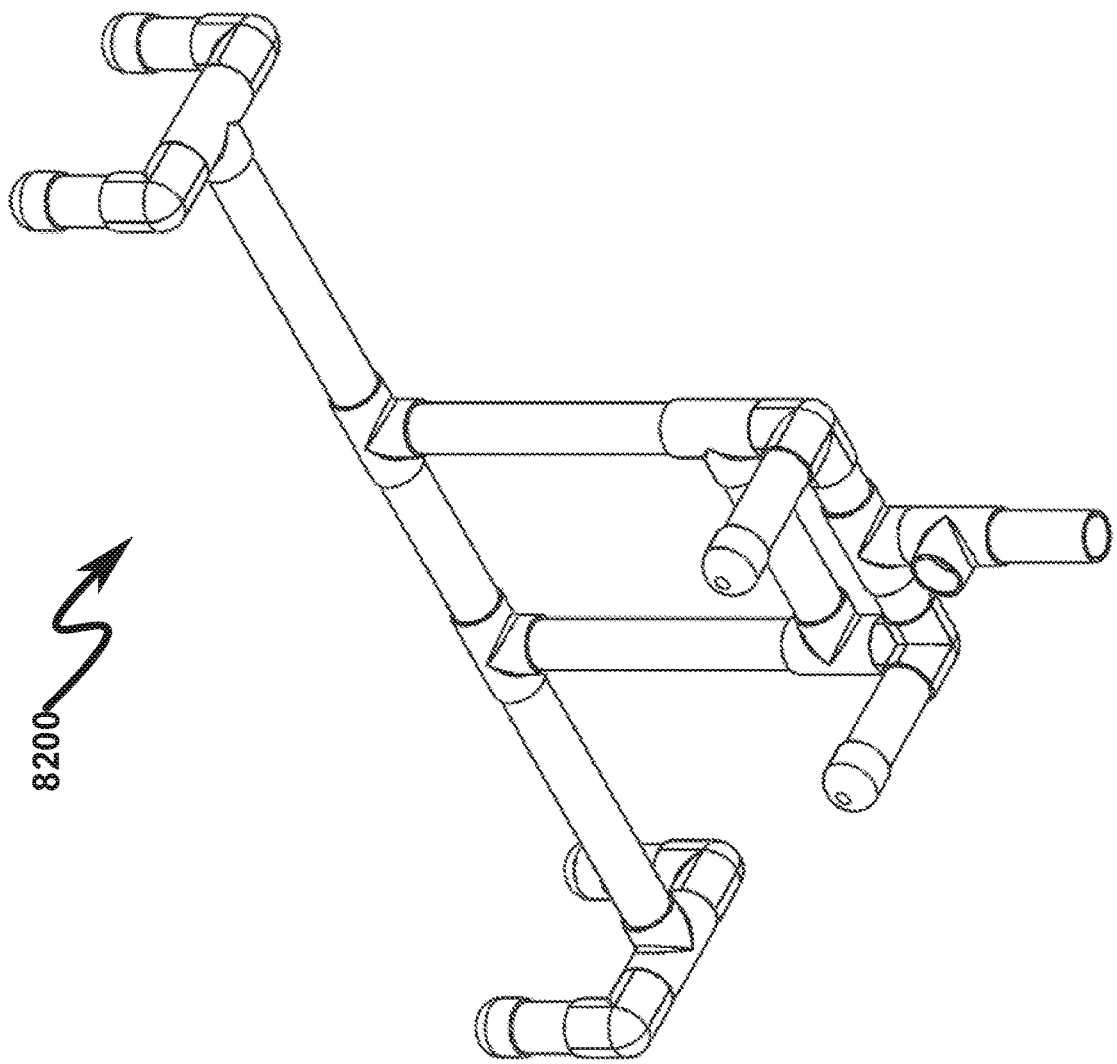
FIG. 82 illustrates a bottom right front perspective view of a preferred exemplary reconfigurable hose rack (RHR) with U-shaped rotatable forks configured vertically.
Figure 83:
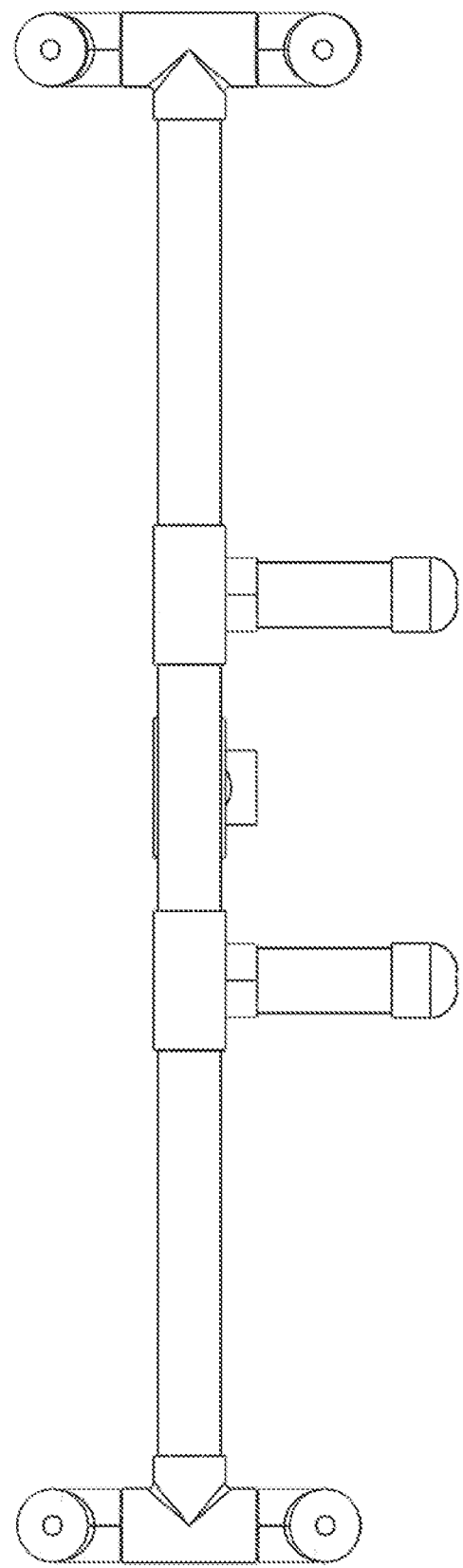
FIG. 83 illustrates a top view of reconfigurable hose rack (RHR) with U-shaped rotatable forks configured vertically.
Figure 84:
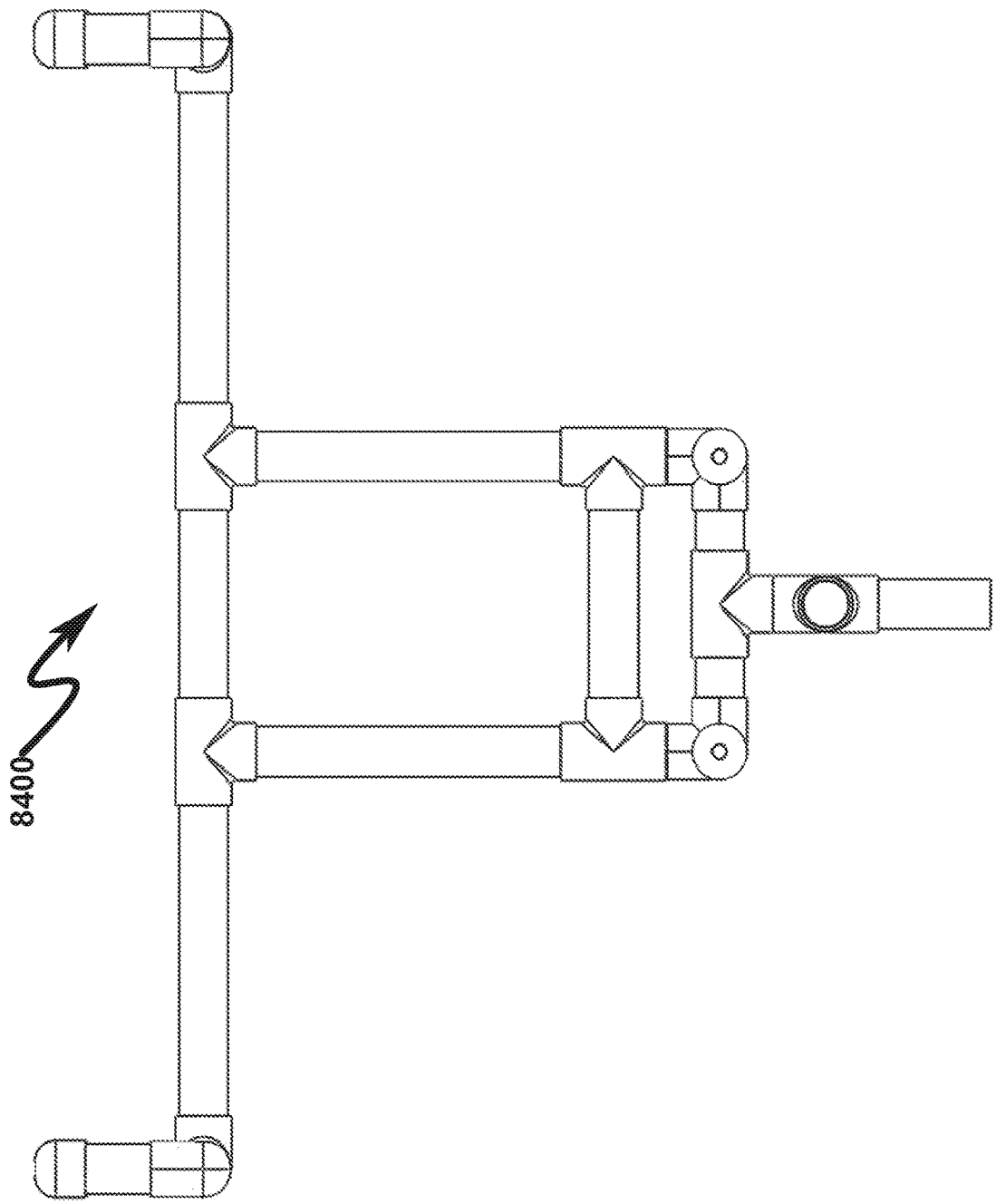
FIG. 84 illustrates a front view of a preferred exemplary reconfigurable hose rack (RHR) with U-shaped rotatable forks configured vertically.
Figure 85:
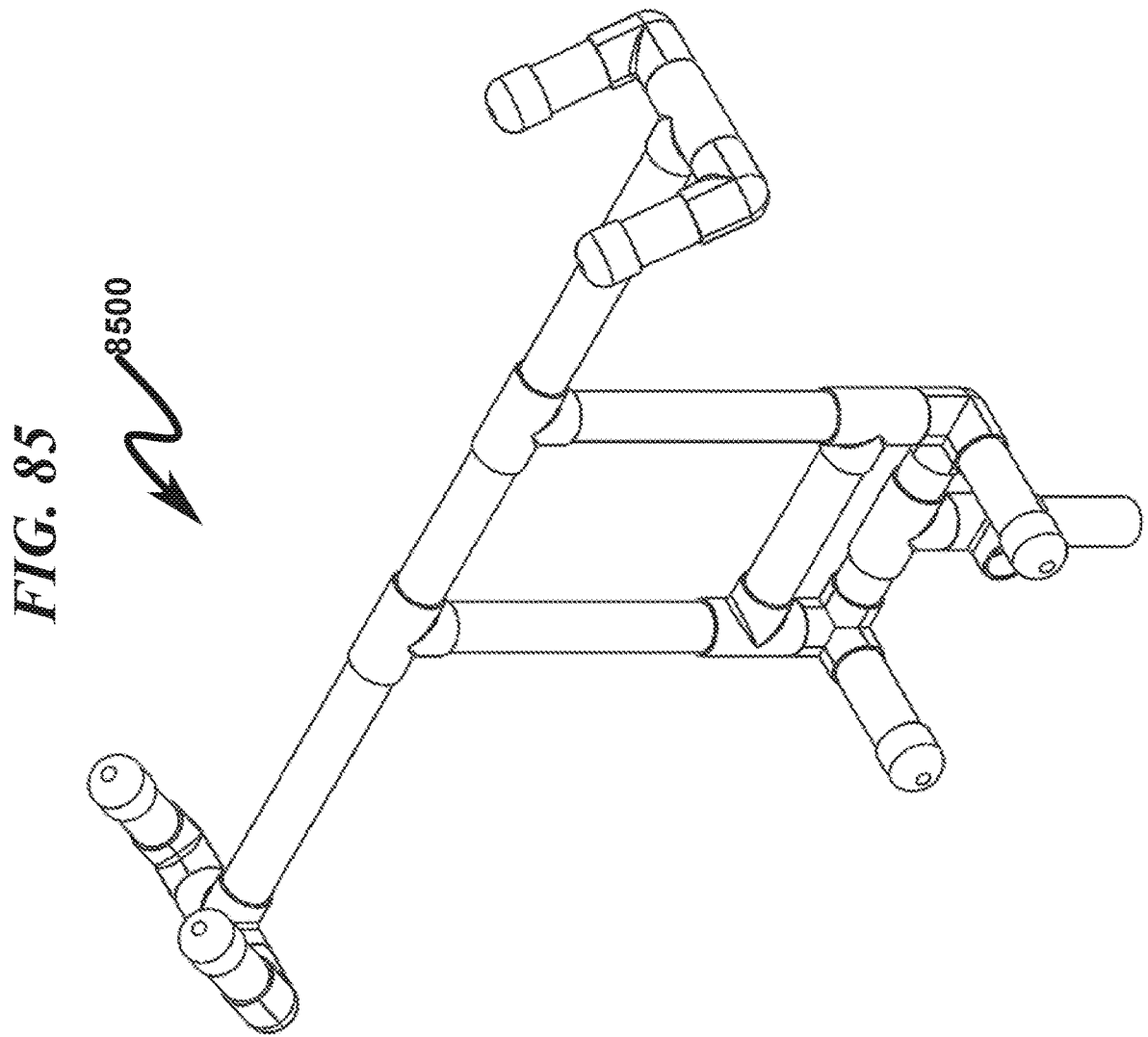
FIG. 85 illustrates a top right front perspective view of a preferred exemplary reconfigurable hose rack (RHR) with U-shaped rotatable forks configured diagonally inward.
Figure 86:
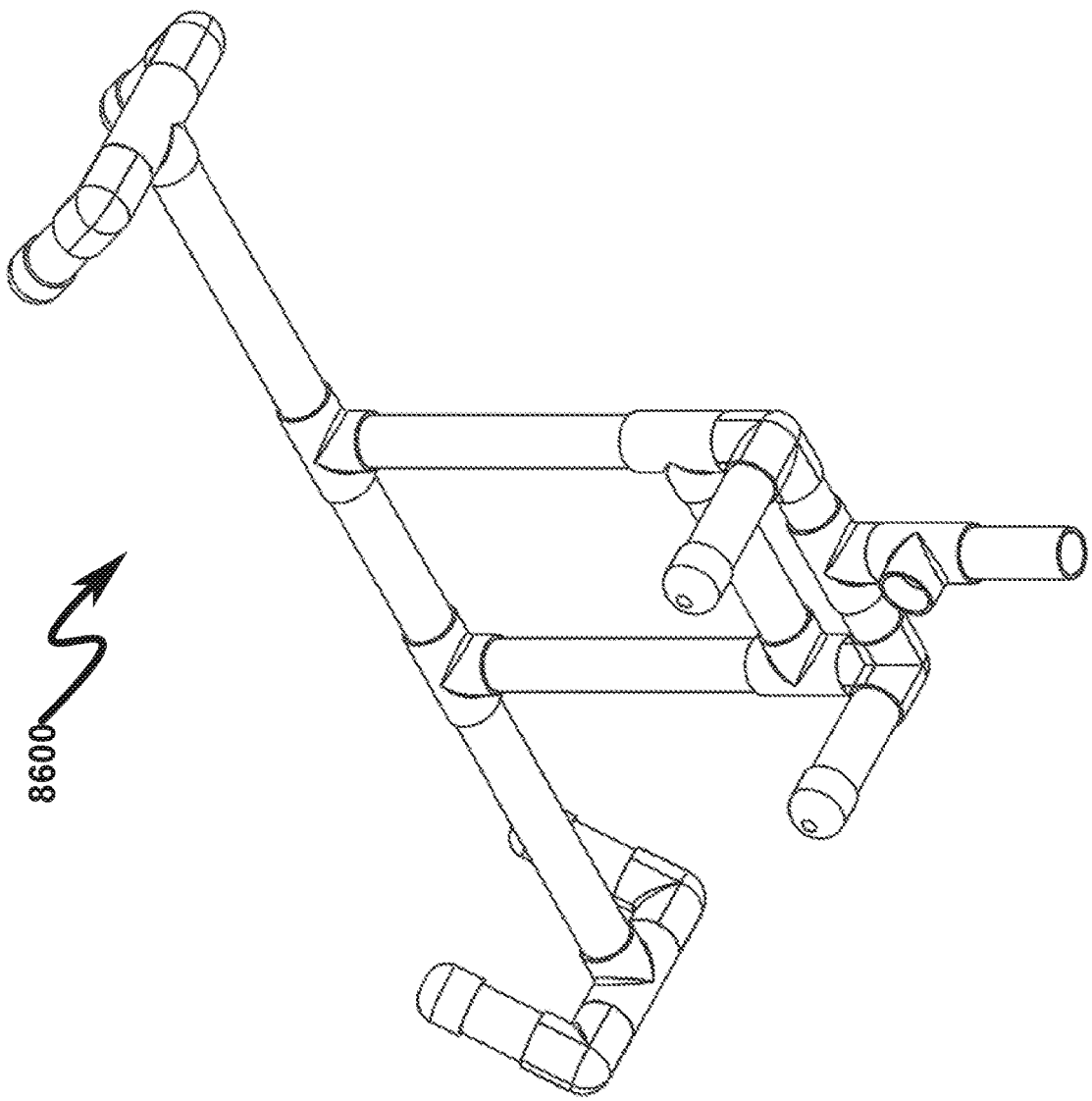
FIG. 86 illustrates a bottom right front perspective view of a preferred exemplary reconfigurable hose rack (RHR) with U-shaped rotatable forks configured diagonally inward.
Figure 87:
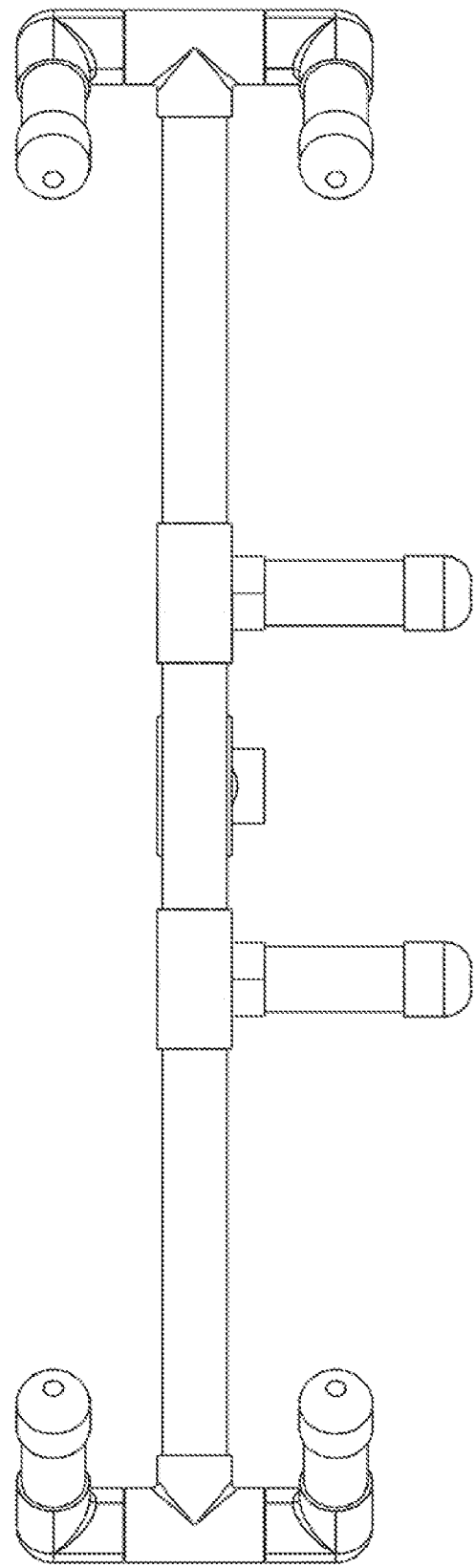
FIG. 87 illustrates a top view of a preferred exemplary reconfigurable hose rack (RHR) with U-shaped rotatable forks configured diagonally inward.
Figure 88:
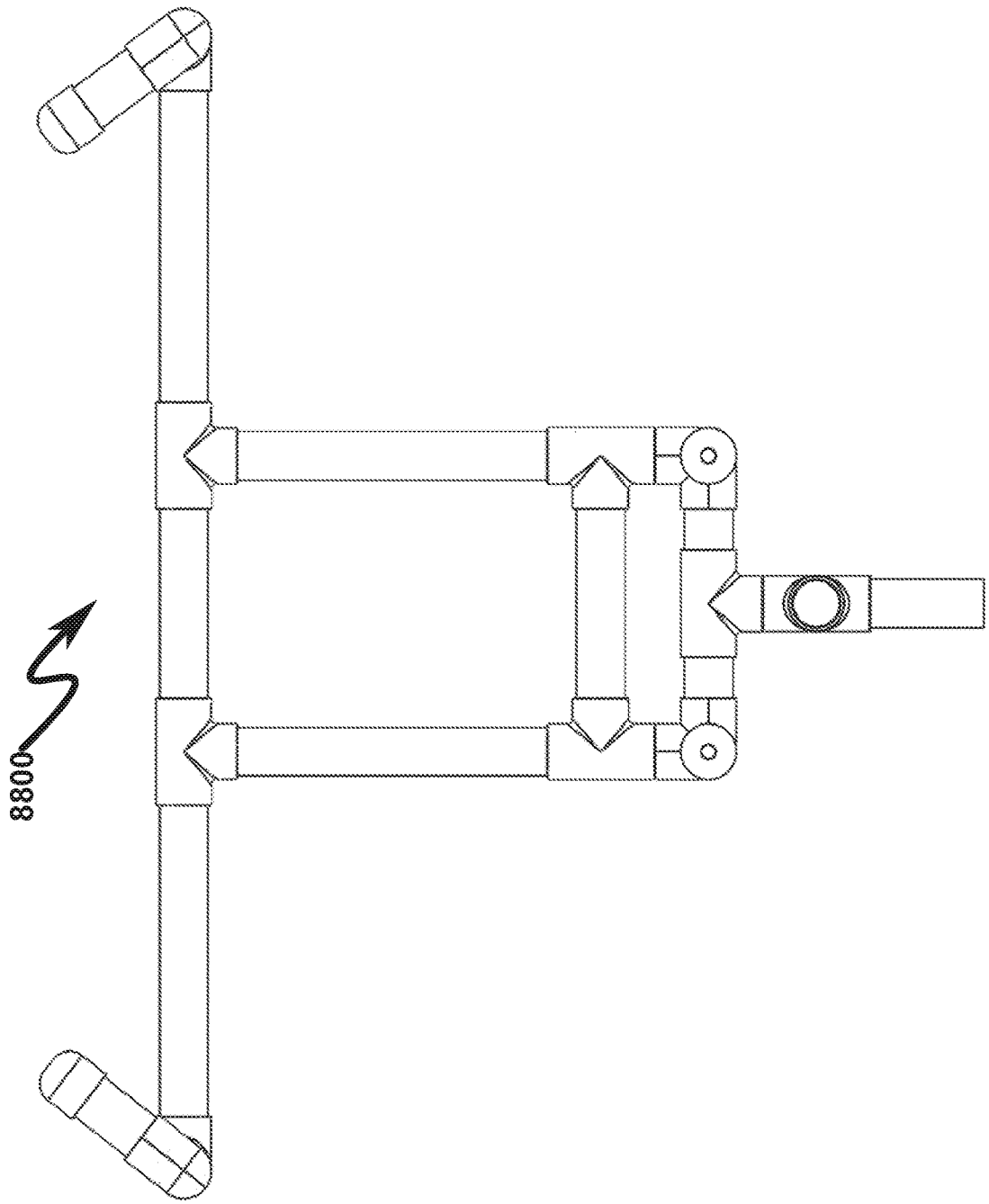
FIG. 88 illustrates a front view of a preferred exemplary reconfigurable hose rack (RHR) with U-shaped rotatable forks configured diagonally inward.
Figure 89:
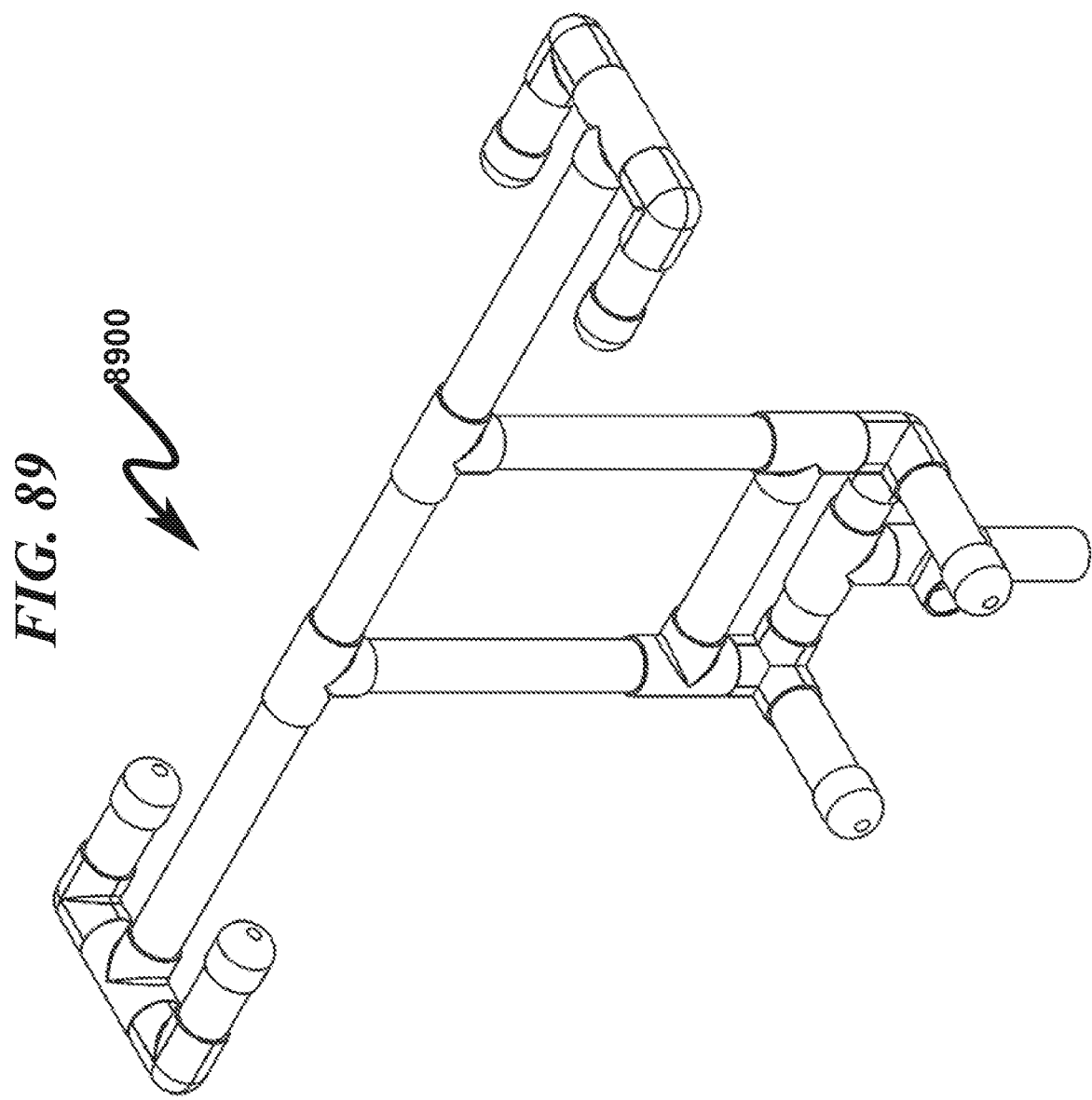
FIG. 89 illustrates a top right front perspective view of a preferred exemplary reconfigurable hose rack (RHR) with U-shaped rotatable forks configured horizontally inward.
Figure 90:
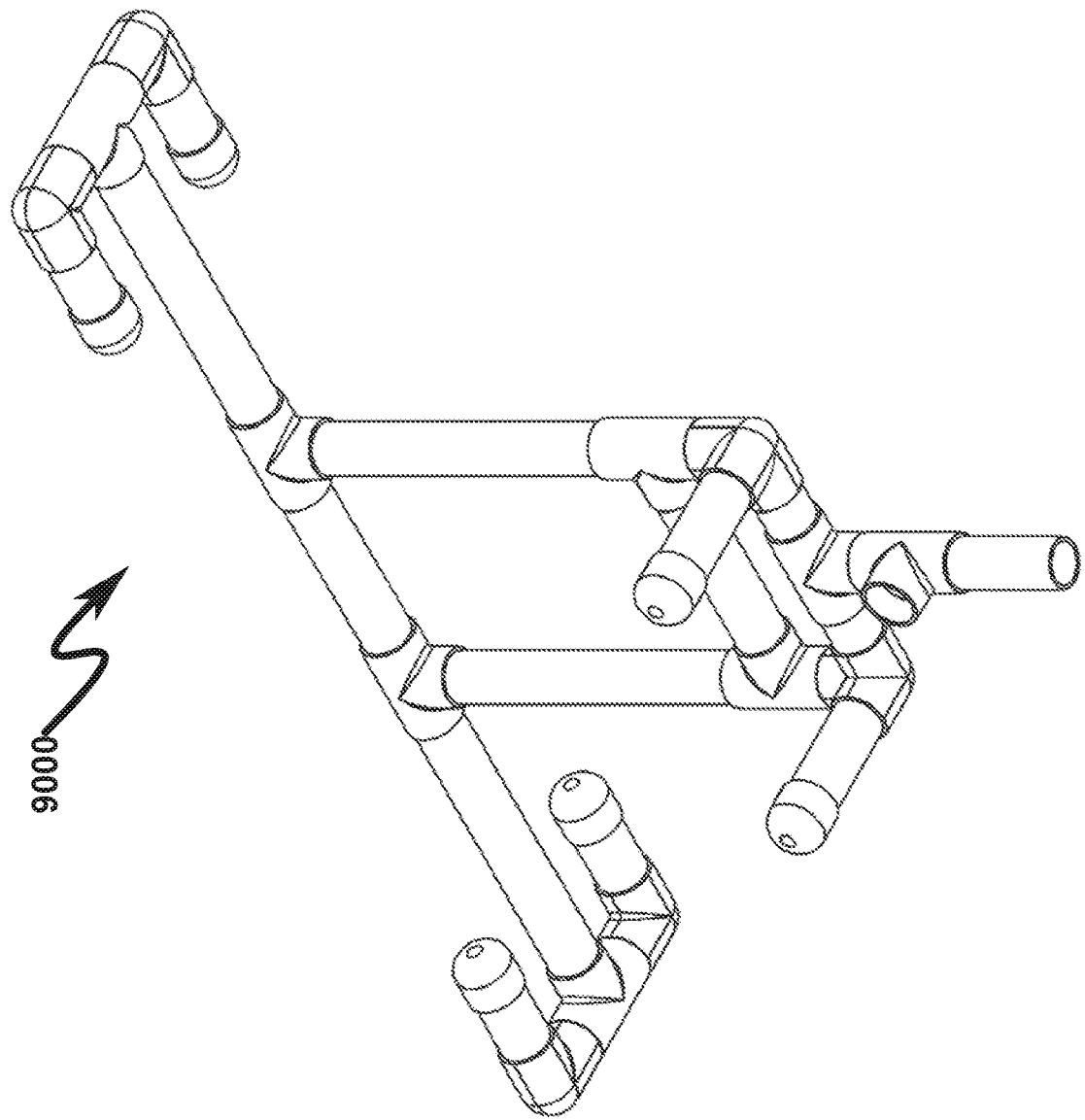
FIG. 90 illustrates a bottom right front perspective view of a preferred exemplary reconfigurable hose rack (RHR) with U-shaped rotatable forks configured horizontally inward.
Figure 91:
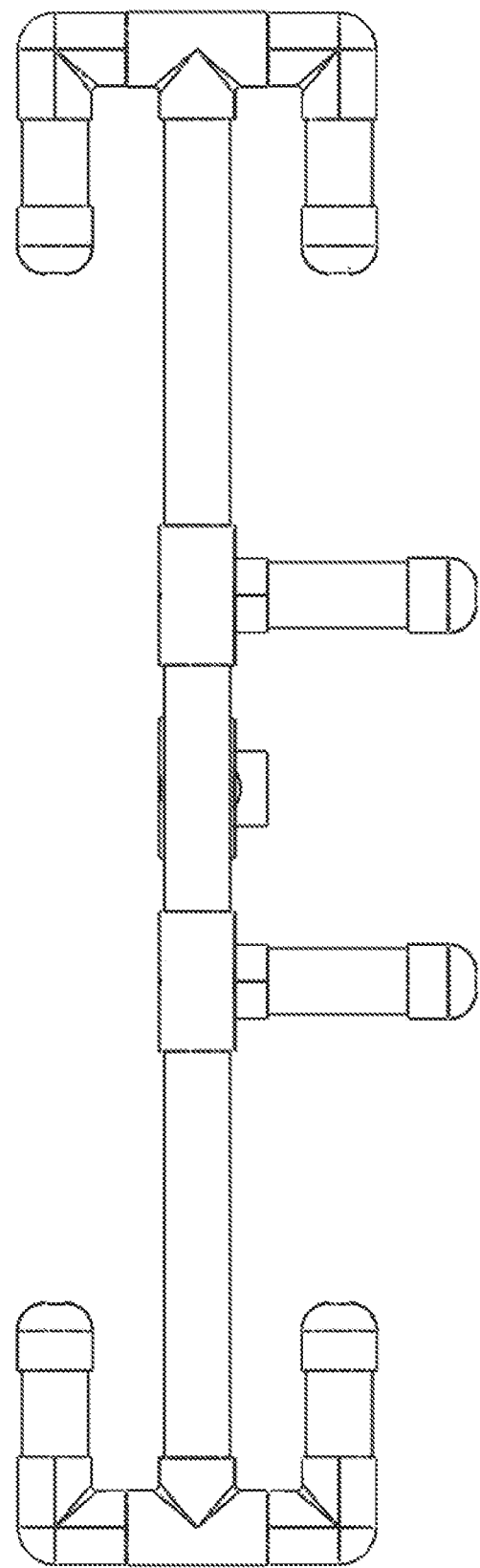
FIG. 91 illustrates a top view of a preferred exemplary reconfigurable hose rack (RHR) with U-shaped rotatable forks configured horizontally inward.
Figure 92:
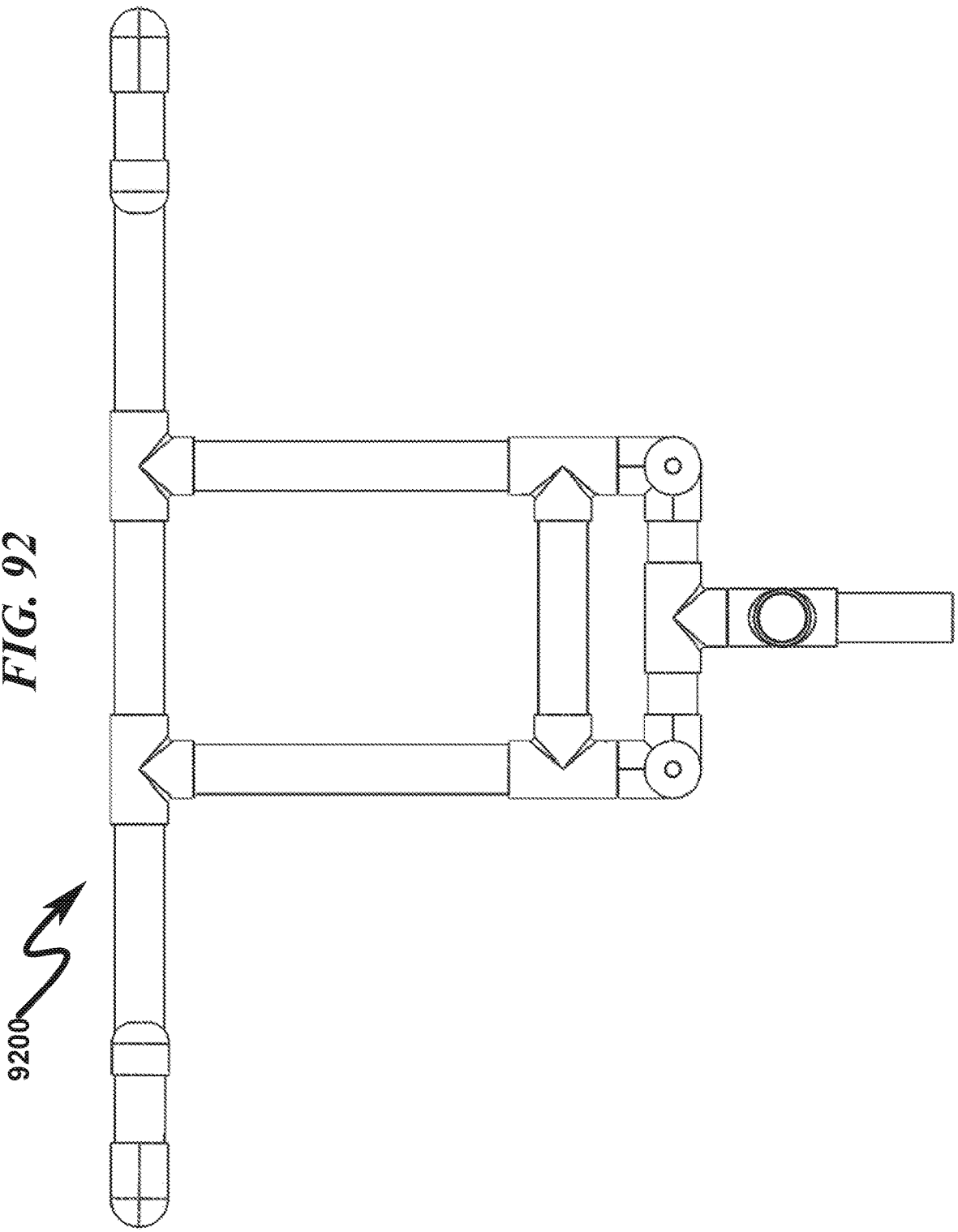
FIG. 92 illustrates a front view of a preferred exemplary reconfigurable hose rack (RHR) with U-shaped rotatable forks configured horizontally inward.

The RHR may be configured as depicted in FIG. 73 (7300)-FIG. 96 (9600) to allow the support arms to be articulated in a number of fixed positions so as to allow the RHR to carry a variety of items based on application context. FIG. 73 (7300)-FIG. 76 (7600) depict exemplary positioning of the U-shaped rotatable forks in the outward horizontal position. FIG. 77 (7700)-FIG. 80 (8000) depict exemplary positioning of the U-shaped rotatable forks in the outward diagonal position. FIG. 81 (8100)-FIG. 84 (8400) depict exemplary positioning of the U-shaped rotatable forks in the vertical position. FIG. 85 (8500)-FIG. 88 (8800) depict exemplary positioning of the U-shaped rotatable forks in the inward diagonal position. FIG. 89 (8900)-FIG. 92 (9200) depict exemplary positioning of the U-shaped rotatable forks in the inward horizontal position.

Figure 93:
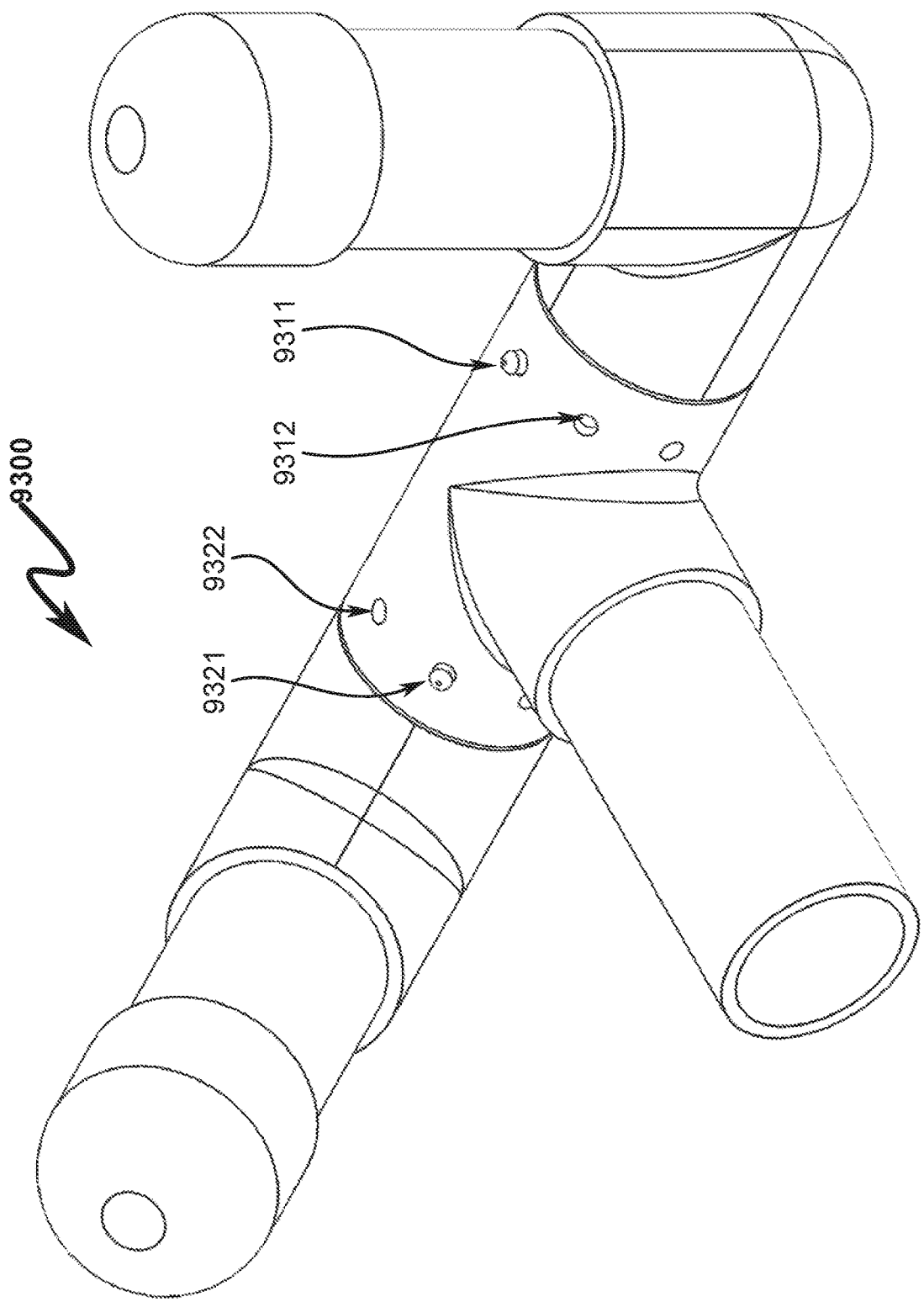
FIG. 93 illustrates a top right front perspective view of a preferred exemplary reconfigurable hose rack (RHR) detent mechanism incorporated within a U-shaped rotatable fork.
Figure 94:
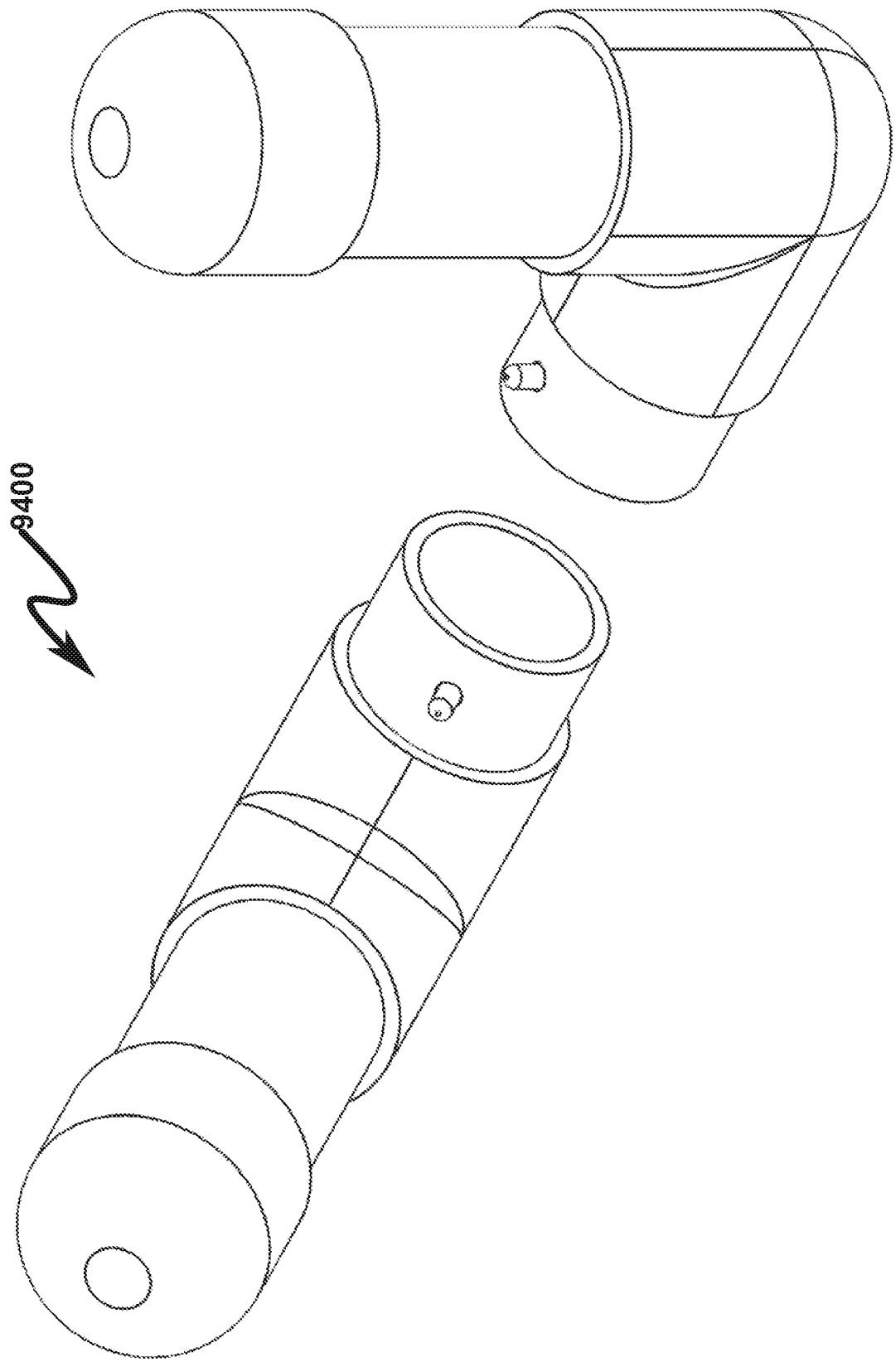
FIG. 94 illustrates a top right front perspective view of a preferred exemplary reconfigurable hose rack (RHR) detent mechanism incorporated within a U-shaped rotatable fork with center T-joint hidden.
Figure 95:
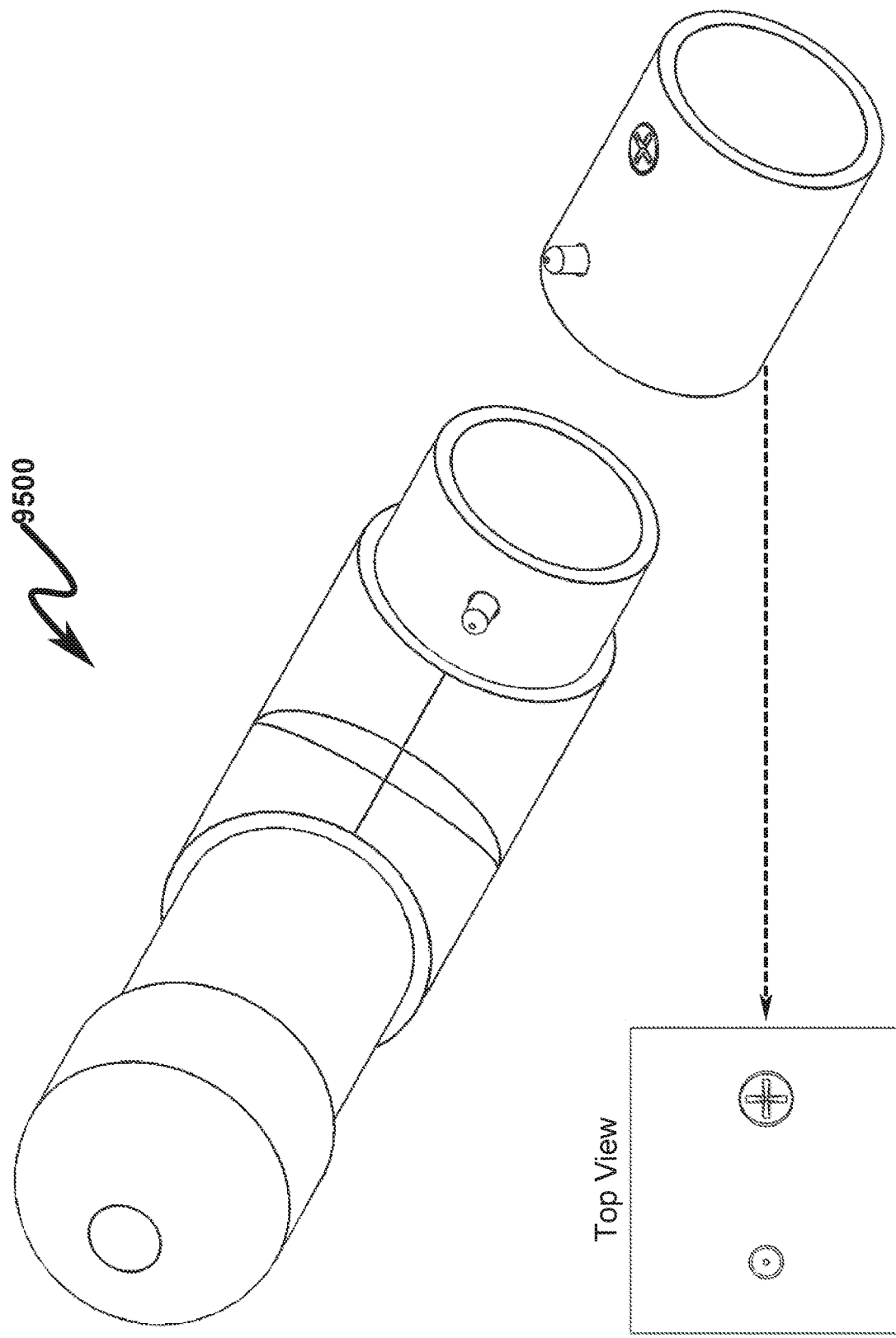
FIG. 95 illustrates a top right front perspective view of a preferred exemplary reconfigurable hose rack (RHR) detent mechanism incorporated within a U-shaped rotatable fork with center T-joint and vertical U-member hidden.

The detent control to support these various U-shaped rotatable fork positions is generally depicted in FIG. 93 (9300)-FIG. 96 (9600). In FIG. 93 (9300) it can be seen that the detent controls permit the U-shaped rotatable forks to be articulated at different angles if necessary. Detent pins (9311, 9321) are mated to a plurality of detent holes (9312, 9322) within the RHR support structure. As depicted in the detail provided in FIG. 96 (9600), the detent pins may be configured within a structure comprising a spring steel lever (9613) that is affixed to the RHR support structure using a fastener such as a countersunk screw and nut as illustrated. This configuration allows the detent (9611) to articulate within the holes of the RHR support structure and allow rotation of the U-shaped rotatable fork in a number of fixed directions.

The reconfigurable nature of the RHR U-shaped rotatable forks permits a wide variety of materials and tools to be transported by the system, including but not limited to pipe stock, coiled hose, ladders, coolers, sporting equipment (e.g., snowboards, kayaks, surfboards and the like). The use of detent-locking on the major frame components of the RHR as well as other embodiments of the structures depicted in the drawings is also anticipated by the invention scope.

Wheel-Well Storage Rack Configurations (9700)-(10400)

Figure 97:
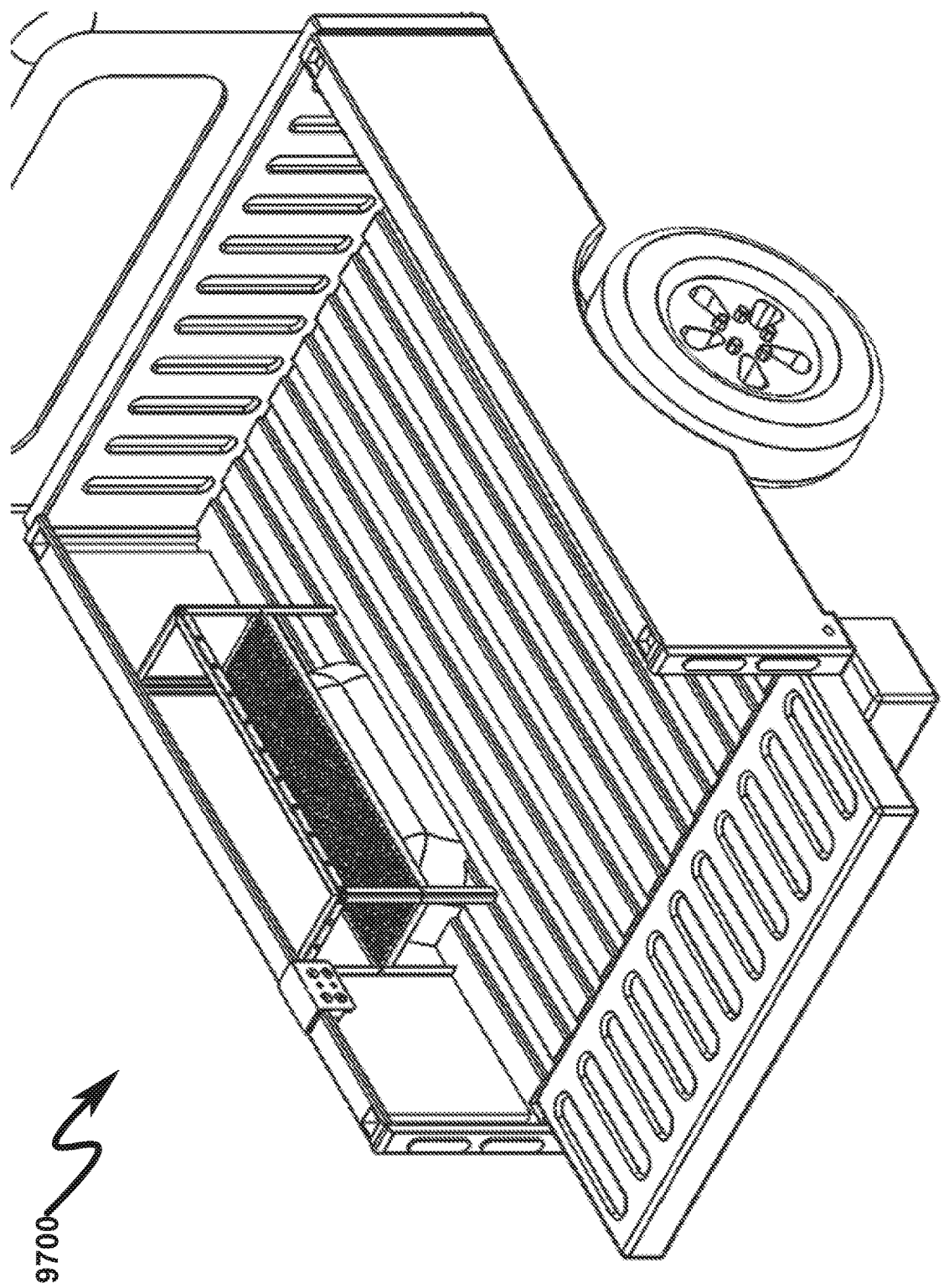
FIG. 97 illustrates a top right front perspective view of an exemplary wheel-well storage rack (WSR) as applied to the left wheel-well of a pickup truck bed.
Figure 98:
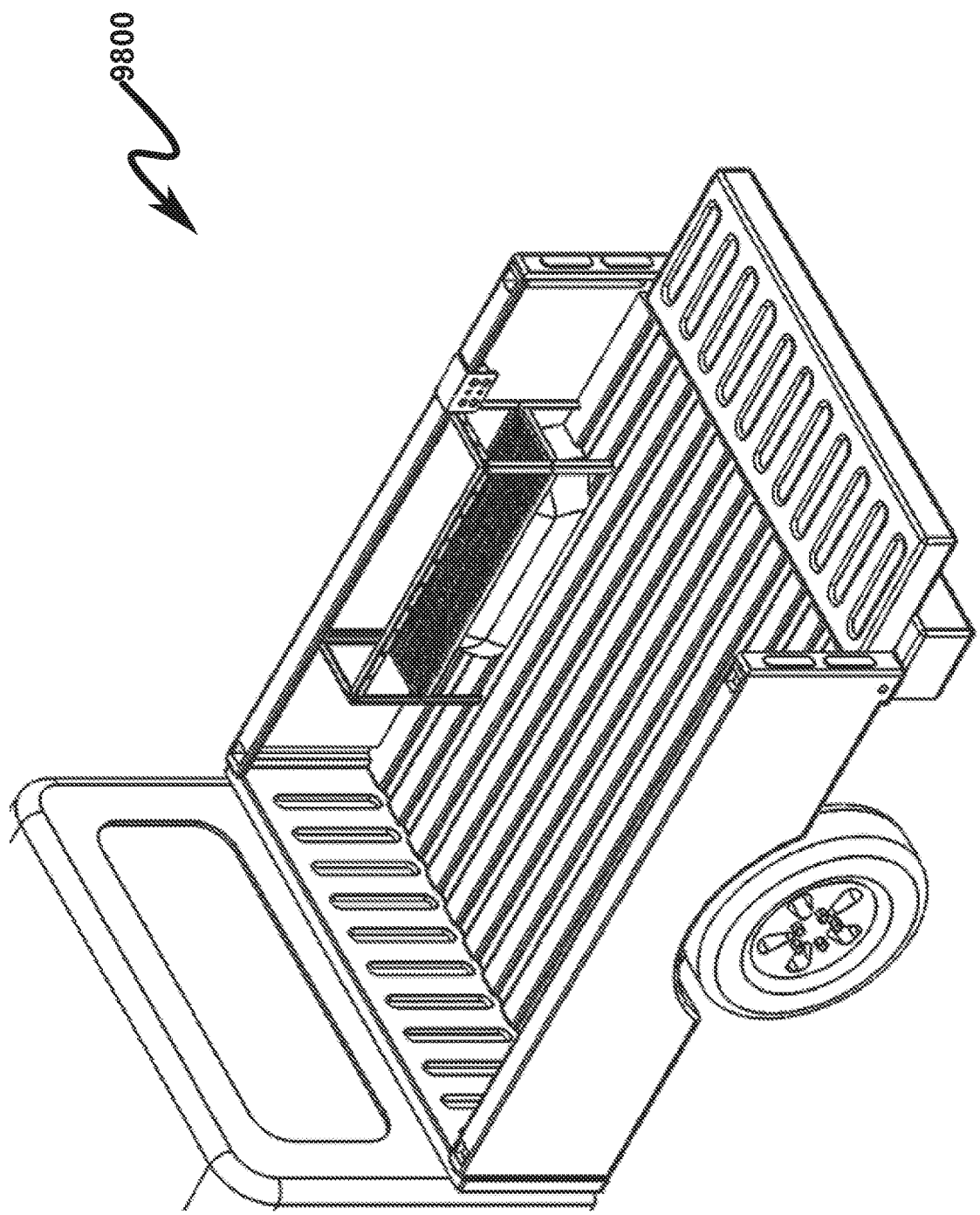
FIG. 98 illustrates a top left front perspective view of an exemplary wheel-well storage rack (WSR) as applied to the right wheel-well of a pickup truck bed.
Figure 99:
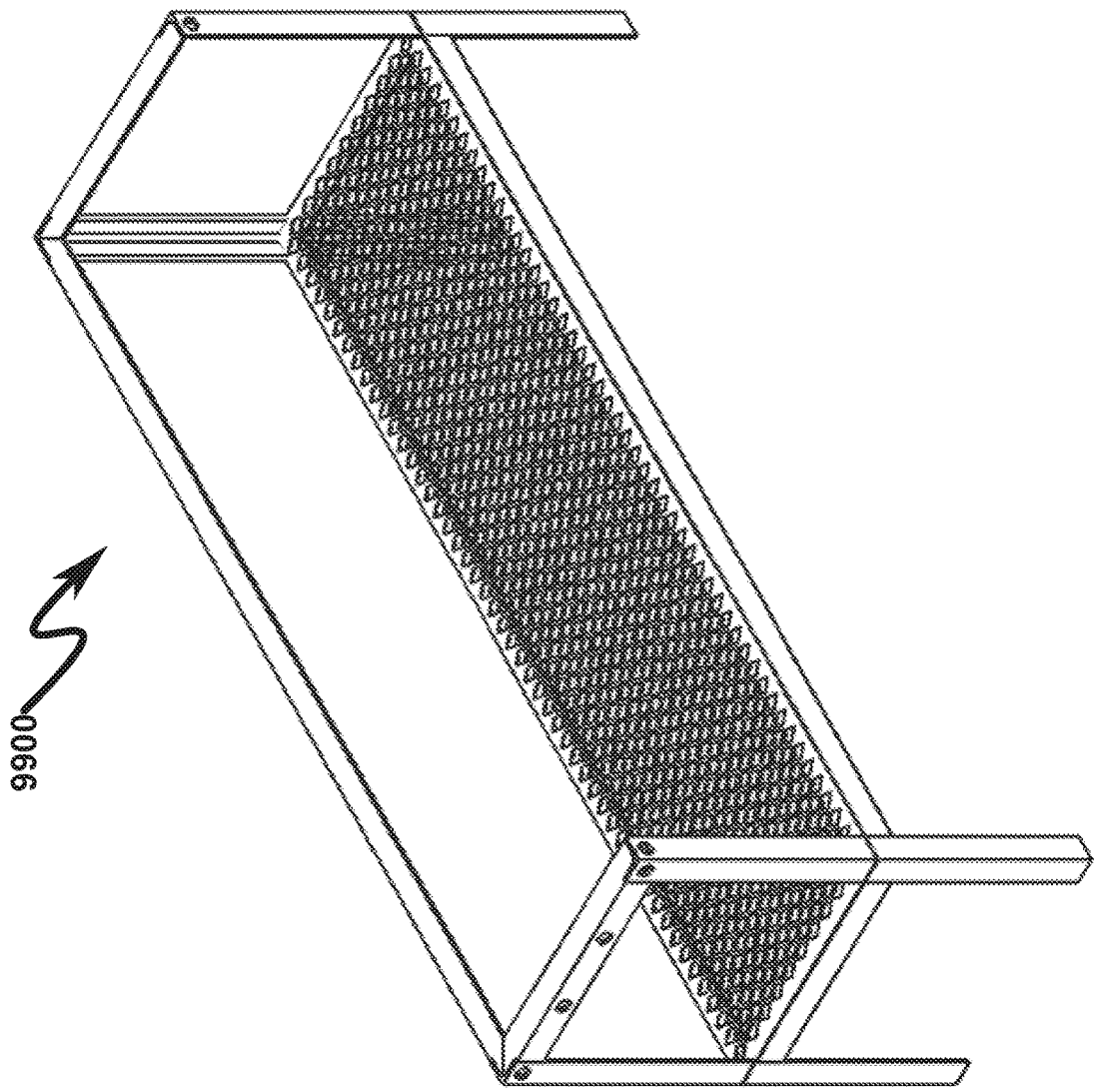
FIG. 99 illustrates a top right front perspective detail view of an exemplary wheel-well storage rack (WSR)
Figure 100:
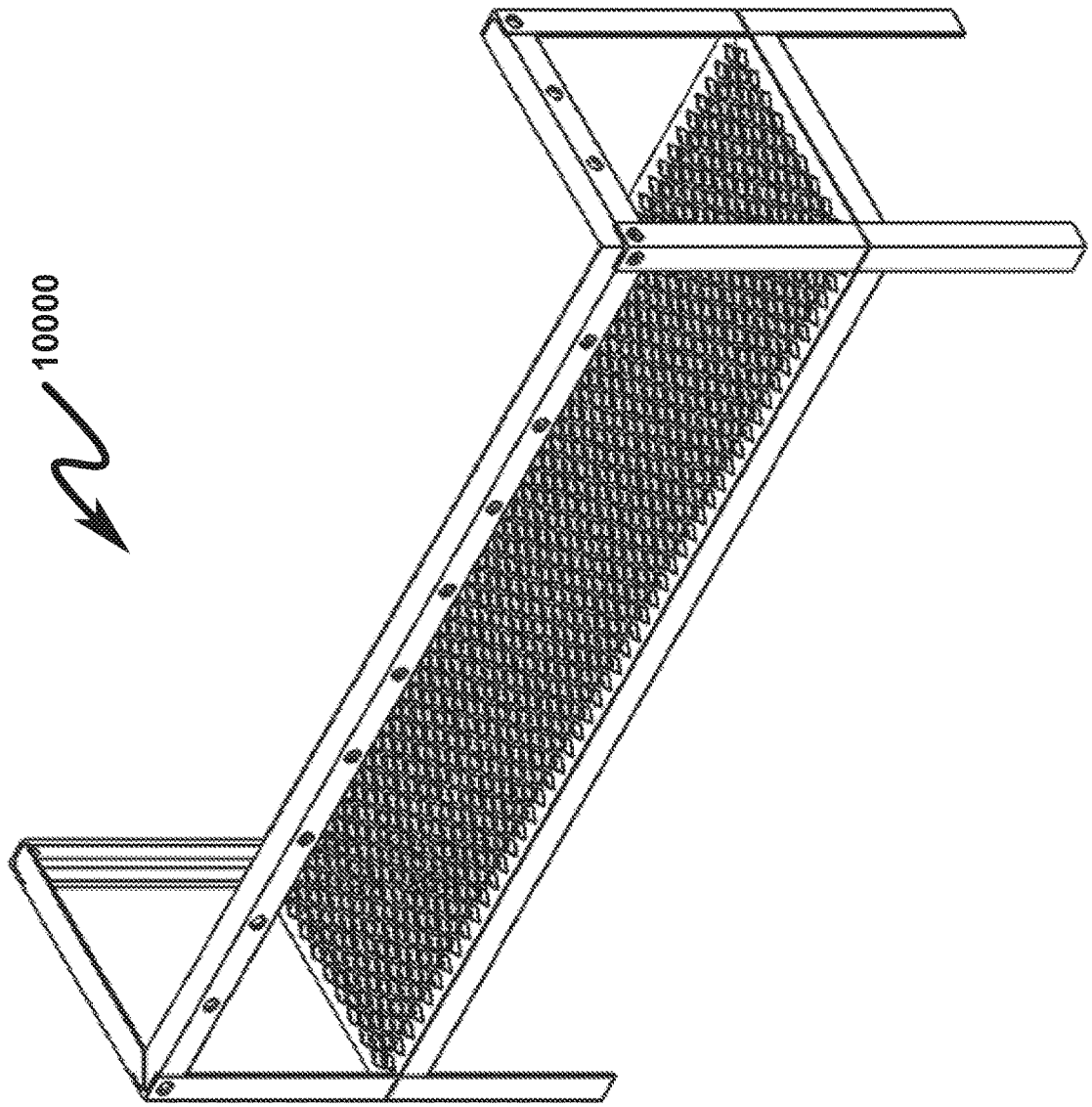
FIG. 100 illustrates a top left front perspective detail view of an exemplary wheel-well storage rack (WSR)
Figure 101:
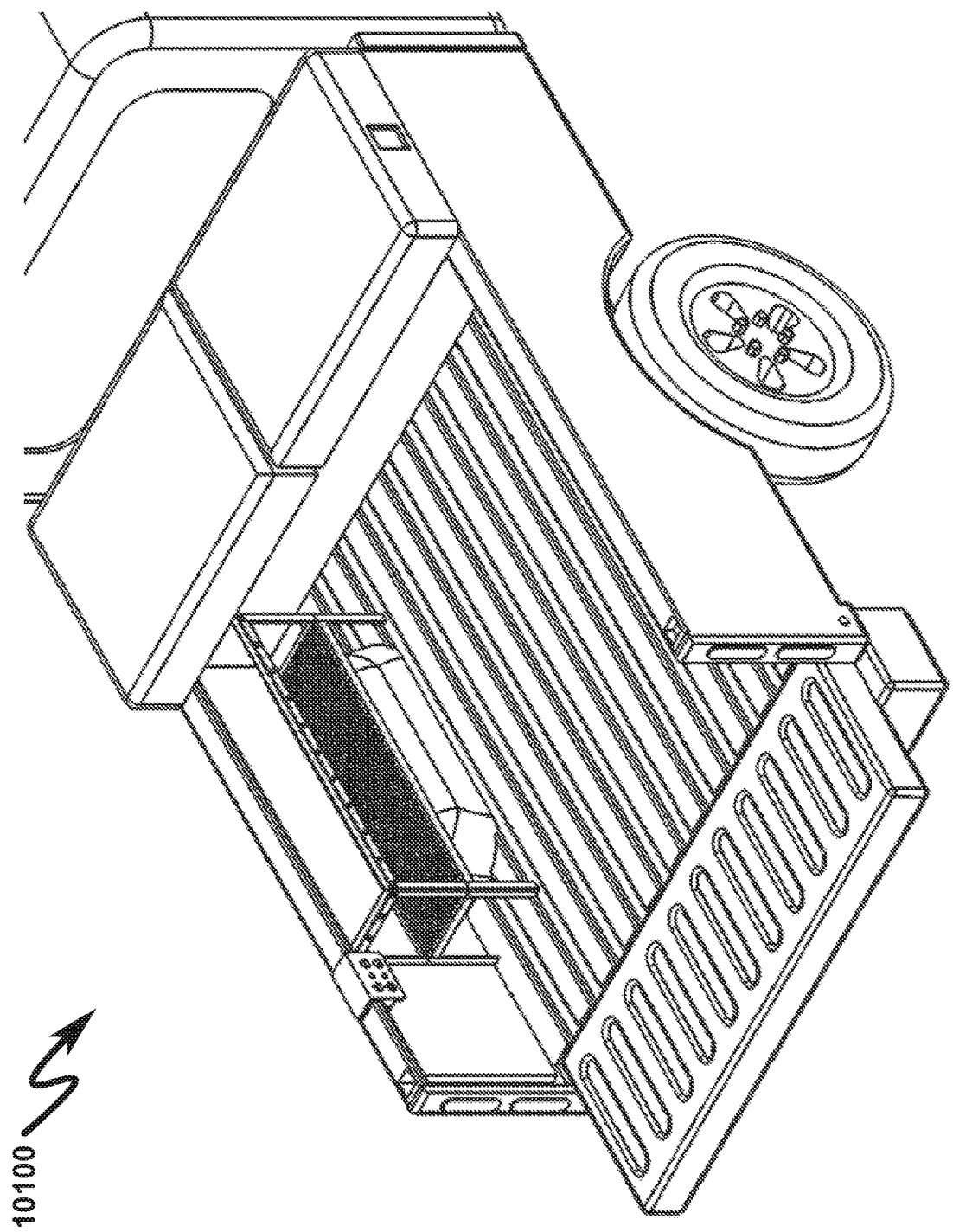
FIG. 101 illustrates a top right front perspective view of an exemplary wheel-well storage rack (WSR) as applied to the left wheel-well of a pickup truck bed outfitted with a conventional truck storage box.
Figure 102:
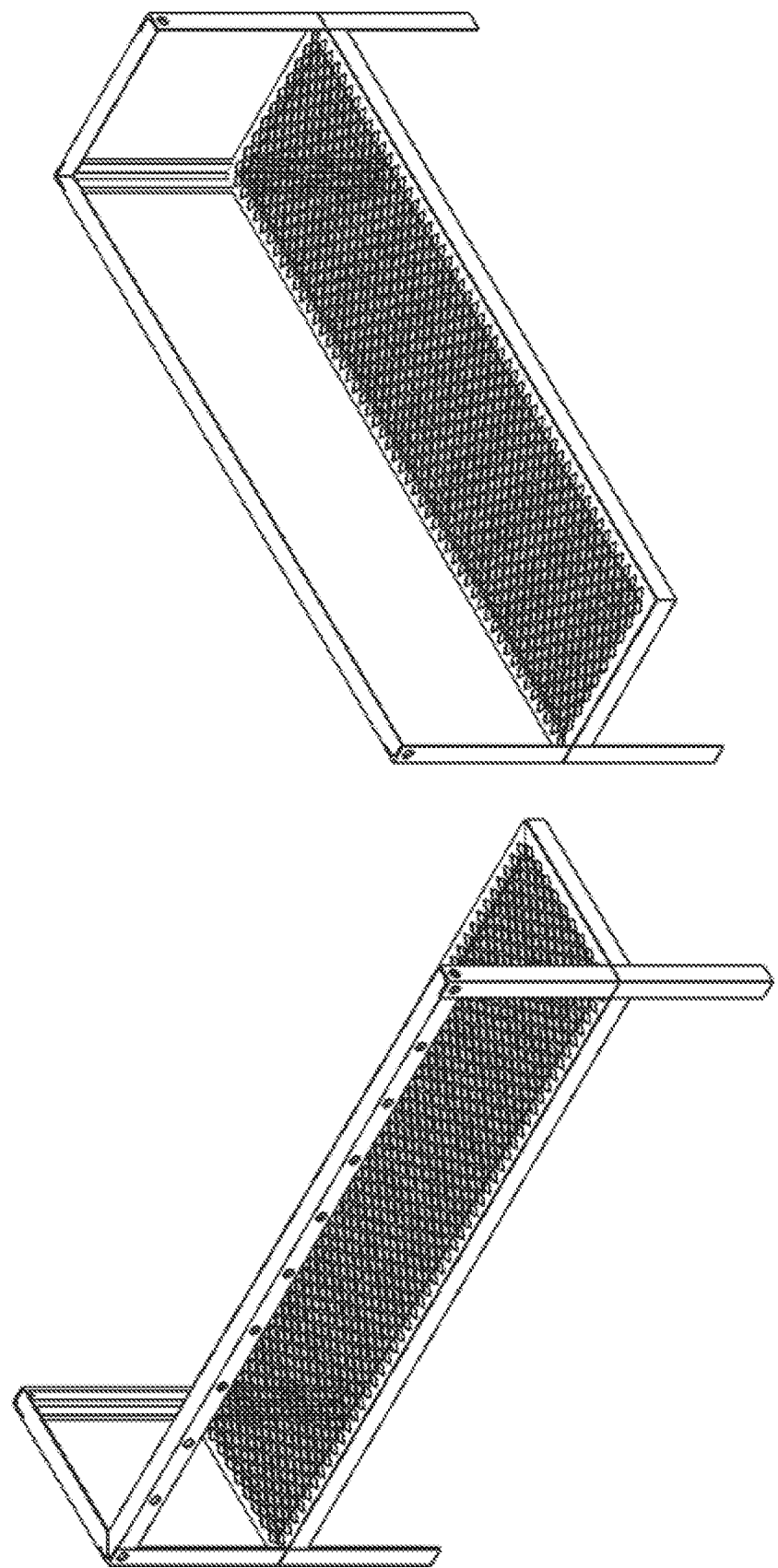
FIG. 102 illustrates top left front and top right front perspective detail views of an exemplary wheel-well storage rack (WSR) designed for left wheel-well placement with a conventional truck storage box.
Figure 103:
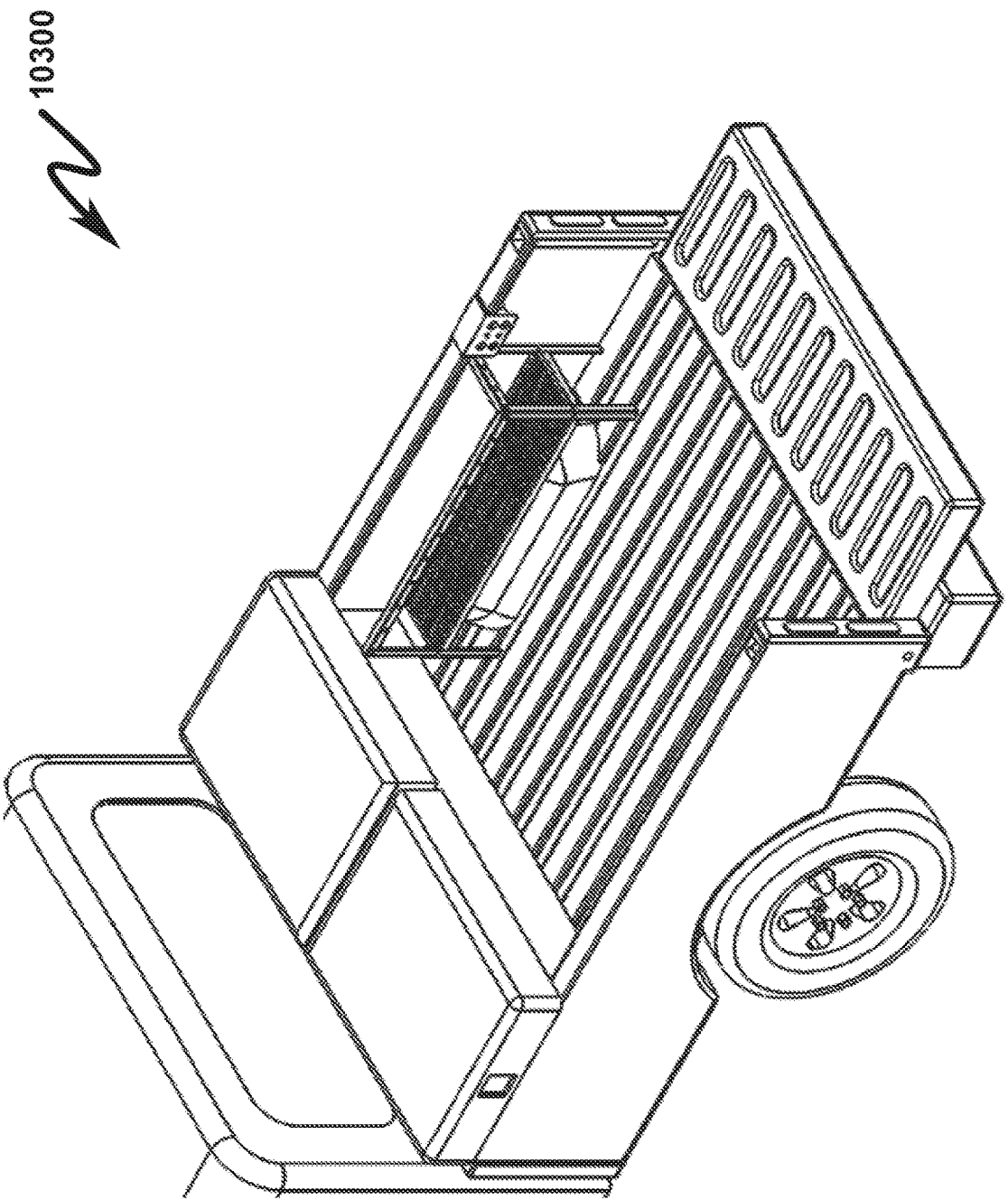
FIG. 103 illustrates a top left front perspective view of an exemplary wheel-well storage rack (WSR) as applied to the right wheel-well of a pickup truck bed outfitted with a conventional truck storage box.

As generally depicted in FIG. 97 (9700)-FIG. 104 (10400), the present invention anticipates a variety of wheel-well storage rack (WSR) configurations. FIG. 97 (9700)-FIG. 100 (10000) depict a four-post WSR configuration that is placed above the left and/or right wheel-well of the pickup truck bed. In situations where the pickup truck is configured with a conventional truck storage box as depicted in FIG. 101 (10100) and FIG. 103 (10300), the WSR may be configured in left-handed configurations as depicted in FIG. 102 (10200) and right-handed configurations as depicted in FIG. 104 (10400) that allow the truck storage box to be installed without interference with the WSR while still permitting safe and secure storage of items in the previously unusable space above the wheel-wells.

WSR Mounting Bracket (10500)-(11200)

Figure 105:
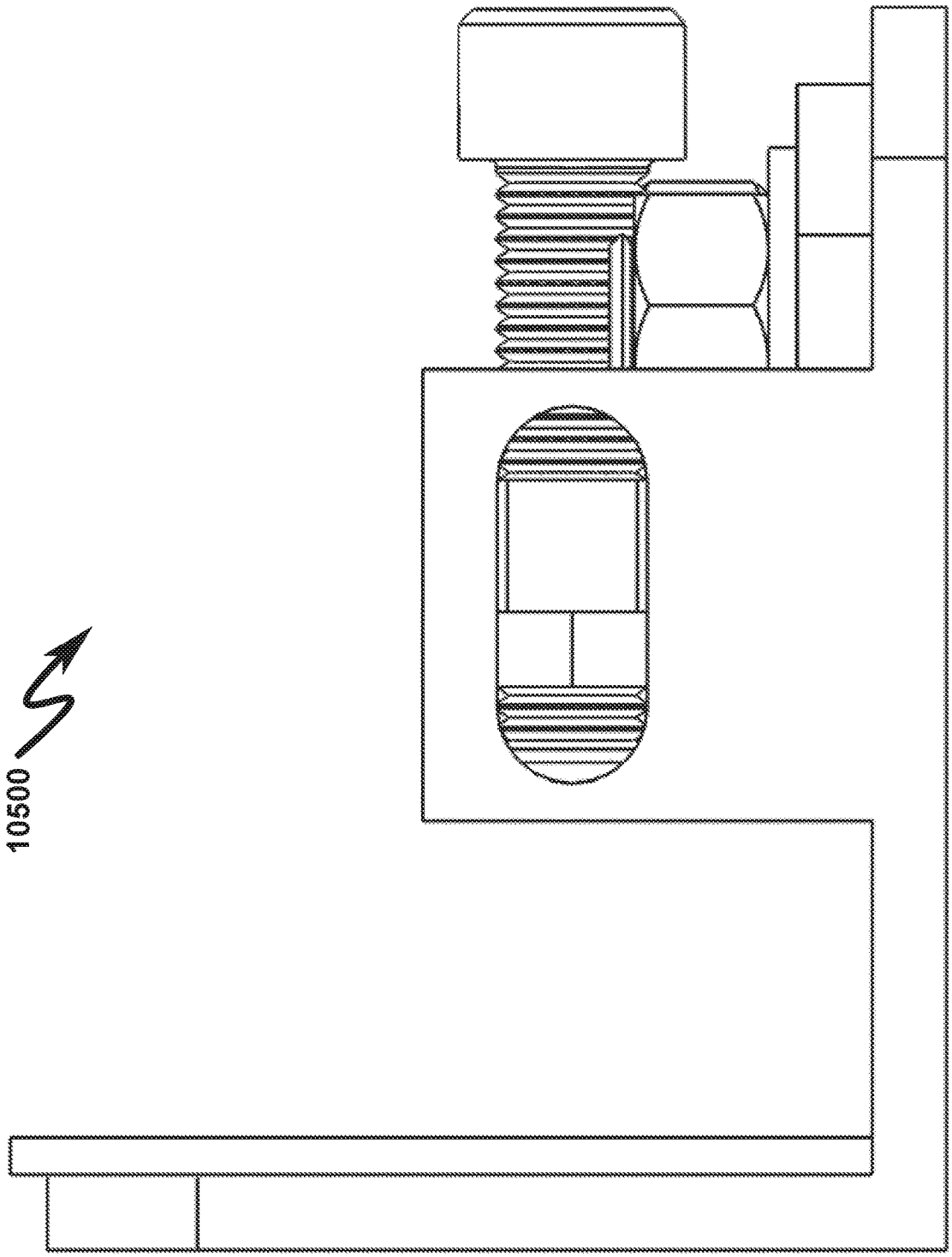
FIG. 105 illustrates a front view of a WSR non-penetrating mounting bracket useful in some preferred invention embodiments.
Figure 106:
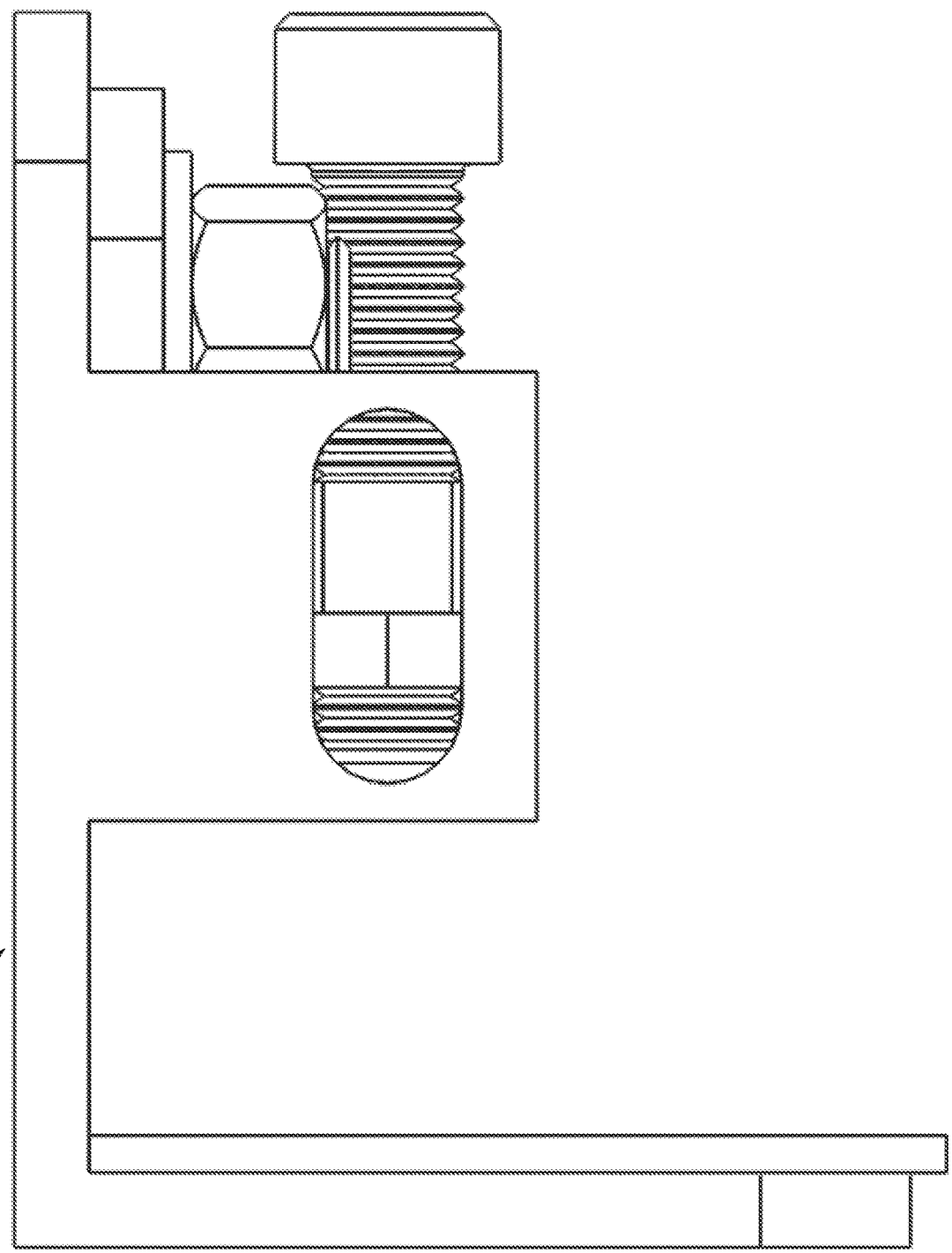
FIG. 106 illustrates a back view of a WSR non-penetrating mounting bracket useful in some preferred invention embodiments.
Figure 107:
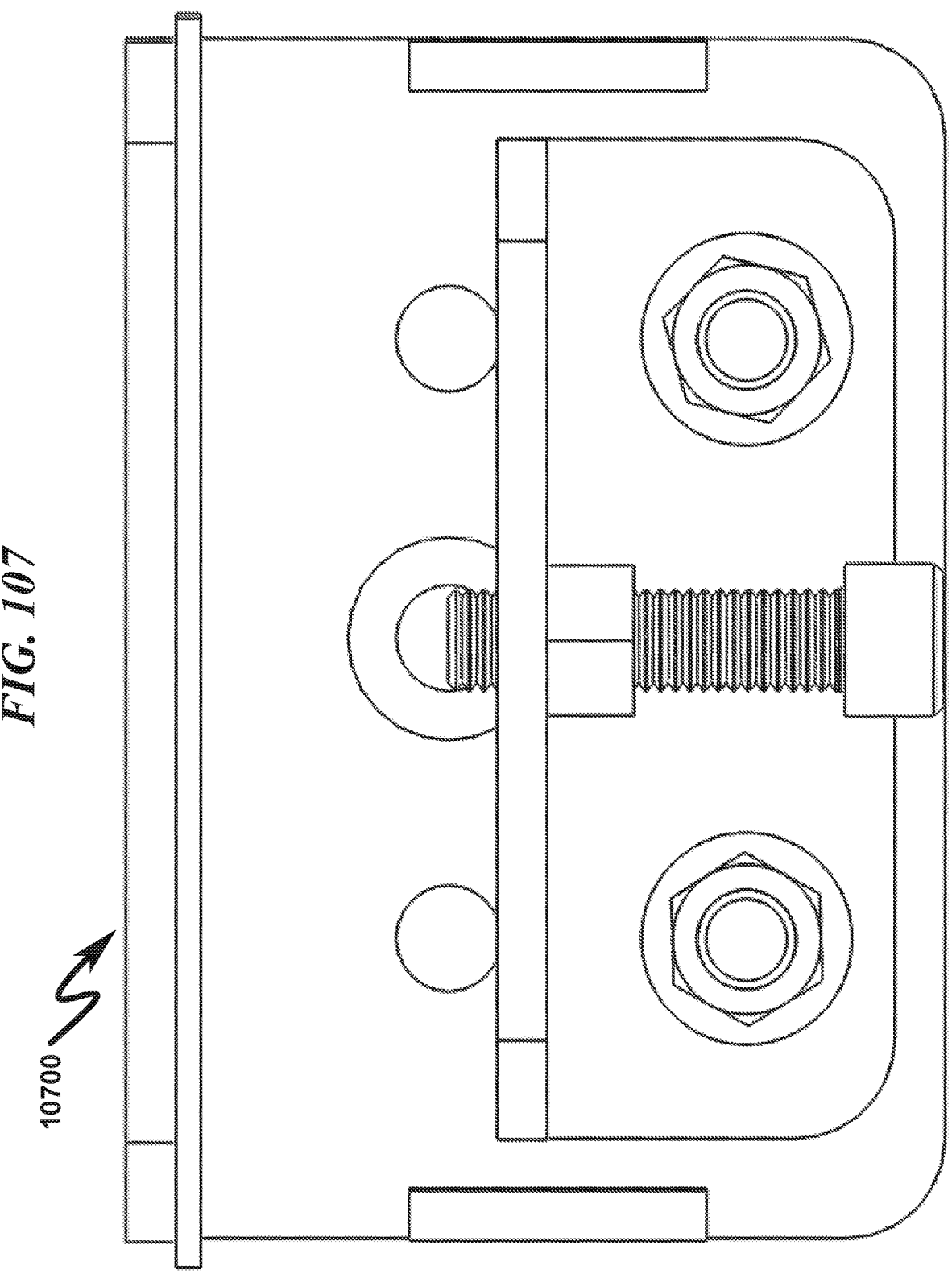
FIG. 107 illustrates a right side view of a WSR non-penetrating mounting bracket useful in some preferred invention embodiments.
Figure 108:
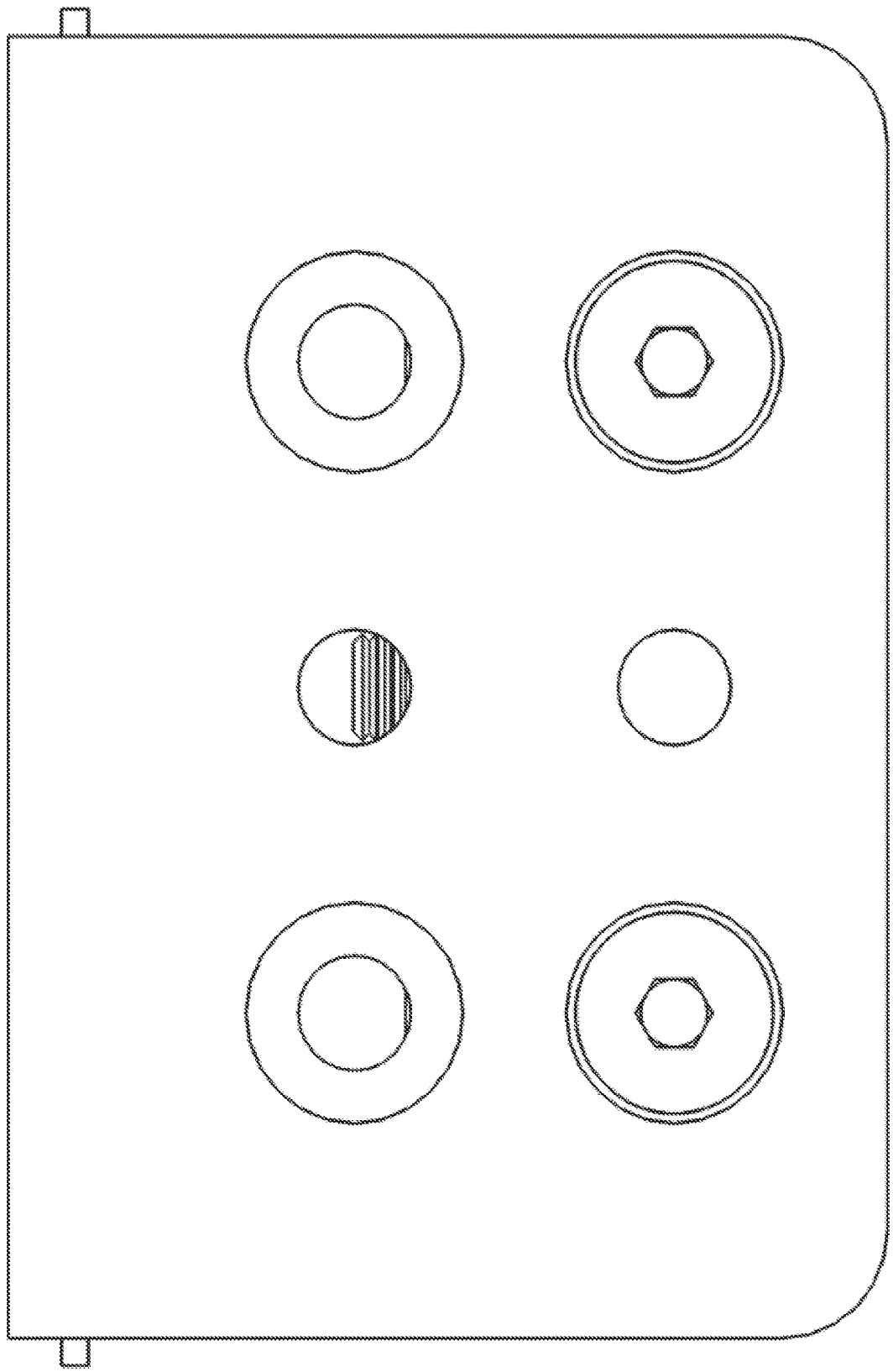
FIG. 108 illustrates a left side view of a WSR non-penetrating mounting bracket useful in some preferred invention embodiments.
Figure 110:
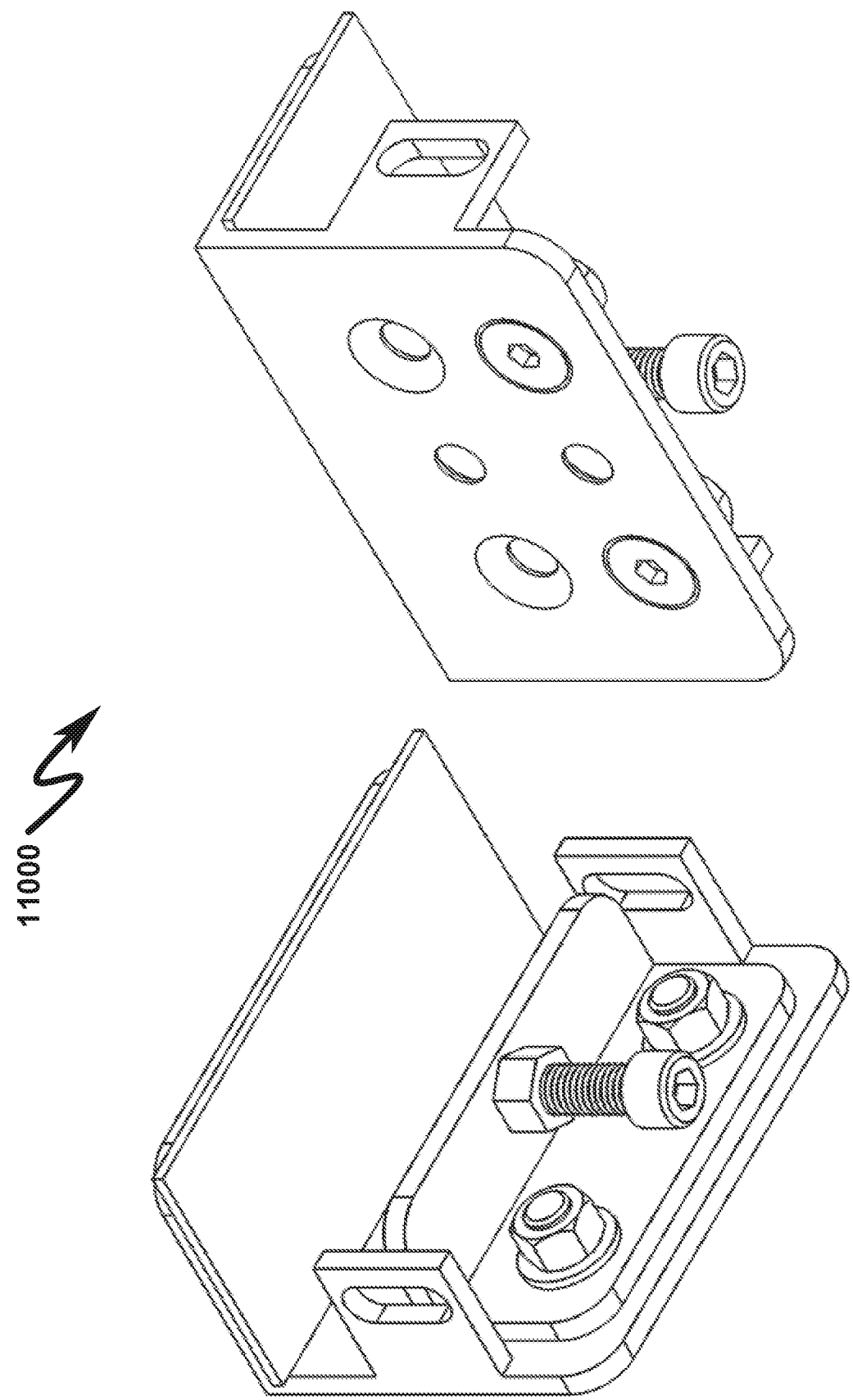
FIG. 110 illustrates bottom right and left front perspective views of a WSR non-penetrating mounting bracket useful in some preferred invention embodiments.
Figure 111:
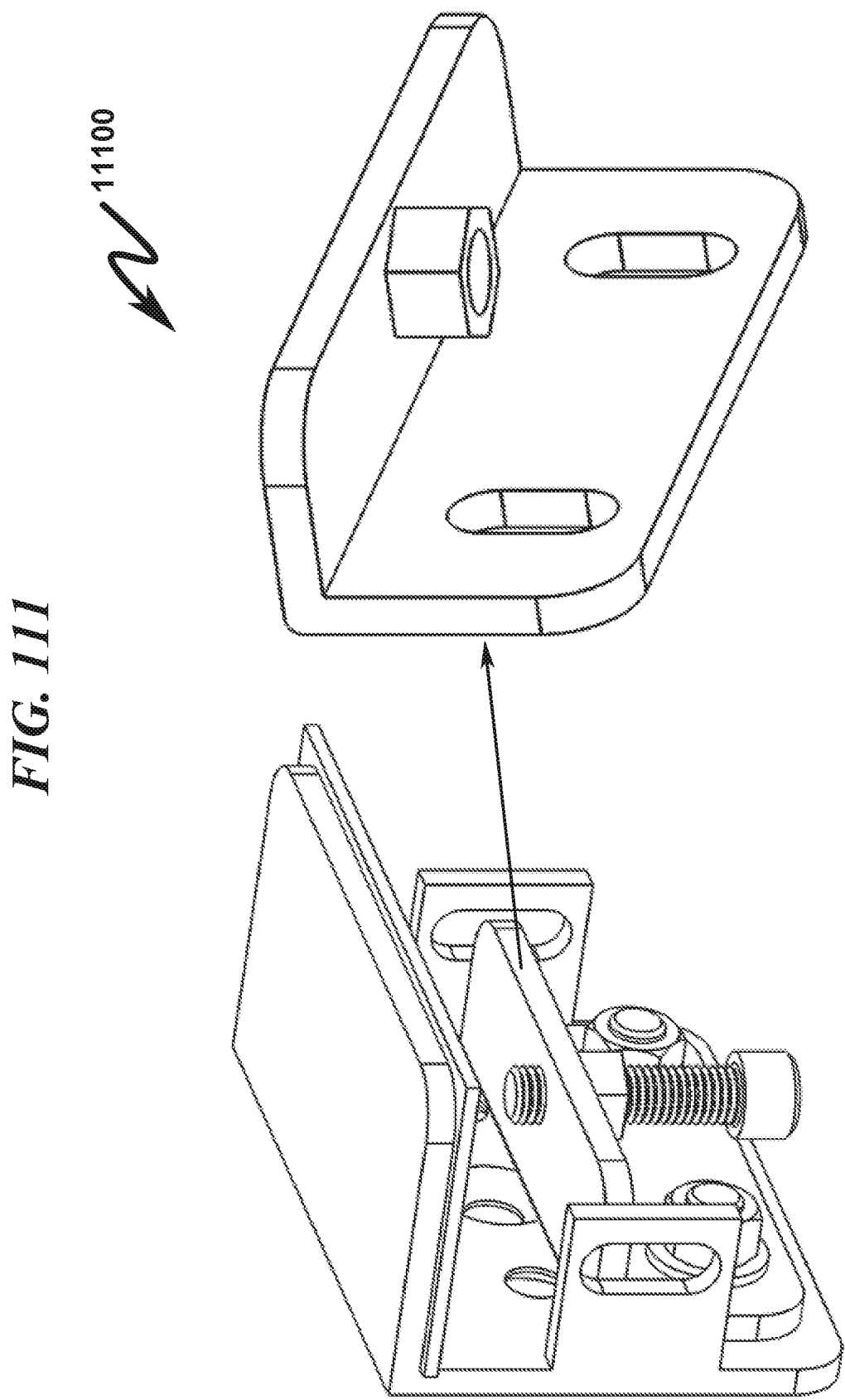
FIG. 111 illustrates a top right front perspective detail view of a WSR non-penetrating mounting bracket useful in some preferred invention embodiments.
Figure 112:
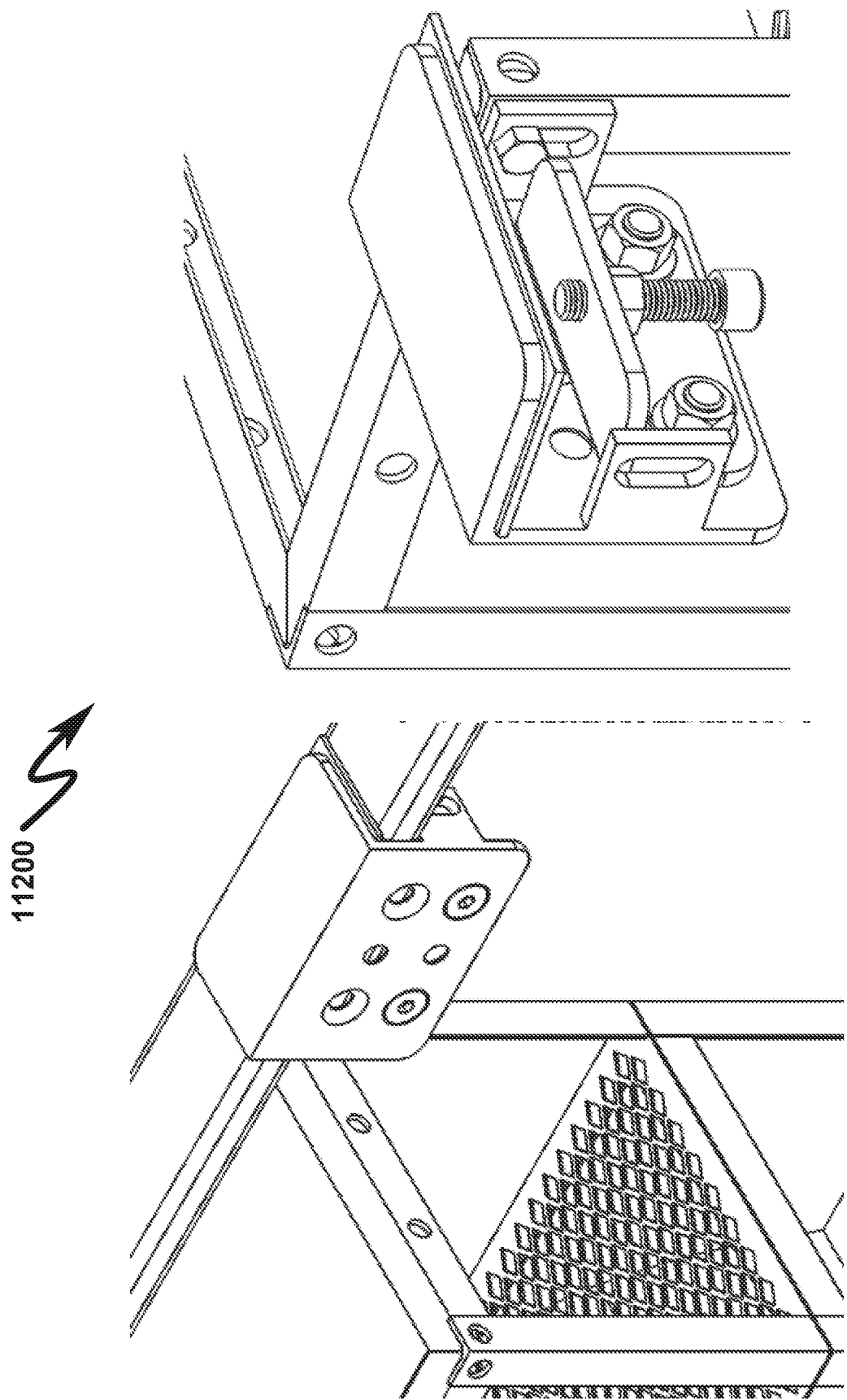
FIG. 112 illustrates top left and right perspective views of a WSR non-penetrating mounting bracket useful in some preferred invention embodiments attached to a pickup truck bed sidewall with additional detail depicting fastening of the WSR bracket to the WSR.

The WSR in some configurations provides support for the tool rack described herein. To provide support for the WSR with respect to the truck bed a WSR mounting bracket may be included in the system as generally depicted in FIG. 105 (10500)-FIG. 11200). This mounting bracket is a variation of the UBA depicted in FIG. 65 (6500)-FIG. 72 (7200) and in some circumstances may be configured as a single bracket assembly for use in both scenarios by implementing the T-structure depicted in FIG. 65 (6500)-FIG. 72 (7200) in the configuration depicted in FIG. 105 (10500)-FIG. 11200). FIG. 11200) depicts the WSR bracket mounted to the pickup truck bed sidewall with additional detail illustrating fastening of the WSR bracket to the WSR frame.

DTS/ETS/VSM Variations (11300)-(12000)

Figure 113:
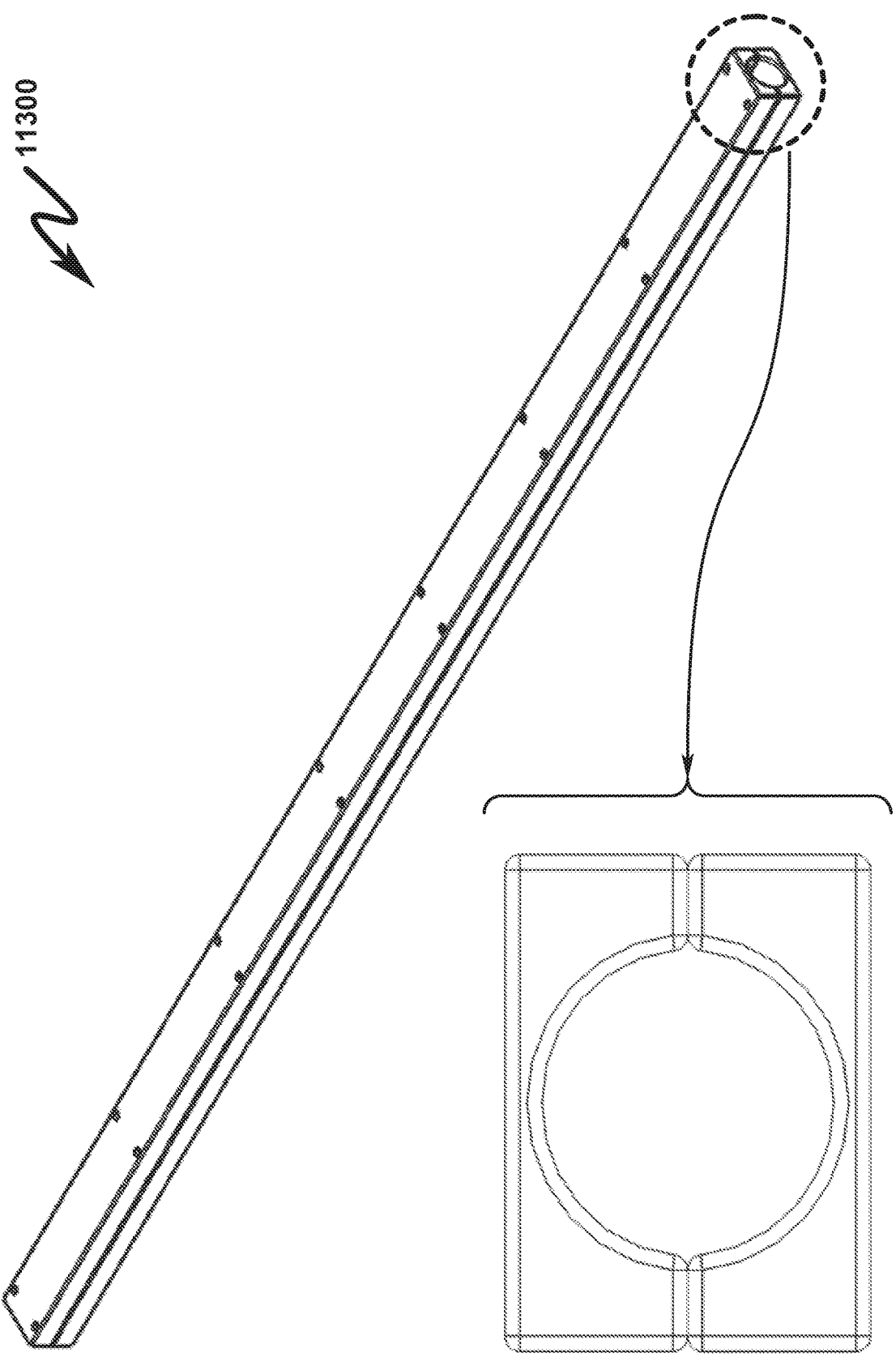
FIG. 113 illustrates an ETS member configured for a 1-slot tubular stack.
Figure 114:
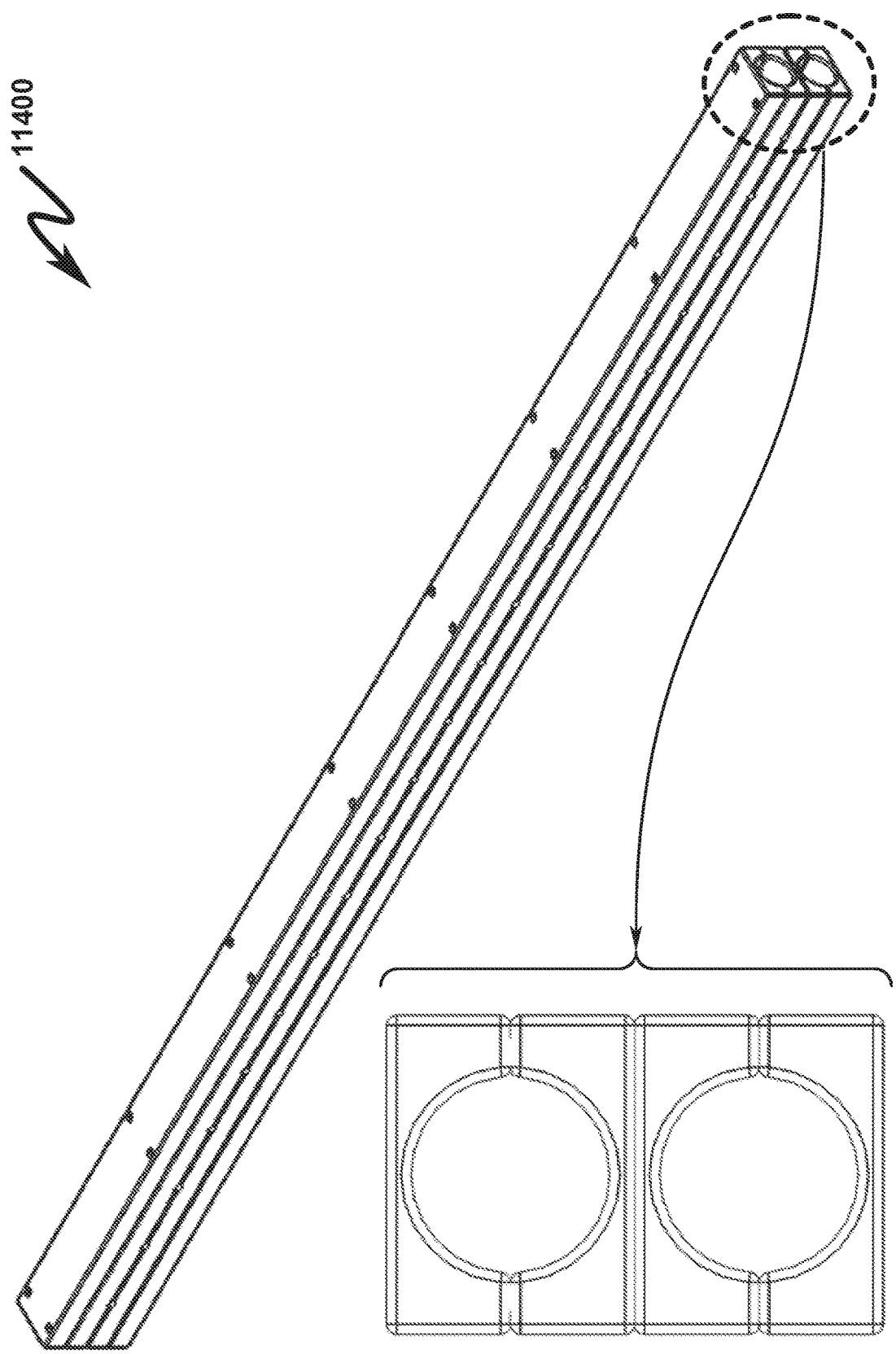
FIG. 114 illustrates an ETS member configured for a 2-slot tubular stack.
Figure 115:
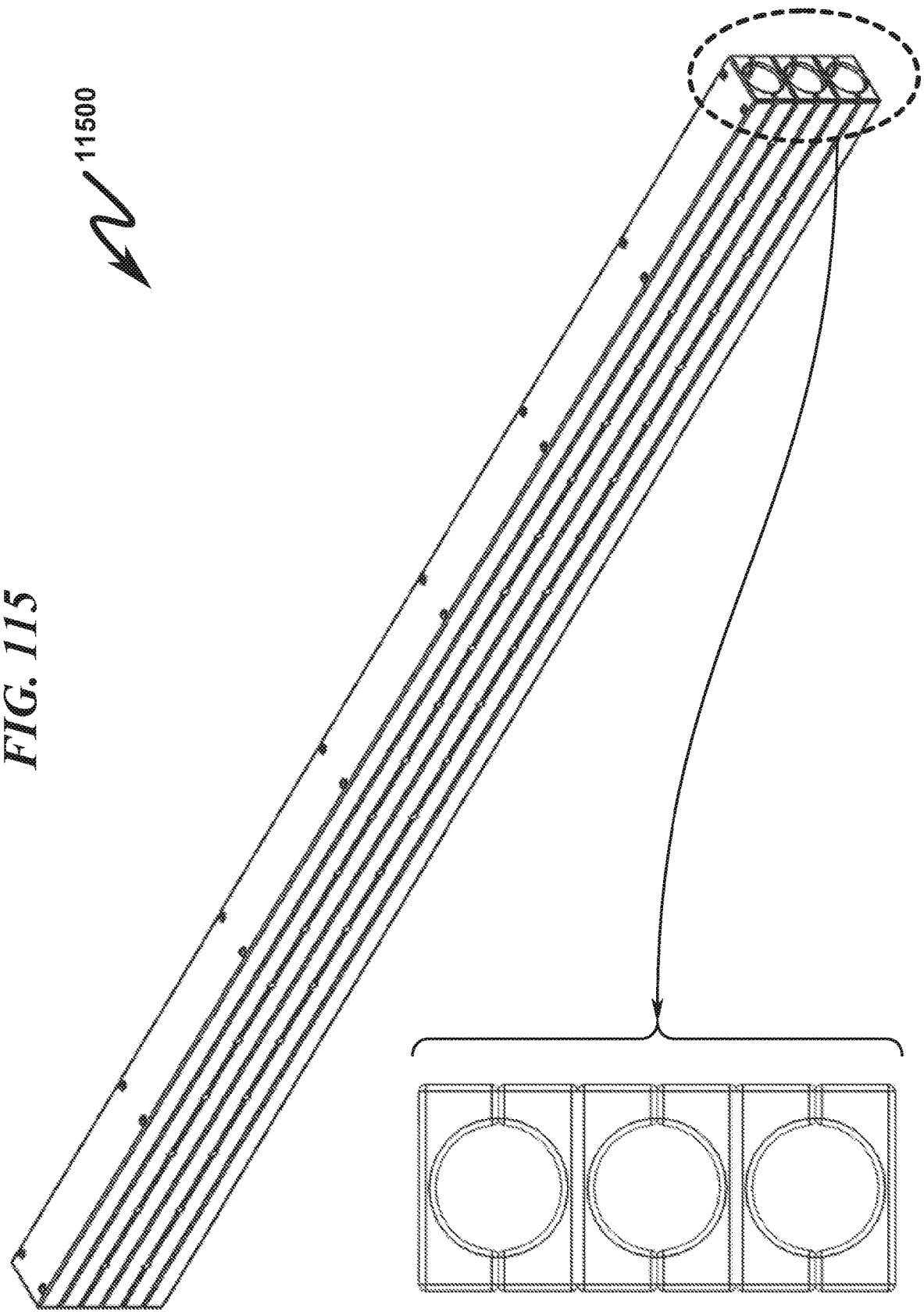
FIG. 115 illustrates an ETS member configured for a 3-slot tubular stack.
Figure 116:
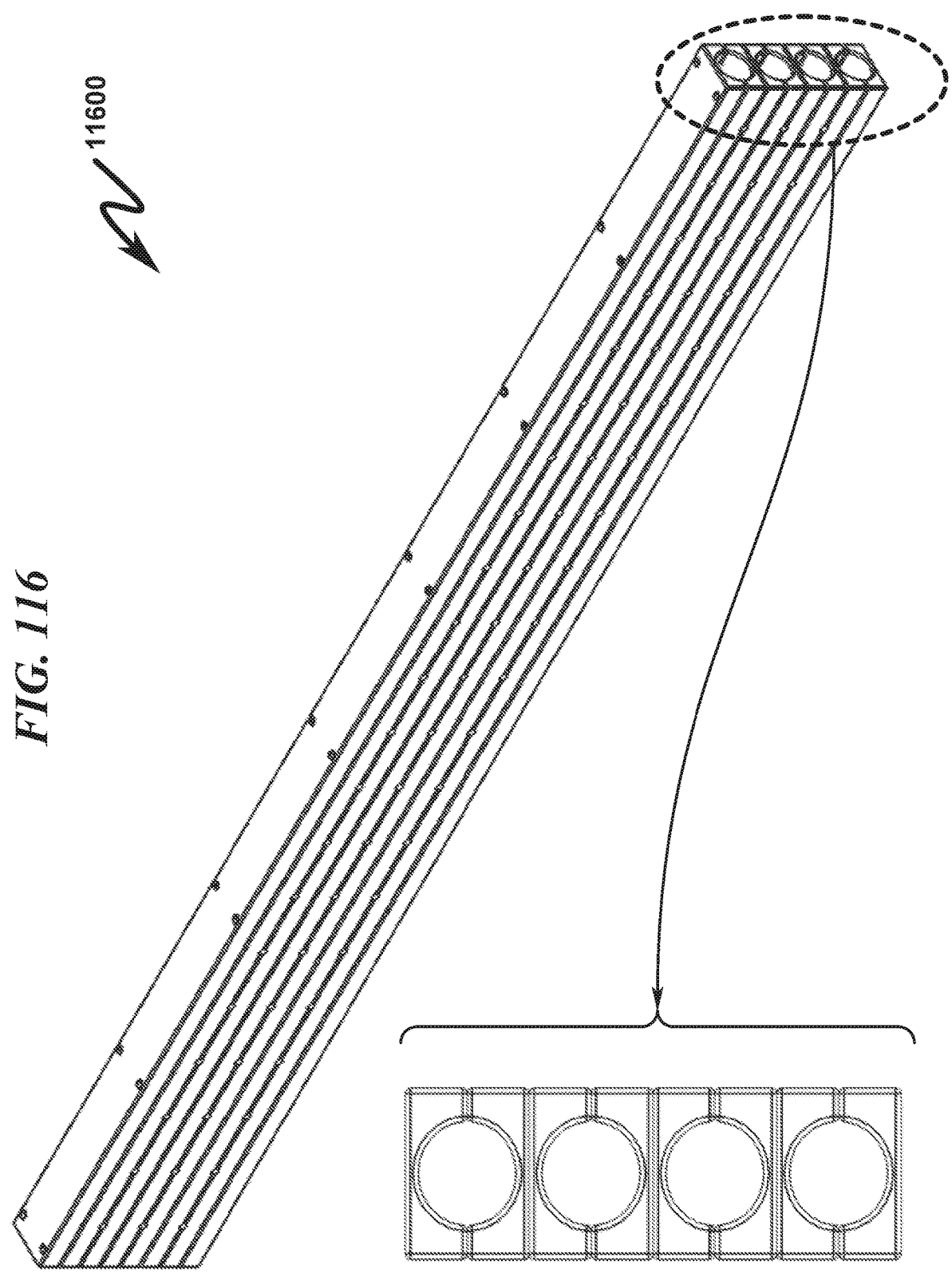
FIG. 116 illustrates an ETS member configured for a 4-slot tubular stack.
Figure 120:
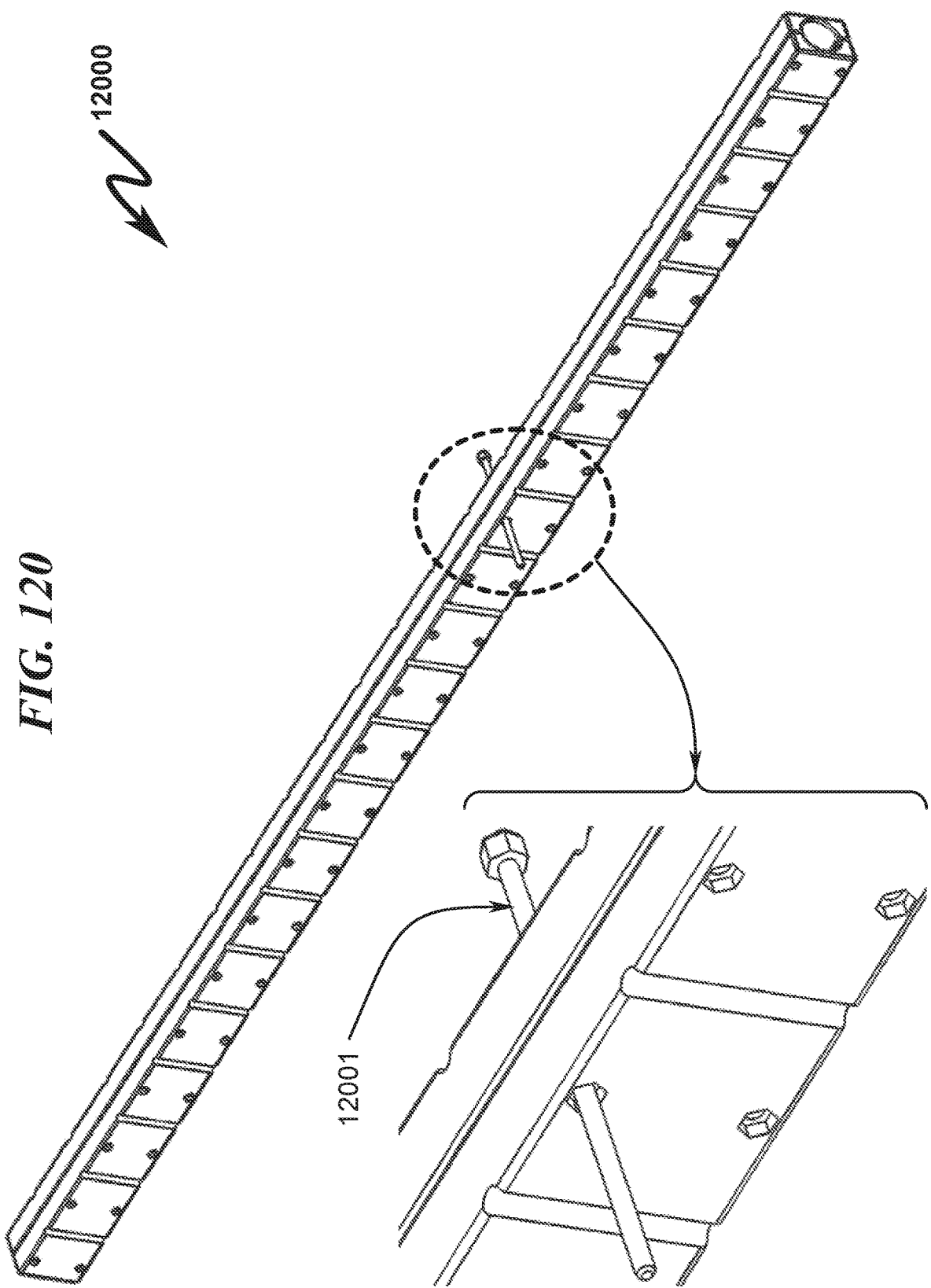

The unified extrusion embodiments of the present invention may incorporate a variety of stacking methodologies for the DTS/ETS/VSM members as generally depicted in FIG. 113 (11300)-FIG. 120 (12000). FIG. 113 (11300) generally depicts an ETS member configured for a 1-slot tubular stack. FIG. 114 (11400) generally depicts an ETS member configured for a 2-slot tubular stack. FIG. 115 (11500) generally depicts an ETS member configured for a 3-slot tubular stack. FIG. 116 (11600) generally depicts an ETS member configured for a 4-slot tubular stack. These variations may be equally applied to the DTS/ETS/VSM structures taught herein.

Figure 117:
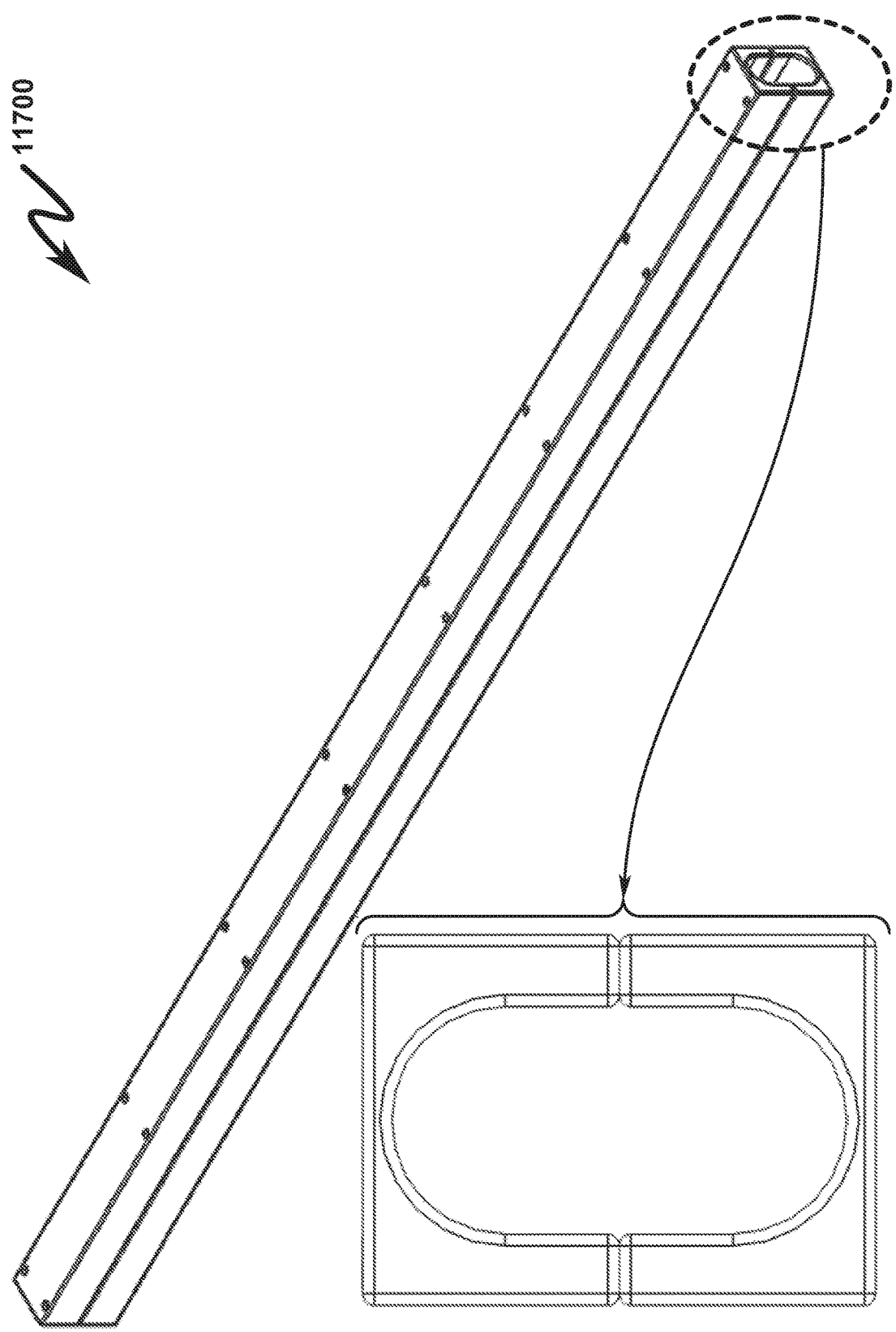
FIG. 117 illustrates an ETS member configured for a 1-slot tubular stack incorporating semi-circular edge on the extrusion void profile.
Figure 118:
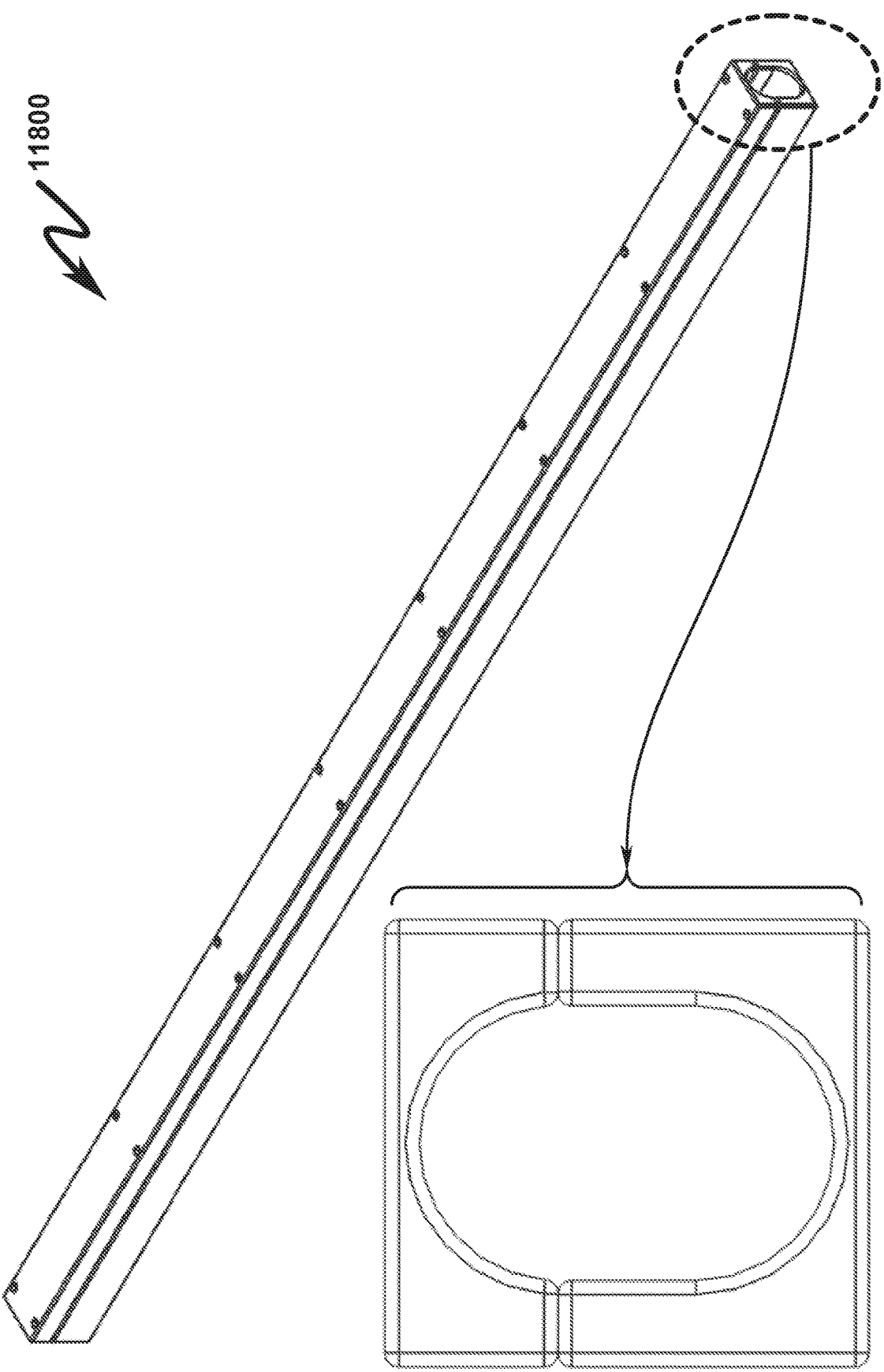
FIG. 118 illustrates an ETS member configured for a 1-slot tubular stack incorporating disparate edge void profiles on the top and bottom extrusions.

FIG. 117 (11700) depicts a variation of the extrusion profile that is elongated and FIG. 118 (11800) illustrates that extrusion profiles may be mixed-and-matched as necessary to customize the storage capability of the tool rack.

Figure 119:
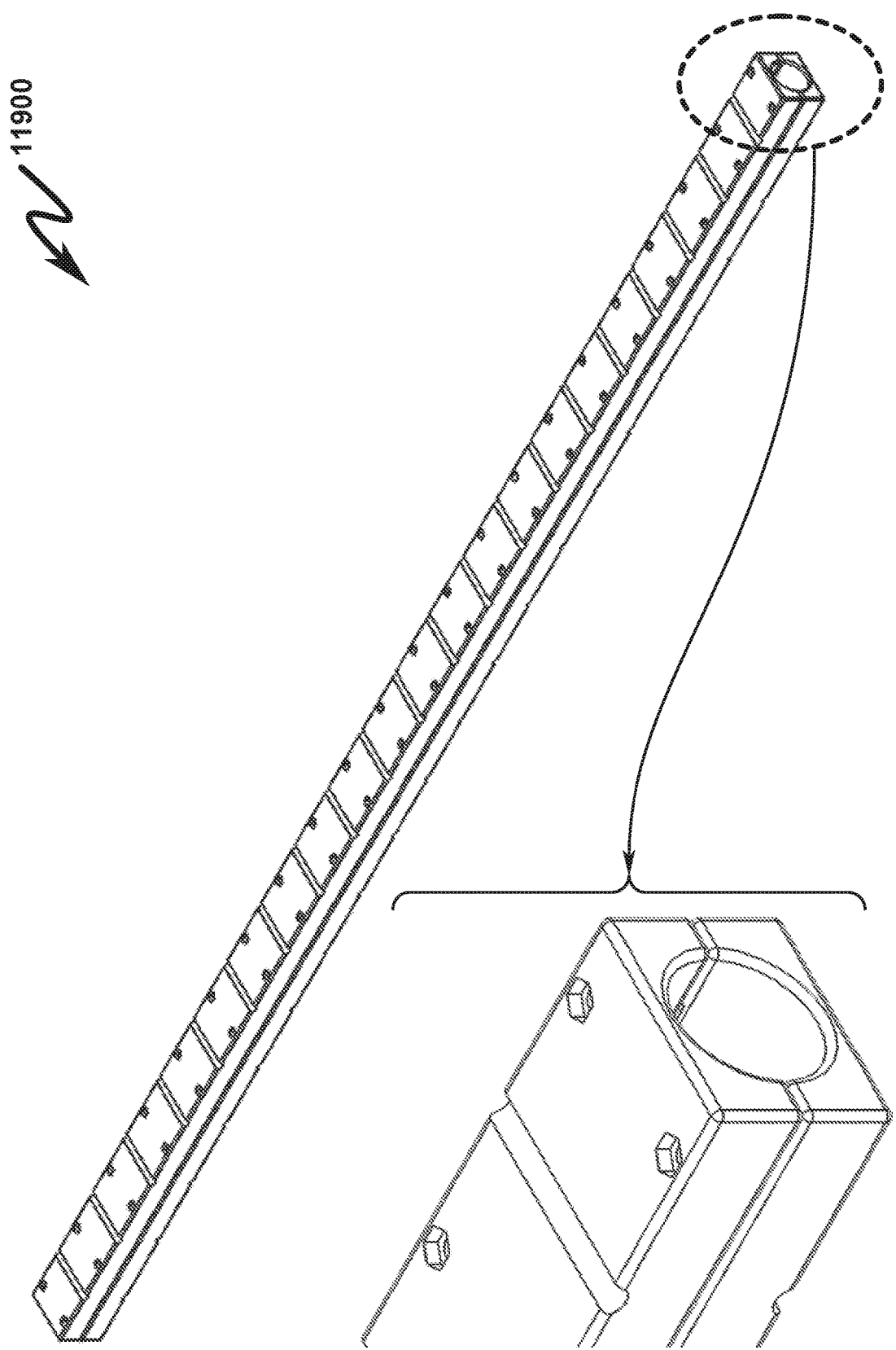

FIG. 119 (11900) illustrates an option in which a singular type of extrusion is used for all DTS/ETS/VSM structures. This variation omits the top/bottom vanity extrusions that do not incorporate the transverse mounting voids (TMV) that are generally present in the middle extrusion members within a tubular stack assembly. Generally speaking, the TMV are used to mate the assembled tubular stack to a UMB or the WSR to provide support for the tool rack. However, as depicted in FIG. 120 (12000), it is possible in some circumstances to use the assembly stack drills (ASD) within the extrusion members to affix the assembled tubular stack to the UMB/WSR via an appropriately chosen fastener (12001).

Universal T-Joint Construction (12100)-(12800)

Figure 121:
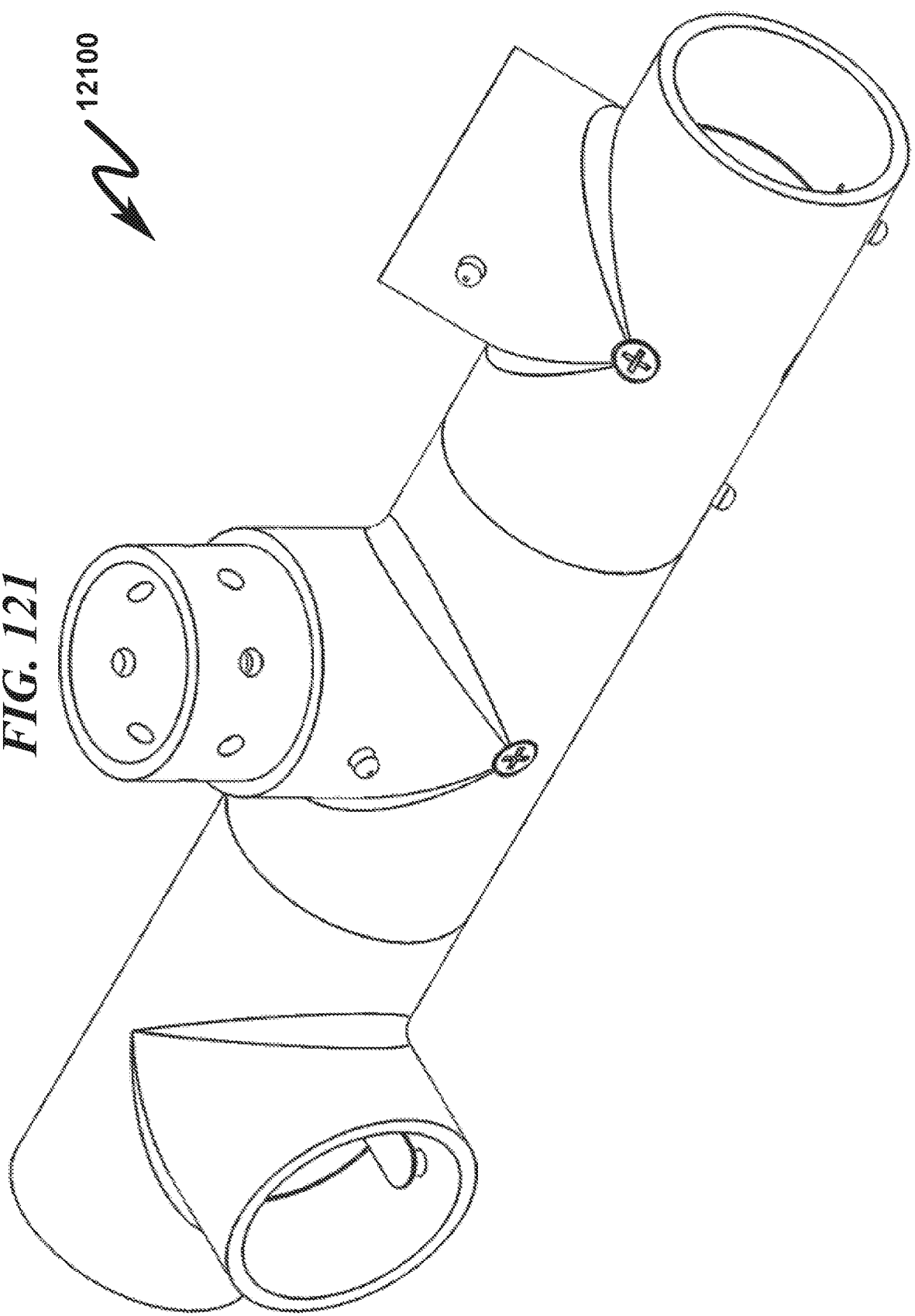
Figure 122:
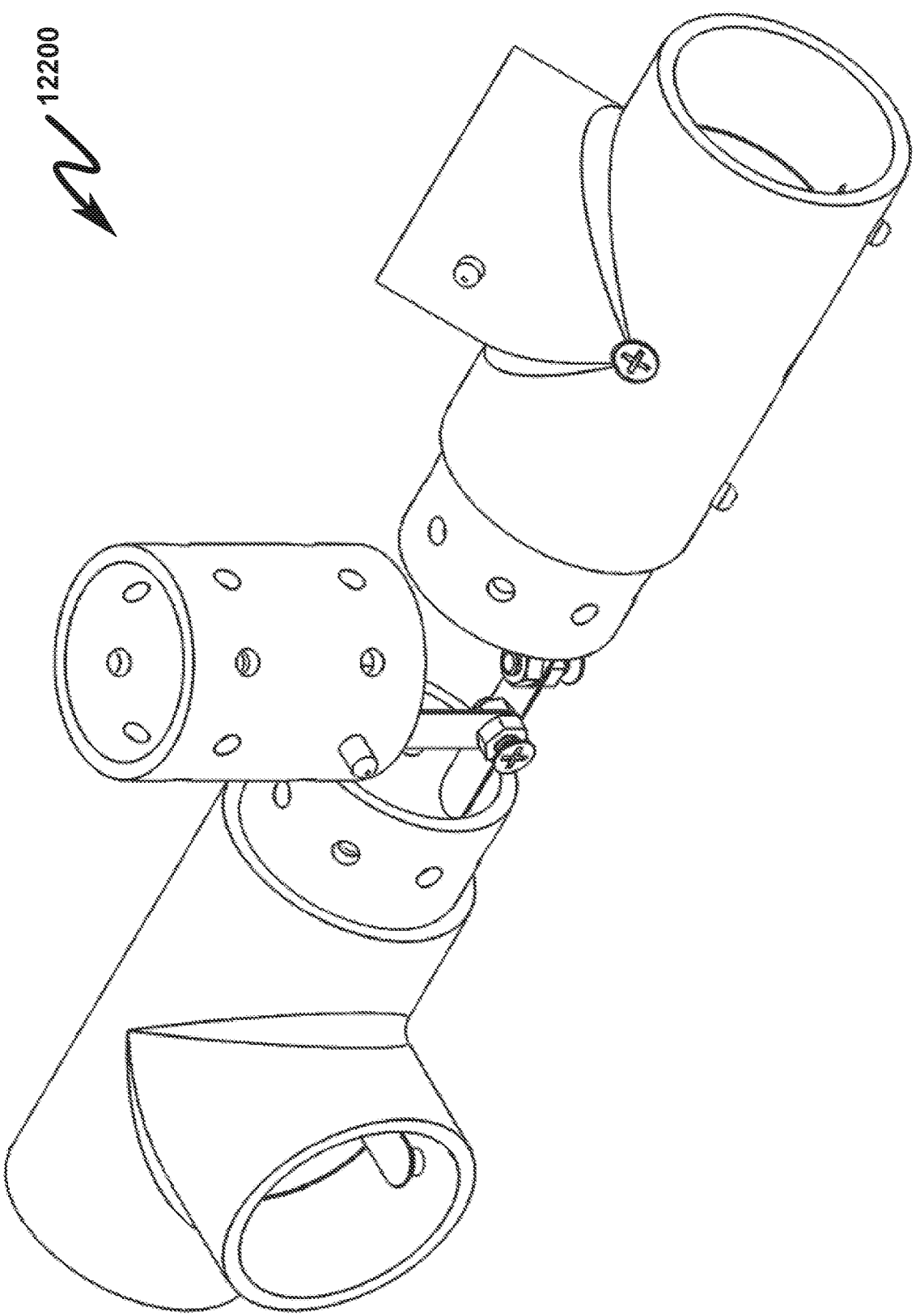
Figure 123:
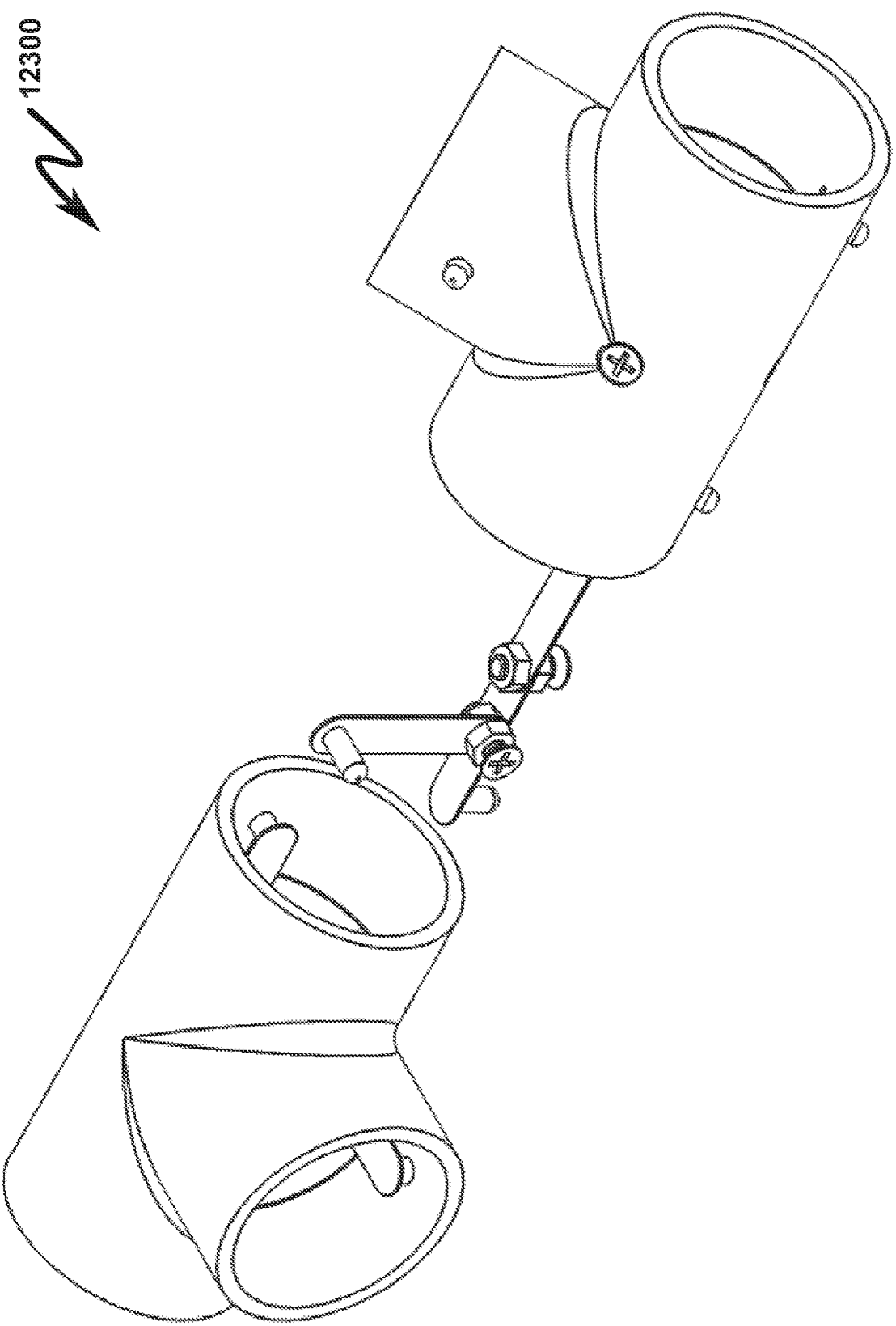
Figure 124:
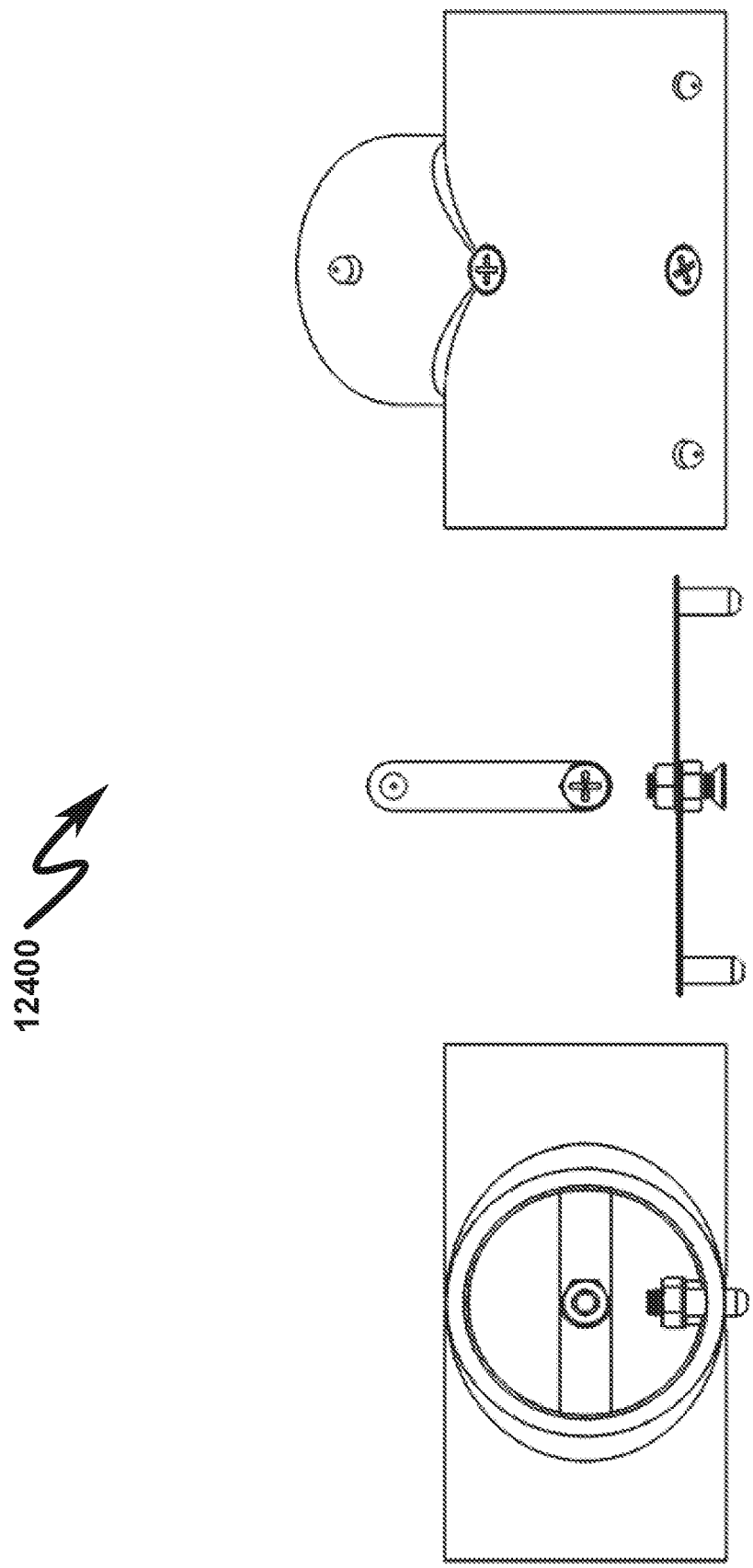
Figure 125:
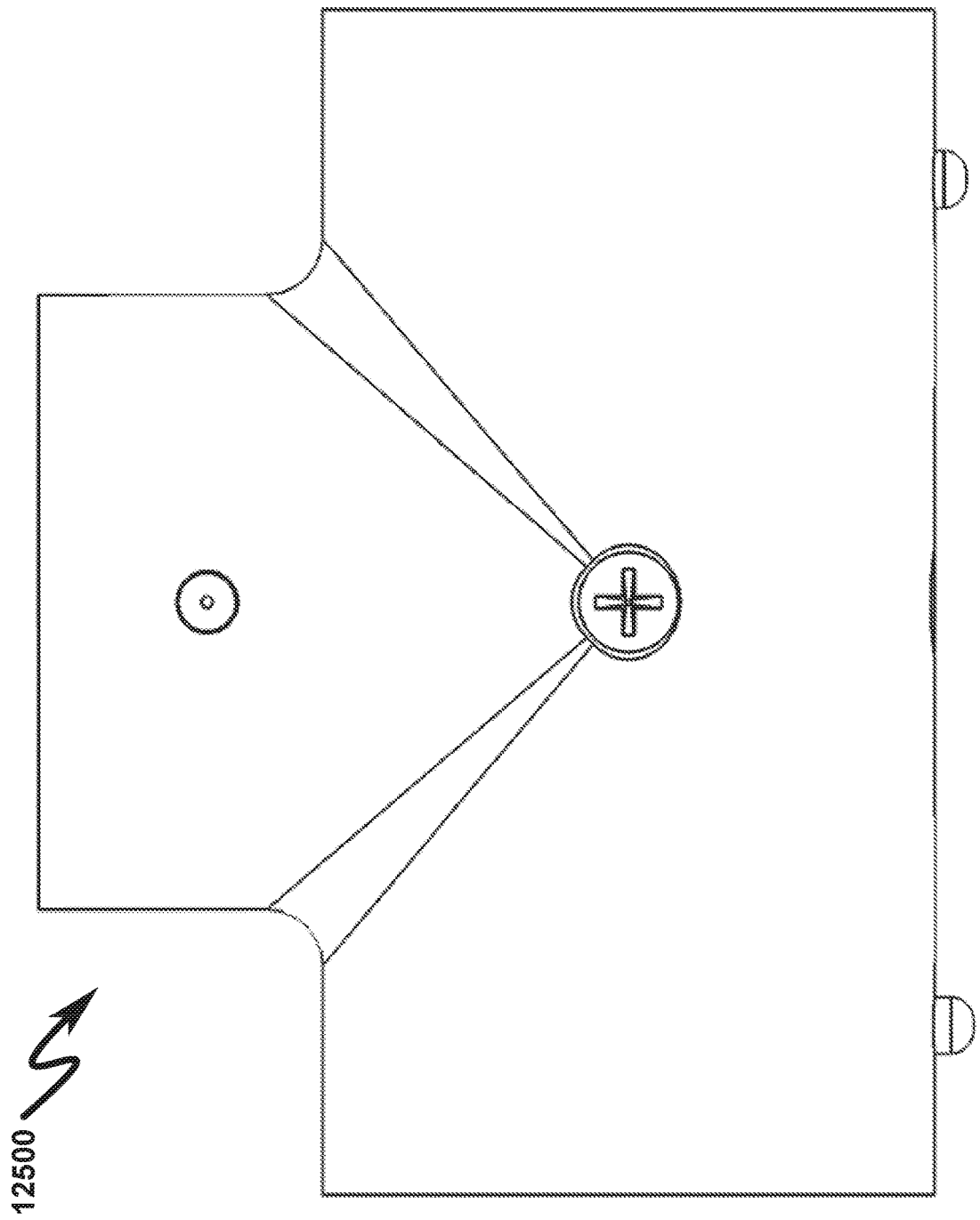
Figure 126:
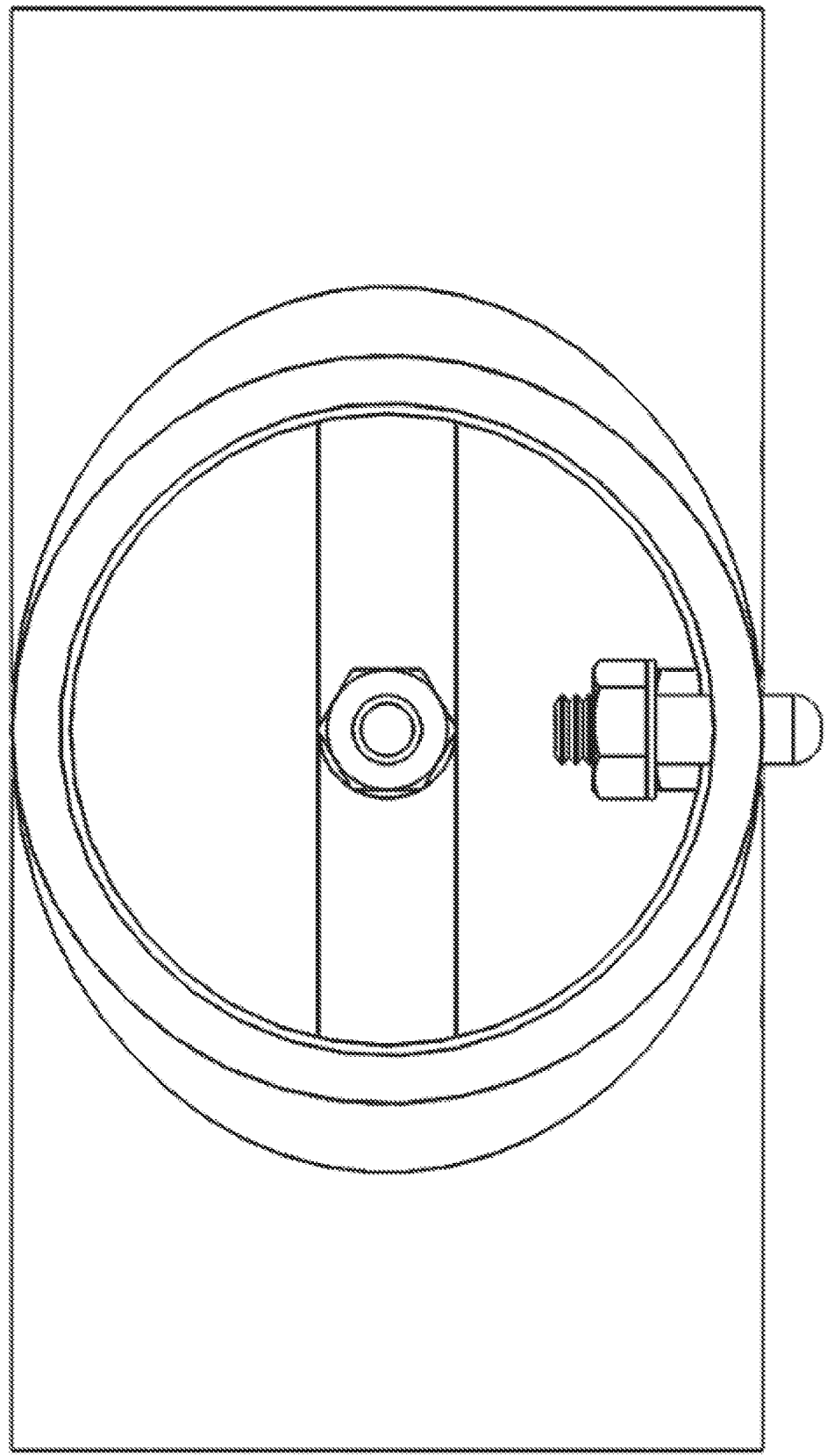
Figure 128:
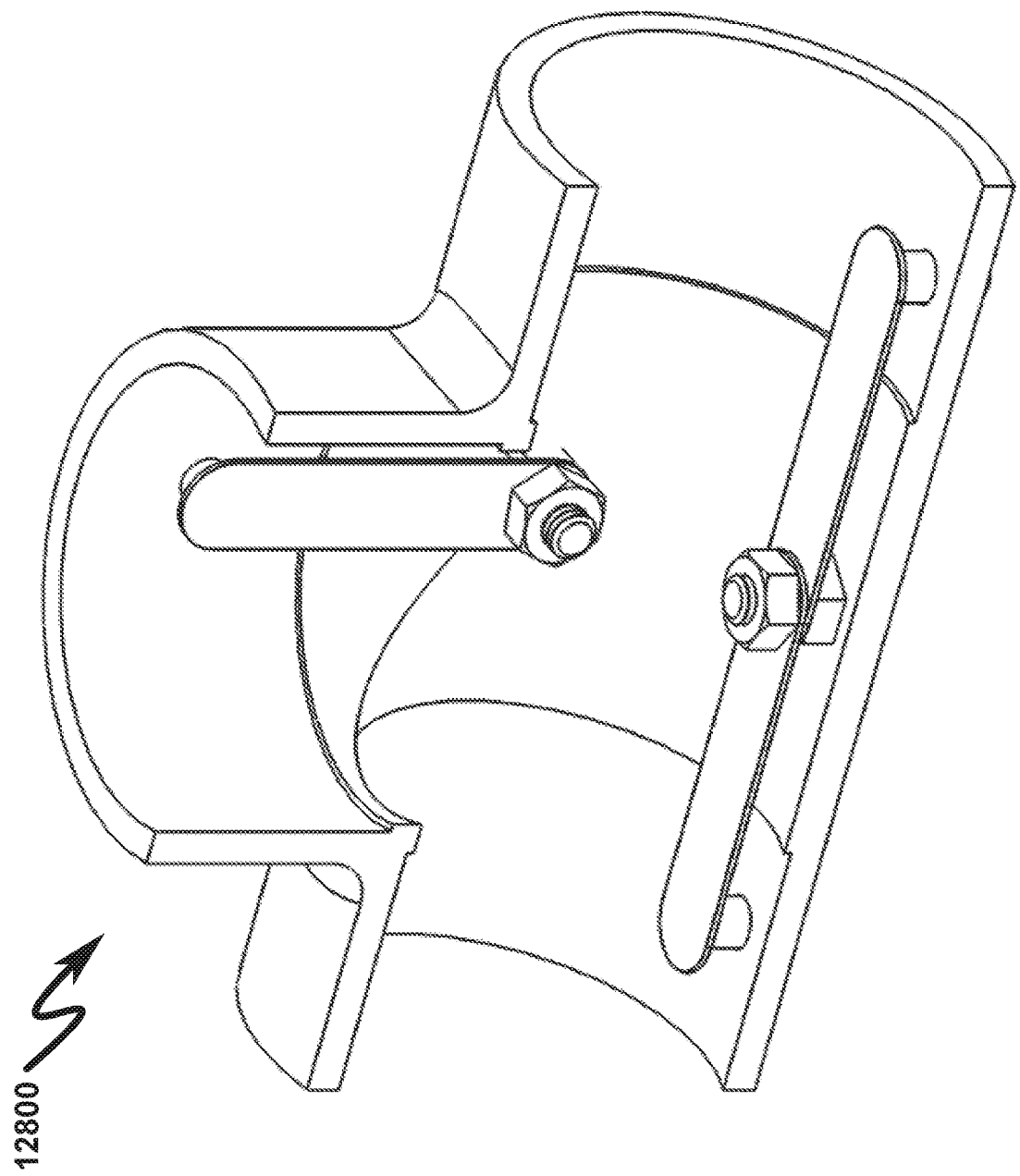

The present invention may in some preferred embodiments make use of universal T-joint construction as depicted generally in FIG. 121 (12100)-FIG. 128 (12800). Here it can be seen that a universal T-joint structure may be mated with pipe/tubing that has been drill indexed at various circumferential locations to allow articulation of the individual T-joint members and pipe/tubing. The pipe/tubing depicted in these drawings may be of any length but is illustrated in short sections to depict a smooth interface between T-joints for aesthetic purposes.

Similar spring steel detent structures as depicted in FIG. 96 (9600) may be used here in the universal T-joint to permit one fabricated joint to economically act in a variety of configurations to support RHR configurations as desired. As with other aspects of the present invention, the ability to adjust the tool rack to a variety of application specific conditions in the field is a highly desirable characteristic not present in the prior art.

Dual Hose Rack Configuration (12900)-(13800)

Figure 129:
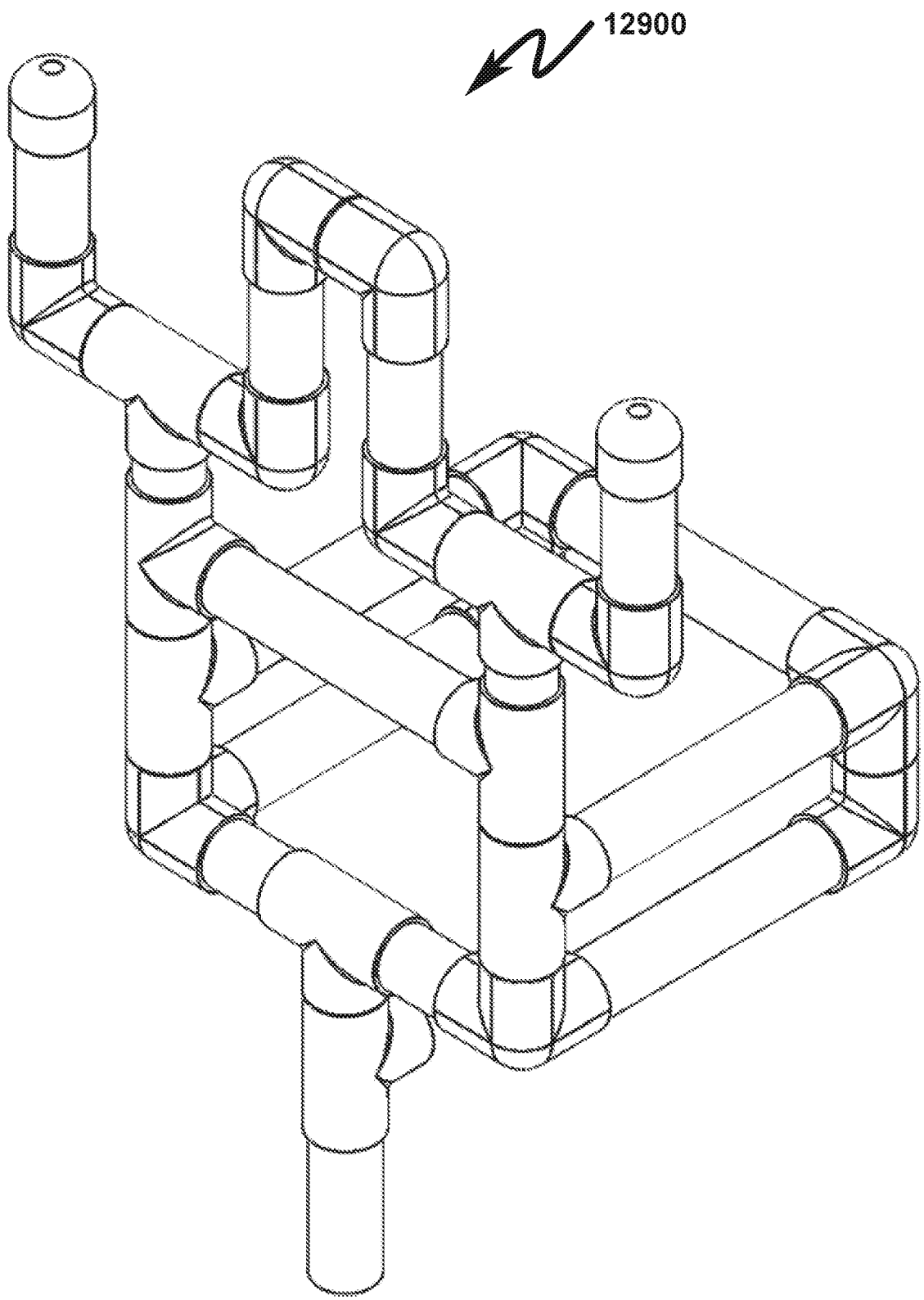
Figure 130:
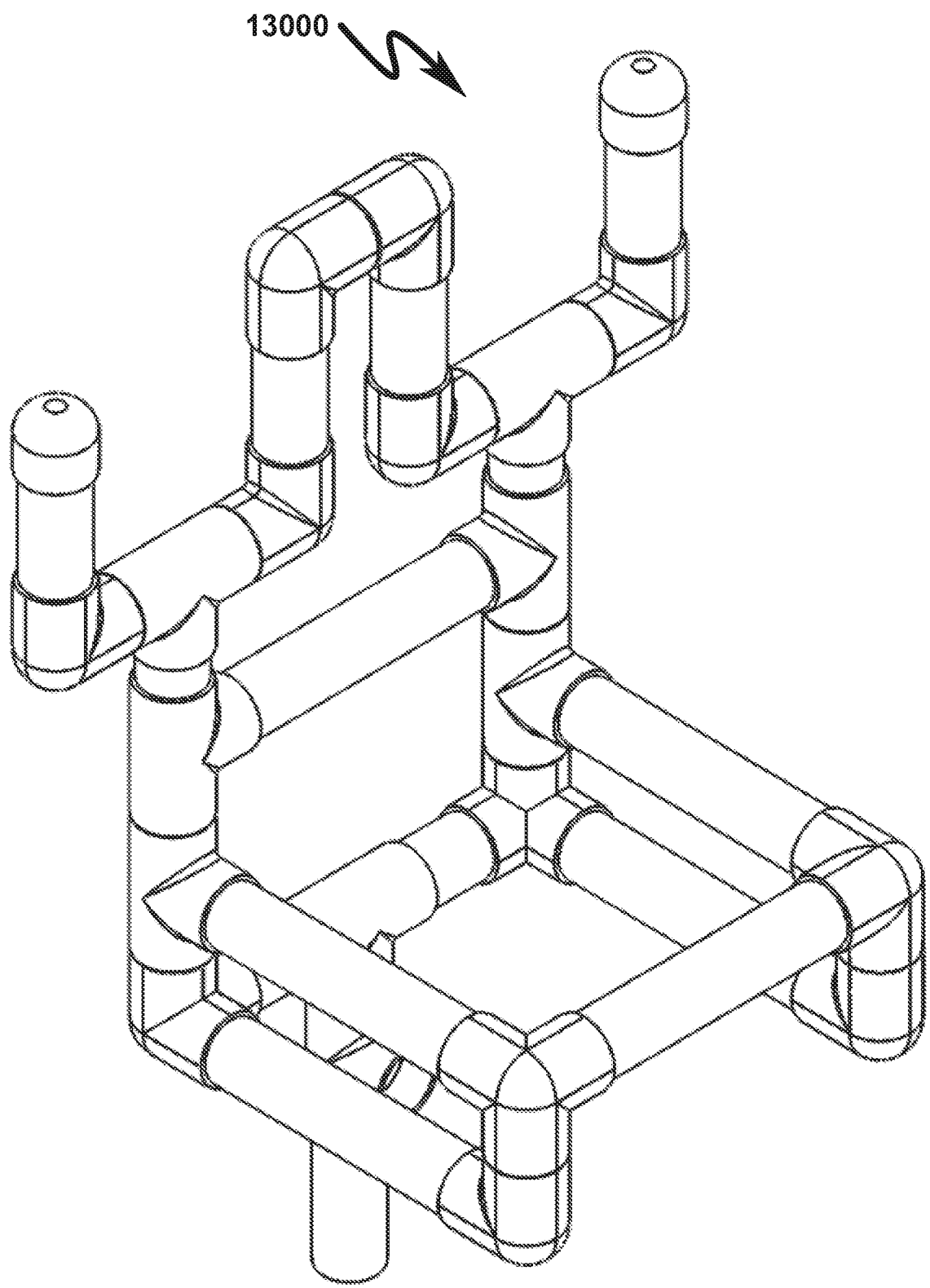

The present invention may in some preferred embodiments incorporate a dual hose rack configuration as generally depicted in the views of FIG. 129 (12900)-FIG. 138 (13800). This exemplary embodiment also incorporates a wraparound cooler containment feature.

Four-Hose Rack Configuration (13900)-(14800)

The present invention may in some preferred embodiments incorporate a four-hose rack configuration as generally depicted in the views of FIG. 139 (13900)-FIG. 148 (14800). This exemplary embodiment also incorporates a front/back cooler containment feature.

Four-Hose+Pole Rack Configuration (14900)-(16000)

The present invention may in some preferred embodiments incorporate a four-hose rack configuration in conjunction with an overhead pole rack as generally depicted in the views of FIG. 149 (14900)-FIG. 160 (16000). The overhead pole rack may comprise one or more horizontal tubes fitted with rubberized reducing end cups (15710) and hose clamps (15720) (as generally detailed in FIG. 157 (15700)-FIG. 158 (15800)) to allow maintenance tools of significant length to be stored horizontally over the truck frame as depicted in FIG. 159 (15900)-FIG. 160 (16000). Normally this type of long-tool storage would not be possible except by using a full-frame storage system as taught by the prior art. With this present invention approach the main truck bed remains open for storage of pool supplies and other maintenance materials as needed.

Hose Rack/Pole Rack Configurations Reconfigurable

The hose rack configurations described above may be utilized with any of the other depicted tool rack configurations described herein. Furthermore, the overhead pole rack described above may be used in any of the hose rack configurations depicted herein and may be removable in some preferred invention embodiments.

Preferred Invention Manufacturing

As can be seen in the preferred invention embodiments, the present invention may be constructed using a single type of extrusion that may be formed of a plastic (preferably PVC or ABS) or in some circumstances aluminum (typically 6061 or 6063 alloys). This construction methodology has several advantages over the prior art, including:

The use of a single type of rectangular extrusion profile (REP) drastically reduces the overall cost of manufacturing. While the invention as depicted in the drawings makes use of a top and bottom extrusion that have smooth outer surfaces, the present invention can be implemented using a single extrusion type that is depicted herein within the middle core of the DTS and ETS structures.

System elements such as the DTS, ETS, and RHR may be customized in length by simply cutting extrusions of a fixed length to size.

The DTS, ETS, and RHR may be customized as to their number by simply stacking a given extrusion form together to construct an overall tube stack of any desired level.

The inner core of the extrusion need not be limited to a half-circle but can be elongated in shape to support storage of more complex tool shapes.

Fastener types used to combine the extrusions are of a single type and as such reduce the stocking requirement for the tool rack system.

One skilled in the art will recognize that this list of advantages is only exemplary and not limitive of the present invention scope.

Extensible Nature of Invention

The embodiments illustrated in the attached drawings are illustrative of some preferred invention configurations. It is important to note that the present invention is designed to be extensible with respect to both the DTS, ETS, and RHR components, such that if additional tool storage is required, it can be retrofitted by simply extending the DTS/ETS stack or adding additional U-shaped rotatable forks within the RHR vertical tree structure.

Preferred Embodiment System Summary

The present invention preferred exemplary system embodiment anticipates a wide variety of variations in the basic theme of construction, but can be generalized as a tool rack system comprising:

(a) elongated tube stack (ETS);
(b) diagonal tube stack (DTS); and
(c) reconfigurable hose rack (RHR);
wherein:
the ETS is configured to mechanically couple to the bed of a pickup truck;
the ETS comprises a first combination of linear elements (FLE) in an elongated linear structure (ELS) coupled together in a singular vertical plane, the FLE further comprising a plurality of elongated voids positioned within and extending along the ELS;
the DTS comprises a second combination of linear elements (SLE) in diagonal linear structure (DLS) coupled together in a singular vertical plane, the SLE further comprising a plurality of elongated voids positioned within and extending along the DLS;
the ETS is configured to have an overall length greater than the DTS;
the DTS is mechanically coupled to the ETS;
the mechanical coupling of the DTS to the ETS allows a longitudinal axis within the DTS to be adjusted to be non-collinear with a longitudinal axis within the ETS;
the RHR is mechanically coupled to the ETS;

the mechanical coupling of the RHR the ETS allows a longitudinal axis within the RHR to be adjusted to be non-collinear with a longitudinal axis within the ETS; and the RHR further comprises a plurality of U-shaped forks rotatably configurable to support the storage of coiled hose or pipe stock.

This general system summary may be augmented by the various elements described herein to produce a wide variety of invention embodiments consistent with this overall design description.

Alternate Preferred Embodiment System Summary

An alternate present invention preferred exemplary system embodiment anticipates a wide variety of variations in the basic theme of construction, but can be generalized as a tool rack system comprising:
  (a) elongated tube stack (ETS);
  (b) diagonal tube stack (DTS);
  (c) reconfigurable hose rack (RHR); and
  (d) wheel-well support rack (WSR);
wherein:
  the WSR is configured to mechanically couple to the bed of a pickup truck;
  the WSR comprises a material retention cage (MRC) comprising an internal horizontal platform connected to four legs within the MRC between distal ends of the four legs and connected at upper distal ends of the four legs by a peripheral retention skirt (PRS);
  the MRC is configured to be placed over a wheel well in the bed of a pickup truck;
  the ETS is configured to mechanically couple to the PRS;
  the ETS comprises a first combination of linear elements (FLE) in an elongated linear structure (ELS) coupled together in a singular vertical plane, the FLE further comprising a plurality of elongated voids positioned within and extending along the ELS;
  the DTS comprises a second combination of linear elements (SLE) in diagonal linear structure (DLS) coupled together in a singular vertical plane, the SLE further comprising a plurality of elongated voids positioned within and extending along the DLS;
  the ETS is configured to have an overall length greater than the DTS;
  the DTS is mechanically coupled to the ETS;
  the mechanical coupling of the DTS to the ETS allows a longitudinal axis within the DTS to be adjusted to be non-collinear with a longitudinal axis within the ETS;
  the RHR is mechanically coupled to the ETS;
  the mechanical coupling of the RHR the ETS allows a longitudinal axis within the RHR to be adjusted to be non-collinear with a longitudinal axis within the ETS; and
  the RHR further comprises a plurality of U-shaped forks rotatably configurable to support the storage of coiled hose or pipe stock.

This general system summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
  An embodiment wherein the ETS further comprises rubberized end-caps.
  An embodiment wherein the RHR further comprises a vertical support member (VSM) configured to support the RHR on the wheel-well of a pickup truck.
  An embodiment wherein the DTS, the ETS, and the RHR comprises extruded PVC pipe.
  An embodiment wherein the DTS, the ETS, and the RHR comprise a rectangular extrusion profile (REP) further comprising a semi-circular void on one face of the REP.
  An embodiment wherein the REP further comprises a plurality of paired insets on one set of opposing faces of the REP, the plurality of paired insets configured to accept fasteners to combine a plurality of the REPs together into a unified structure.
  An embodiment wherein the DTS and the ETS comprise a rectangular extrusion profile (REP) further comprising a slotted void having a semi-circular edge on one face of the REP.
  An embodiment wherein the REP further comprises a plurality of paired insets on one set of opposing faces of the REP, the plurality of paired insets configured to accept fasteners to combine a plurality of the REPs together into a unified structure.
  An embodiment wherein the RHR is configured to retain a cylindrical water cooler.
  An embodiment wherein the ETS further comprises a two-piece mounting bracket consisting of:
    (a) top bracket angle iron (TBA);
    (b) bottom bracket angle iron (BBA);
    (c) top bracket cushion (TBC);
    (d) bracket tensioning bolt (BTB);
  wherein:
    the TBA comprises an angular structure having a top mating face and a side sliding face;
    the BBA comprises an angular structure having a top mating face and a side sliding face;
    the BBA top mating face comprises a threaded portion configured to receive the BTB;
    the TBA and the BBA are configured such that the TBA sliding face and the BBA sliding face are in contact with each other;
    the TBC comprises a flexible soft material comprising a top face and a bottom face;
    the TBC top face conforms to the TBA top mating face; and
    the TBC bottom face and the BBA top mating face are configured to mate to an upper sidewall lip of a pickup truck bed when the BTB is engaged into the BBA.

One skilled in the art will recognize that other embodiments are possible based on combinations of elements taught within the above invention description.

CONCLUSION

A tool rack system/method configured for operation on a pickup truck has been disclosed. The system integrates a diagonal tube stack (DTS), an elongated tube stack (ETS), and a reconfigurable hose rack (RHR). The DTS, ETS, and RHR are configured for placement over the wheel well and tailgate in a pickup truck such that tools inserted within the tool rack are organized and readily available without cluttering the pickup truck bed. The ETS is configured to permit retention of oversized hand tools such as pool cleaning implements without the need for an overhead truck rack. The RHR may be reconfigured to adapt to the overhead retention of long pipe joints as well as hoses such as those used in pool maintenance operations. In both of these reconfigured modes the RHR obviates the need for a conventional truck rack or the use of space within the truck bed for storage.

CLAIMS INTERPRETATION

The following rules apply when interpreting the CLAIMS of the present invention:
The CLAIM PREAMBLE should be considered as limiting the scope of the claimed invention.
"WHEREIN" clauses should be considered as limiting the scope of the claimed invention.
"WHEREBY" clauses should be considered as limiting the scope of the claimed invention.
"ADAPTED TO" clauses should be considered as limiting the scope of the claimed invention.
"ADAPTED FOR" clauses should be considered as limiting the scope of the claimed invention.
The term "MEANS" specifically invokes the means-plus-function claims limitation recited in 35 U.S.C. § 112(f) and such claim shall be construed to cover the corresponding structure, material, or acts described in the specification and equivalents thereof.
The phrase "MEANS FOR" specifically invokes the means-plus-function claims limitation recited in 35 U.S.C. § 112(f) and such claim shall be construed to cover the corresponding structure, material, or acts described in the specification and equivalents thereof.
The phrase "STEP FOR" specifically invokes the step-plus-function claims limitation recited in 35 U.S.C. § 112(f) and such claim shall be construed to cover the corresponding structure, material, or acts described in the specification and equivalents thereof.
The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").
The claims presented herein are to be interpreted in light of the specification and drawings presented herein with sufficiently narrow scope such as to not preempt any abstract idea.
The claims presented herein are to be interpreted in light of the specification and drawings presented herein with sufficiently narrow scope such as to not preclude every application of any idea.
The claims presented herein are to be interpreted in light of the specification and drawings presented herein with sufficiently narrow scope such as to preclude any basic mental process that could be performed entirely in the human mind.
The claims presented herein are to be interpreted in light of the specification and drawings presented herein with sufficiently narrow scope such as to preclude any process that could be performed entirely by human manual effort.

What is claimed is:
1. A tool rack system comprising:
(a) elongated tube stack (ETS);
(b) diagonal tube stack (DTS); and
(c) reconfigurable hose rack (RHR);
wherein:
said ETS is configured to mechanically couple to the bed of a pickup truck;
said ETS comprises a first combination of linear elements (FLE) in an elongated linear structure (ELS) coupled together in a first singular vertical plane (FSVP), said FLE further comprising a plurality of elongated voids positioned within and extending along said ELS;
said DTS comprises a second combination of linear elements (SLE) in a diagonal linear structure (DLS) coupled together in a second singular vertical plane (SSVP), said SLE further comprising a plurality of elongated voids positioned within and extending along said DLS;
said ETS is configured to have an overall length greater than said DTS;
said DTS is mechanically coupled to said ETS;
said mechanical coupling of said DTS to said ETS allows a longitudinal axis within said DTS to be adjusted to be non-collinear with a longitudinal axis within said ETS;
said RHR is mechanically coupled to said ETS;
said mechanical coupling of said RHR to said ETS allows a longitudinal axis within said RHR to be adjusted to be non-collinear with a longitudinal axis within said ETS;
said RHR further comprises a plurality of U-shaped forks rotatably configurable to support the storage of coiled hose or pipe stock;
said DTS, said ETS, and said mechanical coupling of said RHR to said ETS comprise a rectangular extrusion profile (REP) further comprising a semi-circular void on one face of said REP; and
said REP further comprises a plurality of paired insets on one set of opposing faces of said REP, said plurality of paired insets configured to accept fasteners to combine a plurality of said REPs together into a unified structure.

2. The tool rack system of claim 1 wherein said ETS further comprises rubberized end-caps.

3. The tool rack system of claim 1 wherein said RHR further comprises a vertical support member (VSM) configured to support said RHR on the wheel-well of a pickup truck.

4. The tool rack system of claim 1 wherein said DTS, said ETS, and said RHR comprises extruded PVC pipe.

5. The tool rack system of claim 1 wherein said RHR is configured to retain a cylindrical water cooler.

6. The tool rack system of claim 1 wherein said ETS further comprises a two-piece mounting bracket consisting of:
(a) top bracket angle iron (TBA);
(b) bottom bracket angle iron (BBA);
(c) top bracket cushion (TBC);
(d) bracket tensioning bolt (BTB);
wherein:
said TBA comprises an angular structure having a top mating face and a side sliding face;
said BBA comprises an angular structure having a top mating face and a side sliding face;
said BBA top mating face comprises a threaded portion configured to receive said BTB;
said TBA and said BBA are configured such that said TBA sliding face and said BBA sliding face are in contact with each other;
said TBC comprises a material comprising a top face and a bottom face;

said TBC top face conforms to said TBA top mating face; and said TBC bottom face and said BBA top mating face are configured to mate to an upper sidewall lip of a pickup truck bed when said BTB is engaged into said BBA.

7. A tool rack system comprising:
(a) elongated tube stack (ETS);
(b) diagonal tube stack (DTS); and
(c) reconfigurable hose rack (RHR);
wherein:
said ETS is configured to mechanically couple to the bed of a pickup truck;
said ETS comprises a first combination of linear elements (FLE) in an elongated linear structure (ELS) coupled together in a first singular vertical plane (FSVP), said FLE further comprising a plurality of elongated voids positioned within and extending along said ELS;
said DTS comprises a second combination of linear elements (SLE) in a diagonal linear structure (DLS) coupled together in a second singular vertical plane (SSVP), said SLE further comprising a plurality of elongated voids positioned within and extending along said DLS;
said ETS is configured to have an overall length greater than said DTS;
said DTS is mechanically coupled to said ETS;
said mechanical coupling of said DTS to said ETS allows a longitudinal axis within said DTS to be adjusted to be non-collinear with a longitudinal axis within said ETS;
said RHR is mechanically coupled to said ETS;
said mechanical coupling of said RHR to said ETS allows a longitudinal axis within said RHR to be adjusted to be non-collinear with a longitudinal axis within said ETS;
said RHR further comprises a plurality of U-shaped forks rotatably configurable to support the storage of coiled hose or pipe stock;
said DTS and said ETS comprise a rectangular extrusion profile (REP) further comprising a slotted void having a semi-circular edge on one face of said REP; and
said REP further comprises a plurality of paired insets on one set of opposing faces of said REP, said plurality of paired insets configured to accept fasteners to combine a plurality of said REPs together into a unified structure.

8. The tool rack system of claim 7 wherein said ETS further comprises rubberized end-caps.

9. The tool rack system of claim 7 wherein said RHR further comprises a vertical support member (VSM) configured to support said RHR on the wheel-well of a pickup truck.

10. The tool rack system of claim 7 wherein said DTS, said ETS, and said RHR comprises extruded PVC pipe.

11. A tool rack system comprising:
(a) elongated tube stack (ETS);
(b) diagonal tube stack (DTS);
(c) reconfigurable hose rack (RHR); and
(d) wheel-well support rack (WSR);
wherein:
said WSR is configured to mechanically couple to the bed of a pickup truck;
said WSR comprises a material retention cage (MRC) comprising an internal horizontal platform connected to four legs within said MRC between distal ends of said four legs and connected at upper distal ends of said four legs by a peripheral retention skirt (PRS);
said MRC is configured to be placed over a wheel well in the bed of a pickup truck;
said ETS is configured to mechanically couple to said PRS;
said ETS comprises a first combination of linear elements (FLE) in an elongated linear structure (ELS) coupled together in a first singular vertical plane (FSVP), said FLE further comprising a plurality of elongated voids positioned within and extending along said ELS;
said DTS comprises a second combination of linear elements (SLE) in a diagonal linear structure (DLS) coupled together in a second singular vertical plane (SSVP), said SLE further comprising a plurality of elongated voids positioned within and extending along said DLS;
said ETS is configured to have an overall length greater than said DTS;
said DTS is mechanically coupled to said ETS;
said mechanical coupling of said DTS to said ETS allows a longitudinal axis within said DTS to be adjusted to be non-collinear with a longitudinal axis within said ETS;
said RHR is mechanically coupled to said ETS;
said mechanical coupling of said RHR to said ETS allows a longitudinal axis within said RHR to be adjusted to be non-collinear with a longitudinal axis within said ETS;
said RHR further comprises a plurality of U-shaped forks rotatably configurable to support the storage of coiled hose or pipe stock;
said DTS, said ETS, and said mechanical coupling of said RHR to said ETS comprise a rectangular extrusion profile (REP) further comprising a semi-circular void on one face of said REP; and
said REP further comprises a plurality of paired insets on one set of opposing faces of said REP, said plurality of paired insets configured to accept fasteners to combine a plurality of said REPs together into a unified structure.

12. The tool rack system of claim 11 wherein said ETS further comprises rubberized end-caps.

13. The tool rack system of claim 11 wherein said RHR further comprises a vertical support member (VSM) configured to support said RHR on the wheel-well of a pickup truck.

14. The tool rack system of claim 11 wherein said DTS, said ETS, and said RHR comprises extruded PVC pipe.

15. The tool rack system of claim 11 wherein said RHR is configured to retain a cylindrical water cooler.

16. The tool rack system of claim 11 wherein said ETS further comprises a two-piece mounting bracket consisting of:
(a) top bracket angle iron (TBA);
(b) bottom bracket angle iron (BBA);
(c) top bracket cushion (TBC);
(d) bracket tensioning bolt (BTB);
wherein:
said TBA comprises an angular structure having a top mating face and a side sliding face;
said BBA comprises an angular structure having a top mating face and a side sliding face;
said BBA top mating face comprises a threaded portion configured to receive said BTB;
said TBA and said BBA are configured such that said TBA sliding face and said BBA sliding face are in contact with each other;
said TBC comprises a material comprising a top face and a bottom face;
said TBC top face conforms to said TBA top mating face; and said TBC bottom face and said BBA top mating face are configured to mate to an upper sidewall lip of a pickup truck bed when said BTB is engaged into said BBA.

17. A tool rack system comprising:
(a) elongated tube stack (ETS);
(b) diagonal tube stack (DTS);
(c) reconfigurable hose rack (RHR); and
(d) wheel-well support rack (WSR);
wherein:
said WSR is configured to mechanically couple to the bed of a pickup truck;
said WSR comprises a material retention cage (MRC) comprising an internal horizontal platform connected to four legs within said MRC between distal ends of said four legs and connected at upper distal ends of said four legs by a peripheral retention skirt (PRS);
said MRC is configured to be placed over a wheel well in the bed of a pickup truck;
said ETS is configured to mechanically couple to said PRS;
said ETS comprises a first combination of linear elements (FLE) in an elongated linear structure (ELS) coupled together in a first singular vertical plane (FSVP), said FLE further comprising a plurality of elongated voids positioned within and extending along said ELS;
said DTS comprises a second combination of linear elements (SLE) in a diagonal linear structure (DLS) coupled together in a second singular vertical plane (SSVP), said SLE further comprising a plurality of elongated voids positioned within and extending along said DLS;
said ETS is configured to have an overall length greater than said DTS;
said DTS is mechanically coupled to said ETS;
said mechanical coupling of said DTS to said ETS allows a longitudinal axis within said DTS to be adjusted to be non-collinear with a longitudinal axis within said ETS;
said RHR is mechanically coupled to said ETS;
said mechanical coupling of said RHR to said ETS allows a longitudinal axis within said RHR to be adjusted to be non-collinear with a longitudinal axis within said ETS;
said RHR further comprises a plurality of U-shaped forks rotatably configurable to support the storage of coiled hose or pipe stock;
said DTS and said ETS comprise a rectangular extrusion profile (REP) further comprising a slotted void having a semi-circular edge on one face of said REP; and
said REP further comprises a plurality of paired insets on one set of opposing faces of said REP, said plurality of paired insets configured to accept fasteners to combine a plurality of said REPs together into a unified structure.

18. The tool rack system of claim 17 wherein said ETS further comprises rubberized end-caps.

19. The tool rack system of claim 17 wherein said RHR further comprises a vertical support member (VSM) configured to support said RHR on the wheel-well of a pickup truck.

20. The tool rack system of claim 17 wherein said DTS, said ETS, and said RHR comprises extruded PVC pipe.

* * * * *